(12) United States Patent
Su et al.

(10) Patent No.: US 12,381,677 B2
(45) Date of Patent: Aug. 5, 2025

(54) CONFIGURING PHYSICAL RESOURCES FOR INTERFERENCE CANCELLATION

(71) Applicant: Samsung Electronics Co., Ltd., Suwon-si (KR)

(72) Inventors: Di Su, Beijing (CN); Chuang Zhang, Beijing (CN); Yingjie Zhang, Beijing (CN); Peng Lin, Beijing (CN); Chen Qian, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/061,826

(22) Filed: Dec. 5, 2022

(65) Prior Publication Data

US 2023/0102171 A1 Mar. 30, 2023

Related U.S. Application Data

(63) Continuation of application No. 17/057,075, filed as application No. PCT/KR2019/006147 on May 22, 2019, now Pat. No. 11,522,654.

(30) Foreign Application Priority Data

May 22, 2018 (CN) .......................... 201810496781.6
Aug. 8, 2018 (CN) .......................... 201810899502.0
(Continued)

(51) Int. Cl.
*H04L 5/00* (2006.01)
*H04W 72/04* (2023.01)

(52) U.S. Cl.
CPC ........... *H04L 5/0048* (2013.01); *H04W 72/04* (2013.01)

(58) Field of Classification Search
CPC ..... H04L 5/0048; H04L 5/005; H04L 5/0051; H04L 1/0001; H04L 5/00; H04L 5/14;
(Continued)

(56) References Cited

U.S. PATENT DOCUMENTS

| | | |
|---|---|---|
| 8,098,621 B2 | 1/2012 | Beale |
| 2004/0017867 A1 | 1/2004 | Thomas et al. |

(Continued)

FOREIGN PATENT DOCUMENTS

| | | |
|---|---|---|
| CN | 1593030 A | 3/2005 |
| CN | 103634022 A | 3/2014 |

(Continued)

OTHER PUBLICATIONS

International Search Report dated Sep. 6, 2019 in connection with International Patent Application No. PCT/KR2019/006147, 3 pages.
(Continued)

*Primary Examiner* — Brian T Le

(57) ABSTRACT

For supporting higher data rates, resource configuration includes: acquiring, by a terminal, a configuration of physical resources; and performing, by the terminal, transmission according to the configured physical resources, wherein performing, by the terminal, transmission according to the configured physical resources comprises one of: neither performing, by the terminal, uplink transmission nor performing downlink reception on the configured physical resources; performing, by the terminal, only downlink reception on the configured physical resources; and performing, by the terminal, only uplink transmission on the configured physical resources.

20 Claims, 72 Drawing Sheets

(30) Foreign Application Priority Data

| Aug. 23, 2018 | (CN) | .......................... 201810969845.X |
|---|---|---|
| Nov. 30, 2018 | (CN) | .......................... 201811459991.5 |
| Nov. 30, 2018 | (CN) | .......................... 201811462831.4 |

(58) Field of Classification Search
CPC .......... H04L 27/26; H04L 5/16; H04W 72/04; H04W 72/12; H04W 72/11; H04W 72/115; H04W 72/40; H04W 72/044; H04W 72/0446; H04W 72/0453; H04W 72/0457; H04W 72/046; H04W 72/0466; H04W 72/0473; H04W 16/00; H04W 36/06; H04B 7/024

See application file for complete search history.

(56) References Cited

U.S. PATENT DOCUMENTS

| 2013/0083710 | A1 | 4/2013 | Chen et al. |
|---|---|---|---|
| 2013/0194984 | A1 | 8/2013 | Cheng et al. |
| 2013/0286903 | A1 | 10/2013 | Khojastepour et al. |
| 2014/0348018 | A1 | 11/2014 | Bharadia et al. |
| 2016/0338038 | A1 | 11/2016 | Zhang et al. |
| 2017/0201990 | A1 | 7/2017 | Wang et al. |
| 2017/0223709 | A1 | 8/2017 | Noh |
| 2017/0353992 | A1 | 12/2017 | Quan et al. |
| 2018/0007667 | A1 | 1/2018 | You et al. |
| 2018/0279229 | A1* | 9/2018 | Dinan ................... H04W 72/21 |
| 2019/0246287 | A1 | 8/2019 | Liu et al. |
| 2020/0322184 | A1 | 10/2020 | Kim et al. |

FOREIGN PATENT DOCUMENTS

| CN | 103760541 A | 4/2014 |
|---|---|---|
| CN | 108023706 A | 5/2018 |
| EP | 3200524 A1 | 8/2017 |
| KR | 10-2017-0090307 A | 8/2017 |
| WO | 2017084808 A1 | 5/2017 |

OTHER PUBLICATIONS

Written Opinion of the International Searching Authority dated Sep. 6, 2019 in connection with International Patent Application No. PCT/KR2019/006147, 5 pages.

Supplementary European Search Report dated Apr. 15, 2021 in connection with European Patent Application No. 19 80 7491, 18 pages.

China National Intellectual Property Administration, "The First Office Action" dated Nov. 12, 2021, in connection with counterpart Chinese Patent Application No. 201811459991.4, 23 pages.

LG Electronics, "Discussion on FDD support in NR", 3GPP TSG RAN WG1 Meeting #90bis, Oct. 9-13, 2017, R1-1717982, 8 pages.

Office Action Report dated Apr. 9, 2024, in connection with European Patent Application No. 19807491.6, 7 pages.

Office Action issued Sep. 19, 2024, in connection with Korean Patent Application No. 10-2020-7033672, 16 pages.

CATT, "Dynamic TDD slot structure," 3GPP TSG RAN WG1 NR Ad-Hoc Meeting, R1-1700211, Spokane, USA, Jan. 2017, 2 pages.

CATT, "Interference management for dynamic TDD and flexible duplex," 3GPP TSG RAN WG1 Meeting #88, R1-1702113, Athens, Greece Feb. 2017, 3 pages.

Request for the Submission of an Opinion dated May 29, 2025, in connection with KR Application No. 10-2020-7033672, 19 pages.

* cited by examiner

FIG. 11
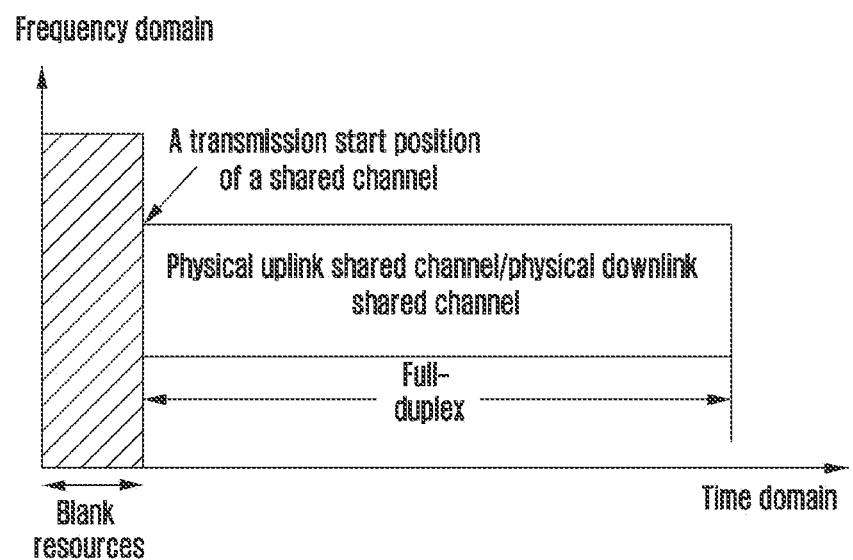
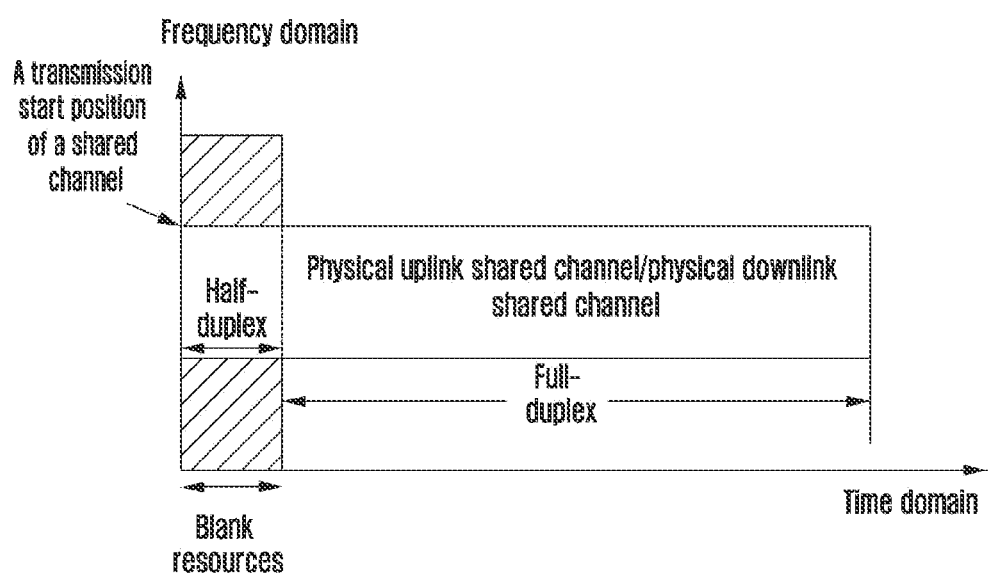

FIG. 14 informing a terminal of an valid physical resource configuration
for a second direction and/or an invalid physical resource
configuration for transmission in a first direction on a band/bandwidth —S1410
of the first direction, wherein the first direction is one of uplink and
downlink, and the second direction is the
other of the uplink and downlink

Obtain At Least One Of Fllowing Transmission Resource Configuration :
A Transmissiom Resource Configuration For Uplink And/or Downlink
Transmission Waveform ,
A Transmissiom Resource Configuration For Uplink And/or Downlink
Resource Allocation Type ,
A Transmissiom Resource Configuration For Uplink And/or Downlink
Transmission And Mapping Method ,
A Configuration For Invalid Physical Resources In Allocated Physical
Resources For Uplink And/or Downlink Transmissions , On Which No
Transmission Is Yo Be Performed — 2401

Perform Transmission According To The Obtained At Least One Of The
Transmission Resource Configurations — 2402

CONFIGURING PHYSICAL RESOURCES FOR INTERFERENCE CANCELLATION

CROSS-REFERENCES TO RELATED APPLICATIONS

This application is a continuation of application Ser. No. 17/057,075 filed Nov. 19, 2020, now U.S. Pat. No. 11,522,654 issued Dec. 6, 2022, which is a 371 of International Application No. PCT/KR2019/006147 filed on May 22, 2019, which claims priority to Chinese Patent Application No. 201810496781.6 filed on May 22, 2018, Chinese Patent Application No. 201810899502.0 filed on Aug. 8, 2018, Chinese Patent Application No. 201810969845.X filed on Aug. 23, 2018, Chinese Patent Application No. 201811459991.4 filed on Nov. 30, 2018, and Chinese Patent Application No. 201811462831.5 filed on Nov. 30, 2018, the disclosures of which are herein incorporated by reference in their entirety.

BACKGROUND

1. Field

The present disclosure relates to the field of interference cancellation technology, and more particularly, to a method for resource configuration and a device and a storage medium thereof for the purpose of interference cancellation.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The rapid growth of mobile data services, especially the exponential growth of high-definition video services and ultra-high-definition video services, higher demands are put on transmission rates of wireless communications. The full-duplex technology can further improve spectrum utilization on the basis of existing systems. In order to enable full-duplex systems to operate, the core problem is to design a solution to cancel self-interference, so that strength of self-interference signals is reduced to at least the same level as that of a noise floor.

A base station or a terminal device operating in a full-duplex mode needs to be configured with an analog cancellation circuit. Therefore, there is a need for a certain design to ensure that there are one or more opportunities to transmit a unidirectional transmission signal and a time for iterative convergence before the base station or the terminal is scheduled for full-duplex transmission. However, this is difficult to be ensured through reference signals and allocation of physical resources of existing communication systems.

Therefore, there is a need for a method which can provide the opportunity to transmit a unidirectional transmission signal and the time for iterative convergence to at least partially solve the above problems.

SUMMARY

According to a first aspect of the present disclosure, there is provided a method for resource configuration, comprising:
configuring physical resources; and
notifying a terminal of the configured resources.
Here, the terminal neither performs uplink transmission nor performs downlink reception on the configured physical resources; or the terminal performs only downlink reception on the configured physical resources; or the terminal performs only uplink transmission on the configured physical resources.

In some examples, the configured physical resources comprise resources for one reference signal configured according to first configuration parameters and second configuration parameters respectively, and the method comprises: performing iterative convergence of an analog cancellation circuit according to the reference signal transmitted on the resources which are configured according to the second configuration parameters; or performing iterative convergence of the analog cancellation circuit according to the reference signal transmitted on the resources which are configured according to the first configuration parameters and the second configuration parameters respectively.

In this case, the second configuration parameters comprise at least one of:
transmission period of the reference signal;
request or trigger for the reference signal transmission;
bandwidth of the reference signal;
antenna ports through which the reference signal is transmitted;
number of the antenna ports through which the reference signal is transmitted;
density of the reference signal;
power offset of the reference signal; and
time domain and frequency domain resources of the reference signal.

In some examples, the configured physical resources further comprise resources configured according to the first configuration parameters.

In some examples, the transmission period and/or the bandwidth of the reference signal in the second configuration parameters are greater than or equal to a transmission period and/or a bandwidth of the reference signal in the first configuration parameters.

In some examples, the resources configured according to the first configuration parameters and the resources configured according to the second configuration parameters are allocated in a time division multiplexing or frequency division multiplexing manner.

In some examples, the reference signal transmitted on the resources which are configured according to the second configuration parameters is obtained by performing duplicate mapping on the reference signal transmitted on the resources which are configured according to the first configuration parameters in a frequency domain many times.

In some examples, the method may further comprise: indicating dedicated physical resources by high layer signaling or a system rule, on which the terminal performs neither transmission nor reception, or the terminal does not perform reception on the dedicated physical resources. Here, when the dedicated physical resources comprise periodic physical resources, indication by the high layer signaling comprises at least one of: period of the dedicated physical resources, time domain resources of the dedicated physical resources, frequency domain resources of the dedicated physical resources, and the system rule is to determine the time domain and the frequency domain resource positions of the dedicated physical resources according to physical resource positions of physical signal(s) or physical channel(s). Here, when the dedicated physical resources comprise aperiodic physical resources, the content indicated by the high layer signaling comprises at least one of: a trigger to enable the dedicated physical resources, time domain resource positions of the dedicated physical resources, frequency domain resource positions of the dedicated physical resources, and the system rule is to determine the time domain resource positions and the frequency domain resource positions of the dedicated physical resources according to the physical resource positions of physical signal(s) or physical channel(s).

In some examples, determining the time domain resource positions and the frequency domain resource positions of the dedicated physical resources according to the physical resource positions of physical signal(s) or physical channel(s) may comprise: determining the period of the dedicated physical resources as an integer multiple of the period of the physical signal(s) or the physical channel(s); and determining a time domain start position of the dedicated physical resources to be the same as or have a fixed offset from a time domain start position of physical signal(s) or physical channel(s). In these examples, when the time domain/frequency domain resources of the dedicated physical resources overlap or partially overlap with the time domain/frequency domain resources of the physical signal(s) or the physical channel(s), time domain duration and/or a bandwidth of the dedicated physical resources may be equal to or greater than time domain duration and/or a bandwidth of the physical signal(s) or the physical channel(s).

In some examples, time domain/frequency domain resources of physical signal(s) or physical channel(s), which are transmitted at the same start time, may puncture into the dedicated physical resources.

In some examples, a time domain end position of the dedicated physical resources is before the start position of a scheduled physical uplink shared channel/physical downlink shared channel, wherein there may be an interval between the time domain end position of the dedicated physical resources and the time domain start position of the physical uplink shared channel/physical downlink shared channel, which may be predefined or indicated by signaling; and/or the time domain start position of the dedicated physical resources may be after the start position of the scheduled physical uplink shared channel/physical downlink shared channel, wherein there may be an interval between the time domain start position of the dedicated physical resources and the time domain start position of the physical uplink shared channel/physical downlink shared channel, which may be predefined or indicated by signaling.

In some examples, dedicated physical resources on which the terminal does not perform transmission or reception and dedicated physical resources on which the terminal does not perform reception are allocated in a time division multiplexing manner.

According to a second aspect of the present disclosure, there is provided a transmission method based on resource configuration, comprising:
acquiring, by a terminal, a configuration of physical resources; and
performing, by the terminal, transmission according to the configured physical resources.

Performing, by the terminal, transmission according to the configured physical resources comprises one of: neither performing, by the terminal, uplink transmission nor performing downlink reception on the configured physical resources; performing, by the terminal, only downlink reception on the configured physical resources; and performing, by the terminal, only uplink transmission on the configured physical resources.

In some examples, the configured physical resources comprise resources configured according to first configuration parameters and second configuration parameters for a reference signal respectively, and performing, by the terminal, transmission according to the configured physical resources comprises:
when the reference signal transmitted on the configured physical resources is a downlink reference signal, not performing, by the terminal, uplink transmission on the resources configured according to the second configuration parameters; and when the reference signal transmitted on the configured physical resources is an uplink reference signal, not performing, by the terminal, downlink reception on the resources configured according to the second configuration parameters.

In some of the above examples, the method further comprises: performing, by the terminal, iterative convergence of an analog cancellation circuit according to the reference signal transmitted on the resources which are configured according to the second configuration parameters; or performing, by the terminal, iterative convergence of the analog cancellation circuit according to the reference signal transmitted on the resources which are configured according to the first configuration parameters and the second configuration parameters respectively.

In some examples, the second configuration parameters comprise at least one of:
  transmission period of the reference signal;
  request or trigger for the reference signal transmission:
  bandwidth of the reference signal;
  antenna ports through which the reference signal is transmitted;
  number of the antenna ports through which the reference signal is transmitted,
  density of the reference signal;
  power offset of the reference signal; and
  time domain and frequency domain resources of the reference signal.

In some examples, the resources configured according to the first configuration parameters and the resources configured according to the second configuration parameters are allocated in a time division multiplexing or frequency division multiplexing manner.

In some examples, the reference signal transmitted on the resources which are configured according to the second configuration parameters is obtained by performing duplicate mapping on the reference signal transmitted on the resources which are configured according to the first configuration parameters in a frequency domain many times.

In some examples, dedicated physical resources are indicated by high layer signaling or a system rule, on which the terminal performs neither transmission nor reception, or the terminal does not perform reception on the dedicated physical resources. Here, when the dedicated physical resources comprise periodic physical resources, indication by the high layer signaling comprises at least one of: period of the dedicated physical resources, time domain resources of the dedicated physical resources, frequency domain resources of the dedicated physical resources, and the system rule is to determine the time domain and the frequency domain resource positions of the dedicated physical resources according to physical resource positions of physical signal(s) or physical channel(s). When the dedicated physical resources comprise aperiodic physical resources, the content indicated by the high layer signaling comprises at least one of: a trigger to enable the dedicated physical resources, time domain resource positions of the dedicated physical resources, frequency domain resource positions of the dedicated physical resources, and the system rule is to determine the time domain resource positions and the frequency domain resource positions of the dedicated physical resources according to the physical resource positions of physical signal(s) or physical channel(s).

In some examples, for the aperiodic physical resources, determining the time domain resource positions and the frequency domain resource positions of the dedicated physical resources according to the physical resource positions of physical signal(s) or physical channel(s) comprises: determining the period of the dedicated physical resources as an integer multiple of the period of the physical signal(s) or the physical channel(s); and determining a time domain start position of the dedicated physical resources to be the same as or have a fixed offset from a time domain start position of physical signal(s) or physical channel(s). Here, when the time domain/frequency domain resources of the dedicated physical resources overlap or partially overlap with the time domain/frequency domain resources of the physical signal(s) or the physical channel(s), time domain duration and/or a bandwidth of the dedicated physical resources are equal to or greater than time domain duration and/or a bandwidth of the physical signal(s) or the physical channel(s).

In some examples, time domain/frequency domain resources of physical signal(s) or physical channel(s), which are transmitted at the same start time, puncture into the dedicated physical resources.

In some examples, for the periodic physical resources, determining the time domain resource positions and the frequency domain resource positions of the dedicated physical resources according to the physical resource positions of physical signal(s) or physical channel(s) comprises: determining that a time domain end position of the dedicated physical resources is before the start position of a scheduled physical uplink shared channel/physical downlink shared channel, wherein there is an interval between the time domain end position of the dedicated physical resources and the time domain start position of the physical uplink shared channel/physical downlink shared channel, which is predefined or indicated by signaling; and/or determining that the time domain start position of the dedicated physical resources is after the start position of the scheduled physical uplink shared channel/physical downlink shared channel, wherein there is an interval between the time domain start position of the dedicated physical resources and the time domain start position of the physical uplink shared channel/physical downlink shared channel, which is predefined or indicated by signaling.

According to a third aspect of the present disclosure, there is provided a base station, comprising:
  a resource configuration module configured to configure physical resources; and
  a configuration notification module configured to notify a terminal of the configured physical resources,
  wherein the terminal neither performs uplink transmission nor performs downlink reception, or the terminal performs only downlink reception, or the terminal performs only uplink transmission on the configured physical resources.

According to a fourth aspect of the present disclosure, there is provided a terminal, comprising:
  a configuration acquisition module configured to acquire a configuration of physical resources; and
  a transmission module configured to perform transmission according to the configured physical resources,
  wherein the transmission module is configured to neither perform uplink transmission nor perform downlink reception on the configured physical resources, or perform only downlink reception on the configured physical resources, or perform only uplink transmission on the configured physical resources.

According to a fifth aspect of the present disclosure, there is provided a terminal, comprising:
a processor; and
a memory configured to store machine readable instructions, which when executed by the processor, cause the processor to perform the method according to the first aspect.

According to a sixth aspect of the present disclosure, there is provided a terminal, comprising:
a processor; and
a memory configured to store machine readable instructions, which when executed by the processor, cause the processor to perform the method according to the second aspect.

According to a seventh aspect of the present disclosure, there is provided a computer readable storage medium having stored thereon executable instructions, which when executed by a processor, cause the processor to perform the method according to the first aspect or the second aspect.

According to the technical solutions according to the embodiments of the present disclosure, an opportunity to transmit a unidirectional transmission signal and a time for iterative convergence are provided, which improves the interference cancellation capability of the system.

In order to solve at least some of the above problems, the embodiments of the present disclosure propose a method and device for resource configuration as described below.

BRIEF DESCRIPTION OF THE DRAWINGS

The above and other features of the present disclosure will become more apparent from the detailed description taken below in conjunction with accompanying drawings, in which:

FIG. 11 illustrates a configuration example of time domain positions of blank resources according to an embodiment of the present disclosure.

FIG. 14 illustrates a schematic flowchart of a method for resource configuration according to an embodiment of the present disclosure.

FIG. 24 schematically shows a flowchart of a transmission method performed at a UE according to an exemplary embodiment of the present disclosure;

Figure 1:
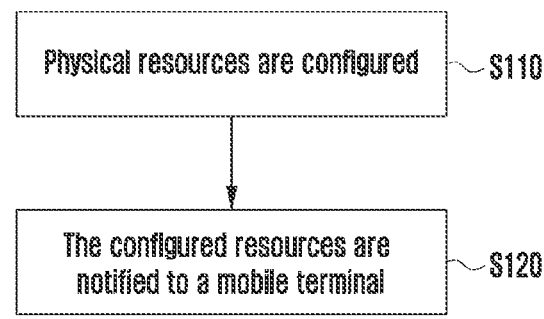
FIG. 1 illustrates a schematic flowchart of a method for resource configuration according to an embodiment of the present disclosure.

In the accompanying drawings, the same or similar structures are identified by the same or similar reference signs.

DETAILED DESCRIPTION

In order to make the purposes, technical solutions and advantages of the present application more clear and more apparent, the present application will be further described in detail below in conjunction with the accompanying drawings. It should be illustrated that the description below is illustrated merely by way of example instead of limiting the present disclosure. In the following description, numerous specific details are set forth to provide a more thorough understanding of the present disclosure. However, it will be obvious to those skilled in the art that the present disclosure may be practiced without these specific details. In other instances, well-known circuits, materials or methods are not described in detail in order to avoid obscuring the present disclosure.

Reference throughout this specification to "an embodiment", "an embodiment", "one example" or "an example" means that a particular feature, structure, or characteristic described in connection with the embodiment or example is included in at least an embodiment of the present disclosure. Thus, the appearances of the phrase "in an embodiment", "in an embodiment", "one example" or "an example" in various places throughout this specification are not necessarily all referring to the same embodiment or example. Furthermore, the particular features, structures, or characteristics may be combined in any suitable combination and/or sub-combination in one or more embodiments or examples. In addition, it should be understood by those skilled in the art that the accompanying drawings provided herein are for the purpose of illustration, and are not necessarily drawn to scale. A term "and/or" used herein comprises any or all combinations of one or more listed related items.

According to estimation by the International Telecommunication Union (ITU), by 2020, the global monthly mobile data traffic will reach 62 exabytes (IEB=2^+GB), and from 2020 to 2030, the global mobile data service will even grow at a rate of about 55% per year. In addition, proportions of video services and machine to machine communication services in mobile data services will gradually increase. In 2030, an amount of the video services will be six times that of non-video services, and the machine to machine communication services will account for about 12% of the mobile data services ("IMT traffic estimates for the years 2020 to 2030, Report ITU-R M.2370-0".)

The rapid growth of the mobile data services, especially the exponential growth of high-definition video services and ultra-high-definition video services, puts higher demands on the transmission rate of wireless communications. In order to meet the growing demands on the mobile services, people need to propose new technologies on the basis of 4G or 5G to further improve the transmission rate and throughput of wireless communication systems. The full-duplex technology can further improve spectrum utilization on the basis of existing systems. Compared with a conventional half-duplex system in which orthogonal segmentation in time domain (Time Division Duplexing (TDD)) or orthogonal segmentation in frequency domain (Frequency Division Duplexing (FDD)) are adopted for uplink and downlink, the full-duplex system allows users' uplink and downlink to be transmitted simultaneously in both the time domain and frequency domain. Therefore, the full-duplex system may theoretically achieve a throughput twice that of the half-duplex system. However, since the uplink and the downlink are transmitted simultaneously at the same frequency, a transmitted signal of the full-duplex system may cause strong self-interference to a received signal of the full-duplex system, and a self-interference signal may be more than 120 dB higher than a noise floor. Therefore, in order to enable the full-duplex system to operate, the core problem is to design a solution to cancel the self-interference, so that strength of the self-interference signal is reduced to at least the same level as that of the noise floor.

At present, there are many methods for self-interference cancellation, which are roughly classified into passive cancellation methods, analog cancellation methods, and digital cancellation methods etc. The passive cancellation methods are the most common self-interference cancellation technique, which mainly refers to reducing strength of a self-interference signal reaching a receiving antenna using physical isolation or dual-polarization isolation of antennas or destructive superposition of signals transmitted from multiple antennas, thereby suppressing the effect of the self-interference. The passive cancellation technique often has limited cancellation capabilities. In practical applications, the passive cancellation methods often need to be used together with other self-interference cancellation techniques, for example, analog cancellation techniques etc., to achieve better self-interference cancellation performance.

The analog cancellation methods are to cancel a self-interference signal in an analog domain of a receiving link (i.e., before analog-to-digital conversion.) The reason for cancellation of the self-interference signal before the analog-to-digital conversion is that it is necessary to ensure that a signal input to an analog-to-digital converter has a reasonable dynamic range. When energy of a residual portion of the self-interference signal is much higher than a desired signal capability, or even higher than maximum energy of the signal input to the analog-to-digital converter, an analog-to-digital conversion operation may introduce an extremely large quantization noise and other nonlinear distortion. In most cases, the passive cancellation methods fail to effectively suppress the self-interference signal, and in this case, it is often necessary to use the analog cancellation technique.

No matter which form of analog cancellation circuit is used, it takes a certain amount of time for the analog cancellation circuit to complete iterative convergence during initialization and coefficient update, and it needs to continuously transmit a signal during the iterative convergence, thereby generating a self-interference signal as an input to the analog cancellation circuit. According to the existing literature, the time for iterative convergence is related to an implementation complexity of the analog cancellation circuit, and is usually about 1 millisecond, and when a self-interference channel changes, the analog cancellation circuit needs to perform the iterative convergence again.

In short, a base station or a terminal device operating in a full-duplex mode needs to be configured with an analog cancellation circuit. Therefore, there is a need for a certain design to ensure that there are one or more opportunities to transmit a unidirectional transmission signal and a time for iterative convergence before the base station or the terminal is scheduled for full-duplex transmission. However, the inventors of the present disclosure discovered that this is difficult to be ensured through reference signals and allocation of physical resources of existing communication systems.

In order to at least partially solve the above problem, the embodiments of the present disclosure provide a method for resource configuration. FIG. 1 illustrates a schematic flowchart of a method for resource configuration according to an embodiment of the present disclosure. As shown in FIG. 1, the method comprises the following operations.

In operation S110, physical resources are configured.

In operation S120, the configured resources are notified to a terminal.

Here, the terminal neither performs uplink transmission nor performs downlink reception on the configured physical resources; or the terminal performs only downlink reception on the configured physical resources; or the terminal performs only uplink transmission on the configured physical resources.

The configured resources may be notified to the terminal in any notification manner used in the art, and the technical solutions according to the embodiments of the present disclosure are not limited by any notification implementation. For example, the configured resources may be notified to the terminal by means of, but not limited to, configuring signaling, a system rule, or negotiation etc.

In some examples, the configured physical resources may comprise resources configured according to first configuration parameters and second configuration parameters for a reference signal respectively, and the method may comprise: performing iterative convergence of an analog cancellation circuit according to the reference signal transmitted on the resources which are configured according to the second configuration parameters; or performing iterative convergence of the analog cancellation circuit according to the reference signal transmitted on the resources which are configured according to the first configuration parameters and the second configuration parameters respectively.

In this case, the second configuration parameters may comprise at least one of:

transmission period of the reference signal;

request or trigger for the reference signal transmission;

bandwidth of the reference signal;

antenna ports through which the reference signal is transmitted;

number of the antenna ports through which the reference signal is transmitted;

density of the reference signal;

power offset of the reference signal; and time domain and frequency domain resources of the reference signal.

In some examples, the transmission period and/or the bandwidth of the reference signal in the second configuration parameters may be greater than or equal to a transmission period and/or a bandwidth of the reference signal in the first configuration parameters.

In some examples, the resources configured according to the first configuration parameters and the resources configured according to the second configuration parameters may be allocated in a time division multiplexing or frequency division multiplexing manner.

In some examples, the reference signal transmitted on the resources which are configured according to the second configuration parameters may be obtained by performing duplicate mapping on the reference signal transmitted on the resources which are configured according to the first configuration parameters in a frequency domain many times.

In some examples, the method may further comprise: indicating dedicated physical resources by high layer signaling or a system rule, on which the terminal performs neither transmission nor reception, or the terminal does not perform reception on the dedicated physical resources. Here, when the dedicated physical resources comprise periodic physical resources, indication by the high layer signaling comprises at least one of: period of the dedicated physical resources, time domain resources of the dedicated physical resources, frequency domain resources of the dedicated physical resources, and the system rule is to determine the time domain and the frequency domain resource positions of the dedicated physical resources according to physical resource positions of physical signal(s) or physical channel(s). Here, when the dedicated physical resources comprise aperiodic physical resources, the content indicated by the high layer signaling comprises at least one of: a trigger to enable the dedicated physical resources, time domain resource positions of the dedicated physical resources, frequency domain resource positions of the dedicated physical resources, and the system rule is to determine the time domain resource positions and the frequency domain resource positions of the dedicated physical resources according to the physical resource positions of physical signal(s) or physical channel(s).

In some examples, determining the time domain resource positions and the frequency domain resource positions of the dedicated physical resources according to the physical resource positions of physical signal(s) or physical channel(s) comprises: determining the period of the dedicated physical resources as an integer multiple of the period of the physical signal(s) or the physical channel(s); and determining a time domain start position of the dedicated physical resources to be the same as or have a fixed offset from a time domain start position of physical signal(s) or physical channel(s). In these examples, when the time domain/frequency domain resources of the dedicated physical resources overlap or partially overlap with the time domain/frequency domain resources of the physical signal(s) or the physical channel(s), time domain duration and/or a bandwidth of the dedicated physical resources are equal to or greater than time domain duration and/or a bandwidth of the physical signal(s) or the physical channel(s).

In some examples, time domain/frequency domain resources of physical signal(s) or physical channel(s), which are transmitted at the same start time, puncture into the dedicated physical resources.

In some examples, a time domain end position of the dedicated physical resources is before the start position of a scheduled physical uplink shared channel/physical downlink shared channel, wherein there is an interval between the time domain end position of the dedicated physical resources and the time domain start position of the physical uplink shared channel/physical downlink shared channel, which is predefined or indicated by signaling; and/or the time domain start position of the dedicated physical resources is after the start position of the scheduled physical uplink shared channel/physical downlink shared channel, wherein there is an interval between the time domain start position of the dedicated physical resources and the time domain start position of the physical uplink shared channel/physical downlink shared channel, which is predefined or indicated by signaling.

In some examples, dedicated physical resources on which the terminal does not perform transmission or reception and dedicated physical resources on which the terminal does not perform reception may be allocated in a time division multiplexing manner.

Figure 2:
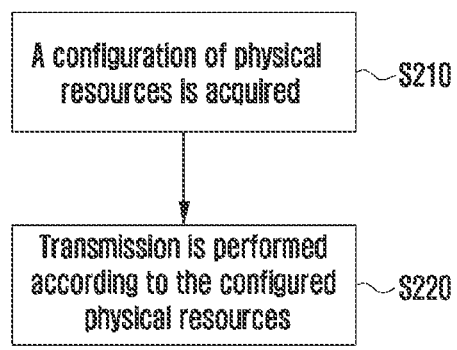
FIG. 2 illustrates a schematic flowchart of a transmission method based on resource configuration according to an embodiment of the present disclosure.

In order to at least partially solve the above problem, the embodiments of the present disclosure further provide another method for resource configuration. FIG. 2 illustrates a schematic flowchart of a transmission method based on resource configuration according to an embodiment of the present disclosure. As shown in FIG. 2, the method comprises the following operations.

In operation S210, a configuration of physical resources is acquired by a terminal.

In operation S220, transmission is performed by the terminal according to the configured physical resources.

Performing, by the terminal, transmission according to the configured physical resources comprises one of: neither performing, by the terminal, uplink transmission nor performing downlink reception on the configured physical resources; performing, by the terminal, only downlink reception on the configured physical resources; and performing, by the terminal, only uplink transmission on the configured physical resources.

In some examples, the configured physical resources may comprise resources configured according to first configuration parameters and second configuration parameters for a reference signal respectively, and performing, by the terminal, transmission according to the configured physical resources may comprise:
when the reference signal transmitted on the configured physical resources is a downlink reference signal, not performing, by the terminal, uplink transmission on the resources configured according to the second configuration parameters; and
when the reference signal transmitted on the configured physical resources is an uplink reference signal, not performing, by the terminal, downlink reception on the resources configured according to the second configuration parameters.

In some of the above examples, the method may further comprise: performing, by the terminal, iterative convergence of an analog cancellation circuit according to the reference signal transmitted on the resources which are configured according to the second configuration parameters; or performing, by the terminal, iterative convergence of the analog cancellation circuit according to the reference signal transmitted on the resources which are configured according to the first configuration parameters and the second configuration parameters respectively.

In some examples, the second configuration parameters may comprise at least one of:
transmission period of the reference signal;
request or trigger for the reference signal transmission:
bandwidth of the reference signal;
antenna ports through which the reference signal is transmitted;
number of the antenna ports through which the reference signal is transmitted;
density of the reference signal;
power offset of the reference signal; and
time domain and frequency domain resources of the reference signal.

In some examples, the resources configured according to the first configuration parameters and the resources configured according to the second configuration parameters may be allocated in a time division multiplexing or frequency division multiplexing manner.

In some examples, the reference signal transmitted on the resources which are configured according to the second configuration parameters may be obtained by performing duplicate mapping on the reference signal transmitted on the resources which are configured according to the first configuration parameters in a frequency domain many times.

In some examples, dedicated physical resources are indicated by high layer signaling or a system rule, on which the terminal performs neither transmission nor reception, or the terminal does not perform reception on the dedicated physical resources. Here, when the dedicated physical resources comprise periodic physical resources, indication by the high layer signaling comprises at least one of: period of the dedicated physical resources, time domain resources of the dedicated physical resources, frequency domain resources of the dedicated physical resources, and the system rule is to determine the time domain and the frequency domain resource positions of the dedicated physical resources according to physical resource positions of physical signal(s) or physical channel(s). When the dedicated physical resources comprise aperiodic physical resources, the content indicated by the high layer signaling comprises at least one of: a trigger to enable the dedicated physical resources, time domain resource positions of the dedicated physical resources, frequency domain resource positions of the dedicated physical resources, and the system rule is to determine the time domain resource positions and the frequency domain resource positions of the dedicated physical resources according to the physical resource positions of physical signal(s) or physical channel(s).

In some examples, for the aperiodic physical resources, determining the time domain resource positions and the frequency domain resource positions of the dedicated physical resources according to the physical resource positions of physical signal(s) or physical channel(s) may comprise: determining the period of the dedicated physical resources as an integer multiple of the period of the physical signal(s) or the physical channel(s); and determining a time domain start position of the dedicated physical resources to be the same as or have a fixed offset from a time domain start position of physical signal(s) or physical channel(s). Here, when the time domain/frequency domain resources of the dedicated physical resources overlap or partially overlap with the time domain/frequency domain resources of the physical signal(s) or the physical channel(s), time domain duration and/or a bandwidth of the dedicated physical resources may be equal to or greater than time domain duration and/or a bandwidth of the physical signal(s) or the physical channel(s).

In some examples, time domain/frequency domain resources of physical signal(s) or physical channel(s), which are transmitted at the same start time, puncture into the dedicated physical resources.

In some examples, for the periodic physical resources, determining the time domain resource positions and the frequency domain resource positions of the dedicated physical resources according to the physical resource positions of physical signal(s) or physical channel(s) may comprise: determining that a time domain end position of the dedicated physical resources is before the start position of a scheduled physical uplink shared channel/physical downlink shared channel, wherein there is an interval between the time domain end position of the dedicated physical resources and the time domain start position of the physical uplink shared channel/physical downlink shared channel, which is predefined or indicated by signaling; and/or determining that the time domain start position of the dedicated physical resources is after the start position of the scheduled physical uplink shared channel/physical downlink shared channel, wherein there is an interval between the time domain start position of the dedicated physical resources and the time domain start position of the physical uplink shared channel/physical downlink shared channel, which is predefined or indicated by signaling.

Figure 3:
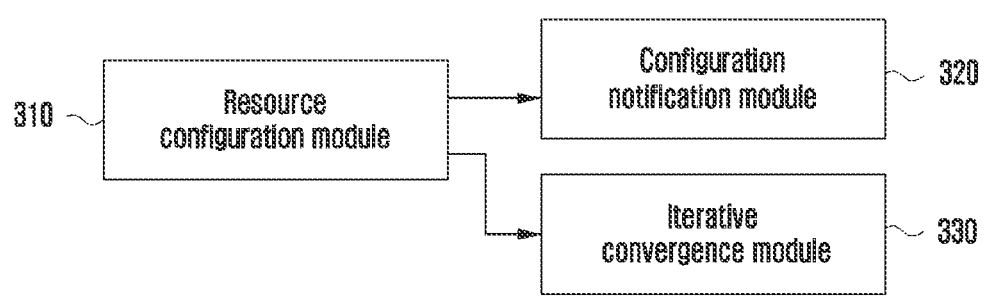
FIG. 3 illustrates a schematic block diagram of a base station according to an embodiment of the present disclosure.

In order to at least partially solve the above problem, the embodiments of the present disclosure further provide a base station. FIG. 3 illustrates a schematic block diagram of a base station according to an embodiment of the present disclosure.

As shown in FIG. 3, the base station comprises a resource configuration module 310 and a configuration notification module 320. The resource configuration module 310 is configured to configure physical resources. The configuration notification module 320 is configured to notify a terminal of the configured resources.

Here, the terminal neither performs uplink transmission nor performs downlink reception on the configured physical resources; or the terminal performs only downlink reception on the configured physical resources; or the terminal performs only uplink transmission on the configured physical resources.

The configured resources may be notified by the configuration notification module 320 to the terminal in any notification manner used in the art, and the technical solutions according to the embodiments of the present disclosure are not limited by any implementation of the configuration notification module 320. For example, the configured resources may be notified by the configuration notification module 320 to the terminal by means of, but not limited to, configuring signaling, a system rule, or negotiation etc.

In some examples, the configured physical resources may comprise resources configured according to first configuration parameters and second configuration parameters for a reference signal respectively, and the base station shown in FIG. 3 may further comprise an iterative convergence module 330 configured to perform iterative convergence of an analog cancellation circuit according to the reference signal transmitted on the resources which are configured according to the second configuration parameters; or perform iterative convergence of the analog cancellation circuit according to the reference signal transmitted on the resources which are configured according to the first configuration parameters and the second configuration parameters respectively.

In this case, the second configuration parameters may comprise at least one of:
transmission period of the reference signal;
request or trigger for the reference signal transmission;
bandwidth of the reference signal;
antenna ports through which the reference signal is transmitted;
number of the antenna ports through which the reference signal is transmitted;
density of the reference signal;
power offset of the reference signal; and
time domain and frequency domain resources of the reference signal.

In some examples, the transmission period and/or the bandwidth of the reference signal in the second configuration parameters may be greater than or equal to a transmission period and/or a bandwidth of the reference signal in the first configuration parameters.

In some examples, the resources configured according to the first configuration parameters and the resources configured according to the second configuration parameters may be allocated in a time division multiplexing or frequency division multiplexing manner.

In some examples, the reference signal transmitted on the resources which are configured according to the second configuration parameters may be obtained by performing duplicate mapping on the reference signal transmitted on the resources which are configured according to the first configuration parameters in a frequency domain many times.

In some examples, the configuration notification module 320 may further be configured to indicate dedicated physical resources by high layer signaling or a system rule, on which the terminal performs neither transmission nor reception, or the terminal does not perform reception on the dedicated physical resources. Here, when the dedicated physical resources comprise periodic physical resources, indication by the high layer signaling comprises at least one of: period of the dedicated physical resources, time domain resources of the dedicated physical resources, frequency domain resources of the dedicated physical resources, and the system rule is to determine the time domain and the frequency domain resource positions of the dedicated physical resources according to physical resource positions of physical signal(s) or physical channel(s). Here, when the dedicated physical resources comprise aperiodic physical resources, the content indicated by the high layer signaling comprises at least one of: a trigger to enable the dedicated physical resources, time domain resource positions of the dedicated physical resources, frequency domain resource positions of the dedicated physical resources, and the system rule is to determine the time domain resource positions and the frequency domain resource positions of the dedicated physical resources according to the physical resource positions of physical signal(s) or physical channel(s).

In some examples, the resource configuration module 310 may further be configured to determine the period of the dedicated physical resources as an integer multiple of the period of the physical signal(s) or the physical channel(s); and determine a time domain start position of the dedicated physical resources to be the same as or have a fixed offset from a time domain start position of physical signal(s) or physical channel(s). In these examples, when the time domain/frequency domain resources of the dedicated physical resources overlap or partially overlap with the time domain/frequency domain resources of the physical signal(s) or the physical channel(s), time domain duration and/or a bandwidth of the dedicated physical resources may be equal to or greater than time domain duration and/or a bandwidth of the physical signal(s) or the physical channel(s).

In some examples, in the resource configuration module 310, time domain/frequency domain resources of physical signal(s) or physical channel(s), which are transmitted at the same start time, may puncture into the dedicated physical resources.

In some examples, a time domain end position of the dedicated physical resources may be before the start position of a scheduled physical uplink shared channel/physical downlink shared channel, wherein there may be an interval between the time domain end position of the dedicated physical resources and the time domain start position of the physical uplink shared channel/physical downlink shared channel, which may be predefined or indicated by signaling; and/or the time domain start position of the dedicated physical resources may be after the start position of the scheduled physical uplink shared channel/physical downlink shared channel, wherein there may be an interval between the time domain start position of the dedicated physical resources and the time domain start position of the physical uplink shared channel/physical downlink shared channel, which may be predefined or indicated by signaling.

In some examples, the resource configuration module 310 may be configured to allocate dedicated physical resources on which the terminal does not perform transmission or reception and dedicated physical resources on which the terminal does not perform reception in a time division multiplexing manner.

Figure 4:
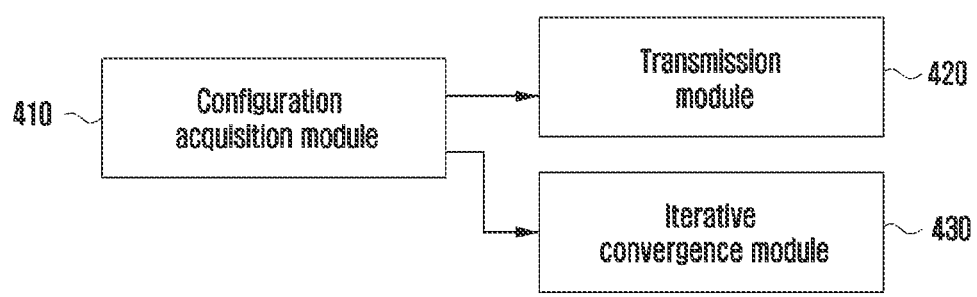
FIG. 4 illustrates a schematic block diagram of a terminal according to an embodiment of the present disclosure.

In order to at least partially solve the above problem, the embodiments of the present disclosure further provide a terminal. FIG. 4 illustrates a schematic block diagram of a terminal according to an embodiment of the present disclosure.

As shown in FIG. 4, the terminal comprises a configuration acquisition module 410 and a transmission module 420. The configuration acquisition module 410 is configured to acquire a configuration of physical resources. The transmission module 420 is configured to perform transmission according to the configured physical resources. The transmission module 420 is configured to neither perform uplink transmission nor perform downlink reception on the configured physical resources; or perform only downlink reception on the configured physical resources; or perform only uplink transmission on the configured physical resources.

In some examples, the configured physical resources may comprise resources configured according to first configuration parameters and second configuration parameters for a reference signal respectively, and the transmission module 420 may be configured to:
  when the reference signal transmitted on the configured physical resources is a downlink reference signal, not perform uplink transmission on the resources configured according to the second configuration parameters; and
  when the reference signal transmitted on the configured physical resources is an uplink reference signal, not perform downlink reception on the resources configured according to the second configuration parameters.

In some of the above examples, the terminal shown in FIG. 4 may further comprise an iterative convergence module 430 configured to: perform iterative convergence of an analog cancellation circuit according to the reference signal transmitted on the resources which are configured according to the second configuration parameters; or perform iterative convergence of the analog cancellation circuit according to the reference signal transmitted on the resources which are configured according to the first configuration parameters and the second configuration parameters respectively.

In some examples, the second configuration parameters may comprise at least one of:
  transmission period of the reference signal;
  request or trigger for the reference signal transmission;
  bandwidth of the reference signal;
  antenna ports through which the reference signal is transmitted;
  number of the antenna ports through which the reference signal is transmitted;
  density of the reference signal;
  power offset of the reference signal; and
  time domain and frequency domain resources of the reference signal.

In some examples, the resources configured according to the first configuration parameters and the resources configured according to the second configuration parameters may be allocated in a time division multiplexing or frequency division multiplexing manner.

In some examples, the reference signal transmitted on the resources which are configured according to the second configuration parameters may be obtained by performing duplicate mapping on the reference signal transmitted on the resources which are configured according to the first configuration parameters in a frequency domain many times.

In some examples, dedicated physical resources may be indicated by high layer signaling or a system rule, on which the terminal performs neither transmission nor reception, or the terminal does not perform reception on the dedicated physical resources. Here, when the dedicated physical resources comprise periodic physical resources, indication by the high layer signaling comprises at least one of: period of the dedicated physical resources, time domain resources of the dedicated physical resources, frequency domain resources of the dedicated physical resources, and the system rule is to determine the time domain and the frequency domain resource positions of the dedicated physical resources according to physical resource positions of physical signal(s) or physical channel(s). Here, when the dedicated physical resources comprise aperiodic physical resources, the content indicated by the high layer signaling comprises at least one of: a trigger to enable the dedicated physical resources, time domain resource positions of the dedicated physical resources, frequency domain resource positions of the dedicated physical resources, and the system rule is to determine the time domain resource positions and the frequency domain resource positions of the dedicated physical resources according to the physical resource positions of physical signal(s) or physical channel(s).

In some examples, for the aperiodic physical resources, the configuration acquisition module 410 may be configured to: determine the period of the dedicated physical resources as an integer multiple of the period of the physical signal(s) or the physical channel(s); and determine a time domain start position of the dedicated physical resources to be the same as or have a fixed offset from a time domain start position of physical signal(s) or physical channel(s). Here, when the time domain/frequency domain resources of the dedicated physical resources overlap or partially overlap with the time domain/frequency domain resources of the physical signal(s) or the physical channel(s), time domain duration and/or a bandwidth of the dedicated physical resources may be equal to or greater than time domain duration and/or a bandwidth of the physical signal(s) or the physical channel(s).

In some examples, in the transmission module 420, time domain/frequency domain resources of physical signal(s) or physical channel(s), which are transmitted at the same start time, may puncture into the dedicated physical resources.

In some examples, for the periodic physical resources, the configuration acquisition module 410 may be configured to: determine that a time domain end position of the dedicated physical resources is before the start position of a scheduled physical uplink shared channel/physical downlink shared channel, wherein there is an interval between the time domain end position of the dedicated physical resources and the time domain start position of the physical uplink shared channel/physical downlink shared channel, which is predefined or indicated by signaling, and/or determine that the time domain start position of the dedicated physical resources is after the start position of the scheduled physical uplink shared channel/physical downlink shared channel, wherein there is an interval between the time domain start position of the dedicated physical resources and the time domain start position of the physical uplink shared channel/physical downlink shared channel, which is predefined or indicated by signaling.

The technical solutions shown in FIGS. 1-4 will be further described below with reference to the specific embodiments. It should be illustrated that the specific embodiments provided below are only specific examples for implementing the technical solutions according to the embodiments of the present disclosure, and should not be construed as limiting the technical solutions according to the embodiments of the present disclosure. For example, a "terminal" as referred to herein may be a mobile terminal, a fixed terminal, or any device which is commonly used in the art or to be developed for receiving resource configuration. In addition, the physical signals or physical channels described above in conjunction with FIGS. 1-4 may be implemented by any manner known in the art, for example, in the following description, the physical signals or physical channels will be described by taking a "downlink control channel coreset" or a "coreset" as an example. However, it should be illustrated that the technical solutions according to the embodiments of the present disclosure may be applied to physical signals or physical channels in a broad sense, and are not limited to the "downlink control channel coreset" or the "coreset." A "blank resource" is used in the following description to nominate the specific physical resource described above; however, it should be illustrated that the specific physical resource described above may have any other name.

Embodiment I

In the present embodiment, a method for configuring and transmitting a reference signal is described, which additionally provides a set of configuration parameters for a reference signal in an existing system for transmission of the reference signal, so that reference signals which are additionally transmitted may be used for other functions. When used in a full-duplex system, the reference signals which are additionally transmitted may be used for iterative convergence of an analog cancellation module of a base station or terminal operating in a full-duplex mode, in addition to an original use of the reference signals. When used in a cellular communication system, the reference signals which are additionally transmitted may be used for neighbor cell measurement etc., in addition to the original use of the reference signals.

The existing system comprises, but not limited to, wireless communication systems such as WiFi, GSM, TDS-CDMA, LTE, LTE-A, new air interface etc. The reference signal comprises, but not limited to, a reference signal for synchronization, for example, a Primary Synchronization Signal (PSS), a Secondary Synchronization Signal (SSS), etc.; a reference signal for downlink/uplink channel measurement, for example, a Cell-specific Reference Signal (CRS), a Channel State Information Reference Signal (CSI-RS), a Sounding Reference Signal (SRS) etc.; and a reference signal for demodulation, for example, a Demodulation Reference Signal (DMRS), a User-specific Reference Signal (URS), etc.

An original parameter configuration of the reference signal is denoted as a first configuration, and a parameter configuration of the same reference signal which is additionally provided is denoted as a second configuration. Parameter configuration content for the reference signal included in parameters of the second configuration comprises at least one of: transmission period of the reference signal; request or trigger for the reference signal transmission; bandwidth of the reference signal; antenna port(s) through which the reference signal is transmitted; number of the antenna ports through which the reference signal is transmitted; density of the reference signal; power offset of the reference signal; time domain and frequency domain resources of the reference signal, and other parameter configuration content included in the first configuration. Any parameter in the second configuration may be acquired by high layer signaling, or by downlink control information, or in an implicit manner (for example, using a system rule which has been negotiated between a base station and a terminal.) For example, in an implicit acquisition manner, a parameter in the second configuration may be the same as that in the first configuration; or in another implicit acquisition manner, a parameter in the second configuration may have a fixed value, for example, antenna ports through which the reference signal with the second configuration is transmitted are fixed antenna ports for the reference signal. Manners in which any two parameters in the second configuration are acquired may be the same or different. A value of a parameter in the second configuration may be the same as or different from that of the same parameter in the first configuration. In particular, periodicity or aperiodicity of the reference signal with the first configuration is not necessarily the same as that of the reference signal with the second configuration, that is, when the reference signal with the first configuration is a periodic reference signal, the reference signal with the second configuration may be a periodic reference signal, or may also be an aperiodic reference signal, or vice versa when the reference signal with the first configuration is an aperiodic reference signal.

Figure 5:
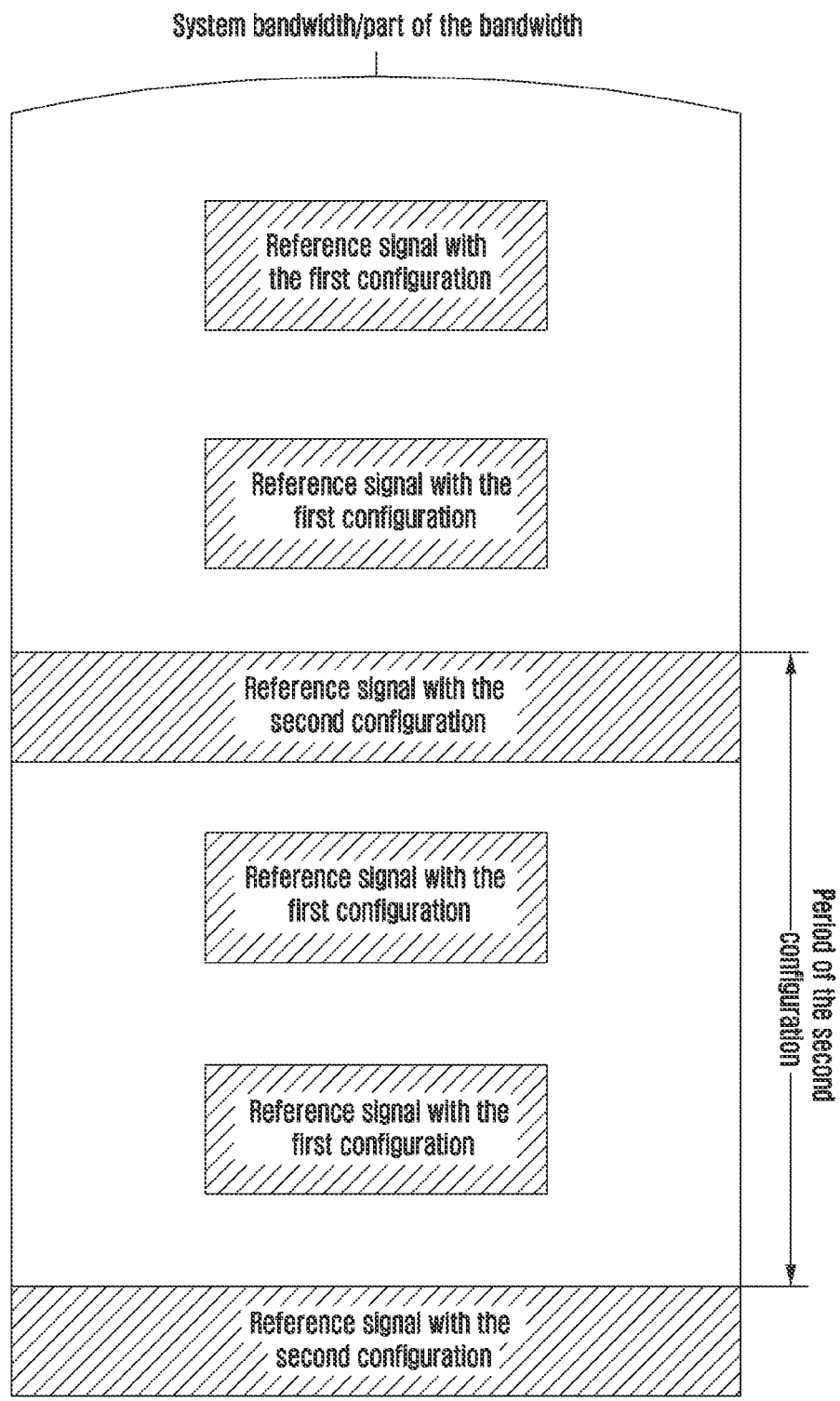
FIG. 5 illustrates an exemplary implementation of transmitting a reference signal according to parameters in a first configuration and parameters in a second configuration according to an embodiment of the present disclosure.
Figure 6:
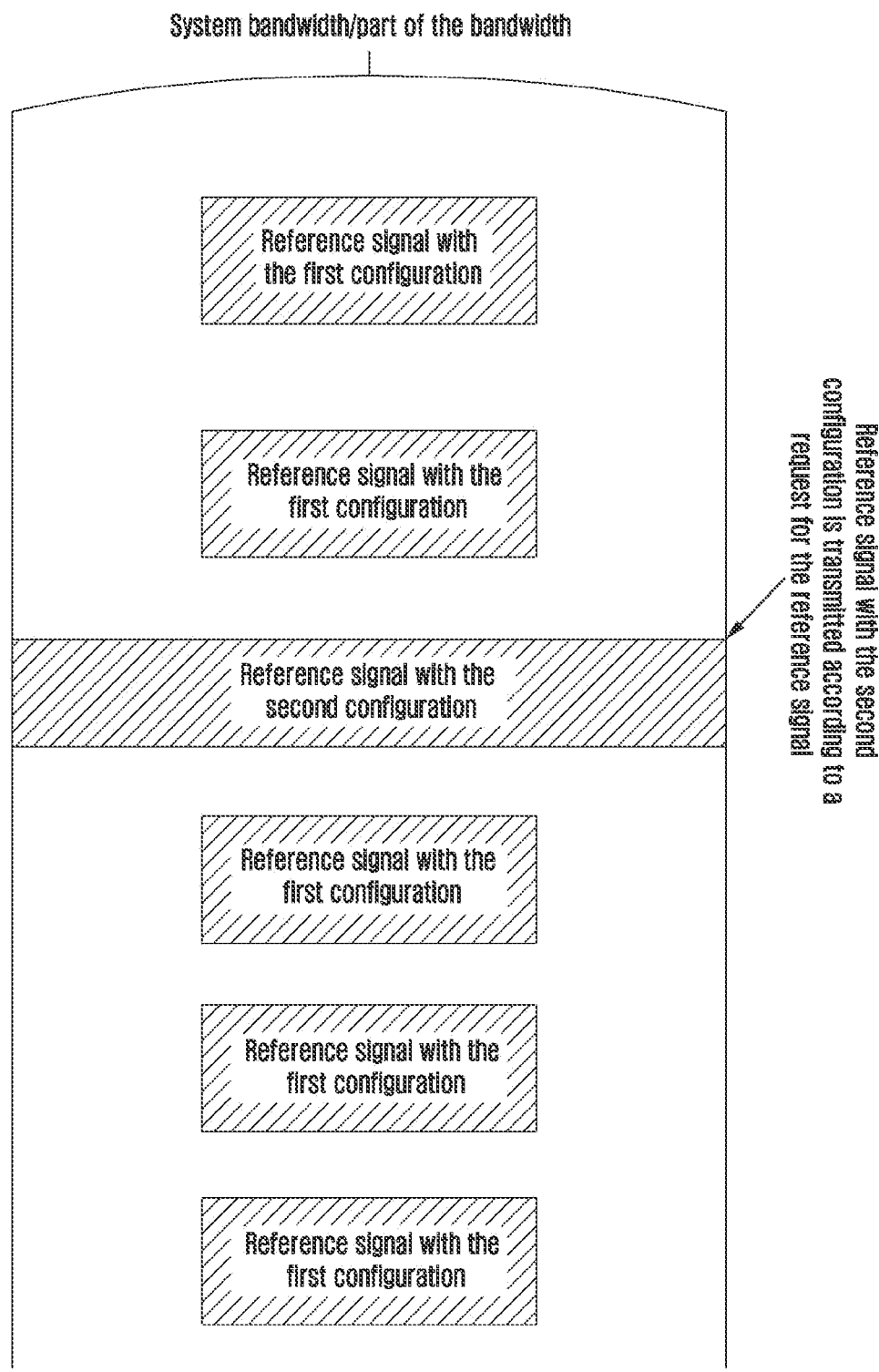
FIG. 6 illustrates another exemplary implementation of transmitting a reference signal according to parameters in a first configuration and parameters in a second configuration according to an embodiment of the present disclosure.

When the reference signal with the original first configuration of the system is a periodic signal, for example, CSI-RS or SRS, FIGS. 5 and 6 illustrate two examples of transmitting the reference signal according to parameters in the first configuration and parameters in the second configuration, wherein FIG. 5 is an example in which the reference signal with the second configuration is a periodic reference signal, and FIG. 6 is an example in which the reference signal with the second configuration is an aperiodic reference signal. On a system bandwidth or a part of the bandwidth on which the reference signal is configured, the reference signal transmitted according to the parameters in the first configuration is a reference signal existing in the existing system, and the terminal may acquire the parameters in the first configuration according to high layer signaling, and read or transmit the reference signal with the first configuration. In addition, the terminal further needs to acquire the parameters in the second configuration, and read or transmit the same reference signal which complies with the second configuration.

Specifically, the terminal may acquire the configuration parameters of the periodic reference signal with the second configuration according to the high layer signaling and/or in an implicit configuration manner, wherein the configuration parameters at least comprise one of: a transmission period of the reference signal with the second configuration, a bandwidth of the reference signal with the second configuration, antenna ports for the reference signal with the second configuration, a density of the reference signal with the second configuration, and a power offset of the reference signal with the second configuration. The terminal performs transmission/reception of the periodic reference signal with the second configuration according to the period of the second configuration, as shown in FIG. 5. Alternatively, the terminal may acquire the configuration parameters of the aperiodic reference signal with the second configuration according to at least one of the following information: downlink control information, high layer signaling, and an implicit configuration manner. The configuration parameters of the aperiodic reference signal with the second configuration comprise at least one of: a request or trigger message for the reference signal, a bandwidth of the reference signal with the second configuration, antenna ports for the reference signal with the second configuration, and a density of the reference signal with the second configuration. For example, the request or trigger message for the reference signal is acquired by downlink control information; the bandwidth of the reference signal with the second configuration, the antenna ports for the reference signal with the second configuration, the density of the reference signal with the second configuration, the power offset of the reference signal with the second configuration etc. are acquired by high layer signaling or in an implicit configuration manner. The terminal performs transmission/reception of the aperiodic reference signal with the second configuration in response to the request or trigger message for the reference signal with the second configuration, as shown in FIG. 6.

Figure 7:
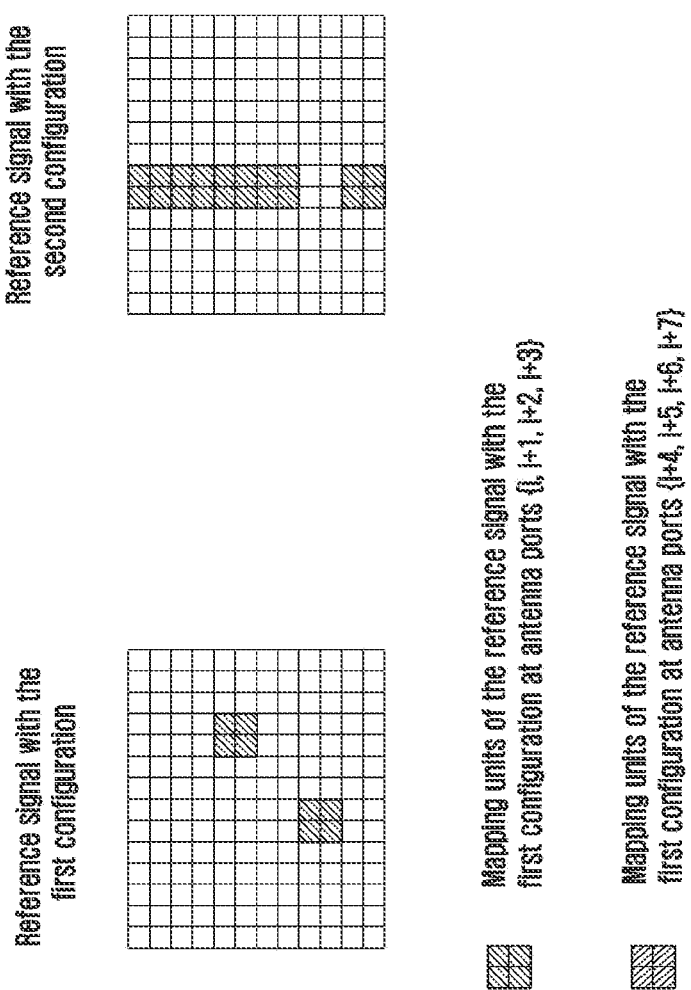
FIG. 7 illustrates an example of using the same time domain symbols for a reference signal with a first configuration as those for a reference signal with a second configuration and using different sub-carriers for the reference signal with the first configuration from those for the reference signal with the second configuration according to an embodiment of the present disclosure.

In an implementation of the reference signal with the second configuration, the period and/or the bandwidth of the reference signal with the second configuration may be greater than a period and/or a bandwidth of the reference signal with the first configuration, as shown in FIGS. 5 and 6. In particular, the reference signal in this configuration mode may be used for iterative convergence of an analog cancellation module of a base station or terminal operating in a full-duplex mode. A reference signal with a larger period complies with a slow change characteristic of a self-interference channel, and a reference signal with a larger bandwidth may generate a time domain signal with a narrower main lobe, which is beneficial to improve the performance of the analog cancellation module. In an implementation of the reference signal with the second configuration, physical resources of the reference signal with the second configuration and physical resources of the reference signal with the first configuration are time division multiplexed, that is, time domain symbols used for the reference signal with the second configuration are different from those used for the reference signal with the first configuration. In another implementation of the reference signal with the second configuration, the physical resources of the reference signal with the second configuration and the physical resources of the reference signal with the first configuration are frequency division multiplexed, that is, sub-carriers used for the reference signal with the second configuration are different from those used for the reference signal with the first configuration. When the time domain symbols used for the reference signal with the second configuration are different from those used for the reference signal with the first configuration, the sub-carriers used for the reference signal with the second configuration may be the same as or different from those used for the reference signal with the first configuration. Alternatively, when the sub-carriers used for the reference signal with the second configuration are different from those used for the reference signal with the first configuration, the time domain symbols used for the reference signal with the second configuration may be the same as or different from those used for the reference signal with the first configuration. An example of using the same time domain symbols for the reference signal with the first configuration as those for the reference signal with the second configuration and using different sub-carriers for the reference signal with the first configuration from those for the reference signal with the second configuration is as shown in FIG. 7. In this case, the terminal may use both the reference signal with the first configuration and the reference signal with the second configuration at the same time to implement functions such as channel measurement etc.

In particular, the reference signal with the second configuration may be transmitted only on certain one or more antenna ports defined for the reference signal. Transmission of the reference signal with the second configuration on a certain antenna port (denoted as antenna port i) may refer to that the reference signal with the second configuration is transmitted on a time domain symbol used on the antenna port i of the reference signal in the first configuration, and/or the reference signal with the second configuration is transmitted using a code sequence used by the antenna port i of the reference signal in the first configuration. In particular, the reference signal with the second configuration may be obtained by performing duplicate mapping on the reference signal with the first configuration in a frequency domain many times. FIG. 7 illustrates a schematic diagram in which the reference signal with the second configuration is multiple copies of mapping units of the reference signal with the first configuration on several antenna ports on different sub-carriers in the same time domain symbols.

Figure 8:
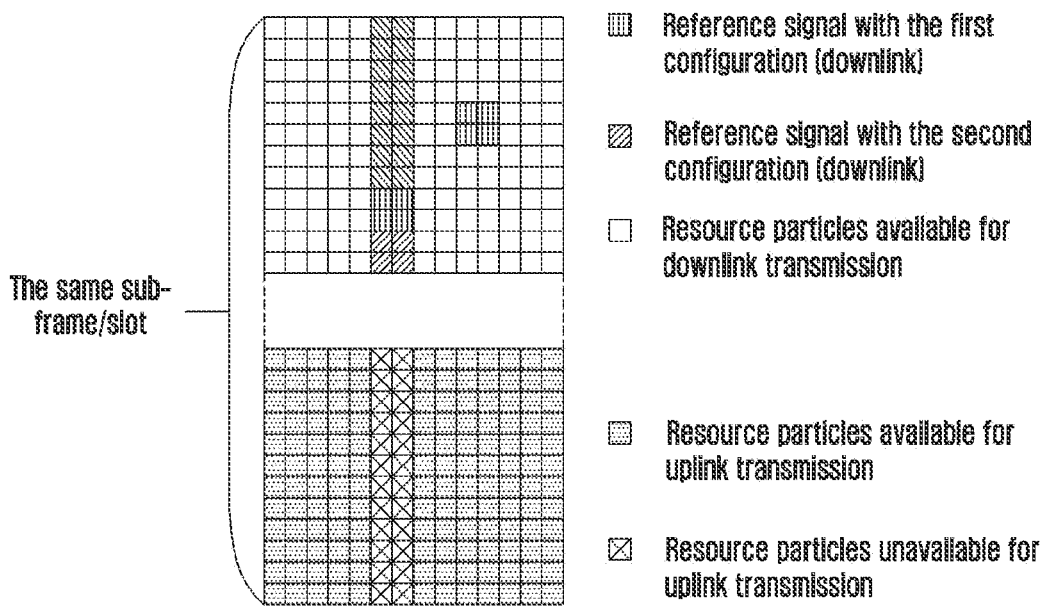
FIG. 8 illustrates an example of downlink unidirectional transmission of a reference signal with a first configuration and a reference signal with a second configuration according to an embodiment of the present disclosure.

In an implementation in which the reference signal with the first configuration and/or the second configuration is transmitted, a unidirectional transmission manner is used. The unidirectional transmission manner means that if a plurality of resource particles of a sub-frame/slot/mini slot are used for the reference signal with the first configuration and/or the second configuration, the resource particles of the sub-frame/slot/mini slot used for unidirectional transmission of the reference signal with the first configuration and/or the second configuration cannot be used for transmission in another direction. The unidirectional transmission comprises uplink unidirectional transmission and downlink unidirectional transmission. When used in a full-duplex system, the unidirectional transmission of the reference signal can ensure that the reference signal better implements the purpose of iterative convergence of the analog cancellation module of the base station or the terminal in the full-duplex mode, so that the analog cancellation module is not interfered by the reception of a desired signal in an iterative convergence calculation process. FIG. 8 illustrates an example of downlink unidirectional transmission of the reference signal with the first configuration and the reference signal with the second configuration. In this example, the reference signal with the first configuration and the reference signal with the second configuration are reference signals in downlink transmission.

Specifically, the terminal may acquire positions of physical resources for the unidirectional transmission of the reference signal with the first configuration and/or the second configuration according to a certain rule, wherein the positions of the physical resources may comprise an index of the radio frame/sub-frame/slot/mini slot where the resource particles used are located, and indexes of time domain symbols and indexes of sub-carriers of the resource particles used. In an implementation of the certain system rule, the terminal determines the positions of the resource particles for the unidirectional transmission of the reference signal according to a configuration type of the reference signal. For example, all resource particles used for the reference signal with the second configuration in FIG. 8 are used for unidirectional transmission. In another implementation of the certain system rule, the resource particles for the unidirectional transmission of the reference signal with the first configuration are determined according to the positions of the resource particles for the reference signal with the second configuration. For example, in the rule in FIG. 8, resource particles for the reference signal with the first configuration which are located in the same time domain symbols as those for the reference signal with the second configuration are resource particles for the unidirectional transmission.

When the terminal acquires the resource particles which are included in the sub-frame/slot/mini slot for unidirectional transmission and are allocated for transmission or reception of physical channels, resource mapping is not performed for the physical channels on resource particles included in the sub-frame/slot/mini slot for unidirectional transmission which is not in the same direction as that of the above unidirectional transmission. In the resource mapping manner, data puncturing is performed for the physical channels at positions where the resource particles for the unidirectional transmission appear, or rate matching is performed only on resource particles other than the resource particles for the unidirectional transmission in the sub-frame/slot/mini slot.

Embodiment II

In the present embodiment, a method for resource configuration is described. Blank resources of a system are configured to enable a base station and/or a terminal to transmit signals on the configured blank resources, including sounding signals, reference signals, or modulation symbols etc. When used in a full-duplex system, the base station or the terminal operating in a full-duplex mode may generate a unidirectional transmission signal using the blank resources for calculation for iterative convergence of an analog cancellation module of the full-duplex base station or terminal. When used in a cellular communication system, blank resources of the system configured by the base station may be used to transmit signals which are not used for users in a local cell, such as reference signals for measurement of a neighboring cell etc.

The blank resources may be defined as follows. A terminal in a local cell is not expected to perform reception or transmission on blank resources configured by a base station; or the terminal in the local cell is not expected to perform reception on the blank resources configured by the base station. a first type of blank resources may be defined to be used by a base station operating in a full-duplex mode to transmit a signal for iterative convergence of an analog cancellation module, or to be used by a base station in a cellular cell to transmit a physical signal or a physical channel for a base station or a terminal in a neighboring cell; and a second type of blank resources may be defined to be used by a terminal operating in a full-duplex mode to transmit a signal for iterative convergence of an analog cancellation module, or to be used by a terminal in a cellular cell to transmit a physical signal or a physical channel for a base station or a terminal in a neighboring cell. In particular, the terminal may acquire type configuration information of the blank resources, wherein the type configuration information of the blank resources indicates the first type of blank resources or the second type of blank resources, and the configuration information may be transmitted by high layer signaling, or may be determined by the system to indicate a fixed one of the first type of blank resources and the second type of blank resources. Herein, "expected to perform reception" and "expected to perform transmission" as well as "receive" and "transmit" may have the same or similar meanings and may be used interchangeably, if not specifically indicated or may not be explicitly determined from the context.

When physical resources for transmission of the physical channel or the physical signal overlap with the blank resources, in an implementation of resource mapping of the physical channel or the physical signal, no uplink physical channel/uplink physical signal/downlink physical channel/downlink physical signal is mapped on the blank resources. This mapping method may be used in a case of the first type of blank resources. When the physical resources for transmission of the physical channel or the physical signal overlap with the blank resources, in another implementation of resource mapping of the physical channel or the physical signal, no downlink physical channel or downlink physical signal is mapped on the blank resources. This mapping method may be used in a case of the second type of blank resources. When the physical resources for transmission of the physical channel or the physical signal overlap with the blank resources, in a third implementation of resource mapping of the physical channel or the physical signal, the terminal determines whether the physical channel/physical signal is mapped on the blank resources according to a type of the physical channel/physical signal. This mapping method may be used in both the case of the first type of blank resources and the case of the second type of blank resources. For example, for the case of the first type of blank resources, the physical uplink shared channel and the physical downlink shared channel as well as corresponding demodulation reference signals are not mapped on the blank resources; other physical channels except for the physical uplink shared channel and the physical downlink shared channel, such as a physical uplink control channel, a physical downlink control channel etc., and other physical signals except for the corresponding demodulation reference signals, such as primary and secondary synchronization signals, CSI-RS, and SRS etc., all cover the blank resources, that is, when the configured blank resources overlap with the above physical channels and physical signals, the configuration of the blank resources is invalidated or deferred until the above physical channels and physical signals are transmitted completely. For the case of the second type of blank resources, the physical downlink shared channel and the corresponding demodulation reference signal are not mapped on the blank resources; all the uplink physical channels and uplink physical signals cover the blank resources; and for other downlink physical channels except for the physical downlink shared channel and other downlink physical signals except for the corresponding downlink demodulation reference signal, the configuration of the blank resources is invalidated or deferred until the physical channels and physical signals are transmitted completely.

A unit of the configured blank resources in a time domain may be a sub-frame/slot/mini slot/time domain symbol etc. The configured blank resources may be one or more consecutive sub-frames/slots/mini slots/time domain symbols in the time domain, or one or more non-consecutive sub-frames/slots/mini slots/time domain symbols in the time domain. The configured blank resources may be one or more consecutive or non-consecutive physical resource blocks in a frequency domain.

Figure 9:
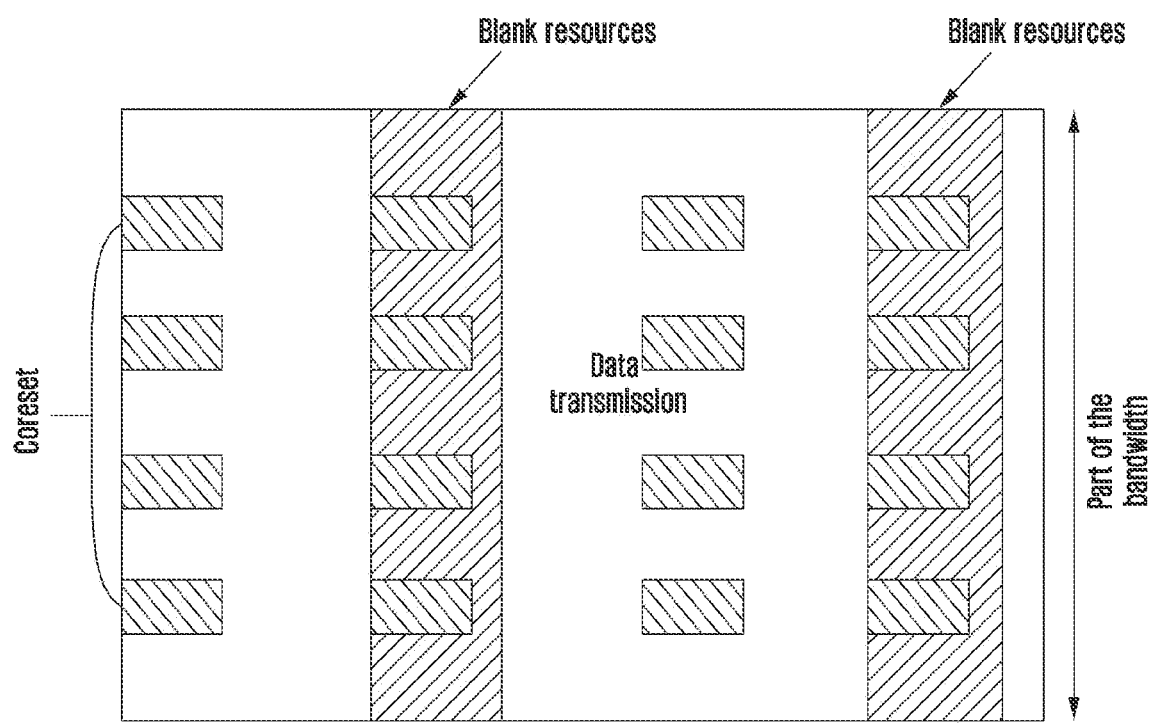
FIG. 9 illustrates an example of determining blank resources according to physical resources of a downlink control channel coreset according to an embodiment of the present disclosure.
Figure 10:
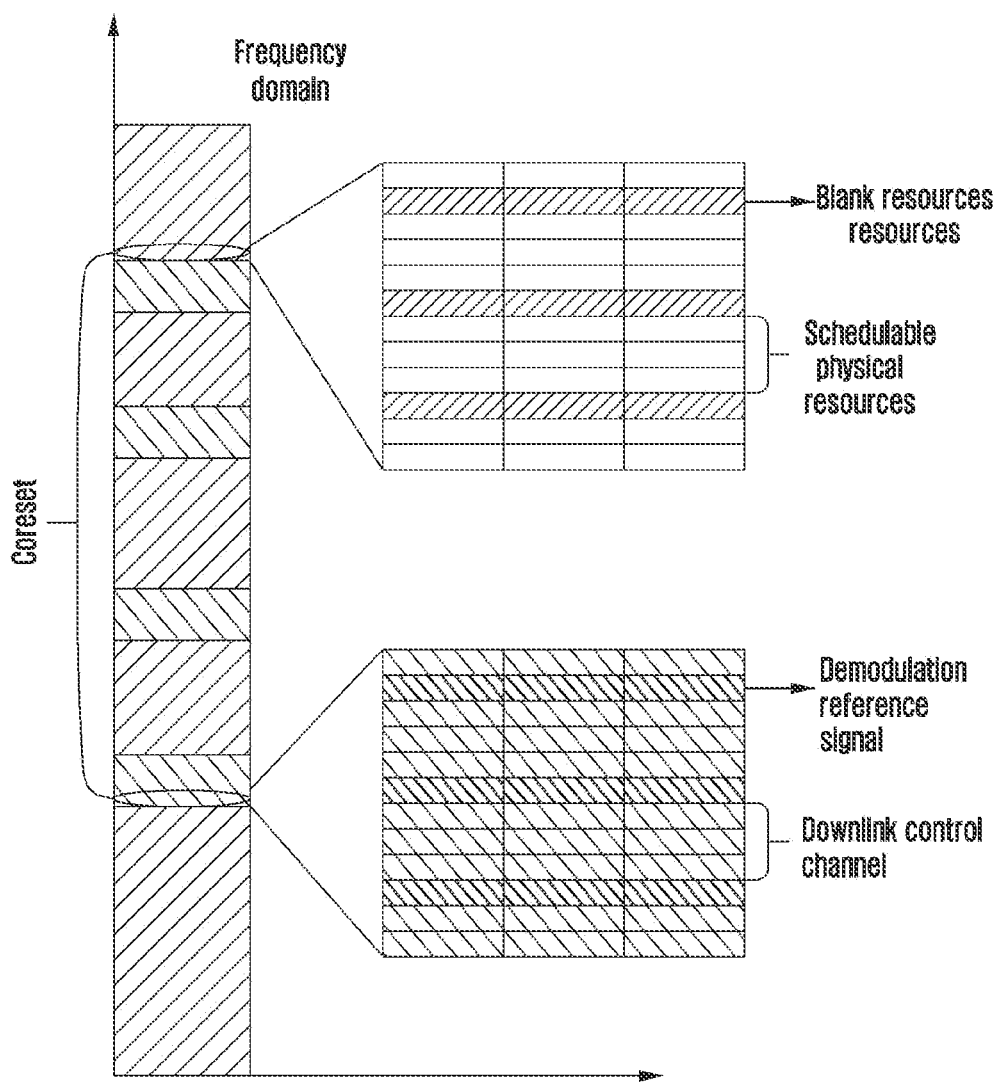
FIG. 10 illustrates an example of a case of punctured transmission of a coreset in blank resources according to an embodiment of the present disclosure.

The configured blank resources may be periodic or aperiodic. The blank resources may be configured to be periodic by the terminal acquiring time domain and frequency domain positions of the blank resources using high layer signaling and/or according to a certain system rule. Content indicated by the high layer signaling comprises at least one of a period of the blank resources, time domain resource positions of the blank resources, and frequency domain positions of the blank resources. The time domain resource positions of the blank resources may specifically indicate a start sub-frame/slot/time domain symbol of the blank resources, and/or an end sub-frame/slot/time domain symbol of the blank resources, and/or a number of continuous sub-frames/slots/time domain symbols of the blank resources. The frequency domain resource positions of the blank resources may specifically indicate an index of a start PRB/sub-carrier of the blank resources, and/or a bandwidth of the blank resources, and/or an index of an end PRB/sub-carrier of the blank resources, and/or an interval between PRBs/sub-carriers allocated for the blank resources. In the system rule, the positions of the blank resources may be acquired by determining the time domain and frequency domain resource positions of the blank resources according to physical resource positions of physical signals or physical channels. FIG. 9 illustrates an example of determining blank resources according to physical resources of a downlink control channel coreset. In this example, the downlink control channel coreset is physical resource blocks which are configured to be non-consecutive, wherein the coreset may be replaced with primary and secondary synchronization signals, Physical Broadcast Channel (PBCH), PHICH, PCFICH, CRS, CSI-RS, SRS, PUCCH, etc., and the method for determining blank resources is equally available in such cases. In an implementation of the method for determining the time domain and frequency domain positions of the blank resources, a period of the blank resources may be an integer multiple of the period of the coreset, and a time domain start position of the blank resources may be the same as or has a fixed offset from a time domain start position of the coreset. When the time domain and frequency domain resources of the configured blank resources overlap or partially overlap with time domain and frequency domain resources of the coreset, time domain duration and a bandwidth of the blank resources may be equal to or larger than those of the coreset, and as shown in FIG. 9, in time domain and frequency domain resources of the coreset which is transmitted at the same start time, puncturing may be performed in the blank resources. In particular, in a full-duplex system, in order to ensure the receiving performance of the control channels, the transmission of the downlink control channels in the coreset may be in a downlink unidirectional transmission mode, that is, a half-duplex transmission mode, and a base station operating in a full-duplex mode may transmit downlink unidirectional signals on the blank resources. Downlink unidirectional transmission signals for the coreset and downlink unidirectional signals for the blank resources may be used to generate consecutive time domain signals with a narrow main lobe, which are used for iterative convergence of an analog cancellation module in the full-duplex base station. In particular, the blank resources may be one or more non-consecutive sub-carriers in the frequency domain, for example, reference signal patterns may be multiplexed by time domain and frequency domain resource positions of the blank resources which are configured on each physical resource block. FIG. 10 illustrates an example of a case of puncturing for a coreset in blank resources, wherein resource positions of demodulation reference signals of downlink control channels may be multiplexed by resource particle positions occupied by the blank resources in each physical resource block, or the resource particle positions occupied by the blank resources in each physical resource block may have a fixed offset from the resource positions of the demodulation reference signals.

The blank resources may be configured to be aperiodic by the terminal acquiring the time domain and frequency domain positions of the blank resources by system signaling and/or according to a certain system rule, wherein the system signaling comprises at least one of high layer signaling, downlink control signaling etc. Content indicated by the system signaling comprises at least one of a blank resource trigger switch, time domain resource positions of the blank resources, and frequency domain positions of the blank resources. In particular, the blank resource trigger switch may be indicated by downlink control signaling.

As a specific implementation of the time domain positions of the triggered blank resources, a time domain end position of the blank resources is before the start position of a scheduled physical uplink shared channel/physical downlink shared channel, and there may be a certain interval between the time domain end position of the configured blank resources and the time domain start position of the physical uplink shared channel/physical downlink shared channel, which may be predefined or indicated by signaling; and/or a time domain start position of the blank resources is after the start position of the scheduled physical uplink shared channel/physical downlink shared channel, and there may be a certain interval between the time domain start position of the configured blank resources and the time domain start position of the physical uplink shared channel/physical downlink shared channel, which may be predefined or indicated by signaling, as shown in FIG. 11. In a specific implementation of the method for configuring the time domain positions of the blank resources, an index of a time domain start sub-frame/slot/time domain symbol of the blank resources and a number of consecutive sub-frames/slots/time domain symbols of the blank resources may be configured, or the index of the time domain start sub-frame/slot/time domain symbol of the blank resources may be appointed and the number of the consecutive sub-frames/slots/time domain symbols of the blank resources may be configured.

As a specific implementation of the frequency domain positions of the triggered blank resources, a bandwidth of the blank resources in the frequency domain covers a transmission bandwidth of the physical uplink shared channel/physical downlink shared channel; or the bandwidth of the blank resources in the frequency domain is outside the transmission bandwidth of the physical uplink shared channel/physical downlink shared channel, as shown in FIG. 11. Blank resources with a larger bandwidth may be configured to enable a base station or a terminal operating in a full-duplex mode to transmit signals which have a larger bandwidth and are consecutive in the frequency domain, thereby generating time domain signals which are more suitable for iterative convergence of an analog cancellation module. In particular, when used in a full-duplex communication system, and the time domain symbols of the configured blank resources overlap with transmission time of the physical uplink shared channel/physical downlink shared channel but a bandwidth of the configured blank resources does not overlap with that of the physical uplink shared channel/physical downlink shared channel, the physical uplink shared channel/physical downlink shared channel is transmitted in a half-duplex transmission mode when the physical uplink shared channel/physical downlink shared channel is transmitted at the same time as the blank resources (that is, there is only the physical channel or signal transmission in one direction on the same time-frequency physical resources), and the physical uplink shared channel/physical downlink shared channel is transmitted in a full-duplex transmission mode at remaining transmission time, as shown in FIG. 11.

Figure 12:
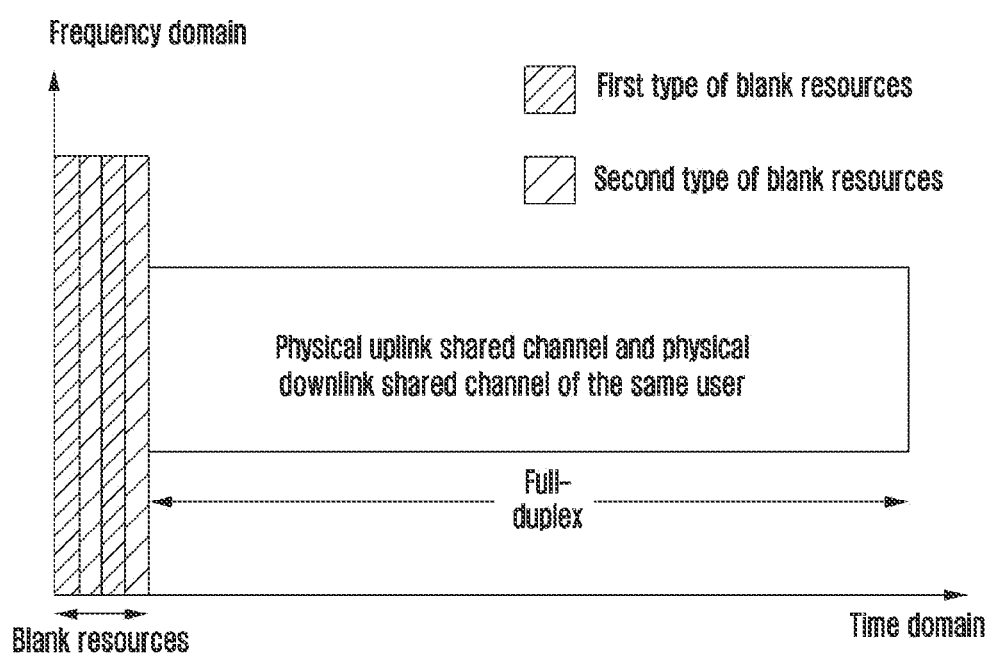
FIG. 12 illustrates an example of a manner in which a first type of blank resources is multiplexed with a second type of blank resources according to an embodiment of the present disclosure.

In particular, the terminal may acquire a configuration of a first type of blank resources and a configuration of a second type of blank resources of the same cell, wherein the first type of blank resources and the second type of blank resources are allocated in a time division multiplexing manner. When both a base station and a terminal in a full-duplex communication system may operate in a full-duplex mode, the full-duplex base station may transmit a signal for iterative convergence of an analog cancellation module of the base station on the first type of blank resources; and the full-duplex terminal may transmit a signal for iterative convergence of an analog cancellation module of the terminal on the second type of blank resources. A specific implementation of multiplexing the first type of blank resources and the second type of blank resources will be described below by taking the configuration of aperiodic blank resources as an example. When the base station schedules a physical uplink shared channel and a physical downlink shared channel of the same user to perform transmission on the same time-frequency resources, both the terminal and the base station operate in the full-duplex mode. Therefore, iterative convergence of the analog cancellation modules needs to be performed separately. In this case, the terminal may acquire the configuration of the first type of blank resources and the configuration of the second type of blank resources, and time domain positions of the first type of blank resources and the second type of blank resources are before the start of the uplink and downlink shared channels scheduled for the terminal. As shown in FIG. 12, the first type of blank resources and the second type of blank resources are time division multiplexed and occur at intervals. Specifically, in duration of the configuration of the blank resources, the first type of blank resources and the second type of blank resources occupy several time domain symbols respectively, and appear alternately.

The analog cancellation methods are to cancel a self-interference signal in an analog domain of a receiving link (i.e., before analog-to-digital conversion), so that a signal input to an analog-to-digital converter has a reasonable dynamic range. In engineering implementations, a complex analog cancellation circuit is often required to ensure that self-interference energy is reduced to be below a noise threshold. In consideration of the cost and implementation complexity of full-duplex devices, a digital cancellation module is often added after the analog cancellation module to further reduce the energy of the self-interference signal.

The digital cancellation methods, as the name implies, refer to methods of cancelling a self-interference signal in a digital domain at a receiving terminal (i.e., after analog-to-digital conversion.) A basic principle thereof is that a full-duplex device transmits a known modulation symbol or reference signal and receives a self-interference signal on specific physical resources at the same time. The full-duplex device may estimate a self-interference channel according to the known transmitted modulation symbol or reference signal. The full-duplex device performs reception and transmission on other physical resources at the same time, and the transmitted signal causes interference to the receiving terminal through the self-interference channel. The full-duplex device may reconstruct the self-interference signal on these physical resources based on the estimated self-interference channel and delete the reconstructed self-interference signal from the received digital domain signal.

In order to ensure the accuracy of the estimation of the self-interference channel, except for transmitting the known modulation symbol or reference signal, no modulation symbol or reference signal is transmitted or received on the physical resources for estimation of the self-interference channel. This means that in the allocated physical resources for full-duplex bidirectional transmission, it is necessary to configure unidirectional transmission resources to transmit a unidirectional signal for estimation of the self-interference channel. The unidirectional transmission means that there is only one uplink or downlink transmission in the same time-frequency resources. The inventors of the present disclosure have found that the existing protocol only supports half-duplex communication (unidirectional communication) such as time division duplexing or frequency division duplexing etc., and how to configure the unidirectional transmission signal in the resources for full-duplex transmission is a new urgent problem to be solved.

On the other hand, the full-duplex communication may be regarded as an enhancement technique for existing time division duplex communication systems or frequency division duplex communication systems, and the full-duplex communication may be used on a spectrum for time division duplexing or frequency division duplexing in the future. Two paired spectrum segments are used for the frequency division duplexing for uplink transmission or downlink transmission respectively. A user needs to receive primary and secondary synchronization signals on a downlink spectrum for downlink synchronization, and transmit a physical random access signal on an uplink spectrum for uplink synchronization, that is, synchronization in one direction is completed only in one spectrum segment. When these two spectrum segments are used for the full-duplex communication, it means that bidirectional communication on uplink and downlink is required in each spectrum segment. Therefore, periodic or aperiodic opposite signals need to be configured for each spectrum segment. In order to ensure that the user can achieve uplink synchronization and downlink synchronization in each spectrum segment, how to configure and transmit an uplink reference signal in a downlink spectrum/bandwidth and how to configure and transmit a downlink reference signal in an uplink spectrum/bandwidth is a new problem introduced by the full-duplex communication.

Figure 13:
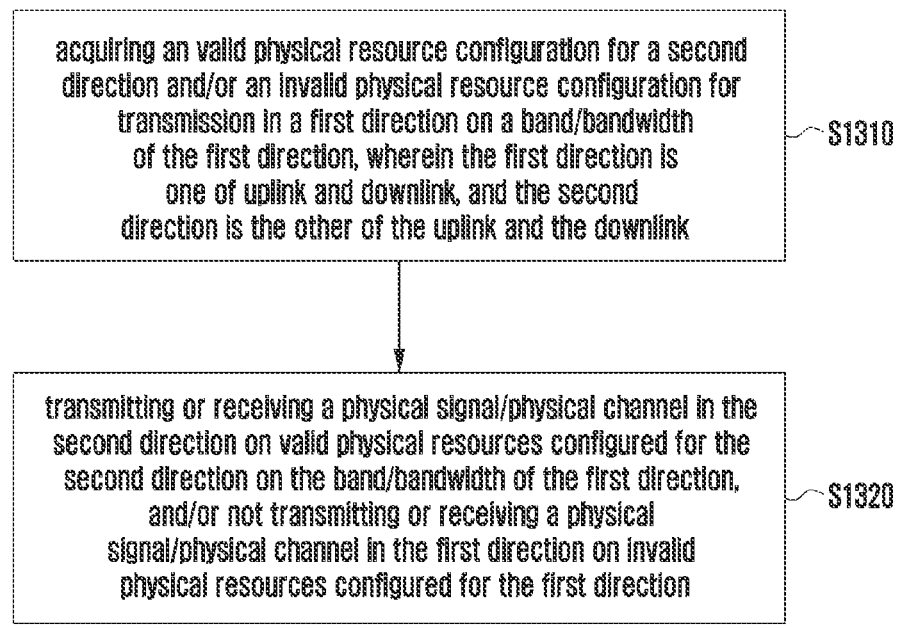
FIG. 13 illustrates a schematic flowchart of a transmission method based on resource configuration according to an embodiment of the present disclosure.

In order to at least partially solve the above problem, the embodiments of the present disclosure provide a transmission method based on resource configuration. FIG. 13 illustrates a schematic flowchart of a transmission method based on resource configuration according to an embodiment of the present disclosure. As shown in FIG. 13, the method comprises the following operations.

In operation S1310, acquiring a valid physical resource configuration for a second direction and/or an invalid physical resource configuration for transmission in a first direction on a band/bandwidth of the first direction, wherein the first direction is one of uplink and downlink, and the second direction is the other of the uplink and the downlink.

In operation S1320, transmitting or receiving a physical signal/physical channel in the second direction on valid physical resources configured for the second direction on the band/bandwidth of the first direction, and/or not transmitting or receiving a physical signal/physical channel in the first direction on invalid physical resources configured for the first direction.

In some examples, acquiring a valid physical resource configuration for a second direction on a band/bandwidth of the first direction comprises: acquiring physical resources reserved for transmission of the physical signal/physical channel in the second direction on the band/bandwidth of the first direction according to high layer signaling.

In some examples, after acquiring physical resources reserved for transmission of the physical signal/physical channel in the second direction on the band/bandwidth of the first direction according to high layer signaling, the method further comprises: acquiring an on-off-switch indication, for determining whether to transmit or receive the physical signal/physical channel of the second direction with the configured physical resources on the band/bandwidth of the first direction. Here, the transmission or reception of the physical signal/physical channel in the second direction on the configured valid physical resources for the second direction is based on the on-off-switch indication.

In the above examples, the method further comprises: acquiring, according to physical resources for transmitting or receiving the physical signal/physical channel in the second direction on a band/bandwidth of the second direction, physical resources for transmitting or receiving the physical signal/physical channel in the second direction on the band/bandwidth of the first direction.

In some examples, when acquiring the valid physical resource configuration for the second direction on the band/bandwidth of the first direction, the method further comprises: acquiring user-specific physical resource configuration for transmitting or receiving the physical signal/physical channel in the second direction on the band/bandwidth of the first direction.

In some examples, the acquiring user-specific physical resource configuration for transmitting or receiving the physical signal/physical channel in the second direction on the band/bandwidth of the first direction comprises: acquiring, according to physical resources for transmitting or receiving the physical signal/physical channel in the second direction on a band/bandwidth of the second direction, physical resources for transmitting or receiving the physical signal/physical channel in the second direction on the band/bandwidth of the first direction.

In some examples, the method may further comprise: acquiring an indication for determining whether to transmit or receive the physical signal/physical channel in the second direction on the band/bandwidth of the first direction; and if the indication indicates that the physical signal/physical channel in the second direction is not transmitted or received on the band/bandwidth of the first direction, when the physical signal/physical channel in the second direction is transmitted or received, performing postponing or puncturing on the configured valid physical resources for the second direction.

In some examples, the acquiring an invalid physical resource configuration for transmission in the first direction comprises any one or a combination of: determining one or multiple time-domain symbols in the physical resources configured for transmitting or receiving a physical signal/physical channel of the first direction as invalid resources for the physical signal/physical channel in the second direction, which are allocated with the same time-frequency resources; determining sequences used for transmitting or receiving the physical signal/physical channel in the first direction as invalid resources for the physical signal/physical channel in the second direction, which are allocated with the same time-frequency resources; or determining frequency-domain resources used for transmitting or receiving the physical signal/physical channel in the first direction as invalid resources for the physical signal/physical channel in the second direction, which are allocated with the same time-frequency resources.

In some examples, the method may further comprise: acquiring one of the following: an indication for determining whether to configure invalid physical resources, wherein when the indication indicates that the invalid physical resources are configured, predetermined invalid physical resources are acquired, or an invalid physical resource configuration is acquired through signaling, or an invalid physical resource configuration configured through signaling.

In some examples, the method further comprises: shifting the physical resources for transmitting or receiving the physical signal/physical channel relative to positions of the invalid physical resources configured on the physical resources; and transmitting or receiving the physical signal/physical channel on the shifted physical resources.

In some examples, the method further comprises: receiving uplink configuration parameters for demodulation reference signals of other devices using the same uplink band/bandwidth and/or downlink band/bandwidth; and estimating interference from other device using the uplink configuration parameters.

In order to at least partially solve the above problem, the embodiments of the present disclosure further provide a method performed by a network side device for resource configuration. FIG. 14 illustrates a schematic flowchart of a method performed by a network side device for resource configuration according to an embodiment of the present disclosure. As shown in FIG. 14, the method comprises the following operation.

In operation S1410, informing a terminal of a valid physical resource configuration for a second direction and/or an invalid physical resource configuration for transmission in a first direction on a band/bandwidth of the first direction, wherein the first direction is one of uplink and downlink, and the second direction is the other of the uplink and downlink.

In some examples, the informing a terminal of a valid physical resource configuration for a second direction on a band/bandwidth of the first direction comprises: informing the terminal of physical resources reserved for transmission of the physical signal/physical channel in the second direction on the band/bandwidth of the first direction according to high layer signaling.

In some examples, the method may further comprise: providing the terminal with an on-off-switch indication, for determining whether to transmit or receive the physical signal/physical channel of the second direction with the configured physical resources on the band/bandwidth of the first direction.

In some examples, the method may further comprise: transmitting, to the terminal, an indication for determining whether to transmit or receive the physical signal/physical channel in the second direction on the band/bandwidth of the first direction.

In some examples, the method may further comprise: providing the terminal with one of the following: an indication for determining whether to configure invalid physical resources, wherein when the indication indicates that the invalid physical resources are configured, predetermined invalid physical resources are acquired, or an invalid physical resource configuration is acquired through signaling; or an invalid physical resource configuration configured through signaling.

Figure 15:
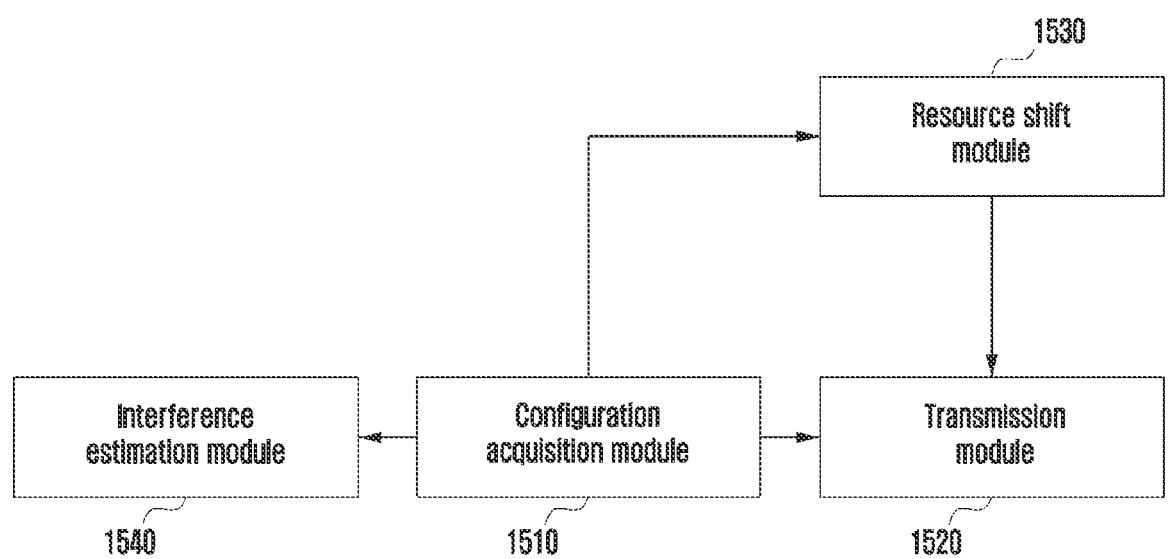
FIG. 15 illustrates a schematic block diagram of a terminal according to an embodiment of the present disclosure.

In order to at least partially solve the above problem, the embodiments of the present disclosure further provide a terminal. FIG. 15 illustrates a schematic block diagram of a terminal according to an embodiment of the present disclosure.

As shown in FIG. 15, the terminal comprises a configuration acquisition module 1510 and a transmission module 1520. The configuration acquisition module 1510 is configured to acquire a valid physical resource configuration for a second direction and/or an invalid physical resource configuration for transmission in a first direction on a band/bandwidth of the first direction, wherein the first direction is one of uplink and downlink, and the second direction is the other of the uplink and the downlink. The transmission module 1520 is configured to transmit or receive a physical signal/physical channel in the second direction on valid physical resources configured for the second direction on the band/bandwidth of the first direction, and/or not to transmit or receive a physical signal/physical channel in the first direction on invalid physical resources configured for the first direction.

In some examples, the configuration acquisition module 1510 may be configured to acquire physical resources reserved for transmission of the physical signal/physical channel in the second direction on the band/bandwidth of the first direction according to high layer signaling.

In some examples, after acquiring physical resources reserved for transmission of the physical signal/physical channel in the second direction on the band/bandwidth of the first direction according to high layer signaling, the configuration acquisition module 1510 may further be configured to acquire, an on-off-switch indication, for determining whether to transmit or receive the physical signal/physical channel of the second direction with the configured physical resources on the band/bandwidth of the first direction. Here, the transmission or reception of the physical signal/physical channel in the second direction on the configured valid physical resources for the second direction is based on the on-off-switch indication.

In the above examples, the configuration acquisition module 1510 may further be configured to acquire, according to physical resources for transmitting or receiving the physical signal/physical channel in the second direction on a band/bandwidth of the second direction, physical resources for transmitting or receiving the physical signal/physical channel in the second direction on the band/bandwidth of the first direction.

In some examples, when the valid physical resource configuration for the second direction on the band/bandwidth of the first direction is acquired, the configuration acquisition module 1510 may further be configured to acquire user-specific physical resource configuration for transmitting or receiving the physical signal/physical channel in the second direction on the band/bandwidth of the first direction.

In some examples, the configuration acquisition module 1510 may further be configured to acquire, according to physical resources for transmitting or receiving the physical signal/physical channel in the second direction on a band/bandwidth of the second direction, physical resources for transmitting or receiving the physical signal/physical channel in the second direction on the band/bandwidth of the first direction.

In some examples, the configuration acquisition module 1510 may further be configured to acquire an indication for determining whether to transmit or receive the physical signal/physical channel in the second direction on the band/bandwidth of the first direction. If the indication indicates that the physical signal/physical channel in the second direction is not transmitted or received on the band/bandwidth of the first direction, when the physical signal/physical channel in the second direction is transmitted or received, the transmission module 1520 performs postponing or puncturing on the configured valid physical resources for the second direction.

In some examples, the configuration acquisition module 1510 may be configured to perform any one or a combination of the following operations: determining one or multiple time-domain symbols in the physical resources configured for transmitting or receiving a physical signal/physical channel of the first direction as invalid resources for the physical signal/physical channel in the second direction, which are allocated with the same time-frequency resources; determining sequences used for transmitting or receiving the physical signal/physical channel in the first direction as invalid resources for the physical signal/physical channel in the second direction, which are allocated with the same time-frequency resources; or determining frequency-domain resources used for transmitting or receiving the physical signal/physical channel in the first direction as invalid resources for the physical signal/physical channel in the second direction, which are allocated with the same time-frequency resources.

In some examples, the configuration acquisition module 1510 may further be configured to acquire one of the following: an indication for determining whether to configure invalid physical resources, wherein when the indication indicates that the invalid physical resources are configured, predetermined invalid physical resources are acquired, or an invalid physical resource configuration is acquired through signaling; or an invalid physical resource configuration configured through signaling.

In some examples, the terminal shown in FIG. 15 may further comprise a resource shift module 1530, configured to shift the physical resources for transmitting or receiving the physical signal/physical channel relative to positions of the invalid physical resources configured on the physical resources. In this case, the transmission module 1520 is configured to transmit or receive the physical signal/physical channel on the shifted physical resources.

In some examples, the configuration acquisition module 1510 may further be configured to receive uplink configuration parameters for demodulation reference signals of other devices using the same uplink band/bandwidth and/or downlink band/bandwidth. The terminal shown in FIG. 15 may further comprise an interference estimation module

1540 configured to estimate interference from other device using the uplink configuration parameters.

Figure 16:
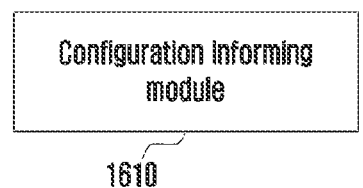
FIG. 16 illustrates a schematic block diagram of a network side device according to an embodiment of the present disclosure.

In order to at least partially solve the above problem, the embodiments of the present disclosure further provide a network side device (for example, a base station). FIG. 16 illustrates a schematic block diagram of a network side device according to an embodiment of the present disclosure.

As shown in FIG. 16, the network side device comprises a configuration informing module 1610. The configuration informing module 1610 is configured to inform a terminal of a valid physical resource configuration for a second direction and/or an invalid physical resource configuration for transmission in a first direction on a band/bandwidth of the first direction, wherein the first direction is one of uplink and downlink, and the second direction is the other of the uplink and downlink.

In some examples, the configuration informing module 1610 may further be configured to inform the terminal of physical resources reserved for transmission of the physical signal/physical channel in the second direction on the band/bandwidth of the first direction according to high layer signaling.

In some examples, the configuration informing module 1610 may further be configured to provide the terminal with an on-off-switch indication, for determining whether to transmit or receive the physical signal/physical channel of the second direction with the configured physical resources on the band/bandwidth of the first direction.

In some examples, the configuration informing module 1610 may further be configured to transmit, to the terminal, an indication for determining whether to transmit or receive the physical signal/physical channel in the second direction on the band/bandwidth of the first direction.

In some examples, the configuration informing module 1610 may further be configured to provide the terminal with one of the following: an indication for determining whether to configure invalid physical resources, wherein when the indication indicates that the invalid physical resources are configured, predetermined invalid physical resources are acquired, or an invalid physical resource configuration is acquired through signaling; or an invalid physical resource configuration configured through signaling.

The technical solutions shown in FIGS. 1-4 will be further described below with reference to the specific embodiments. It should be illustrated that the specific embodiments provided below are only specific examples for implementing the technical solutions according to the embodiments of the present disclosure, and should not be construed as limiting the technical solutions according to the embodiments of the present disclosure. For example, a "terminal" as referred to herein may be a mobile terminal, a fixed terminal, or any device which is commonly used in the art or to be developed for receiving a resource configuration.

In the following description, for the sake of brevity, the specific technical solutions will be described by taking one of downlink or uplink being primarily used as a direction (referred to as "this direction" in some examples) in which a terminal intends to transmit a physical signal, and the other direction of the downlink or the uplink being referred to as an opposite direction or opposing direction to "this direction". However, it should be recognized that, as long as there is no explicit indication or contradiction, in the solutions described below, the solution described for the uplink/downlink is equally applicable to a scenario for the downlink/uplink, and it only needs to make adaptive amendments by those skilled in the art without any creative work.

Embodiment III

In the present embodiment, there is proposed a method for configuring and transmitting an opposite physical signal in a downlink (uplink) spectrum or bandwidth. With respect to the meaning of the opposite physical signal, an uplink physical signal is an opposite signal for a downlink spectrum or bandwidth; and similarly, a downlink physical signal is an opposite signal for an uplink spectrum or bandwidth. The configured opposite physical signal may be used for a user's synchronization process in a transmission direction. In particular, the method for transmitting a physical signal according to the present embodiment may be applied to a full-duplex communication system operating on paired spectrums for frequency division duplexing.

Figure 17:
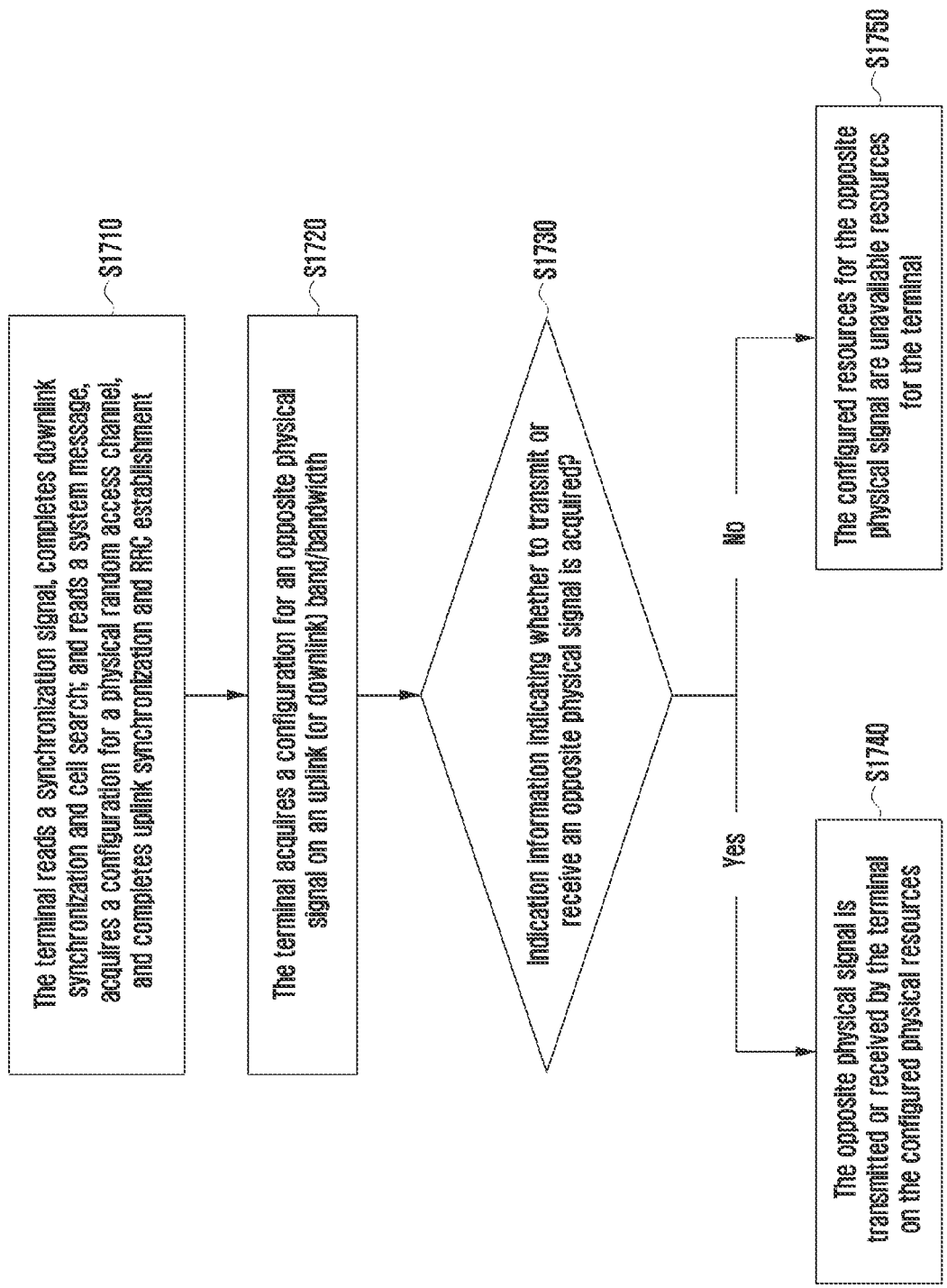
FIG. 17 is a schematic flowchart illustrating a schematic implementation of a transmission method based on resource configuration according to an embodiment of the present disclosure.

A process of a terminal acquiring a configuration for an opposite physical signal on a downlink (uplink) spectrum or bandwidth, and transmitting or receiving the physical signal is as shown in FIG. 17.

In step S1710, the terminal reads a synchronization signal, completes downlink synchronization in a downlink band/bandwidth, acquires a Physical Cell Identity (PCID), and completes cell search; and reads a primary message block and a system message block, acquires a position of an uplink band/bandwidth and a configuration for a physical random access channel, and completes uplink synchronization and RRC connection establishment.

In step S1720, the terminal acquires a configuration for an uplink physical signal on the downlink band/bandwidth, and/or acquires a configuration for a downlink physical signal on the uplink band/bandwidth. The uplink physical signal on the downlink band/bandwidth and the downlink physical signal on the uplink band/bandwidth may be configured by cell-specific signaling, for example, a system message block etc., or by user-specific signaling. Indication content of the signaling may be an on-off-switch indication for determining whether an uplink physical signal is configured on a downlink band/bandwidth, or an on-off-switch indication for determining whether a downlink physical signal is configured on an uplink band/bandwidth, or an on-off-switch indication for indicating whether opposite physical signals are configured on the uplink and downlink bands/bandwidths.

The uplink physical signal on the downlink band/bandwidth may be a random access signal, a Sounding Reference Signal (SRS), an (uplink) Demodulation Reference Signal (DMRS), etc. The downlink physical signal on the uplink band/bandwidth may be a primary synchronization signal, a secondary synchronization signal, a Cell-specific Reference Signal (CRS), a Channel State Information Reference Signal (CSI-RS), a (downlink) Demodulation Reference Signal (DMRS), etc.

An implementation of the method for configuring an uplink physical signal will be described below by taking configuration and transmission of a random access signal on a downlink band/bandwidth as an example. The method is not limited to be applied to a random access signal, and may also be applied to other physical signals, for example, a synchronization signal, a CRS, a periodic CSI-RS, a periodic SRS, etc. When used for configuration of an uplink physical signal, a method for configuring and transmitting a downlink physical signal on an uplink band/bandwidth described below needs to be adaptively modified. The terminal acquires physical resources for a random access channel reserved by a system on a downlink band/bandwidth according to high layer signaling, wherein the physical resources comprises at least one of time domain resources, frequency domain resources, and sequence resources; then acquires physical resources for transmitting a random access signal by the terminal itself on the downlink band/bandwidth; and then transmits the random access signal on the acquired physical resources for the random access signal. A specific implementation in which the terminal acquires the physical resources for the random access channel reserved by the system on the downlink band/bandwidth according to high layer signaling may be that the terminal acquires an on-off-switch indication for determining whether the physical resources for the random access channel are configured on the downlink band/bandwidth in high layer signaling, and if the on-off-switch indication is enabled, the system reserves the physical resources for the random access channel on the downlink band/bandwidth, wherein positions of the physical resources for the random access channel may be the same as those reserved by the system on the uplink band/bandwidth; otherwise, there are no physical resources for the random access channel reserved on the downlink band/bandwidth. A specific implementation in which the physical resources for transmitting the random access signal by the terminal itself on the downlink band/bandwidth are acquired may be that the terminal acquires physical resources for transmitting the random access signal on the downlink band/bandwidth according to physical resources for transmitting a random access signal by the terminal itself on an uplink band/bandwidth, for example, the physical resources for transmitting the random access signal on the downlink band/bandwidth are the same as those for transmitting the random access signal by the terminal on the uplink band/bandwidth.

Another implementation of the method for configuring a physical signal will be described below by taking configuration and transmission of an aperiodic sounding reference signal on a downlink band/bandwidth as an example. The method is not limited to be applied to an aperiodic sounding reference signal, and may also be applied to other uplink signals or downlink signals, for example, a demodulation reference signal, an aperiodic CSI-RS, etc. When used for configuration of an uplink physical signal, a method for configuring and transmitting a downlink physical signal on an uplink band/bandwidth described below needs to be adaptively modified. The terminal acquires physical resources for a sounding reference signal on the downlink band/bandwidth according to user-specific signaling or downlink control information, wherein the physical resources comprise at least one of time domain resources, frequency domain resources, and sequence resources; and transmits the sounding reference signal on the configured physical resources. Indication content of the downlink control information for configuring the physical resources for the sounding reference signal on the downlink band/bandwidth may comprise a request for transmitting the sounding reference signal. Indication content of the user-specific signaling for configuring the physical resources for the sounding reference signal on the downlink band/bandwidth may comprise a request for transmitting the sounding reference signal/a switch for configuring the sounding reference signal, and/or time domain resources/frequency domain resources for transmitting the sounding reference signal, for example, a period, a sub-band bandwidth, etc. of the sounding reference signal. A manner in which the terminal acquires the physical resources for the sounding reference signal on the downlink band/bandwidth may be the same as a manner in which the terminal acquires the physical resources for the sounding reference signal on the uplink band/bandwidth; or the terminal acquires the physical resources for the sounding reference signal on the downlink band/bandwidth in an implicit indication manner. For example, if the terminal determines that the switch for configuring the sounding reference signal is in a turn-on state, it indicates that the sounding reference signal is transmitted on the downlink band/bandwidth; and the physical resources for transmitting the sounding reference signal on the downlink band/bandwidth may be the same as the configured physical resources for the sounding reference signal on the uplink band/bandwidth without additional signaling notification.

In step S1730, the terminal acquires an indication indicating whether to transmit an opposite physical signal on the uplink (or downlink) band/bandwidth. If the indication indicates that the opposite physical signal is to be transmitted, then in step S1740, the opposite physical signal is transmitted or received by the terminal on the physical resources configured in step S1720. If the indication indicates that the opposite physical signal is not to be transmitted, and the physical resources configured in step S1720 are time-frequency resources reserved by the system, then in step S1750, the physical resources reserved by the system for the opposite physical signal are invalid resources for the terminal, that is, the terminal performs postponing or punctured transmission on the invalid resources reserved by the system when transmission is performed on the uplink (or downlink) band/bandwidth.

Embodiment IV

In the present embodiment, there is proposed a method for transmitting uplink and downlink physical signals. Time-frequency resources of the uplink (or downlink) physical signal are configured as invalid resources for transmission in another direction, which ensures that the transmission of the physical signal is unidirectional transmission, that is, there is no signal transmission in the other direction on the time-frequency resources for transmission of the physical signal. The transmission method may be used in a scenario of full-duplex communication, and the configured unidirectional transmission physical signal may be used by a full-duplex device for estimation of a self-interference channel or for estimation of inter-user interference. A method for acquiring and transmitting an invalid resource configuration by a terminal from physical resources for transmission of a physical channel will be described below by taking configuration of a unidirectional transmission demodulation reference signal as an example. If another unidirectional transmission physical signal is configured, the following method may still be applicable, with only difference in acquiring the resource configuration for the unidirectional transmission physical signal.

In a specific implementation, the terminal acquires physical resources for an opposite demodulation reference signal, and all or a part of the physical resources are used as invalid resources for transmission of a physical channel or physical signal in this direction, wherein if the transmission of the physical channel in this direction is transmission of a downlink physical channel, opposite transmission is uplink transmission, and vice versa. The physical resources of the opposite demodulation reference signal comprise at least one of indexes of symbols occupied by the opposite demodulation reference signal, indexes of physical resource blocks occupied by the opposite demodulation reference signal, orthogonal sequences used by the opposite demodulation reference signal, for example, cyclic shift values of ZC sequences, etc. When the physical channel is transmitted, the terminal may perform postponing or punctured transmission on the invalid resources.

Figure 18:
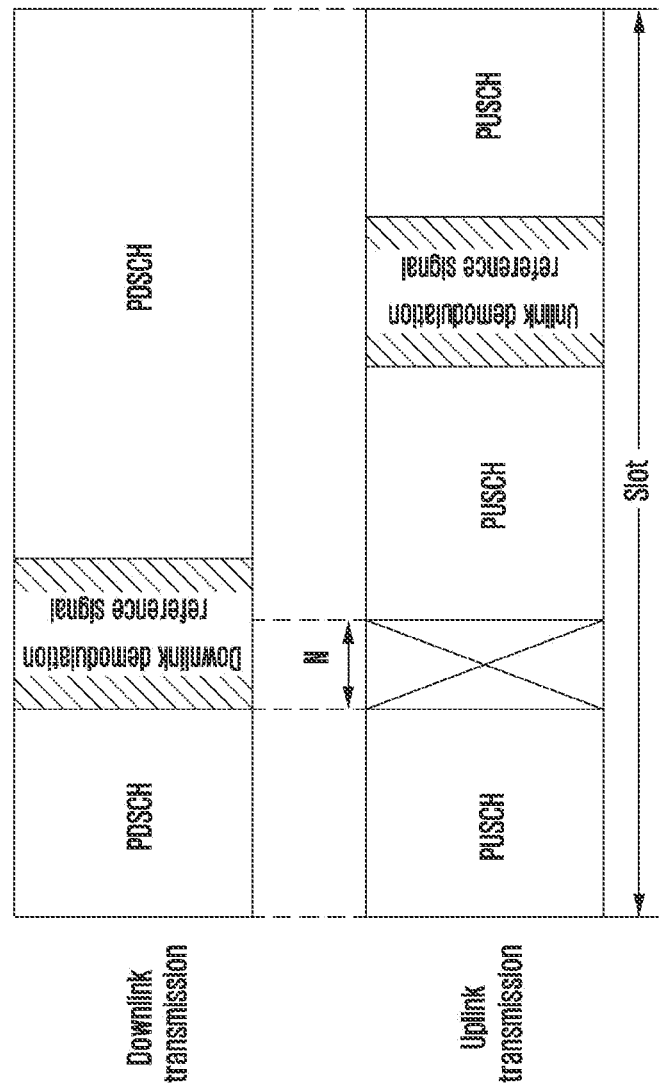
FIG. 18 is a schematic diagram illustrating an example of determining invalid resources according to an embodiment of the present disclosure.

The method for determining, by a terminal, all or a part of physical resources for an opposite demodulation reference signal as invalid resources for transmission of a physical channel or physical signal in this direction may comprise: determining positions of time-frequency resources of first N symbols for the opposite demodulation reference signal as invalid resources for transmission of the physical channel or physical signal in this direction, wherein a value of N is fixedly determined by a protocol, or indicated by high layer signaling, or indicated by downlink control signaling. FIG. 18 illustrates a schematic diagram of the transmission method. It is assumed that a PDSCH and a PUSCH are scheduled to be transmitted in the same frequency domain resources on the same slots, and a downlink demodulation reference signal and an uplink demodulation reference signal are not on the same symbols. In this case, the terminal acquires time-frequency resources of first N symbols for the downlink demodulation reference signal as invalid resources for transmission of the PUSCH according to high layer signaling or downlink control signaling, and a manner in which the PUSCH is mapped on sub-frames may be as shown in FIG. 18.

Figure 19:
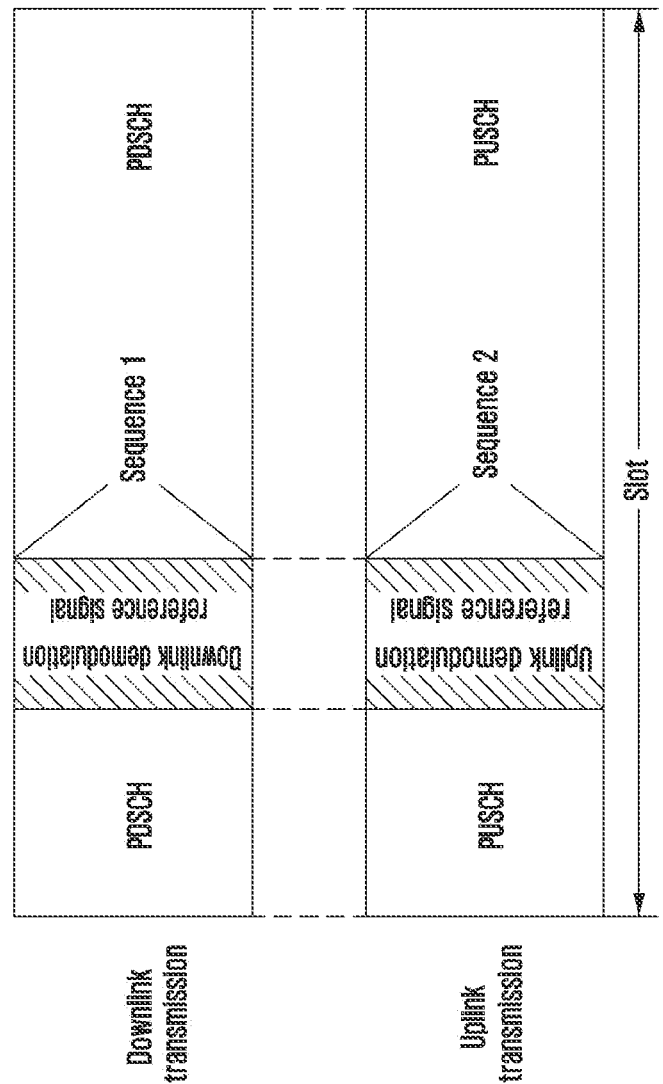
FIG. 19 is a schematic diagram illustrating another example of determining invalid resources according to an embodiment of the present disclosure.

The method for determining, by a terminal, all or a part of physical resources for an opposite demodulation reference signal as invalid resources for transmission of a physical signal in this direction may comprise: determining sequences used for the opposite demodulation reference signal as invalid resources for transmission of the physical signal in this direction, wherein sequences used for transmission of the physical signal in this direction may be orthogonal or quasi-orthogonal sequences of the sequences for transmission of the opposite demodulation reference signal, and may be fixedly determined by a protocol, or indicated by high layer signaling, or indicated by downlink control information. The method is applicable to a scenario in which time-frequency resources for transmission of the opposite demodulation reference signal overlap with those for transmission of the demodulation reference signal in this direction. FIG. 19 illustrates a schematic diagram. It is assumed that a PDSCH and a PUSCH are scheduled to be transmitted in the same frequency domain resources on the same slots, and a downlink demodulation reference signal and an uplink demodulation reference signal are on the same symbols. In this case, sequence resources used for the downlink demodulation reference signal are invalid resources for the uplink demodulation reference signal. Sequences used for the uplink demodulation reference signal may be orthogonal or quasi-orthogonal sequences for the downlink demodulation reference signal, and the sequences may be fixedly determined by a protocol, or indicated by high layer signaling, or indicated by downlink control information, For example, the terminal acquires an initial value of a pseudo-random sequence generator for the uplink demodulation reference signal, wherein there is a difference Δ between the initial value and an initial value for the downlink demodulation reference signal, and a value of Δ may be fixedly determined by a protocol, or indicated by high layer signaling/downlink control signaling, and is acquired by the terminal. In another example, the uplink downlink demodulation signal and downlink demodulation signal are ZC sequences using the same root sequence, and the terminal acquires a cyclic shift value $n_{cs}^{UL}$ of the uplink demodulation reference signal as an ZC sequence. The cyclic shift value $n_{cs}^{UL}$ is different from a cyclic shift value of the downlink demodulation reference signal, and $n_{cs}^{UL}$ may be fixedly determined by a protocol, indicated by high layer signaling, or indicated by downlink control information.

Figure 20:
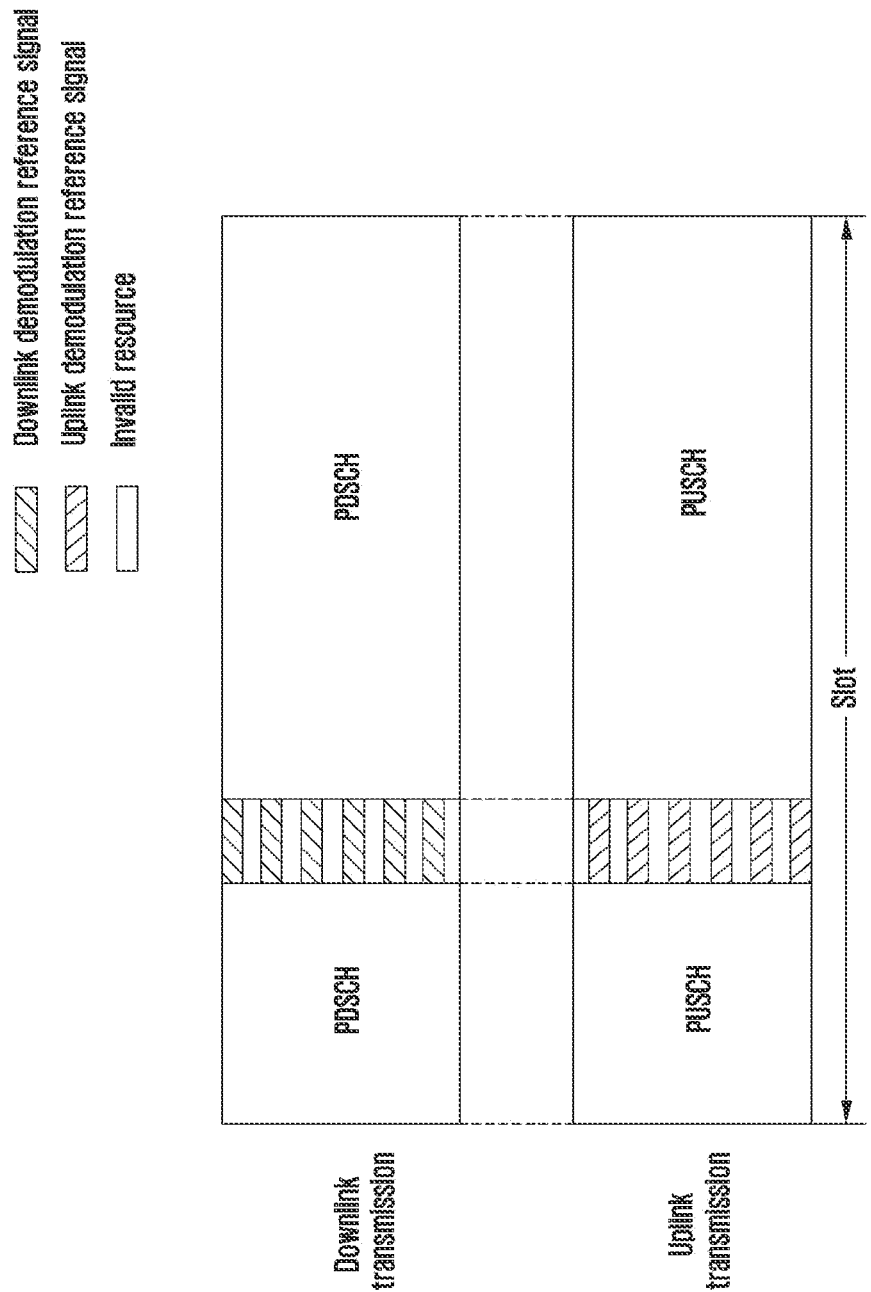
FIG. 20 is a schematic diagram illustrating another example of determining invalid resources according to an embodiment of the present disclosure.

The method for determining, by a terminal, all or a part of physical resources for an opposite demodulation reference signal as invalid resources for transmission of a physical channel or physical signal in this direction may comprise: determining positions of frequency domain resources for the opposite demodulation reference signal as invalid resources for transmission of the physical channel or physical signal in this direction, wherein valid frequency domain resources for transmission of the physical channel or physical signal in this direction are fixedly determined by a protocol, or indicated by high layer signaling, or indicated by downlink control signaling. The method is applicable to a scenario in which frequency domain resources for the opposite demodulation reference signal on the same symbols are discontinuous. FIG. 20 illustrates a schematic diagram. It is assumed that a PDSCH and a PUSCH are scheduled to be transmitted in the same frequency domain resources on the same slots, and the frequency domain resources used for the downlink demodulation reference signal on the same symbols are discontinuous. In this case, the uplink demodulation reference signal may be mapped on the same symbols as those for the downlink demodulation reference signal, the frequency domain resources used for the downlink demodulation reference signal are invalid resources for the uplink demodulation reference signal.

The above three methods for determining, by a terminal, all or a part of physical resources for an opposite demodulation reference signal resource as invalid resources for transmission of a physical channel or physical signal in this direction may be combined with each other to form a new determination method, which will not be described in detail again.

In an implementation, the terminal may acquire the physical resources for the opposite demodulation reference signal by receiving scheduling authorization information for opposite transmission. The implementation may be applicable to a case where time-frequency resources scheduled by a terminal for transmission of a demodulation reference signal on a Physical Downlink Shared Channel (PDSCH) overlap with those scheduled by the same terminal for transmission of a demodulation reference signal on an uplink physical channel, wherein the uplink physical channel may be a Physical Uplink Shared Channel (PUSCH). In this case, the terminal may receive uplink scheduling authorization and downlink scheduling authorization at the same time. The uplink scheduling authorization information and the downlink scheduling authorization information may be transmitted through different physical downlink control channels respectively, or the uplink scheduling authorization information and the downlink scheduling authorization information may also be carried and transmitted through the same physical downlink control channel at the same time.

Another method for acquiring and transmitting, by a terminal, an invalid resource configuration from physical resources for transmission of a physical channel, as described below, comprises: acquiring, by the terminal, the invalid resource configuration through a fixed protocol rule and/or signaling notification. Specifically, signaling indicating the invalid resource configuration may be downlink control information. For example, the terminal acquires uplink (or downlink) scheduling authorization information to obtain invalid resources for transmission of a physical uplink (or downlink) shared channel. Further, the invalid resources may be physical resources for an opposite physical channel or physical signal, such as an opposite demodulation reference signal. In a specific implementation, the terminal acquires a switch indication for indicating whether invalid resources are configured in the uplink (or downlink) scheduling authorization information. When the switch indication is enabled, invalid resources which are fixedly determined by a protocol are acquired; and when the switch indication is disabled, there is no invalid resource configuration. The invalid resources which are fixedly determined by the protocol may be time domain resources, and/or frequency domain resources, and/or sequence resources, as shown in FIG. 18, FIG. 19 and FIG. 20 described above. In another specific implementation, the terminal acquires configuration information of invalid resources in the uplink (or downlink) scheduling authorization information, wherein the configured invalid resources may be time domain resources, and/or frequency domain resources, and/or sequence resources. For example, it is indicated using 1 bit that positions of the invalid resources are a column of resource particles $(k, l_0)$, or two columns of resource particles $(k, l_0)$ and $(k, l_0+1)$, where k is an index of a sub-carrier belonging to physical resource blocks allocated for transmission of a physical channel; and $l_o$ is an index of an initial OFDM symbol for transmission of the physical channel on slots, or an index of an initial OFDM symbol of invalid resources configured by the scheduling authorization information of the terminal. In another example, it is indicated that the invalid resource particles satisfy one of conditions in Table 1. Table 1 illustrates a correspondence between indication state indexes and invalid resource particles for transmission of a physical channel, wherein k is an index of a sub-carrier belonging to physical resource blocks allocated for transmission of the physical channel; and $l_o$ is an index of an initial OFDM symbol for transmission of the physical channel on slots, or an index of an initial OFDM symbol of invalid resources configured by scheduling authorization information of the terminal. In another example, it is indicated that positions of the invalid resources are resource particles (k,l), where k is an index of a sub-carrier belonging to physical resource blocks allocated for transmission of the physical channel; and l is indicated through bit mapping. For example, if indication information is 000110000000000, $4^{th}$ and $5^{th}$ bits which are 1 indicate that invalid resources are configured on $4^{th}$ and $5^{th}$ OFDM symbols in slots for transmission of the scheduled physical channel.

TABLE 1

Correspondence between indication state indexes and invalid resource particles for transmission of a physical channel

| Indication state indexes | Invalid resource particles for transmission of a physical channel |
| --- | --- |
| 0 | $(k, l_0)$ |
| 1 | $(k, l_0)$ and $(k, l_0 + 1)$ |
| 2 | $(k, l_0)$ and $(k, 4)$ |
| 3 | $(k, l_0)$ and $(k, 7)$ |
| 4 | $(k, l_0)$ and $(k, 9)$ |
| 5 | $(k, l_0)$ and $(k, 11)$ |

In addition, considering that the configured invalid resources may overlap with positions of configured resources for a physical signal, which may, for example, be a demodulation reference signal, a sounding reference signal, a CSI-RS, etc. for a physical channel, in order to ensure that an invalid resource configuration does not affect a normal function of the physical signal, physical signal patterns which do not cause overlapping between the invalid resources and the physical resources for the physical signal may be configured; or the physical resources for transmission of the physical signal may be shifted. A method for configuring physical signal patterns and configuring a shift of physical resources for transmission of a physical signal is given below. In particular, the following method may also be used for a process when the invalid resources overlap with a resource configuration for a physical channel, except that the "physical signal" is replaced with the "physical channel" in the following method, and details thereof will not be described in detail herein.

In a specific implementation of the method for configuring physical signal patterns, a terminal acquires positions, i.e., physical signal patterns, of physical resources for a physical signal according to switch indication. For example, it is assumed that a system configures invalid resources in uplink transmission to ensure that a downlink demodulation reference signal in full-duplex transmission is in unidirectional transmission. In this case, if the terminal determines that the switch indication is enabled, the terminal acquires physical resources for an uplink or downlink demodulation reference signal. In this case, physical resources for transmitting, by a terminal, the uplink demodulation reference signal are different from those for receiving, by a terminal, the downlink demodulation reference signal, wherein the terminal for uplink transmission and the terminal for downlink reception may be the same terminal or different terminals. At the same time, the terminal which performs uplink transmission further needs to acquire an invalid resource configuration for the uplink physical channel. The configuration method is as described above.

Figure 21:
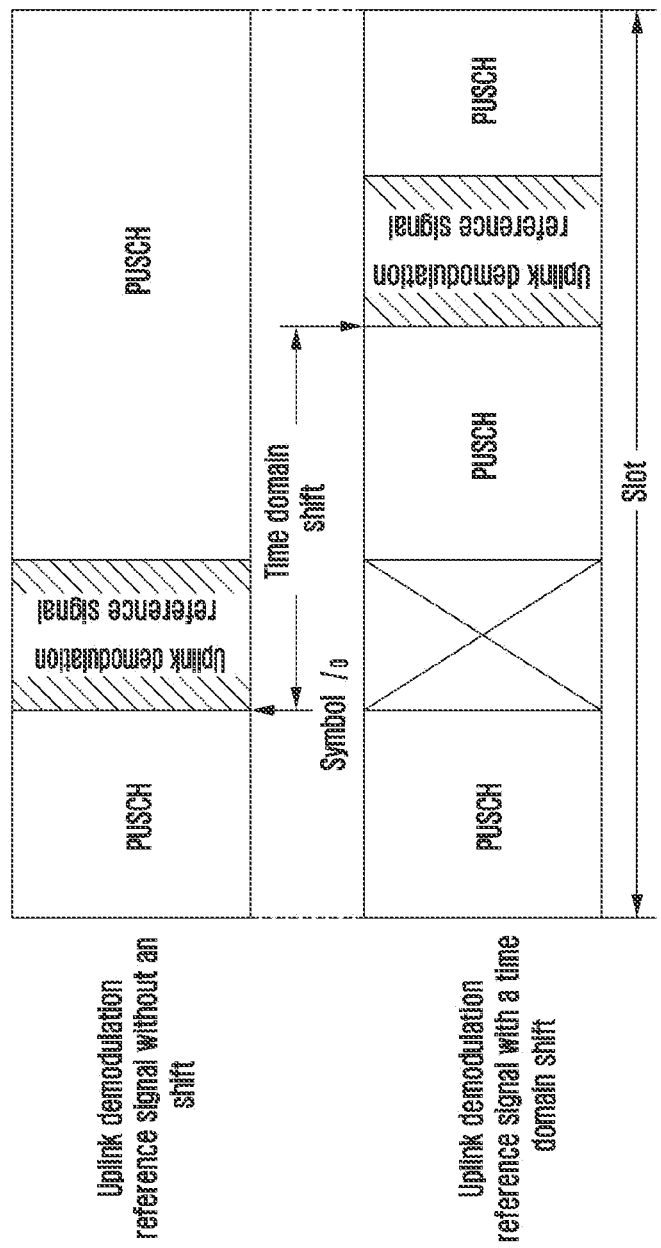
FIG. 21 is a schematic diagram illustrating an example of shifting resources for transmission of a physical signal relative to invalid resources according to an embodiment of the present disclosure.

In a specific implementation of a method for configuring a shift of physical resources for transmission of a physical signal, the terminal acquires a physical resource shift indication of the physical signal, and the physical signal is transmitted by using the shifted physical resources, wherein the physical resources may be time domain resources, and/or frequency domain resources, and/or sequence resources. Specifically, a shift value of the time domain resources may be one or more OFDM symbols; a shift value of the frequency domain resources may be one or more sub-carriers; a shift value of the sequence resources may be a cyclic shift value of sequences etc. The method for acquiring, by the terminal, a physical resource shift indication of the physical signal may comprise: determining, by the terminal, whether to shifted physical resources for the physical signal according to positions of invalid resources; when the positions of the configured invalid resources overlap with the physical resources for the physical signal, the terminal shifts the physical resources for transmission or reception of the physical signal; otherwise, the terminal transmits or receives the physical signal using the original physical resources, wherein a shift value of the physical resources may be configured using signaling, or may be fixedly determined by a protocol. The method for configuring a shift value of the physical resources using signaling may comprise: configuring a shift value of physical resources for a physical signal, for example, a shift value which may indicate an index of an OFDM symbol for transmission of the physical signal, by using user-specific signaling or uplink and downlink scheduling authorization information. By taking an uplink demodulation reference signal as an example, the uplink demodulation reference signal is transmitted in an initial OFDM symbol, which is denoted as $l_o$, for transmission of the physical channel. It is assumed that invalid resources configured in this case are all sub-carriers on the symbol $l_o$, that is, the configured invalid resources overlap with physical resources for the uplink demodulation reference signal. In this case, a shift value of an index of an OFDM symbol for the uplink demodulation reference signal acquired by the terminal according to signaling is N, and the uplink demodulation reference signal is transmitted on an OFDM symbol with an index of ($l_o$+N). FIG. 21 illustrates a schematic diagram of the example. Similarly, a shift of a sub-carrier/physical resource block for transmission of the physical signal may also be indicated. Similarly, a shift value of a cyclic shift of a sequence for transmission of the physical signal, an initial generation value of a sequence for transmission of the physical signal, etc. may also be indicated.

In addition, a unidirectional transmission physical signal may be configured to be used by a base station or terminal operating in a full-dual mode for estimation of a self-interference channel, and in particular, the unidirectional transmission uplink physical signal may further be configured for estimation of an inter-terminal interference channel. Specifically, when the base station operates in a full-duplex mode, the same time-frequency resources may be allocated for a terminal (hereinafter referred to as an uplink terminal) which performs uplink transmission and a terminal (hereinafter referred to as a downlink terminal) which performs downlink reception, and the downlink terminal may perform downlink reception while receiving uplink transmission signals of other terminals, which thus causes inter-terminal interference. In this case, when a unidirectional transmission uplink demodulation reference signal is configured, the downlink terminal estimates an inter-terminal interference channel by using the unidirectional transmission uplink demodulation reference signal, which improves the detection performance of the receiver or provide necessary information for uplink feedback.

The method for configuring and transmitting a unidirectional transmission uplink physical signal will be described below by still taking the demodulation reference signal as an example. In a specific implementation, the downlink terminal acquires configuration parameters for demodulation reference signals of one or more uplink terminals, which at least comprise one of the following configuration contents of each uplink terminal: a demodulation reference signal sequence, transmission power, and time domain positions of the uplink demodulation reference signal and frequency domain positions of the uplink demodulation reference signal. The configuration information of the demodulation reference signal sequence comprises at least one of a User Equipment Identity (UE ID), a Scrambling Identity (Scrambling ID), a spreading code index, and a cyclic shift. The method for acquiring, by the downlink terminal, the configuration parameters for the demodulation reference signal of the uplink terminal may comprise: acquiring, by the downlink terminal, the configuration parameters through downlink scheduling authorization information or user-specific signaling. In the process, the downlink terminal acquires the configuration parameters for the demodulation reference signal of the uplink terminal, and uses all or a part of the resources in the uplink demodulation signal as invalid resources for transmission of a downlink physical channel or physical signal; and at the same time, the downlink terminal may receive an uplink demodulation reference signal according to the configuration of the uplink demodulation reference signal.

Figure 22:
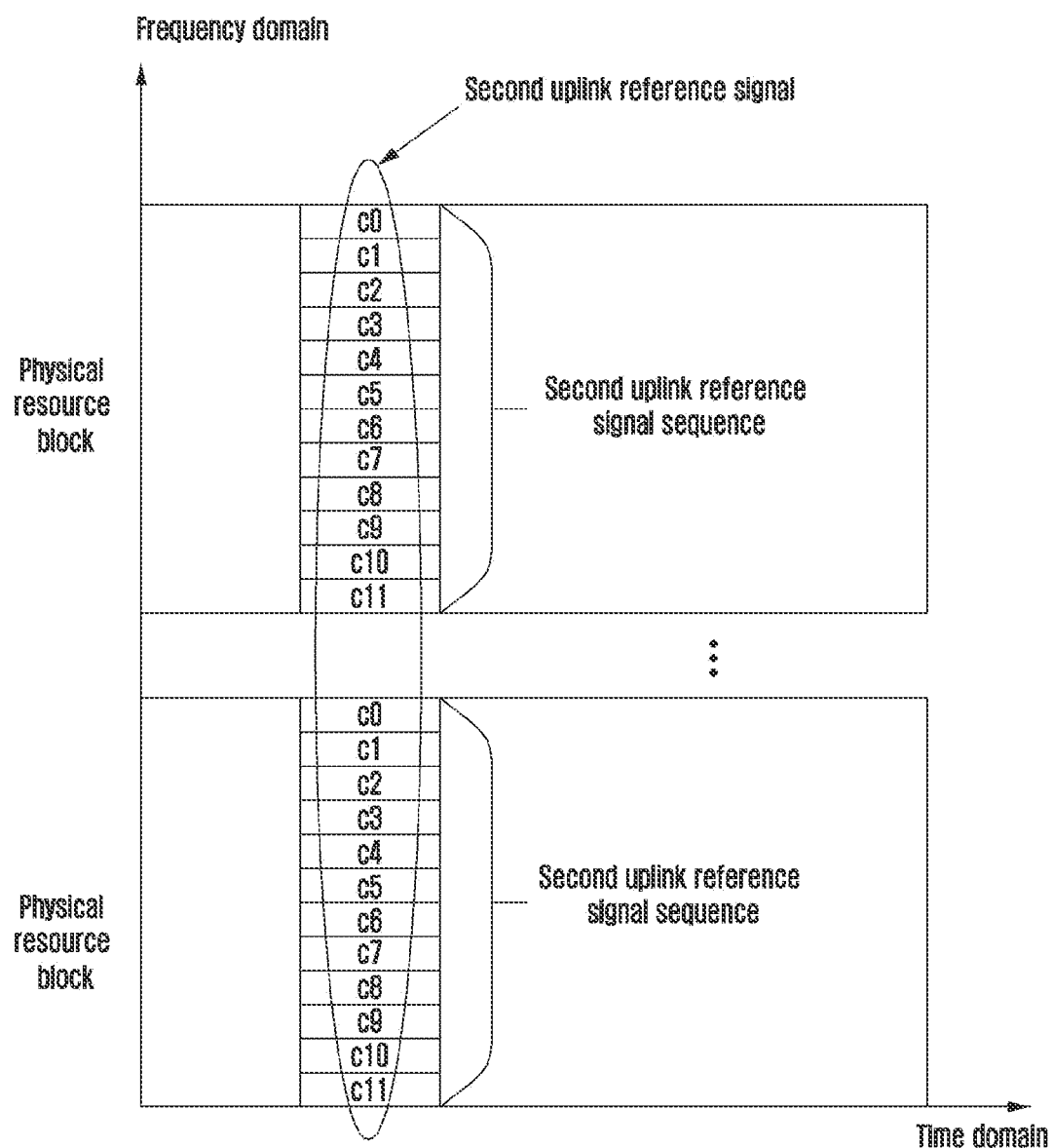
FIG. 22 is a schematic diagram illustrating an example of reference signal sequences for transmission according to an embodiment of the present disclosure.

New uplink reference signals/new configuration parameters for the uplink reference signal may further be defined. For example, in another specific implementation of the method for configuring and transmitting an unidirectional transmission uplink physical signal, the downlink terminal acquires second configuration parameters for the uplink reference signal transmitted by the uplink terminal, which at least comprise one of the following contents: reference signal sequence related configuration information, transmission power, and time domain and frequency domain positions of the reference signal (or uplink physical channel.) In the process, the downlink terminal acquires the second configuration parameters for the uplink reference signal of the uplink terminal as invalid resources for transmission of the downlink physical channel or physical signal. At the same time, the downlink terminal may receive a second uplink reference signal according to a configuration of a dedicated uplink reference signal. Configuration parameters of the second uplink reference signal may be a cell-level configuration, or may be fixedly determined by a protocol. For example, the second uplink reference signal is transmitted by different terminals using fixed transmission power, which may be a cell-level configuration parameter or may be fixedly determined by a protocol. The second uplink reference signal may be a part of the uplink demodulation reference signal and occupy a part or all of the physical resources for the uplink demodulation reference signal. For example, the protocol specifies that all sub-carriers on a second OFDM symbol in the physical resources for the configured uplink demodulation reference signal are used as resources for the second uplink reference signal; or physical resources not used for the uplink demodulation reference signal do not overlap with those for the uplink demodulation reference signal. Specifically, the second uplink reference signal may be transmitted using a short sequence, and the same sequence is repeatedly transmitted on time-frequency resources for the second uplink reference signal, wherein the short sequence may be a sequence which is fixedly determined by a protocol, or a sequence configured using cell-specific signaling. For example, as shown in FIG. 22, assuming that the second uplink reference signal occupies a number of physical resource blocks in the frequency domain, a sequence with a length of 12 may be mapped on each physical resource block, and this mapping process is repeated on different physical resource blocks. In a case where the same time-frequency resources are allocated for a plurality of uplink terminals and downlink terminals, all the uplink terminals may transmit the same short sequence or perform sequence spreading, that is, different uplink terminals use different spreading codes, or different uplink terminals uses different cyclic shifts. Values of the spreading codes or cyclic shifts used by the different uplink terminals may be carried by downlink scheduling authorization information and may be notified to the downlink terminals. The sequence spreading may be performed in the frequency domain or the time domain. For example, assuming that there are two uplink terminals, a sequence with a length of 6 may be used for the frequency domain spreading. Each element of the sequence is spread using the same spreading code with a length of 2, and the sequence after the spreading has a length of 12, which is the same as that of FIG. 22, and is mapped on one OFDM symbol of a single physical resource block. A sequence with a length of 12 is also used for time-domain spreading, and each element in each sequence is spread using the same spreading code with a length of 2, and is mapped on two OFDM symbols of the same sub-carrier respectively. Therefore, the sequence after the spreading has a length of 24, and is mapped on two OFDM symbols of a single physical resource.

In addition, there is another interference in the full-duplex system which is different from that in the half-duplex system. When the base station simultaneously schedules an uplink transmission of one user and a downlink transmission of another user on the same time-frequency resources, the uplink transmission performed by the uplink user may cause interference with the reception performed by the downlink user. Especially when the distance between the scheduled uplink user and downlink user is relatively close, such an inter-user interference is even more severe. In general, the inter-user interference in the full-duplex transmission may be effectively reduced by optimizing the scheduling algorithm of the base station. However, since both the user location and channel information on which the scheduling of the base station is based are limited, the scheduling algorithm is also difficult to ensure that the inter-user interference is reduced below the noise threshold. Therefore, the inter-user interference is a factor needed to be considered in this type of full-duplex transmission. Paradoxically, however, under the design of the existing system, it is difficult for the interfered downlink user to obtain information about the uplink interfering user or perform inter-user interference measurement. Thus, the downlink user receiver cannot perform additional optimization for the inter-user interference. In order to ensure the performance of the receiver, it is required that physical resources for the downlink reception are interfered by the inter-user interference from the same interference source. For example, it should be avoided that a plurality of users are scheduled on the same physical resources for the same downlink user. Otherwise, different symbols in the downlink reception process would be subjected to different interference strengths, resulting in bit error propagation.

Figure 23:
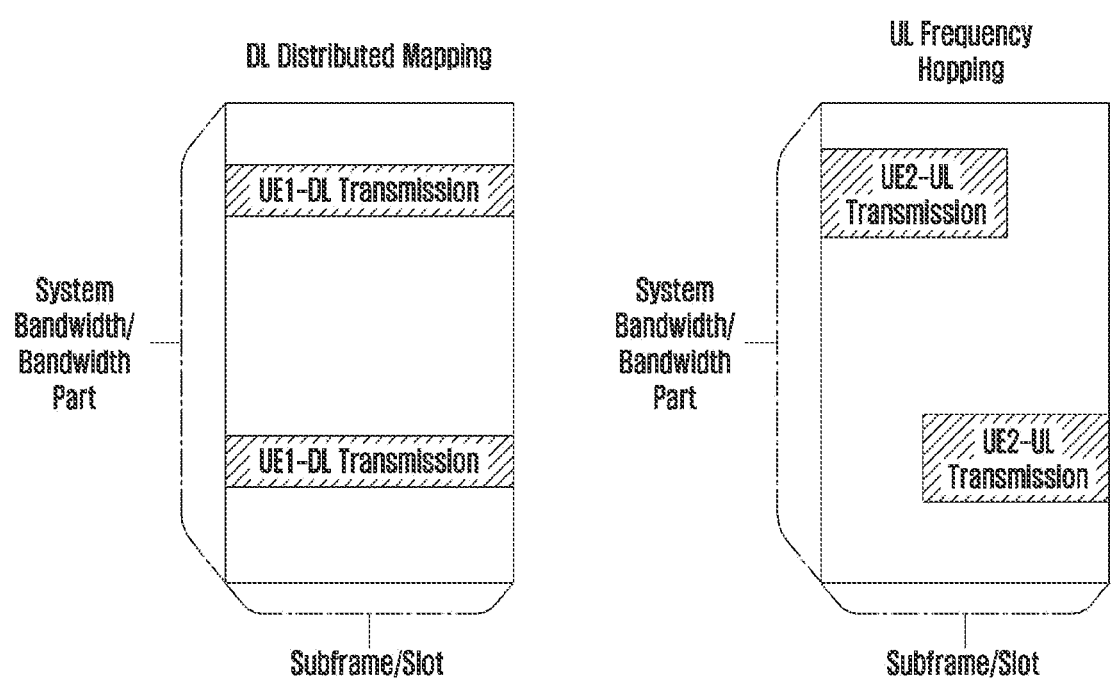
FIG. 23 schematically shows a physical resource allocation diagram of downlink distributed mapping and uplink frequency hopping.

However, according to the design of the existing system, it is difficult to ensure that only the inter-user interference from the same uplink user exists on the physical resources of the downlink users in the case of full-duplex resource allocation. First, in the actual systems, the waveforms of the uplink and the downlink physical channels may be different, and different waveforms are applicable to different resource allocation types. For example, the orthogonal frequency division multiplexing waveforms for which a transform precoder is enabled needs to use a type of resource allocation that is continuous in the frequency domain; while the orthogonal frequency division multiplexing waveforms for which a transform precoder is not enabled needs to use a type of resource allocation that is continuous or not continuous in the frequency domain. When the uplink user and the downlink user use the resource allocation that is continuous in the frequency domain and the resource allocation that is not continuous in the frequency domain, it cannot be guaranteed to schedule only a pair of uplink user and downlink user on the same time-frequency resources. Secondly, the waveforms of the uplink and downlink physical channels are different, so that the methods for obtaining frequency domain diversity in the uplink and downlink are different. For example, in the existing system, the downlink physical channel uses orthogonal frequency division multiplexing (OFDM) waveforms and does not support the transform precoder, thus the method of obtaining the frequency domain diversity is distributed mapping or interleaved mapping, that is, data of one transport block is mapped onto discontinuous physical resource blocks, and indexes of the physical resource blocks may be obtained according to a pattern of the distributed mapping or an interleaving mapping formula. In the existing system, the uplink physical channel may use the OFDM waveforms for which the transform precoder is enabled or not enabled, and the method of obtaining the frequency domain diversity is frequency hopping, that is, the physical resources occupied by the uplink transmission on the same OFDM symbols are continuous in the frequency domain, and the frequency domain resource positions occupied by different OFDM symbols of the same uplink transmission are different. FIG. 23 shows a schematic diagram of physical resource allocation for downlink distributed mapping and uplink frequency hopping. It can be seen that in the current system, using different frequency domain diversity techniques in the uplink and downlink transmissions will cause the full duplex base station unable to guarantee that the completely identical time-frequency resources are multiplexed in the scheduled uplink and downlink transmissions.

Hereinafter, a flowchart of a transmission method performed at a UE according to an exemplary embodiment of the present disclosure will be described in detail with reference to FIG. 24.

FIG. 24 schematically shows a flowchart of a transmission method 2400 performed at a UE according to an exemplary embodiment of the present disclosure.

As shown in FIG. 24, the method 2400 includes steps 2401 and 2403.

In step 2401, the UE obtains at least one of the following transmission resource configurations:
  a transmission resource configuration for uplink and/or downlink transmission waveform,
  a transmission resource configuration for uplink and/or downlink resource allocation type,
  a transmission resource configuration for uplink and/or downlink transmission and mapping method, wherein the transmission and mapping methods comprise at least one of three combinations of: distributed mapping and centralized mapping, interleaved mapping and non-interleaved mapping, frequency hopping transmission and non-frequency hopping transmission,
  a configuration for invalid physical resources in allocated physical resources for uplink and/or downlink transmission, on which no transmission is to be performed.

In step 2403, the UE performs transmission according to the obtained at least one of the transmission resource configuration for uplink and/or downlink transmission waveform, the transmission resource configuration for uplink and/or downlink resource allocation type, the transmission resource configuration for uplink and/or downlink transmission and mapping method, or the configuration for invalid physical resources in allocated physical resources for uplink and/or downlink transmission, on which no transmission is to be performed.

It may be guaranteed by obtaining the at least one of the transmission resource configuration for uplink and/or downlink transmission waveform, the transmission resource configuration for uplink and/or downlink resource allocation type, the transmission resource configuration for uplink and/or downlink transmission and mapping method that the uplink and the downlink transmission scheduled in the full duplex communication multiplex the same time-frequency resources. In addition, the invalid physical resources in the allocated resources for the uplink and/or downlink transmission on which no transmission is to be performed are configured so that the physical resources used by the physical uplink/physical downlink shared channel and the physical resources used by the physical downlink/physical uplink control channel(s) do not overlap, thereby guaranteeing the transmission performance of the physical control channel.

Hereinafter, the schemes of how the UE obtains the transmission resource configurations for uplink and/or downlink transmission waveform, uplink and/or downlink resource allocation type, uplink and/or downlink frequency hopping and mapping methods will be described in detail respectively.

Obtaining Transmission Resource Configuration for Uplink and/or Downlink Transmission Waveform It should be understood that "uplink and/or downlink transmission waveform" herein specifically refer to "uplink and/or downlink physical channel transmission waveforms", wherein the uplink/downlink physical channel includes, but is not limited to, a physical uplink/physical downlink shared channel, a physical uplink/physical downlink control channel; and the physical channel transmission waveform include, but are not limited to, an OFDM for which transform domain precoding is enabled, an OFDM for which transform domain precoding is not enabled.

In an exemplary embodiment, the UE may obtain the transmission resource configuration for the uplink and/or downlink transmission waveform via higher layer signaling.

Specifically, in an exemplary embodiment, the UE may obtain a transmission waveform in one transmission direction, obtain indication information on a relationship between uplink and downlink transmission waveforms via UE-specific higher layer signaling and/or UE group-specific higher layer signaling, and determine a transmission waveform for the other transmission direction according to the relationship between the uplink and downlink transmission waveforms and the obtained transmission waveform in one transmission direction. It should be understood that the expression "UE-specific higher layer signaling and/or UE group-specific higher layer signaling" used herein may refer to UE-specific higher layer signaling or UE group-specific higher layer signaling in practical applications.

Taking the downlink physical channel as an example, in an exemplary implementation, 1 bit in the configuration parameter of the downlink physical channel is used to indicate whether the downlink physical channel waveform is the same as the uplink physical channel waveform. Assuming that the uplink physical channel waveform obtained by the UE is OFDM and the transform domain precoding is enabled, and the UE obtains an indication indicating that the downlink physical channel waveform is the same as the uplink physical channel waveform, the downlink physical channel waveform received by the UE is OFDM for which the transform domain precoding is enabled; otherwise, if the UE obtains an indication indicating that the downlink physical channel waveform is different from the uplink physical channel waveform, the downlink physical channel waveform received by the UE is not OFDM for which the transform domain precoding is enabled, e.g., may be OFDM for which the transform domain precoding is not enabled, or other waveforms.

In an exemplary embodiment, the UE may obtain indication information on a combination of uplink and downlink transmission waveforms (i.e., a joint indication mode) via UE-specific higher layer signaling and/or UE group-specific higher layer signaling, and determine the uplink and/or downlink transmission waveform according to the combination of the uplink and downlink transmission waveforms. In an exemplary implementation, one indication field may be used to indicate a combination of waveforms of the uplink physical channel and the downlink physical channel. Table 2 shows such an instance.

TABLE 2

| Indication Field | Uplink And Downlink Physical Channel Waveforms |
|---|---|
| 00 | Both Uplink And Physical Downlink Shared Channel Waveforms are OFDM for which transform domain precoding is enabled |
| 01 | Both Uplink And Physical Downlink Shared Channel Waveforms are OFDM for which transform domain precoding is not enabled |
| 10 | Physical uplink shared channel Waveform is OFDM for which transform domain precoding is enabled; Physical downlink shared channel Waveform is OFDM for which transform domain precoding is not enabled |
| 11 | Physical uplink shared channel Waveform is OFDM for which transform domain precoding is not enabled; Physical downlink shared channel Waveform is OFDM for which transform domain precoding is enabled |

In an exemplary embodiment, the higher layer signaling (e.g., the UE-specific higher layer signaling, the UE group-specific higher layer signaling, cell-specific higher layer signaling) may indicate the waveforms of the uplink and downlink physical channels implicitly. The UE may obtain indication information having a predefined association with the uplink and/or downlink transmission waveform via the UE-specific higher layer signaling and/or the UE group-specific higher layer signaling, and determine the uplink and/or downlink transmission waveform according to the predefined association with uplink and/or downlink transmission waveform. Specifically, the indication information may be indication information of a full-duplex communication/full-duplex bandwidth part/full-duplex bandwidth, that is, system-level full-duplex indication information. When the indication information is enabled, it means that the full-duplex scheduling is allowed on the system bandwidth/the current bandwidth part/the currently configured bandwidth, that is, the uplink and downlink transmissions of different users or the same user are allowed on the same time-frequency resources. Taking an indication of full-duplex bandwidth part as an example, in an exemplary implementation, if the full-duplex indication of the current bandwidth part obtained by the UE is enabled, the waveforms of both the uplink physical channel and the downlink physical channel transmitted by the UE on the bandwidth part are OFDMs for which the transform domain precoding is not enabled; if the full-duplex indication of the current bandwidth part obtained by the UE is not enabled, the waveforms of the uplink physical channel and the downlink physical channel transmitted by the UE on the bandwidth part are obtained according to the existing half-duplex system configuration. In another exemplary implementation, if the full-duplex indication of the current bandwidth part obtained by the UE is enabled, the downlink physical channel waveform transmitted by the UE on the bandwidth part is the same as the uplink physical channel waveform. In particular, the uplink physical channel configures whether the transform domain precoding is enabled or not according to the higher layer signaling, and the downlink physical channel waveform is obtained according to the uplink physical channel waveform configuration.

In another exemplary embodiment, the UE may obtain the transmission resource configuration for the uplink and/or downlink transmission waveform via physical layer signaling. The physical layer signaling may be downlink control information that carries an uplink scheduling grant and/or a downlink scheduling grant. Then, the UE may determine the corresponding uplink and/or downlink transmission waveform according to the corresponding uplink and/or downlink transmission waveform.

Specifically, in an exemplary embodiment, the UE may obtain an indication of the corresponding uplink and/or downlink transmission waveform from the uplink and/or downlink scheduling grant carried by the physical layer signaling. The indication may be 1 bit explicitly indicating whether the transform domain precoding is enabled (i.e., indicating that the waveform is OFDM for which the transform domain precoding is enabled or OFDM for which the transform domain precoding is not enabled).

In an exemplary embodiment, physical layer signaling may implicitly indicate the waveforms of the uplink and downlink physical channels. In an exemplary implementation, the UE may obtain indication information having a predefined association with corresponding uplink and/or downlink transmission waveform via uplink and/or downlink scheduling grant carried in the physical layer signaling, and determine the corresponding uplink and/or downlink transmission waveform according to the predefined association with the corresponding uplink and/or downlink transmission waveform. For example, 1 bit is used for indicating that there is the full-duplex transmission of the uplink and downlink physical channels on the physical resources scheduled by the scheduling grant, wherein the uplink physical channel and the downlink physical channel transmitted on the same physical resources may be from the same UE, or from different UEs. Specifically, the indication information may be UE level full-duplex indication information. In an example, when the full duplex indication information obtained by the UE is enabled, the waveforms of the scheduled uplink and/or downlink physical channel may be OFDM for which the transform domain precoding is not enabled; otherwise, the waveform of the scheduled uplink and/or downlink physical channel is obtained according to the half-duplex system configuration.

Obtaining Transmission Resource Configuration for Uplink and/or Downlink Resource Allocation Type It should be understood that the "uplink and/or downlink resource allocation type" herein refers to "uplink and/or downlink physical channel resource allocation type", including, but not limited to, the uplink resource allocation type and the downlink resource allocation type in the existing LTE system.

In an exemplary embodiment, the UE may obtain the uplink and/or downlink resource allocation type according to one indication field in the scheduling grant carried by the physical layer signaling (i.e., an explicit indication). In an example, the full-duplex system may support one physical downlink control channel(s) carrying scheduling grant, and schedule the uplink and downlink physical channel transmissions of the same UE simultaneously. When the UE receives one piece of scheduling grant to schedule the uplink and downlink physical channel transmissions simultaneously, the UE may obtain the resource allocation types of the uplink physical channel and the downlink physical channel by reading the indication field in the scheduling grant. The indication field in the scheduling grant may be one resource allocation type indicated by one indication field, wherein the resource allocation type is applicable to both the resource allocations of the uplink physical channel and the downlink physical channel scheduled for the UE; or the indication field in the scheduling grant may be an indication field jointly indicating the resource allocation type of the uplink physical channel and the resource allocation type of the downlink physical channel scheduled for the user. Table 3 shows such an instance.

TABLE 3

| Indication Field | Uplink Physical Channel Resource Allocation Type And Downlink Physical Channel Resource Allocation Type |
|---|---|
| 00 | Uplink Physical Channel Resource Allocation Type is Uplink Physical Channel Resource Allocation Type 0; Downlink Physical Channel Resource Allocation Type is Downlink Physical Channel Resource Allocation Type 0 |
| 01 | Uplink Physical Channel Resource Allocation Type is Uplink Physical Channel Resource Allocation Type 0; Downlink Physical Channel Resource Allocation Type is Downlink Physical Channel Resource Allocation Type 1 |
| 10 | Uplink Physical Channel Resource Allocation Type is Uplink Physical Channel Resource Allocation Type 1; Downlink Physical Channel Resource Allocation Type is Downlink Physical Channel Resource Allocation Type 0 |
| 11 | Uplink Physical Channel Resource Allocation Type is Uplink Physical Channel Resource Allocation Type 1; Downlink Physical Channel Resource Allocation Type is Downlink Physical Channel Resource Allocation Type 1 |

In another exemplary embodiment, the UE may obtain the uplink and/or downlink resource allocation type implicitly, that is, determine the uplink and/or downlink resource allocation type according to the obtained configuration for the uplink and/or downlink transmission waveform, and a predefined association between the uplink and downlink transmission waveforms and the uplink and/or downlink resource allocation type. In an example, the UE may obtain the resource allocation type of the uplink and downlink physical channels according to the waveform combination of the uplink and downlink physical channels. For example, the UE obtains the configuration information of the uplink and downlink physical channel waveforms on the bandwidth or bandwidth part allowed for the full duplex transmission; if at least one of the obtained uplink and downlink physical channel waveforms is OFDM for which the transform domain precoding is enabled, the resource allocation types for the UE performing both the uplink and downlink physical channel transmissions on the bandwidth or bandwidth part allowed for the full duplex transmission are the resource allocation type of which the resource allocation is continuous in the frequency domain, e.g., Uplink/Downlink Resource Allocation Type 1; if the waveforms of both the obtained uplink and downlink physical channels are OFDM for which the transform domain precoding is not enabled, the resource allocation types for the UE performing the uplink and downlink physical channel transmissions on the bandwidth or bandwidth part allowed for the duplex transmission should be the same, which may be either the resource allocation type of which the resource allocation is continuous in the frequency domain, or the resource allocation type of which the resource allocation is not continuous in the frequency domain. This may be defined by the system or indicated by the high layer signaling and/or the physical layer signaling.

Here, the configuration for the uplink and/or downlink transmission waveform may be obtained by at least one of:

obtaining indication information on a relationship between uplink and downlink transmission waveforms via UE-specific higher layer signaling and/or UE group-specific higher layer signaling, and determining a transmission waveform for the other transmission direction according to the relationship between the uplink and downlink transmission waveforms and the obtained transmission waveform in one transmission direction;

obtaining indication information on a combination of uplink and downlink transmission waveforms via UE-specific higher layer signaling and/or UE group-specific higher layer signaling, and determining the uplink and/or downlink transmission waveform according to the combination of the uplink and downlink transmission waveforms;

obtaining indication information having a predefined association with the uplink and/or downlink transmission waveform via UE-specific higher layer signaling and/or UE group-specific higher layer signaling, and determining the uplink and/or downlink transmission waveform according to the predefined association with uplink and/or downlink transmission waveform;

obtaining indication information of corresponding uplink and/or downlink transmission waveform via uplink and/or downlink scheduling grant carried in physical layer signaling, and determining the corresponding uplink and/or downlink transmission waveform according to the corresponding uplink and/or downlink transmission waveform; or obtaining indication information having a predefined association with corresponding uplink and/or downlink transmission waveform via uplink and/or downlink scheduling grant carried in physical layer signaling, and determining the corresponding uplink and/or downlink transmission waveform according to the predefined association with the corresponding uplink and/or downlink transmission waveform.

Obtaining Transmission Resource Configuration for Uplink and/or Downlink Transmission and Mapping Method It should be understood that "uplink and/or downlink transmission and mapping method" herein specifically refers to "uplink and/or downlink physical channel transmission and mapping method", including, but not limited to, at least one of the following three combinations: distributed mapping and centralized mapping, interleaved mapping and non-interleaved mapping, frequency hopping transmission and non-frequency hopping transmission.

In an exemplary embodiment, the UE may obtain an indication of the uplink and/or downlink transmission and mapping method (i.e., an explicit indication) via the higher layer signaling and/or the physical layer signaling (e.g., the downlink control information). In an example, the UE obtains an indication about the transmission and mapping method in the full-duplex transmission configuration parameter, which may be a 1-bit indication field (distributed mapping, frequency hopping transmission), and the full-duplex transmission configuration parameter may be a high-level configuration parameter for a bandwidth part allowed for the full-duplex transmission, or a configured bandwidth allowed for the full-duplex transmission, or a system bandwidth allowed for the full-duplex transmission. Further, the UE obtains, from the scheduling grant, whether to enable the indicated transmission and mapping method. For example, if the transmission and mapping method of the uplink physical channel and the downlink physical channel transmitted on the full duplex bandwidth part that is firstly obtained by the UE according to the full duplex configuration parameter is the frequency hopping transmission, the UE then obtains the indication of whether to enable the frequency hopping transmission or not according to the downlink control information, so as to perform the uplink and/or downlink physical channel transmission.

In another exemplary embodiment, the UE may obtain the configuration for the uplink and/or downlink transmission and mapping method implicitly. In an example, the UE obtains the transmission and mapping method of the uplink physical channel and/or downlink physical channel according to the waveform configurations of the uplink physical channel and the downlink physical channel, wherein there is an association between the waveforms of the uplink physical channel and the downlink physical channel and the transmission and mapping methods of the uplink physical channel and the downlink physical channel. Specifically, when the association between the waveforms and the transmission and the mapping methods is a one-to-one association or a one-to-many association, it is not necessary to indicate the transmission and mapping methods of the uplink and downlink physical channels by using an indication bit. In a specific example, when the uplink physical channel waveform obtained by the UE is OFDM for which the transform domain precoding is enabled, the transmission and mapping methods of both the uplink physical channel and the downlink physical channel are frequency hopping transmissions and use the same frequency hopping pattern, and the UE further obtains an indication of whether the frequency hopping transmission is enabled according to the downlink control information. When the waveforms of both the uplink physical channel and the downlink physical channel obtained by the UE are the OFDM for which the transform domain precoding is not enabled, the transmission and mapping methods of the uplink physical channel and the downlink physical channel are distributed mapping (or interleaved mapping) and use the same mapping rule, and the UE further obtains an indication of whether the distributed mapping (or interleaved mapping) is enabled according to the downlink control information. When the distributed mapping (or interleaved mapping) is not enabled, both the uplink physical channel and the downlink physical channel use a centralized mapping (or non-interleaved mapping).

Here, the configuration for the uplink and/or downlink transmission waveform may be obtained by at least one of:

obtaining indication information on a relationship between uplink and downlink transmission waveforms via UE-specific higher layer signaling and/or UE group-specific higher layer signaling, and determining a transmission waveform for the other transmission direction according to the relationship between the uplink and downlink transmission waveforms and the obtained transmission waveform in one transmission direction;

obtaining indication information on a combination of uplink and downlink transmission waveforms via UE-specific higher layer signaling and/or UE group-specific higher layer signaling, and determining the uplink and/or downlink transmission waveform according to the combination of the uplink and downlink transmission waveforms;

obtaining indication information having a predefined association with the uplink and/or downlink transmission waveform via UE-specific higher layer signaling and/or UE group-specific higher layer signaling, and determining the uplink and/or downlink transmission waveform according to the predefined association with uplink and/or downlink transmission waveform;

obtaining indication information of corresponding uplink and/or downlink transmission waveform via uplink and/or downlink scheduling grant carried in physical layer signaling, and determining the corresponding uplink and/or downlink transmission waveform according to the corresponding uplink and/or downlink transmission waveform; or obtaining indication information having a predefined association with corresponding uplink and/or downlink transmission waveform via uplink and/or downlink scheduling grant carried in physical layer signaling, and determining the corresponding uplink and/or downlink transmission waveform according to the predefined association with the corresponding uplink and/or downlink transmission waveform.

The foregoing describes in detail how the UE obtains the transmission resource configuration for the uplink and/or downlink transmission waveform, the uplink and/or downlink resource allocation type, the uplink and/or downlink frequency hopping and mapping methods, respectively. In an actual system, in order to perform the uplink and/or downlink transmission, the UE needs to obtain at least one of the transmission resource configurations for the uplink and/or downlink transmission waveform, the uplink and/or downlink resource allocation type, and the uplink and/or downlink frequency hopping and mapping method. The different methods of obtaining the indication information as described above may be used in combination with each other.

In the existing (half-duplex) system, the physical resources of the physical downlink shared channel may overlap with the physical resources of the physical downlink control channel. In this case, since the UE may obtain the physical resources of the physical downlink shared channel and the physical downlink control channel(s) simultaneously, the system only needs to specify the priority of the physical resources of the physical downlink shared channel and the physical resources of the physical downlink control channel(s) received by the UE when there is a conflict, and a normal downlink reception may be guaranteed. Similarly, in the existing (half-duplex) system, the physical resources of the physical uplink shared channel may overlap with the physical resources of the physical uplink control channel(s), and the processing method thereof is similar. For the half-duplex system, there is no scenario in which the uplink transmission and the downlink transmission are multiplexed on the same block of time-frequency resources as in the full-duplex system.

The full-duplex system means that the uplink and downlink transmissions of the same or different UEs are scheduled on the same time-frequency resources, and there may be a case where the physical resources allocated to the physical downlink control channel(s) conflict with the physical resources allocated to the physical uplink shared channel; or the physical resources allocated to the physical uplink control channel(s) conflict with the physical resources allocated to the physical downlink shared channel. In order to ensure the reliability of the uplink and physical downlink control channel(s) transmissions, even in a full-duplex system, the uplink and physical downlink control channels should ensure a uni-directional half-duplex transmission mode. In this case, the avoidance of the physical control channel(s) needs to define a new physical process.

For this purpose, according to another exemplary embodiment of the present disclosure, the UE may obtain, in step 2401, a configuration for invalid physical resources in allocated physical resources for uplink and/or downlink transmission, on which no transmission is to be performed. In this case, the UE obtains the invalid physical resources in the allocated physical resources for the uplink and/or downlink transmission, on which no transmission is to be performed, so that the physical resources used by the physical uplink/physical downlink shared channel do not overlap with the physical resources used by the physical downlink/physical uplink control channel(s), thereby ensuring the transmission performance of the physical control channel(s).

Hereinafter, an embodiment in which the UE obtains, in step 2401, the invalid physical resources in the allocated physical resources for the uplink and/or downlink transmission, on which no transmission is to be performed, and performs transmission in step 2403 will be described in detail with reference to FIG. 25. For convenience of comparison, the steps in FIG. 25 corresponding to those in FIG. 24 are denoted by reference numerals similar to those used in FIG. 24.

Figure 25:
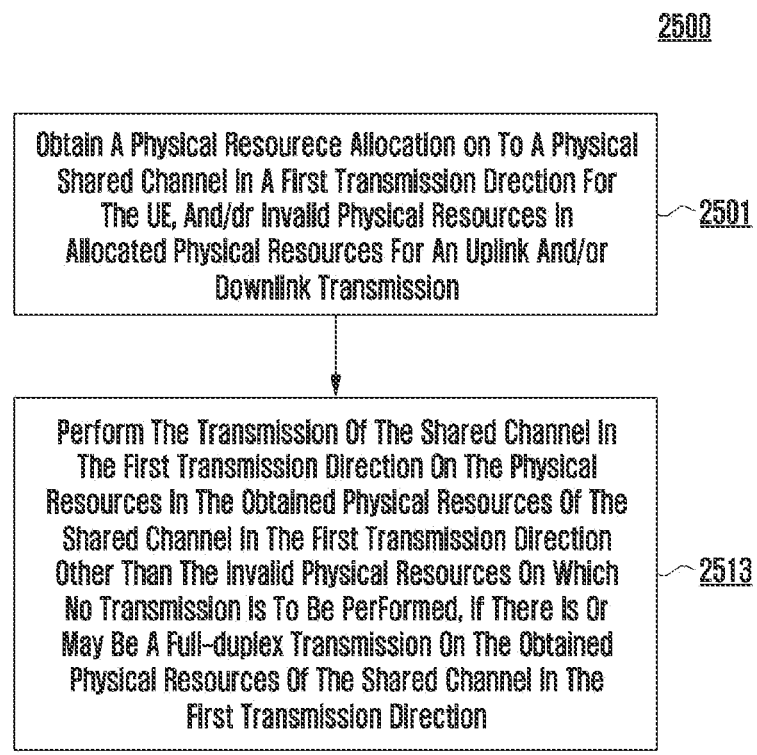
FIG. 25 schematically shows a flowchart of a transmission method performed at a UE according to another exemplary embodiment of the present disclosure.

FIG. 25 schematically shows a flowchart of a transmission method 2500 performed at the UE according to this exemplary embodiment.

As shown in FIG. 25, the method 2500 includes steps 2501 and 2503.

In step 2501, the UE obtains a physical resource configuration of a physical shared channel configured in a first transmission direction configured to the UE, and a configuration of invalid physical resources in the allocated physical resources for the uplink and/or downlink transmission, on which no transmission is to be performed.

The invalid physical resources on which no transmission is to be performed may include at least one of:

physical resources (hereinafter referred to as a "first physical resources"), which are physical resources allocated to a physical uplink shared channel configured by the base station for the UE that overlap with UE-specific or UE group-specific or cell-specific physical resources of physical downlink control channel(s);

invalid physical resources (hereinafter referred to as "second physical resources") in allocated physical resources of a physical downlink shared channel configured by the base station for the UE, on which no downlink transmission is to be performed.

In step 2503, if the UE determines that there is or may be a full-duplex transmission on the physical resources of the physical shared channel in the first transmission direction, the transmission of the physical shared channel in the first transmission direction is performed on the physical resources in the obtained physical resources of the physical shared channel in the first transmission direction other than the invalid physical resources on which no transmission is to be performed.

In an exemplary embodiment, it is determined that there is or may be a full-duplex transmission on the obtained physical resources of the physical shared channel in the first transmission direction according to at least one of following criteria:

an obtained transmission subframe of the physical shared channel in the first transmission direction being a subframe in a second transmission direction, wherein the first transmission direction is different from the second transmission direction; for example, the first transmission direction is uplink, and the second transmission direction is downlink; or the first transmission direction is downlink, and the second transmission direction is uplink;

an obtained transmission bandwidth of the physical shared channel in the first transmission direction being a bandwidth in the second transmission direction;

obtained frequency domain resources of the physical shared channel in the first transmission direction being located in a bandwidth part/configured bandwidth/system bandwidth in which the full duplex transmission is enabled;

obtained time domain resources of the physical shared channel in the first transmission direction being located in a subframe/OFDM symbol/time slot in which a full duplex transmission is enabled; or obtained scheduling grant indicating a full duplex transmission.

In an exemplary embodiment where the first transmission direction is uplink and the second transmission direction is downlink, in step 2501, the UE further obtains the physical resource configuration of the physical downlink control channel(s) for the UE, and obtains the configuration of invalid physical resources on which no transmission is to be performed by determining the first physical resources as the part of physical resources of the physical uplink shared channel that overlap with the physical resources of the physical downlink control channel(s), according to the obtained physical resource allocation to the physical uplink shared channel and the physical resource configuration for the physical downlink control channel.

In step 2503, if the UE determines that there is or may be a full-duplex transmission on the obtained physical resources of the physical uplink shared channel, the transmission of the physical uplink shared channel may be performed on the physical resources in the obtained physical resources of the physical uplink shared channel other than the overlapping first physical resources by at least one of:

the first physical resources puncturing into the transmission of the physical uplink shared channel;

rate matching of the physical uplink shared channel around physical resource elements (REs) of the first physical resources; or postponing the transmission of the physical uplink shared channel until after the end of first physical resources.

Hereinafter, a method of processing the physical resource conflict between the physical uplink shared channel and the physical downlink control channel(s) will be described with reference to specific examples.

The UE obtains the physical resource configuration of the physical downlink control channel(s) and the physical uplink shared channel in step 2501, and determines whether there is or may be a full-duplex transmission on the obtained physical resources of the physical uplink shared channel. As described above, the basis on which the UE determines that there is or may be a full-duplex transmission on the obtained physical resources of the physical uplink shared channel may consist in that the transmission subframe of the physical uplink shared channel obtained by the UE is a downlink subframe; or the transmission bandwidth of the physical uplink shared channel obtained by the UE is a downlink bandwidth; or the frequency domain resources of the physical uplink shared channel obtained by the UE are located in the bandwidth part/configured bandwidth/system bandwidth in which the full duplex transmission is enabled; or the time domain resources of the physical uplink shared channel obtained by the UE are located in the subframe/OFDM symbol/time slot in which the full duplex transmission is enabled. The physical resources of the physical downlink control channel(s) may be the physical resources of the physical downlink control channel(s) configured at the system and obtained by the UE. The meaning of the physical resources of the physical downlink control channel(s) configured at the system is a collection of physical resources configured by the system for the transmission of the physical downlink control channels of all the users in the connected state in the cell. For example, the UE indicates to obtain the physical resources of the physical downlink control channel(s) via a physical control format indication channel, or the UE obtains the physical resource configuration of the physical control channel(s) core set via the higher layer signaling.

Figure 26A:
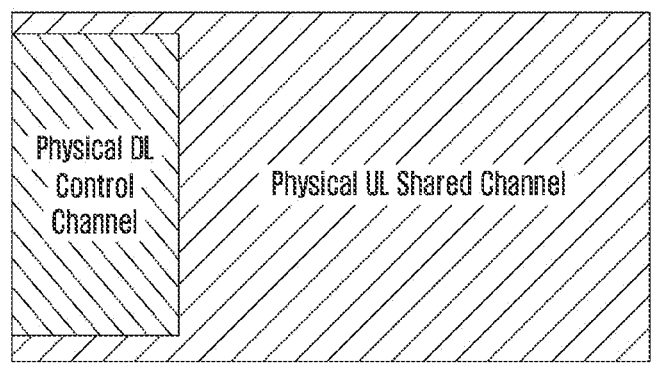
FIG. 26a schematically shows a diagram of processing a physical uplink shared channel transmission using the method illustrated in FIG. 25 according to an exemplary embodiment of the present disclosure.
Figure 26B:
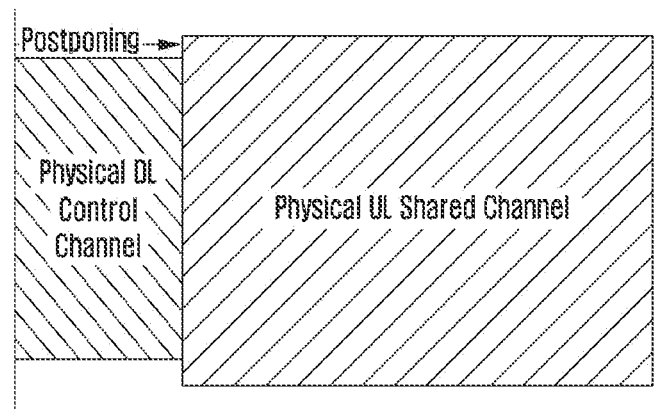
FIG. 26b schematically shows a diagram of processing a physical uplink shared channel transmission using the method illustrated in FIG. 25 according to another exemplary embodiment of the present disclosure.

If the UE determines that there is or may be a full-duplex transmission on the obtained physical resources of the physical uplink shared channel, it is further determined whether the allocated physical uplink shared channel physical resources overlap or partially overlap with the physical resources of the physical downlink control channel. The overlapping of the physical resources means that there is at least one same physical resource element between the physical resources allocated to the physical uplink shared channel and the physical resources of the physical downlink control channel. If the physical resources of the physical uplink shared channel overlap with the physical resources of the physical downlink control channel(s), the UE processes the transmission of the physical uplink shared channel by a processing method including at least one of: the physical resources used by the physical downlink control channel(s) puncturing into the physical uplink shared channel; or rate matching of the physical uplink shared channel around the physical resource elements used by the physical downlink control channel; or postponing the transmission/mapping of the physical uplink shared channel until after the overlapping physical resources. The postponing the transmission/mapping may be: postponing until an OFDM symbol next to the OFDM symbol used by the physical downlink control channel(s) to continue the transmission of the physical uplink shared channel, or may be postponing until a subframe/slot next to the last transmission subframe/slot in the physical downlink control channel(s) period at the system side. The schematic diagram of the effect of the previous two processing methods is shown in FIG. 26a, and the schematic diagram of the effect of the third processing method is shown in FIG. 26b. If the physical resources of the physical uplink shared channel do not overlap with the physical resources of the physical downlink control channel(s), the UE transmits the physical uplink shared channel on the allocated physical resources of the physical uplink shared channel.

In an exemplary embodiment in which the first transmission direction is downlink and the second transmission direction is uplink, the method of solving the physical resource conflict is different from that in the foregoing exemplary embodiment in which the first transmission direction is uplink and the second transmission direction is downlink. That is because, the physical resources of the physical downlink control channel(s) at the system side are cell-level resource configuration, and all the UEs that access the network can obtain the physical resources of the physical downlink control channel(s) at the system side; but in the full-duplex system, what conflicts with the physical resources of the physical downlink shared channel of one UE is always the physical uplink control channel(s) of another UE, and the resource configuration of the physical uplink control channel(s) is user-level. The existing system design does not support one UE to obtain the physical resources of the physical uplink control channel(s) of another UE. Therefore, for the problem that the physical resources of the physical downlink shared channel conflict with those of the physical uplink control channel(s), one method is to design a mechanism for the UE to obtain the physical resources of the physical uplink control channel(s) of other UEs; and another method is to ensure, from the mechanism of resource allocation, that the physical resources used for the physical uplink control channel(s) and the physical resources used for the physical downlink shared channel do not overlap with each other.

Therefore, in the exemplary embodiment, the UE obtains, in step 2501, a configuration of the second physical resources in the allocated physical resources of the physical downlink shared channel configured by the base station for the UE, on which no downlink transmission is to be performed.

In step 2503, if the UE determines that there is or may be a full-duplex transmission on the obtained physical resources of the physical downlink shared channel, the reception of the physical downlink shared channel is performed on the physical resources in the obtained physical resources of the physical downlink shared channel other than the second physical resources is performed by at least one of:

the second physical resources puncturing into the reception of the physical downlink shared channel;

rate matching of the physical downlink shared channel around physical resource elements of the second physical resources; or postponing the transmission of the physical downlink shared channel until after the end of the second physical resources.

In an exemplary embodiment, said obtaining the configuration of the second physical resources includes at least one of:

obtaining the physical resource configuration configured for physical uplink control channel(s) of the UE; and if obtained physical resources of the physical uplink control channel(s) overlap with the obtained physical resources of the physical downlink shared channel, using the overlapping physical resources as the second physical resources; and obtaining a location of the second physical resources in the physical resources of the physical downlink shared channel, according to the scheduling grant of the physical downlink shared channel.

Hereinafter, a method of processing the physical resource conflict between the physical downlink shared channel and the physical uplink control channel(s) will be described with reference to specific examples.

The UE obtains the physical resource configuration of the physical downlink shared channel in step 2501, and determines whether there is or may be a full-duplex transmission on the obtained physical resources of the physical downlink shared channel. Specifically, the basis on which the UE determines that there is or may be a full-duplex transmission on the obtained physical resources of the physical downlink shared channel may consist in that the transmission subframe of the physical downlink shared channel obtained by the UE is an uplink subframe; or the transmission bandwidth of the physical downlink shared channel obtained by the UE is an uplink bandwidth; or the frequency domain resources of the physical downlink shared channel obtained by the UE are located in the bandwidth part/configured bandwidth/system bandwidth in which the full duplex transmission is enabled; or the time domain resources of the physical downlink shared channel obtained by the UE are located in the subframe/OFDM symbol/time slot in which the full duplex transmission is enabled.

The UE also obtains, in step 2501, the location of the second physical resources in the allocated physical resources of the physical downlink shared channel, on which no downlink transmission is to be performed. Specifically, the second physical resources are invalid physical resources in the second physical resources configured by the UE within the physical resources of the physical downlink shared channel, on which no receptions of the downlink physical signal and the downlink physical channel are to be performed.

An implementation of the UE obtaining the location of the second physical resources includes: the UE obtaining its own physical uplink control channel(s) physical resources, and when its own physical uplink control channel(s) physical resources overlap or partially overlap with its own physical downlink shared channel physical resources, the UE using the physical resources, in its own physical uplink control channel(s) physical resources, that overlap with the physical downlink shared channel physical resources as the second physical resources. Specifically, the method of the UE obtaining its own physical uplink control channel(s) physical resources may be the same as the existing process, that is, obtaining its own physical uplink control channel(s) physical resources via the higher layer signaling and/or from the downlink control information. More specifically, the UE may obtain the physical downlink shared channel physical resources and the second physical resources in the physical downlink shared channel physical resources respectively according to different downlink control signaling. For example, when the physical uplink control channel(s), as the second physical resources of the physical downlink shared channel, is physical uplink control channel(s) carrying ACK/NACK of another physical downlink shared channel, the downlink control signaling based on which the UE obtains the second physical resources of some physical downlink control channel(s)(i.e., the physical uplink control channel(s) physical resources) is different from the downlink control signaling based on which the physical downlink shared channel is scheduled.

Another implementation of the UE obtaining the location of the second physical resources includes: the UE obtaining the location of the second physical resources in the physical downlink shared channel physical resources according to the scheduling grant of the physical downlink shared channel. The content indicating the location of the second physical resources that is included in the scheduling grant includes at least one of: slot/subframe/mini-subframe occupied by the second physical resources, a time domain symbol location occupied by the second physical resources, a physical resource block location occupied by the second physical resources, or a subcarrier location occupied by the second physical resources. Further, the method for performing the location indication of the second physical resources by using the scheduling grant of the physical downlink shared channel may include: notifying a relative location with reference to a start or end location of physical resources in time domain and/or frequency domain of the physical downlink shared channel. The method of indicating the relative location is illustrated by taking indicating the start location of the second physical resources in the time domain as an example. Assuming that the start location in the time domain of the physical resources of the physical downlink shared channel obtained by the UE is Symbol #3 of Subframe #4, and the location of the second physical resources of the physical downlink shared channel in the time domain obtained by the UE is the fifth symbol from the start location of the physical resources of the physical downlink shared channel in the time domain, then the location of the second physical resources in the time domain actually obtained by the UE is Symbol #8 of Subframe #4. Specifically, the second physical resources may be physical uplink control channel(s) resources of the UE, or may be physical uplink control channel(s) resources of other UEs.

Figure 27A:
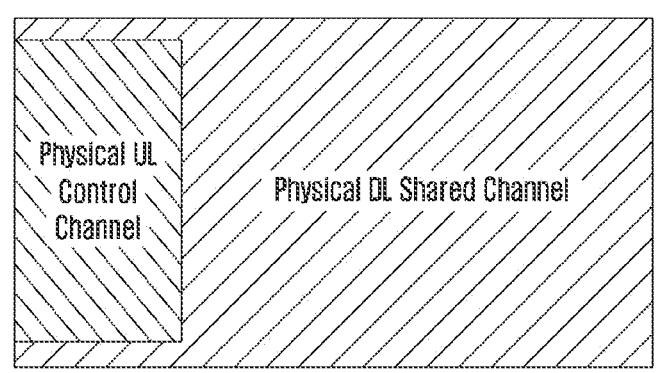
FIG. 27a schematically shows a diagram of processing a physical downlink shared channel transmission using the method illustrated in FIG. 25 according to an exemplary embodiment of the present disclosure.
Figure 27B:
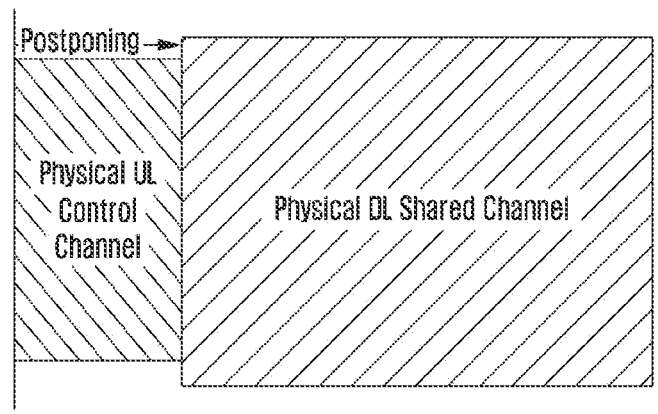
FIG. 27b schematically shows a diagram of processing a physical downlink shared channel transmission using the method illustrated in FIG. 25 according to another exemplary embodiment of the present disclosure.

The UE may determine the physical resources actually transmitted by the physical downlink shared channel according to the obtained configuration of the second physical resources of the physical downlink shared channel. If there is silence resource in the physical downlink shared channel physical resources, the UE processes the transmission of the physical downlink shared channel by a processing method including at least one of: the second physical resources puncturing into the reception of the physical downlink shared channel; rate matching of the physical downlink shared channel around physical resource elements of the second physical resources; or postponing the transmission of the physical downlink shared channel until after the end of the second physical resources. The postponing the reception/mapping may be: postponing until a symbol next to the last OFDM symbol of the second physical resources to continue the reception of the physical downlink shared channel. The schematic diagram of the effect of the previous two processing methods is shown in FIG. 27a, and the schematic diagram of the effect of the third processing method is shown in FIG. 27b. If there is no second physical resource in the physical resources of the physical downlink shared channel, the UE receives the physical downlink shared channel on the allocated physical resources of the physical downlink shared channel.

Figure 28:
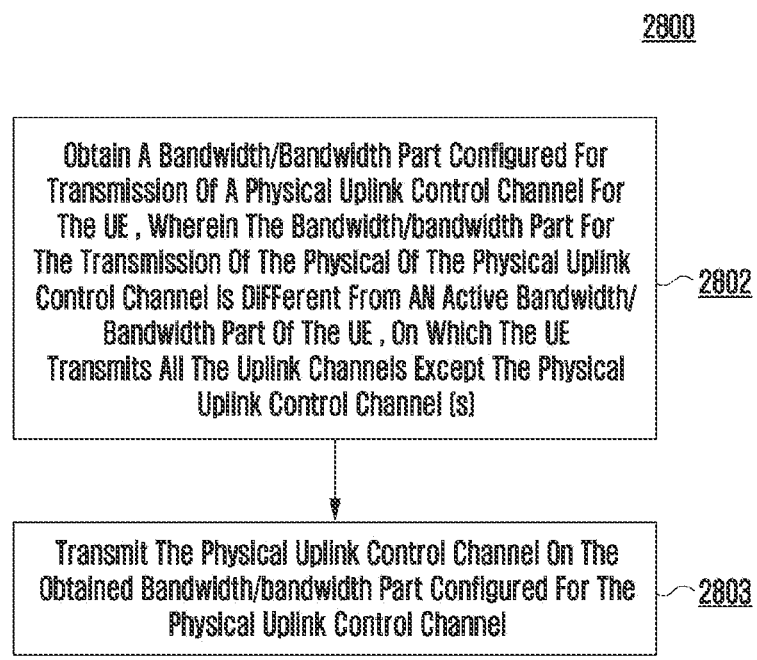
FIG. 28 schematically shows a flowchart of a transmission method performed at a UE according to yet another exemplary embodiment of the present disclosure.

In another exemplary embodiment, in order to ensure the transmission performance of the physical uplink control channel(s), the transmission method 2400 performed by the UE may further include steps as shown in FIG. 28. FIG. 28 shows another exemplary method of processing the physical resource conflict between the physical downlink shared channel and the physical uplink control channel.

In step 2802, the UE obtains a bandwidth/bandwidth part for transmission of physical uplink control channel(s) configured for the UE, wherein the bandwidth/bandwidth part for the transmission of the physical uplink control channel(s) is different from an active bandwidth/bandwidth part of the UE, on which the UE transmits all the uplink channels except the physical uplink control channel(s); and in step 2803, the UE transmits the physical uplink control channel(s) according to the obtained bandwidth/bandwidth part of the physical uplink control channel.

Figure 29A:
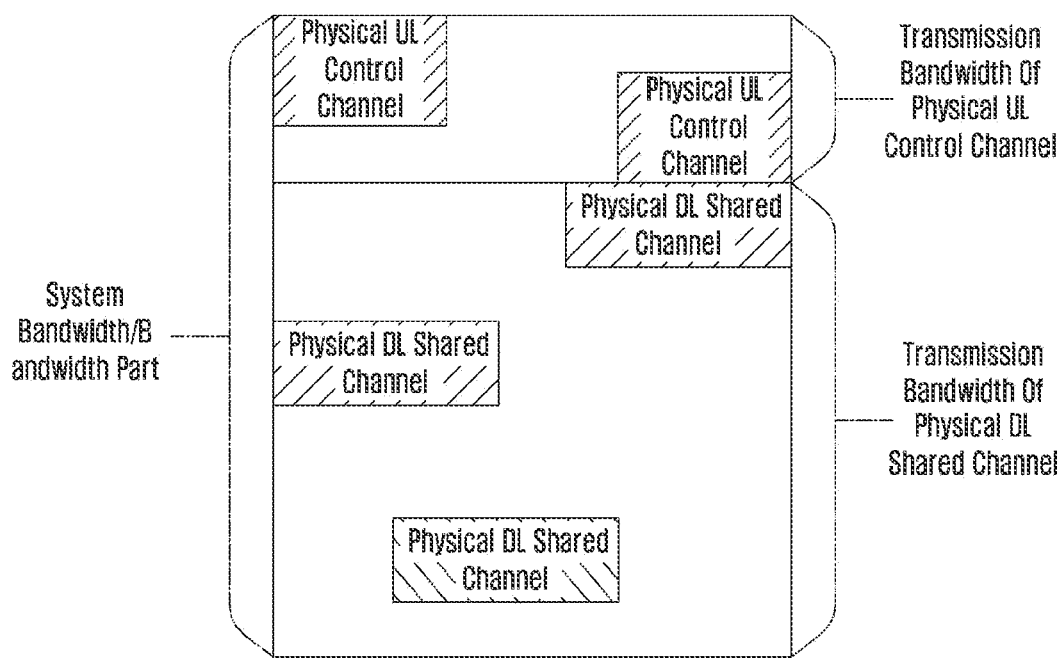
FIG. 29a schematically shows a diagram of processing a physical downlink shared channel transmission using the method illustrated in FIG. 28 according to an exemplary embodiment of the present disclosure.
Figure 29B:
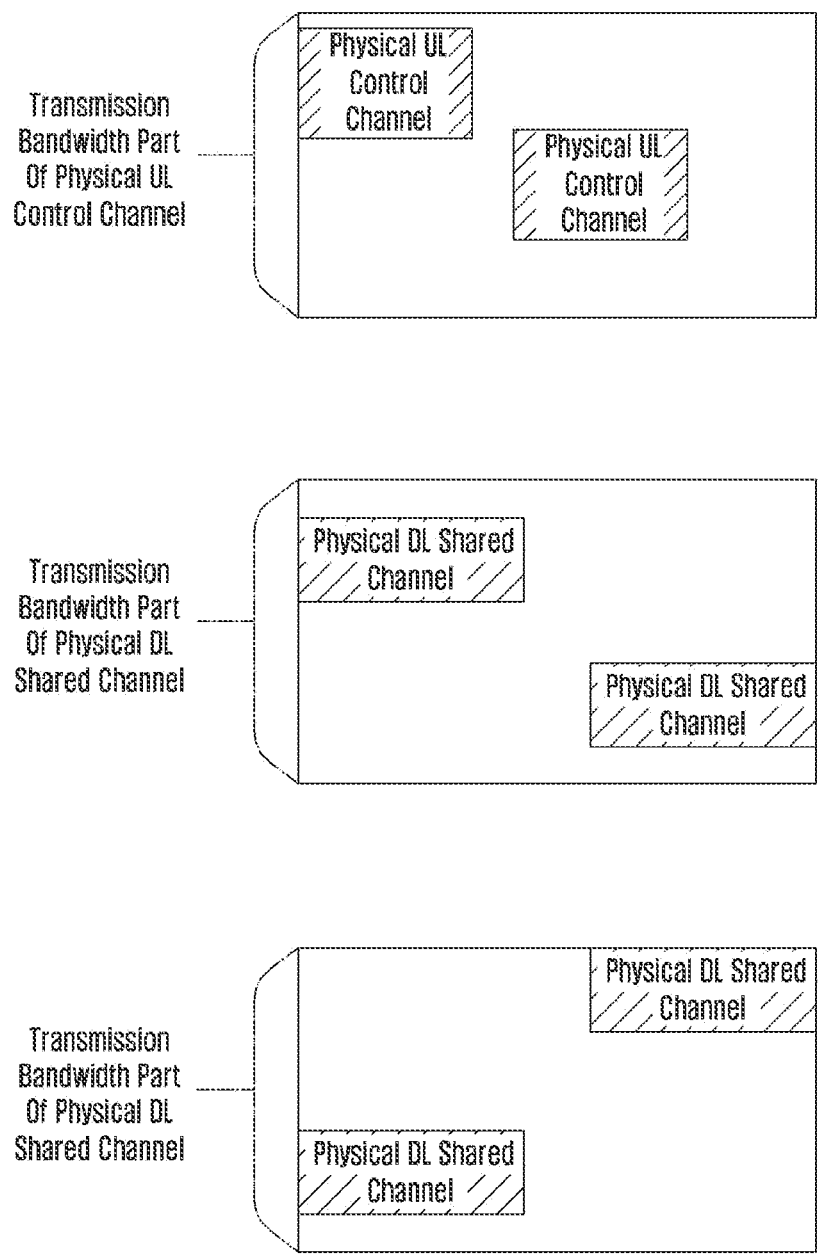
FIG. 29b schematically shows a diagram of processing a physical downlink shared channel transmission using the method illustrated in FIG. 28 according to another exemplary embodiment of the present disclosure.

By configuring the physical uplink control channel(s) transmission on the bandwidth/bandwidth part of the non-full duplex transmission, it is ensured that the physical uplink control channel(s) transmission and the physical downlink shared channel transmission would not be allocated with the same time-frequency resources. FIG. 29a and FIG. 29b show schematic diagrams of two methods respectively. In a specific implementation, the UE obtains a bandwidth/bandwidth part for transmission of the physical uplink control channel(s), and the bandwidth/bandwidth part for the transmission of the physical uplink control channel(s) may be different from the bandwidth/bandwidth part for the UE performing other uplink physical channel transmissions. The bandwidth/bandwidth part of the UE for the other uplink physical channel transmissions may particularly be an activated uplink bandwidth part, or a bandwidth configured in the latest physical uplink shared channel scheduling grant, or a specific bandwidth defined by the system. For example, it is assumed that the system bandwidth or the bandwidth part includes 100 physical resource blocks, the bandwidth on which the other uplink physical channel transmissions may be performed in the system bandwidth or bandwidth part is physical resource blocks with indexes of 3 to 96, and the indexes of the physical resource blocks for the non-physical uplink control channel(s) transmission are defined by the system.

A specific implementation of the UE obtaining the bandwidth/bandwidth part for the transmission of the physical uplink control channel(s) may be that the bandwidth/bandwidth part for the transmission of the physical uplink control channel(s) is defined by the system. For example, it is assumed that a certain bandwidth part includes 100 physical resource blocks, and the bandwidth on which the other uplink physical channel transmissions may be performed in the bandwidth part is defined to be physical resource blocks with indexes of 3 to 96, the bandwidth on which the physical uplink control channel(s) transmission may be performed is physical resource blocks with indexes of 0 to 2 and indexes of 97 to 99; or it is assumed that the system contains several bandwidth parts, the bandwidth part index that can be used for the physical uplink control channel(s) transmission is defined by the system, for example, it may be the bandwidth part used for the synchronization signal transmission.

Another specific implementation of the UE obtaining the bandwidth/bandwidth part for the transmission of the physical uplink control channel(s) may include: the UE obtaining the bandwidth/bandwidth part for the transmission of the physical uplink control channel(s) via the higher layer signaling. For example, the higher layer signaling may be the bandwidth/bandwidth part for the transmission of the physical uplink control channel(s) specific to the cell, indicating that the UE that meets a condition transmits the physical uplink control channel(s) on the configured bandwidth/bandwidth part. Specifically, the UE that meets the condition may be: all UEs in the cell, or UEs performing downlink transmission on a specific bandwidth/bandwidth part, wherein a specific implementation of the specific bandwidth/bandwidth part may be a bandwidth/bandwidth part for full-duplex transmission. Another implementation of the UE obtaining the bandwidth/bandwidth part for the transmission of the physical uplink control channel(s) via the higher layer signaling is that the UE obtains the bandwidth/bandwidth part for the transmission of the physical uplink control channel(s) via the user-specific signaling. For example, the user-specific signaling may function to indicate the bandwidth or bandwidth part used by the UE for the transmission of the physical uplink control channel(s), e.g., indicating a bandwidth part index used for the transmission of the physical uplink control channel.

Another specific implementation of the UE obtaining the bandwidth/bandwidth part for transmission of the physical uplink control channel(s) may include: the UE obtaining the bandwidth/bandwidth part for the transmission of the physical uplink control channel(s) via the downlink control signaling. For example, the UE obtains the bandwidth/bandwidth part for the transmission of the physical uplink control channel(s) according to the scheduling grant of the downlink control signaling. A particular method of indicating the bandwidth or bandwidth part for the transmission of the physical uplink control channel(s) may be indicating that the bandwidth or bandwidth part for the transmission of the physical uplink control channel(s) is the same as or different from the bandwidth/bandwidth part for the other uplink physical channel transmissions. When it is indicated that they are the same, the UE performs the transmission of the physical uplink control channel(s) on the configured bandwidth/bandwidth part for the other uplink physical channel transmissions; when it is indicated that they are different, the UE performs the transmission of the physical uplink control channel(s) on the bandwidth/bandwidth part not used for other uplink physical channel transmissions. The bandwidth/bandwidth part not used for other uplink physical channel transmissions may be defined by the system, or obtained by the UE via the higher layer signaling (the specific method thereof has been described previously). The specific method of indicating the bandwidth or bandwidth part for the transmission of the physical uplink control channel(s) may also be: indicating a physical resource block index used for the transmission of the physical uplink control channel; or indicating a bandwidth part index used for the transmission of the physical uplink control channel.

Hereinafter, a method for configuring transmission resources performed at a base station according to an exemplary embodiment of the present disclosure will be described in detail with reference to FIG. 30. For the sake of brevity, details in the above method 2400 already described with reference to FIG. 24 will be omitted herein.

Figure 30:
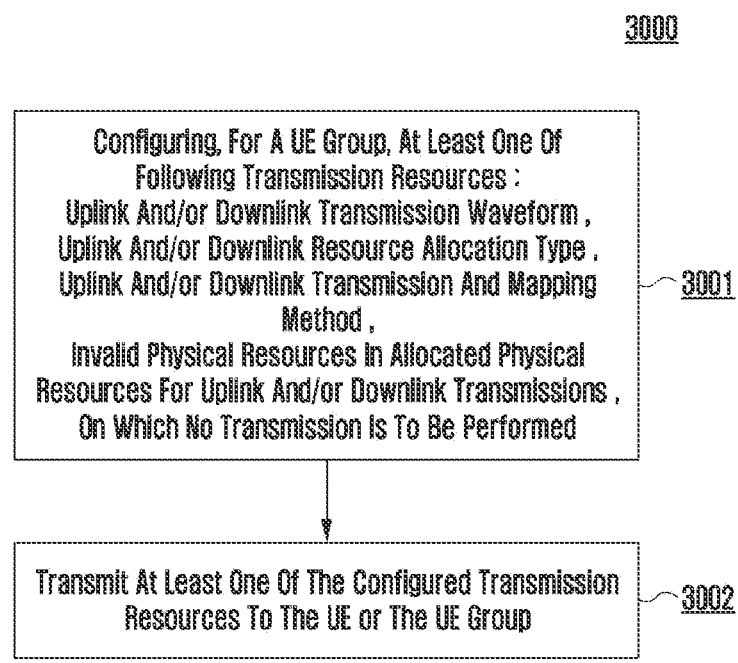
FIG. 30 schematically shows a flowchart of a method for configuring transmission resources performed at a base station according to an exemplary embodiment of the present disclosure.

FIG. 30 schematically shows a flowchart of a method 3000 for configuring transmission resources performed at a base station according to an exemplary embodiment of the present disclosure.

As shown in FIG. 30, the method 3000 may include steps 3001 and 3002.

In step 3001, the base station configures, for a UE or a UE group, at least one of following transmission resources:
uplink and/or downlink transmission waveform,
uplink and/or downlink resource allocation type,
uplink and/or downlink transmission and mapping method, wherein the transmission and mapping methods include at least one of three combinations of: distributed mapping and centralized mapping, interleaved mapping and non-interleaved mapping, frequency hopping transmission and non-frequency hopping transmission,
invalid physical resources in allocated physical resources for uplink and/or downlink transmission, on which no transmission is to be performed.

In step 3002, the base station transmits at least one of the configured transmission resources to the UE or the UE group.

In an exemplary embodiment, said transmitting the configured transmission resource configuration for the uplink and/or downlink transmission waveform to the UE or the UE group in step 3002 includes at least one of:
including indication information on a relationship between uplink and downlink transmission waveforms in UE-specific higher layer signaling and/or UE group-specific higher layer signaling;
including indication information on a combination of uplink and downlink transmission waveforms in UE-specific higher layer signaling and/or UE group-specific higher layer signaling;
including indication information having a predefined association with the uplink and/or downlink transmission waveform in UE-specific higher layer signaling and/or UE group-specific higher layer signaling;
including indication information having a predefined association with the uplink and/or downlink transmission waveform in cell-specific higher layer signaling;
including indication information on uplink and/or downlink transmission waveform corresponding to uplink and/or downlink scheduling grant in the uplink and/or downlink scheduling grant carried in physical layer signaling; or
including indication information having a predefined association with uplink and/or downlink transmission waveform in physical layer signaling.

In an exemplary embodiment, the indication information having the predefined association with the uplink and/or downlink transmission waveform included in the UE-specific higher layer signaling and/or the UE group-specific higher layer signaling and/or the cell-specific higher layer signaling includes indication information on a full-duplex communication/full-duplex bandwidth part/full-duplex bandwidth.

In an exemplary embodiment, the indication information having the predefined association with the corresponding uplink and downlink transmission waveforms in the physical layer signaling includes full-duplex indication information.

In an exemplary embodiment, the configuration for the uplink and/or downlink resource allocation type is transmitted to the UE or the UE group in step 3002 via the physical layer signaling, wherein an indication field is included in the scheduling grant carried in the physical layer signaling, and is used for indicating the uplink and/or downlink resource allocation type.

In an exemplary embodiment, an indication of one resource allocation type is included in the indication field, the resource allocation type being applied to both the scheduled uplink and downlink resource allocations; or an indication of a combination of the scheduled uplink and downlink resource allocations is included in the indication field.

In an exemplary embodiment, a configuration for the uplink and/or downlink transmission and mapping method is transmitted in step 3002 via the higher layer signaling and/or the physical layer signaling.

According to another exemplary embodiment of the present disclosure, the base station may configure, in step 3001, invalid physical resources in allocated physical resources for the uplink and/or downlink transmission, on which no transmission is to be performed. In this case, the base station configures the invalid physical resources in the allocated physical resources for the uplink and/or downlink transmission, on which no transmission is to be performed, so that the physical resources used by the physical uplink/physical downlink shared channel do not overlap with the physical resources used by the physical downlink/physical uplink control channel(s), thereby ensuring the transmission performance of the physical control channel.

Hereinafter, an embodiment in which the base station configures invalid physical resources in allocated physical resources for uplink and/or downlink transmission on which no transmission is to be performed in step 3001 will be described in detail below with reference to FIG. 31. For convenience of comparison, the steps in FIG. 31 corresponding to those in FIG. 30 are denoted by reference numerals similar to those used in FIG. 30.

Figure 31:
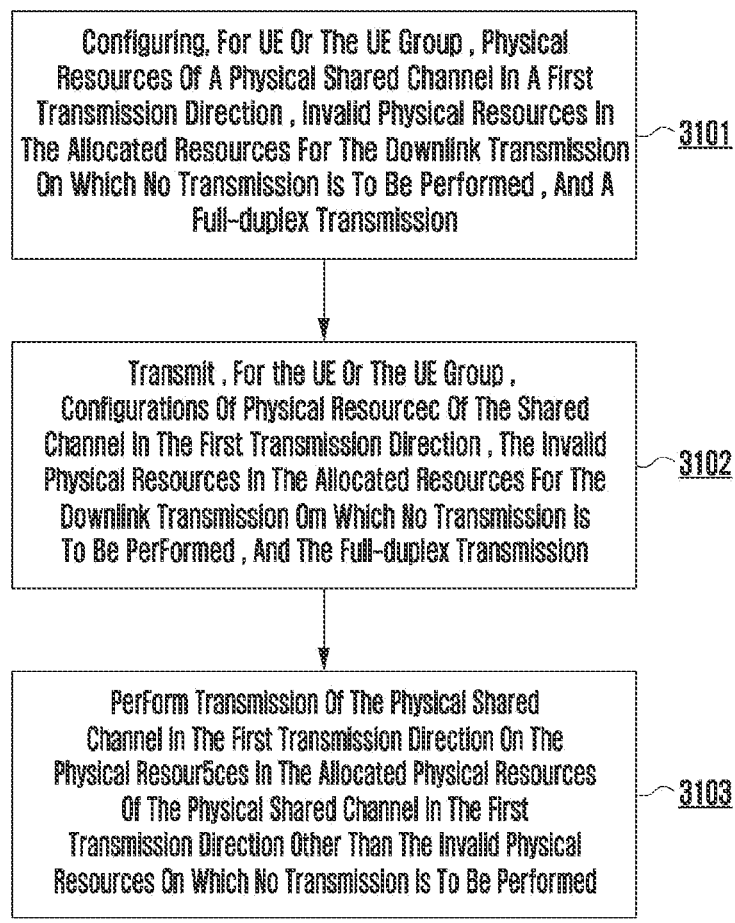
FIG. 31 schematically shows a flowchart of a method for configuring transmission resources performed at a base station according to another exemplary embodiment of the present disclosure.

FIG. 31 schematically shows a flowchart of a method for configuring transmission resources performed at the base station according to this exemplary embodiment of the present disclosure.

As shown in FIG. 31, the method 3100 includes steps 3101, 3102, and 3103.

In step 3101, the base station allocates, to the UE or the UE group, physical resources of a physical shared channel in the first transmission direction, invalid physical resources in allocated physical resources for uplink and/or downlink transmission, on which no transmission is to be performed, and a full-duplex transmission.

In step 3102, the base station transmits, to the UE or the UE group, the following configurations: physical resources of the physical shared channel in the first transmission direction, the invalid physical resources in the allocated physical resources for the uplink and/or downlink transmission, on which no transmission is to be performed, and the full-duplex transmission.

The invalid physical resources on which no transmission is to be performed may include at least one of:
first physical resources, which are a part of physical resources allocated to a physical uplink shared channel by a base station for the UE that overlap with UE-specific or UE group-specific or cell-specific physical resources of physical downlink control channel(s) configured by the base station; or
second physical resources configured by a base station for the UE, which are within physical resources of a physical downlink shared channel but without any downlink transmission performed.

In step 3103, the base station performs the transmission of the physical shared channel in the first transmission direction on the physical resources in the allocated physical resources of the physical shared channel in the first transmission direction other than the invalid physical resources on which no transmission is to be performed.

In an exemplary embodiment, the first transmission direction is uplink, and step 3101 further includes: configuring, for the UE, physical resources of the physical downlink control channel.

Step 3103 includes:
if the allocated physical resources of the physical uplink shared channel overlap with the configured physical resources of the physical downlink control channel(s), performing reception of the physical uplink shared channel on physical resources in the allocated physical resources of the physical uplink shared channel other than the overlapping first physical resources by at least one of:
the first physical resources puncturing into the reception of the physical uplink shared channel;
rate matching of the physical uplink shared channel around physical resource elements of the first physical resources; or
postponing the reception of the physical uplink shared channel until after the end of the first physical resources.

In an exemplary embodiment, the first transmission direction is downlink, and step 3101 further includes: configuring, for the UE, second physical resources in the allocated physical resources of the physical downlink shared channel, on which no transmission is to be performed.

Step 3103 includes: performing the transmission of the physical downlink shared channel on the physical resources in the allocated physical resources of the physical downlink shared channel other than the second physical resources by at least one of:
the second physical resources puncturing into the transmission of the physical downlink shared channel;
rate matching of the physical downlink shared channel around physical resource elements of the second physical resources; or
postponing the transmission of the physical downlink shared channel until after the end of the second physical resources.

In an exemplary embodiment, step 3102 further includes: transmitting, to the UE, the configuration of the second physical resources in the physical resources of the physical downlink shared channel by at least one of:
configuring, for the UE, the physical resource configuration for the physical uplink control channel(s); if the configured physical resources of the physical uplink control channel(s) overlap with the allocated physical resources of the physical downlink shared channel, using the overlapping physical resources as the second physical resources; or
transmitting, to the UE, a location of the second physical resources within the physical resources of the physical downlink shared channel by using the scheduling grant of the physical downlink shared channel.

In an exemplary embodiment, content indicating the location of the second physical resources that is included in the scheduling grant includes at least one of:
slot(s)/subframe(s)/mini-subframe(s) of the second physical resources,
location of time domain symbol(s) of the second physical resources,
location of physical resource block(s) of the second physical resources, or
location of subcarrier location occupied by the second physical resources.

In an exemplary embodiment, the scheduling grant indicates the location of the second physical resources by notifying a relative location with reference to a start or end location of physical resources in time domain and/or frequency domain of the physical downlink shared channel.

In an exemplary embodiment, the second physical resources further include physical resources of physical uplink control channels of other UEs.

Figure 32:
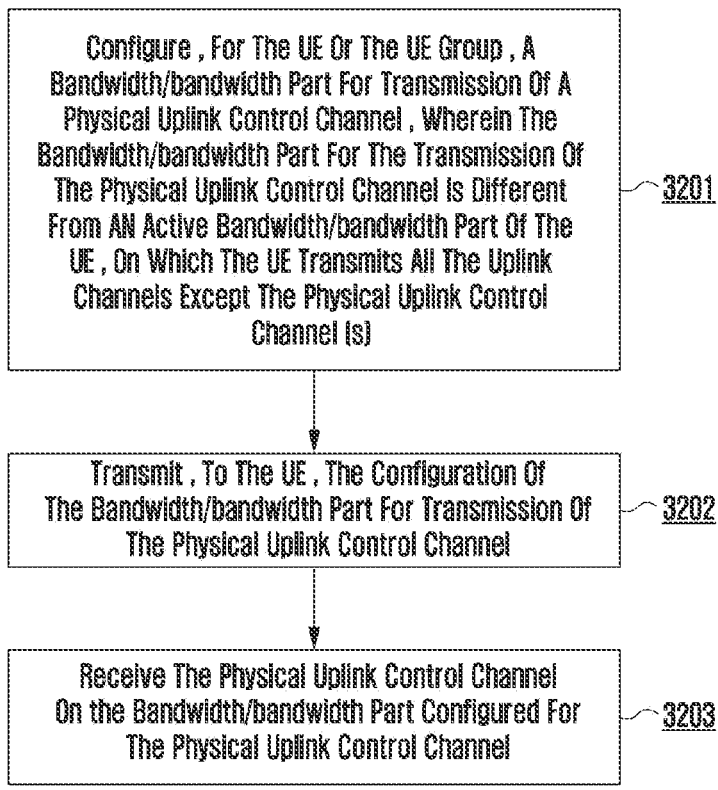
FIG. 32 schematically shows a flowchart of a method for configuring transmission resources performed at a base station according to yet another exemplary embodiment of the present disclosure.

In another exemplary embodiment, in order to ensure the transmission performance of the physical uplink control channel(s), the method 3000 for configuring the transmission resources performed at the base station may further include steps as shown in FIG. 32. FIG. 32 shows another exemplary method of processing the physical resource conflict between the physical downlink shared channel and the physical uplink control channel.

In step 3201, the base station configures, for the UE or the UE group, a bandwidth/bandwidth part for transmission of physical uplink control channel(s), wherein the bandwidth/bandwidth part for the transmission of the physical uplink control channel(s) is different from an active bandwidth/bandwidth part of the UE, on which the UE transmits all the uplink channels except the physical uplink control channel(s);

In step 3202, the base station transmits, to the UE or the UE group, the configuration of the bandwidth/bandwidth part for transmission of the physical uplink control channel; and In step 3203, the base station receives the physical uplink control channel(s) on the configured bandwidth/bandwidth part of the physical uplink control channel.

Figure 33:
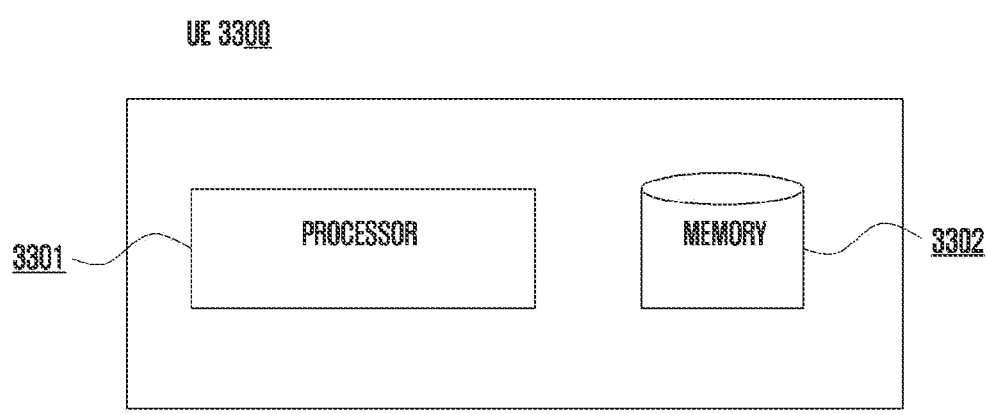
FIG. 33 schematically shows a structure block diagram of a UE according to an exemplary embodiment of the present disclosure.

Hereinafter, the structure of the UE according to an exemplary embodiment of the present disclosure will be described below with reference to FIG. 33. FIG. 33 schematically shows a structure block diagram of a UE 3300 according to an exemplary embodiment of the present disclosure. The UE 3300 can be used to perform the method 2400 as previously described with reference to FIG. 24, the method 2500 as previously described with reference to FIG. 25, and the method 2800 as previously described with reference to FIG. 28.

As shown in FIG. 33, the UE 3300 includes a processing unit or processor 3301, which may be a single unit or a combination of multiple units for performing different steps of the methods; a memory 3302 in which computer-executable instructions are stored, wherein the instructions, when executed by the processor 3301, cause the UE 3300 to perform the method 2400, the method 2500, and the method 2800. For the sake of brevity, only the schematic structure of the UE according to the exemplary embodiment of the present disclosure will be described herein, and the method 2400 as previously described with reference to FIG. 24, and details that have been described in the method 2500 as previously described with reference to FIG. 25, and the method 2800 as previously described with reference to FIG. 28 will be omitted herein.

In an exemplary embodiment in which the instructions, when executed by the processor 3301, cause the UE 3300 to perform the method 2400, the instructions cause the UE 3300 to:
obtain at least one of following transmission resource configurations:
a transmission resource configuration for uplink and/or downlink transmission waveform,
a transmission resource configuration for uplink and/or downlink resource allocation type,
a transmission resource configuration for uplink and/or downlink transmission and mapping method, wherein the transmission and mapping methods include at least one of three combinations of: distributed mapping and centralized mapping, interleaved mapping and non-interleaved mapping, frequency hopping transmission and non-frequency hopping transmission,
a configuration for invalid physical resources in allocated physical resources for uplink and/or downlink transmission, on which no transmission is to be performed; and
perform transmission according to the obtained at least one transmission resource configuration.

In an exemplary embodiment, said obtaining the transmission resource configuration for the uplink and/or downlink transmission waveform includes at least one of:
obtaining a transmission waveform in one transmission direction, obtaining indication information on a relationship between uplink and downlink transmission waveforms via UE-specific higher layer signaling and/or UE group-specific higher layer signaling, and determining a transmission waveform for the other transmission direction according to the relationship between the uplink and downlink transmission waveforms and the obtained transmission waveform in the one transmission direction;
obtaining indication information on a combination of uplink and downlink transmission waveforms via UE-specific higher layer signaling and/or UE group-specific higher layer signaling, and determining the uplink and/or downlink transmission waveform according to the combination of the uplink and downlink transmission waveforms;
obtaining indication information having a predefined association with the uplink and/or downlink transmission waveform via UE-specific higher layer signaling and/or UE group-specific higher layer signaling, and determining the uplink and/or downlink transmission waveform according to the predefined association with uplink and/or downlink transmission waveform;
obtaining indication information having a predefined association with the uplink and/or downlink transmission waveform via cell-specific higher layer signaling, and determining the uplink and/or downlink transmission waveform according to the predefined association with the uplink and/or downlink transmission waveform;
obtaining indication information on corresponding uplink and/or downlink transmission waveform via uplink and/or downlink scheduling grant carried in physical layer signaling, and determining the corresponding uplink and/or downlink transmission waveform according to the corresponding uplink and/or downlink transmission waveform; or
obtaining indication information having a predefined association with corresponding uplink and/or downlink transmission waveform via uplink and/or downlink scheduling grant carried in physical layer signaling, and determining the corresponding uplink and/or downlink transmission waveform according to the predefined association with the corresponding uplink and/or downlink transmission waveform.

In an exemplary embodiment, the indication information having the predefined association with the uplink and/or downlink transmission waveform obtained via the UE-specific higher layer signaling and/or the UE group-specific higher layer signaling includes indication information on a full-duplex communication/full-duplex bandwidth part/full-duplex bandwidth.

In an exemplary embodiment, the indication information having the predefined association with the corresponding uplink and/or downlink transmission waveform from the uplink and/or downlink scheduling grant carried in the physical layer signaling includes full-duplex indication information.

In an exemplary embodiment, said obtaining the transmission resource configuration for the uplink and/or downlink resource allocation type includes at least one of:
obtaining both of uplink and downlink resource allocation types according to the same indication field in the scheduling grant carried in physical layer signaling; or
determining the uplink and/or downlink resource allocation type according to the configured uplink and/or downlink transmission waveform, and a predefined association between the uplink and downlink transmission waveforms and the uplink and/or downlink resource allocation type.

In an exemplary embodiment, said obtaining the uplink and/or downlink resource allocation type according to the indication field in the scheduling grant includes at least one of:
obtaining an indication of one resource allocation type from the indication field, the resource allocation type being applied to both the scheduled uplink and downlink resource allocations; or
obtaining an indication of a combination of the scheduled uplink and downlink resource allocations from the indication field.

In an exemplary embodiment, said determining the uplink and/or downlink resource allocation type according to the configured uplink and/or downlink transmission waveform, and the predefined association between the uplink and downlink transmission waveforms and the uplink and/or downlink resource allocation type includes:
obtaining the configuration for the uplink and/or downlink transmission waveform by at least one of:

obtaining indication information on a relationship between uplink and downlink transmission waveforms via UE-specific higher layer signaling and/or UE group-specific higher layer signaling, and determining, according to the relationship between the uplink and downlink transmission waveforms and the obtained transmission waveform in one transmission direction, a transmission waveform in the other transmission direction;

obtaining indication information on a combination of uplink and downlink transmission waveforms via UE-specific higher layer signaling and/or UE group-specific higher layer signaling, and determining the uplink and/or downlink transmission waveform according to the combination of the uplink and downlink transmission waveforms;

obtaining indication information having a predefined association with the uplink and/or downlink transmission waveform via UE-specific higher layer signaling and/or UE group-specific higher layer signaling, and determining the uplink and/or downlink transmission waveform according to the predefined association with uplink and/or downlink transmission waveform;

obtaining indication information on corresponding uplink and/or downlink transmission waveform via uplink and/or downlink scheduling grant carried in physical layer signaling, and determining the corresponding uplink and/or downlink transmission waveform according to the corresponding uplink and/or downlink transmission waveform; or obtaining indication information having a predefined association with corresponding uplink and/or downlink transmission waveform via uplink and/or downlink scheduling grant carried in physical layer signaling, and determining the corresponding uplink and/or downlink transmission waveform according to the predefined association with the corresponding uplink and/or downlink transmission waveform.

In an exemplary embodiment, said obtaining the transmission resource configuration for the uplink and/or downlink transmission and mapping method includes:

obtaining an indication of the uplink and/or downlink transmission and mapping method via higher layer signaling and/or physical layer signaling;

determining the uplink and/or downlink transmission and mapping method according to the obtained configuration for the uplink and/or downlink transmission waveform, and the predefined association between the uplink and downlink transmission waveforms and the uplink and/or downlink transmission and mapping method.

In an exemplary embodiment, said determining the uplink and/or downlink transmission and mapping method according to the obtained configuration for the uplink and/or downlink transmission waveform, and the predefined association between the uplink and downlink transmission waveforms and the uplink and/or downlink transmission and mapping method includes:

obtaining the configuration for the uplink and/or downlink transmission waveform by at least one of:

obtaining indication information on a relationship between uplink and downlink transmission waveforms via UE-specific higher layer signaling and/or UE group-specific higher layer signaling, and determining, according to the relationship between the uplink and downlink transmission waveforms and the obtained transmission waveform in one transmission direction, a transmission waveform in the other transmission direction;

obtaining indication information on a combination of uplink and downlink transmission waveforms via UE-specific higher layer signaling and/or UE group-specific higher layer signaling, and determining the uplink and/or downlink transmission waveform according to the combination of the uplink and downlink transmission waveforms;

obtaining indication information having a predefined association with the uplink and/or downlink transmission waveform via UE-specific higher layer signaling and/or UE group-specific higher layer signaling, and determining the uplink and/or downlink transmission waveform according to the predefined association with uplink and/or downlink transmission waveform;

obtaining indication information on corresponding uplink and/or downlink transmission waveform via uplink and/or downlink scheduling grant carried in physical layer signaling, and determining the corresponding uplink and/or downlink transmission waveform according to the corresponding uplink and/or downlink transmission waveform; or obtaining indication information having a predefined association with corresponding uplink and/or downlink transmission waveform via uplink and/or downlink scheduling grant carried in physical layer signaling, and determining the corresponding uplink and/or downlink transmission waveform according to the predefined association with the corresponding uplink and/or downlink transmission waveform.

In an exemplary embodiment in which the instructions, when executed by the processor 3301, cause the UE 3300 to perform the method 2500, the instructions cause the UE 3300 to:

obtain a physical resource configuration for a physical shared channel in a first transmission direction that is configured to the UE; and determine whether there is or may be a full duplex transmission on the obtained physical resources of the physical shared channel in the first transmission direction;

wherein said performing the transmission according to the obtained configuration for the invalid physical resources in the allocated physical resources for the uplink and/or downlink transmission on which no transmission is to be performed includes: performing the transmission of the physical shared channel in the first transmission direction on the physical resources in the obtained physical resources of the physical shared channel in the first transmission direction other than the invalid physical resources on which no transmission is to be performed, if there is or may be a full-duplex transmission on the obtained physical resources of the physical shared channel in the first transmission direction.

In an exemplary embodiment, the physical resources on which no transmission is to be performed include at least one of:

first physical resources, which are a part of physical resources allocated to a physical uplink shared channel by a base station for the UE that overlap with UE-specific or UE group-specific or cell-specific physical resources of physical downlink control channel(s) configured by the base station; or second physical resources configured by a base station for the UE, which are physical resources of a physical downlink shared channel but without any downlink transmission performed.

In an exemplary embodiment, whether there is or may be a full-duplex transmission on the obtained physical resources of the physical shared channel in the first transmission direction is determined according to at least one of following criteria:
- an obtained transmission subframe of the physical shared channel in the first transmission direction being a subframe in a second transmission direction, wherein the first transmission direction is different from the second transmission direction;
- an obtained transmission bandwidth of the physical shared channel in the first transmission direction being a bandwidth in the second transmission direction;
- obtained frequency domain resources of the physical shared channel in the first transmission direction being located in a bandwidth part/configured bandwidth/system bandwidth in which the full duplex transmission is enabled;
- obtained time domain resources of the physical shared channel in the first transmission direction being located in a subframe/OFDM symbol/time slot in which a full duplex transmission is enabled; or
- obtained scheduling grant indicating a full duplex transmission.

In an exemplary embodiment, the first transmission direction is uplink, and the second transmission direction is downlink, and
the instructions further cause the UE 3300 to obtain a physical resource configuration of physical downlink control channel(s) configured to the UE,
wherein said obtaining the configuration for the invalid physical resources on which no transmission is to be performed includes: determining the first physical resources, as the part of physical resources of the physical uplink shared channel that overlap with the physical resources of the physical downlink control channel(s), according to the obtained physical resource allocation to the physical uplink shared channel and the physical resource configuration for the physical downlink control channel,
wherein said performing the transmission of the physical shared channel in the first transmission direction on the physical resources in the obtained physical resources of the physical shared channel in the first transmission direction other than the invalid physical resources on which no transmission is to be performed includes: performing the transmission of the physical uplink shared channel on the physical resources in the obtained physical resources of the physical uplink shared channel other than the overlapping first physical resources is performed by at least one of:
the first physical resources puncturing into the transmission of the physical uplink shared channel;
rate matching of the physical uplink shared channel around physical resource elements of the first physical resources; or
postponing the transmission of the physical uplink shared channel until after the end of the first physical resources.

In an exemplary embodiment, the first transmission direction is downlink, and the second transmission direction is uplink,
wherein said obtaining the configuration of the invalid physical resources on which no transmission is to be performed includes: obtaining a configuration of the second physical resources configured by the base station for the UE in the allocated physical resources of the physical downlink shared channel, on which no downlink transmission is to be performed,
wherein said performing the transmission of the physical shared channel in the first transmission direction on the physical resources in the obtained physical resources of the physical shared channel in the first transmission direction other than the invalid physical resources on which no transmission is to be performed includes: performing the reception of the physical downlink shared channel on the physical resources in the obtained physical resources of the physical downlink shared channel other than the second physical resources is performed by at least one of:
the second physical resources puncturing into the reception of the physical downlink shared channel;
rate matching of the physical downlink shared channel around physical resource elements of the second physical resources; or
postponing the transmission of the physical downlink shared channel until after the end of the second physical resources.

In an exemplary embodiment, said obtaining the configuration of the second physical resources includes at least one of:
obtaining the physical resource configuration for physical uplink control channel(s) of the UE; and if obtained physical resources of the physical uplink control channel(s) overlap with the allocated physical resources of the physical downlink shared channel, using the overlapping physical resources as the second physical resources; and
obtaining a location of the second physical resources within the physical resources of the physical downlink shared channel, according to the scheduling grant of the physical downlink shared channel.

In an exemplary embodiment, content indicating the location of the second physical resources that is included in the scheduling grant includes at least one of:
slot(s)/subframe(s)/mini-subframe(s) of the second physical resources,
location of time domain symbol(s) of the second physical resources,
location of physical resource block(s) of the second physical resources, or
location of subcarrier location occupied by the second physical resources In an exemplary embodiment, the scheduling grant indicates the location of the second physical resources by notifying a relative location with reference to a start or end location of physical resources in time domain and/or frequency domain of the physical downlink shared channel.

In an exemplary embodiment, the second physical resources further include physical resources of physical uplink control channels of other UEs.

In an exemplary embodiment in which the instructions, when executed by the processor 3301, cause the UE 3300 to perform the method 2800, the instructions cause the UE 3300 to:
obtaining a bandwidth/bandwidth part configured for transmission of physical uplink control channel(s) for the UE, wherein the bandwidth/bandwidth part for the transmission of the physical uplink control channel(s) is different from an active bandwidth/bandwidth part of the UE, on which the UE transmits all the uplink channels except the physical uplink control channel(s); and transmit the physical uplink control channel(s) on the obtained bandwidth/bandwidth part configured for the physical uplink control channel.

In an exemplary embodiment, the bandwidth/bandwidth part configured for the transmission of the physical uplink control channel(s) is defined by a system.

In an exemplary embodiment, the bandwidth/bandwidth part configured for the transmission of the physical uplink control channel(s) is obtained via the higher layer signaling, wherein the bandwidth/bandwidth part for the transmission configured the physical uplink control channel(s) via the higher layer signaling indicates a UE that meets a condition to transmit the physical uplink control channel(s) on the configured bandwidth/bandwidth part, wherein the UE that meets the condition includes: all UEs in a cell, and/or UEs performing downlink transmissions on a specific bandwidth/bandwidth part, wherein the specific bandwidth/bandwidth part includes a bandwidth/bandwidth part for the full-duplex transmission; or the higher layer signaling is UE dedicated signaling for indicating a bandwidth/bandwidth part used by the UE to transmit the physical uplink control channel.

In an exemplary embodiment, the bandwidth/bandwidth part for the transmission of the physical uplink control channel(s) is obtained via the physical layer signaling, wherein obtaining the bandwidth or bandwidth part for the transmission of the physical uplink control channel(s) from the scheduling grant of the physical downlink shared channel, wherein the bandwidth/bandwidth part for the transmission of the physical uplink control channel(s) is indicated by at least one of:

indicating that the bandwidth/bandwidth part for the transmission of the physical uplink control channel(s) is the same as or different from the bandwidth/bandwidth part for transmission of other uplink physical channels, wherein when it is indicated that the bandwidth/bandwidth part for the transmission of the physical uplink control channel(s) is the same as the bandwidth/bandwidth part for transmission of other uplink physical channels, the UE transmits the physical uplink control channel(s) on the configured bandwidth/bandwidth part used by the other uplink physical channels; when it is indicated that the bandwidth/bandwidth part for the transmission of the physical uplink control channel(s) is different from the active bandwidth/bandwidth part of the UE, on which the UE transmits all the uplink channels except the physical uplink control channel(s), the UE transmits the physical uplink control channel(s) on the bandwidth/bandwidth part used for the transmission of non-other uplink physical channels, wherein the bandwidth/bandwidth part used for the transmission of the non-other uplink physical channels is defined by the system or obtained by the UE via the higher level signaling;

indicating a physical resource block index used for the transmission of the physical uplink control channel; or indicating a bandwidth part index used for the transmission of the physical uplink control channel.

Figure 34:
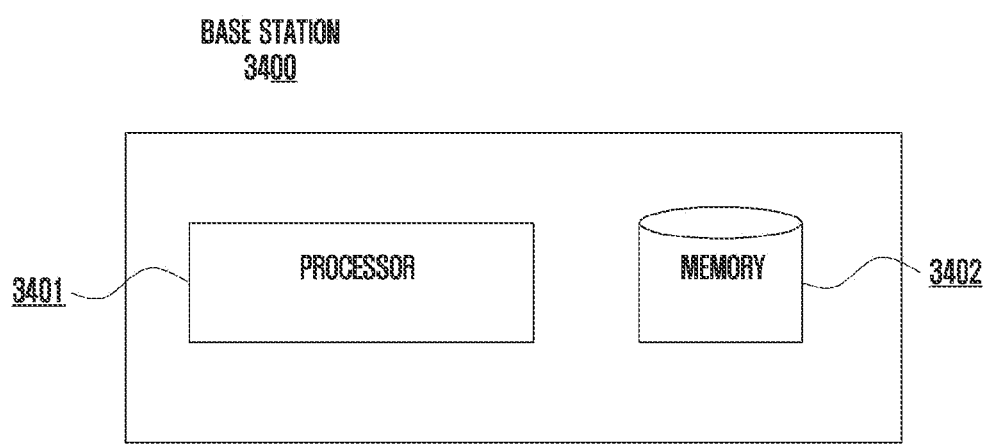
FIG. 34 schematically shows a structure block diagram of a base station according to an exemplary embodiment of the present disclosure.

Hereinafter, the structure of the base station according to an exemplary embodiment of the present disclosure will be described below with reference to FIG. 34. FIG. 34 schematically shows a structure block diagram of a base station 3400 according to an exemplary embodiment of the present disclosure. The base station 3400 can be used to perform the method 3000 as previously described with reference to FIG. 30, the method 3100 as previously described with reference to FIG. 31, and the method 1000 as previously described with reference to FIG. 32.

As shown in FIG. 34, the base station 3400 includes a processing unit or processor 3401, which may be a single unit or a combination of multiple units for performing different steps of the methods; a memory 3402 in which computer-executable instructions are stored, wherein the instructions, when executed by the processor 3301, cause the base station 3400 to perform the method 3000, the method 3100, and the method 1000. For the sake of brevity, only the schematic structure of the base station according to the exemplary embodiment of the present disclosure will be described herein, and the method 3000 as previously described with reference to FIG. 30, and details that have been described in the method 3100 as previously described with reference to FIG. 31, and the method 1000 as previously described with reference to FIG. 32 will be omitted herein.

In an exemplary embodiment in which the instructions, when executed by the processor 3301, cause the base station 3400 to perform the method 3000, the instructions cause the base station 3400 to:

configure, for a UE or a UE group, at least one of following transmission resources:
uplink and/or downlink transmission waveform,
uplink and/or downlink resource allocation type,
uplink and/or downlink transmission and mapping method, wherein the transmission and mapping methods include at least one of three combinations of: distributed mapping and centralized mapping, interleaved mapping and non-interleaved mapping, frequency hopping transmission and non-frequency hopping transmission,
invalid physical resources in allocated physical resources for uplink and/or downlink transmission, on which no transmission is to be performed; and
transmit at least one of the configured transmission resources to the UE or the UE group.

In an exemplary embodiment, said transmitting the configured transmission resource configuration for the uplink and/or downlink transmission waveform to the UE or the UE group includes at least one of:

including indication information on a relationship between uplink and downlink transmission waveforms in UE-specific higher layer signaling and/or UE group-specific higher layer signaling;

including indication information on a combination of uplink and downlink transmission waveforms in UE-specific higher layer signaling and/or UE group-specific higher layer signaling;

including indication information having a predefined association with the uplink and/or downlink transmission waveform in UE-specific higher layer signaling and/or UE group-specific higher layer signaling;

including indication information having a predefined association with the uplink and/or downlink transmission waveform in cell-specific higher layer signaling;

including indication information on uplink and/or downlink transmission waveform corresponding to uplink and/or downlink scheduling grant in the uplink and/or downlink scheduling grant carried in physical layer signaling; or including indication information having a predefined association with uplink and/or downlink transmission waveform in physical layer signaling.

In an exemplary embodiment, the indication information having the predefined association with the uplink and/or downlink transmission waveform included in the UE-specific higher layer signaling and/or the UE group-specific higher layer signaling and/or the cell-specific higher layer signaling includes indication information on a full-duplex communication/full-duplex bandwidth part/full-duplex bandwidth.

In an exemplary embodiment, the indication information having the predefined association with the corresponding uplink and downlink transmission waveforms in the physical layer signaling includes full-duplex indication information.

In an exemplary embodiment, the configuration for the uplink and/or downlink resource allocation type is transmitted to the UE or the UE group via the physical layer signaling, wherein one indication field is included in the scheduling grant carried in the physical layer signaling, and is used for indicating both of the uplink and/or downlink resource allocation types.

In an exemplary embodiment, an indication of one resource allocation type is included in the indication field, the resource allocation type being applied to both the scheduled uplink and downlink resource allocations; or an indication of a combination of the scheduled uplink and downlink resource allocations is included in the indication field.

In an exemplary embodiment, a configuration for the uplink and/or downlink transmission and mapping method is transmitted via the higher layer signaling and/or the physical layer signaling.

In an exemplary embodiment in which the instructions, when executed by the processor 3401, cause the base station 3400 to perform the method 3100, the instructions cause the base station 3400 to:

allocate, to the UE or the UE group, a physical resource configuration for a physical shared channel in a first transmission direction and a full duplex transmission; and perform the transmission of the physical shared channel in the first transmission direction on the physical resources in the allocated physical resources of the physical shared channel in the first transmission direction other than the invalid physical resources on which no transmission is to be performed.

The physical resources on which no transmission is to be performed include at least one of:

first physical resources, which are a part of physical resources allocated to a physical uplink shared channel by a base station for the UE that overlap with UE-specific or UE group-specific or cell-specific physical resources of physical downlink control channel(s); or second physical resources configured by a base station for the UE which no downlink transmission is to be performed are within physical resources of a downlink shared channel physical downlink shared channel but without any downlink transmission performed.

In an exemplary embodiment, the first transmission direction is uplink, and the instructions further cause the base station 3400 to configure physical resources of a physical downlink control channel(s) for the UE;

wherein said performing the transmission of the physical shared channel in the first transmission direction on the physical resources in the allocated physical resources of the physical shared channel in the first transmission direction other than the invalid physical resources on which no transmission is to be performed includes:

if the allocated physical resources of the physical uplink shared channel overlap with the configured physical resources of the physical downlink control channel(s), performing reception of the physical uplink shared channel on physical resources in the allocated physical resources of the physical uplink shared channel other than the overlapping first physical resources by at least one of:

the first physical resources puncturing into the reception of the physical uplink shared channel;

rate matching of the physical uplink shared channel around physical resource elements of the first physical resources; or postponing the reception of the physical uplink shared channel until after the end of the first physical resources.

In an exemplary embodiment, the first transmission direction is downlink, and the instructions further cause the base station 3400 to configure, for the UE, second physical resources in the allocated physical resources of the physical downlink shared channel, on which no transmission is to be performed;

wherein said performing the transmission of the physical shared channel in the first transmission direction on the physical resources in the allocated physical resources of the physical shared channel in the first transmission direction other than the invalid physical resources on which no transmission is to be performed includes:

performing the transmission of the physical downlink shared channel on the physical resources in the allocated physical resources of the physical downlink shared channel other than the second physical resources by at least one of:

the second physical resources puncturing into the transmission of the physical downlink shared channel;

rate matching of the physical downlink shared channel around physical resource elements of the second physical resources; or postponing the transmission of the physical downlink shared channel until after the end of the second physical resources.

In an exemplary embodiment, the method further includes: transmitting, to the UE, the configuration of the second physical resources in the physical resources of the physical downlink shared channel by at least one of:

configuring, for the UE, the physical resource configuration for the physical uplink control channel(s); if the configured physical resources of the physical uplink control channel(s) overlap with the allocated physical resources of the physical downlink shared channel, using the overlapping physical resources as the second physical resources; or transmitting, to the UE, a location of the second physical resources within the physical resources of the physical downlink shared channel by using the scheduling grant of the physical downlink shared channel.

In an exemplary embodiment, content indicating the location of the second physical resources that is included in the scheduling grant includes at least one of:

slot(s)/subframe(s)/mini-subframe(s) of the second physical resources, location of time domain symbol(s) of the second physical resources,
location of physical resource block(s) of the second physical resources, or
location of subcarrier location occupied by the second physical resources.

In an exemplary embodiment, the scheduling grant indicates the location of the second physical resources by notifying a relative location with reference to a start or end location of physical resources in time domain and/or frequency domain of the physical downlink shared channel.

In an exemplary embodiment, the second physical resources further include physical resources of physical uplink control channels of other UEs.

In an exemplary embodiment in which the instructions, when executed by the processor 3401, cause the base station 3400 to perform the method 1000, the instructions cause the base station 3400 to.
configure, for the UE or the UE group, a bandwidth/bandwidth part for transmission of physical uplink control channel(s), wherein the bandwidth/bandwidth part for the transmission of the physical uplink control channel(s) is different from an active bandwidth/bandwidth part of the UE, on which the UE transmits all the uplink channels except the physical uplink control channel(s); and
receive the physical uplink control channel(s) on the configured bandwidth/bandwidth part of the physical uplink control channel.

In order to address the self-interference issue in the same transceiver, the following full-duplex transceiver, electronic apparatus and computer readable storage medium are provided.

The self-interference signal mentioned in the present application is an interference signal generated by a transmitting signal of a transmission circuit on a reception circuit in the same transceiver.

Technical solutions of the present application and the manners to solve the above-mentioned technical problems by technical solutions of the present application will be described in detail below with respect to specific embodiments. The following specific embodiments may be combined with one another. Details of the same or similar concepts or processes may not be described again in some embodiments. With reference to the accompanying drawings, embodiments of the present application will now be described.

Embodiment V

Figure 35:
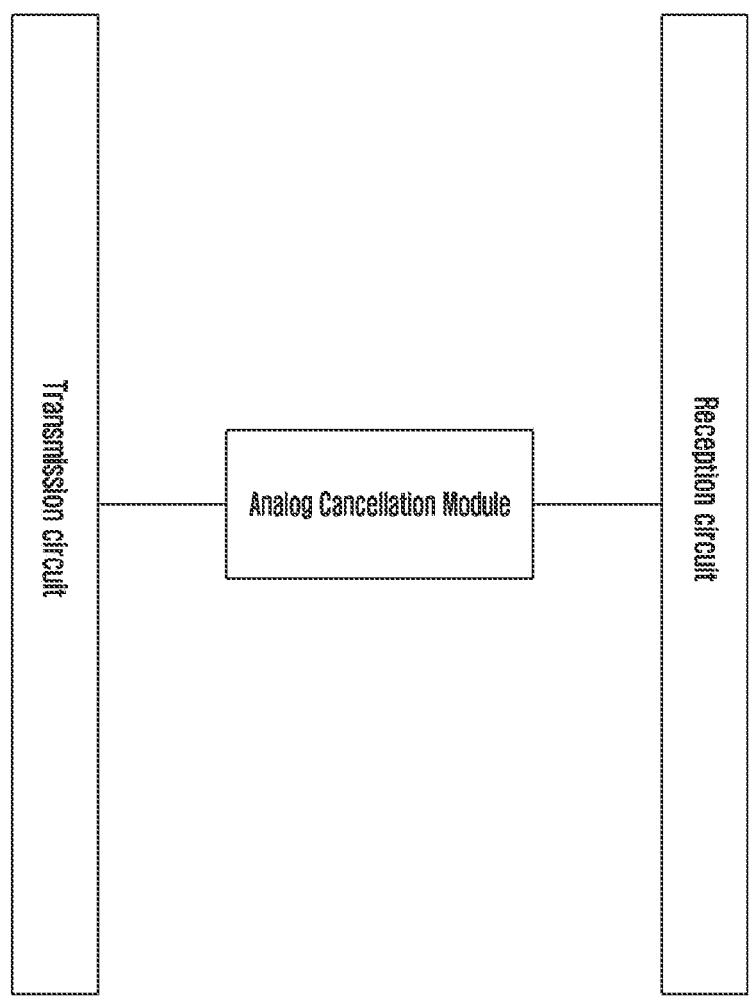
FIG. 35 is a schematic structural diagram showing a full-duplex transceiver according to Embodiment V of the present application.

FIG. 35 is a schematic structural diagram of a full-duplex transceiver according to Embodiment V of the present application;

As shown in FIG. 35, the present application provides a full-duplex transceiver, including: at least one transmission circuit, at least one reception circuit, and analog cancellation modules.

For any pair of transmitting and reception circuits, the analog cancellation module is connected to the reception circuit and the transmission circuit for analog cancellation on a self-interference signal of a received signal based on a transmitted signal.

The connections mentioned in the present application include at least one of the following: an electrical connection, an optical path connection in accordance with optical signal transmission, the optical path connection and a photoelectric converter with an electrical connection.

Compared with the prior art, the full-duplex transceiver of the embodiment of the present application may better suppress self-interference from a transmitting antenna port of a transmission circuit to a receiving antenna port of a reception circuit in the same device caused by full-duplex communication, and achieve a reasonable compromise between self-interference suppression performance and implementation complexity (including hardware complexity and software complexity).

Embodiment VI

The embodiment of the present application provides another possible implementation. On the basis of Embodiment V, the full-duplex transceiver shown in Embodiment VI is further included.

Optionally, in the full-duplex transceiver of the embodiment of the present application, the analog cancellation module includes: at least one digitally assisted analog cancellation sub-module;
the digitally assisted analog cancellation sub-module includes: digitally assisted analog cancellation unit, a corresponding control unit and an adder;
the adder of each digitally assisted analog cancellation sub-module is sequentially and serially connected to an analog domain circuit of the reception circuit;
the digitally assisted analog cancellation unit has an input connected to a digital domain circuit of the transmission circuit, and an output connected to the reception circuit, for generating a feedback signal, and performing analog cancellation according to the feedback signal and the digital transmitting signal of the digital domain circuit of the transmission circuit.

Optionally, the digitally assisted analog cancellation unit has an output connected to one input of the corresponding adder, and a feedback chain connected to the output of the adder through a corresponding control unit, or a feedback chain connected to a digital domain circuit of the reception circuit through the corresponding control unit, for performing analog cancellation on the self-interference signal according to a digital transmitting signal of the digital domain circuit in the reception circuit and a feedback signal from the corresponding adder, or according to the digital transmitting signal and a feedback signal from the digital domain circuit of the reception circuit.

Optionally, the analog cancellation module includes: at least one digitally assisted analog cancellation sub-module;
the digitally assisted analog cancellation sub-module includes: a digitally assisted analog cancellation unit, a corresponding control unit and an adder;
the adder of each digitally assisted analog cancellation sub-module is sequentially and serially connected to an analog domain circuit of the reception circuit;
the digitally assisted analog cancellation unit has an output connected to an input of the corresponding adder, and a feedback chain connected to the output of the adder through a corresponding control unit, or a feedback chain connected to a digital domain circuit of the reception circuit through the corresponding control unit, for performing analog cancellation on the self-interference signals according to a digital transmitting signal of the digital domain circuit in the reception circuit and a feedback signal from the corresponding adder, or according to the digital transmitting signal and a feedback signal from the digital domain circuit in the reception circuit.

Optionally, the analog cancellation module includes: a first stage analog cancellation module and a second stage analog cancellation module;

the first stage analog cancellation module and the second stage analog cancellation module are sequentially connected in an analog domain circuit of the reception circuit for sequentially performing analog cancellation on the self-interference signal of the reception circuit.

Optionally, the first stage analog cancellation module includes at least one first stage analog cancellation sub-module, and the second stage analog cancellation module includes at least one digitally assisted analog cancellation sub-module;

each of the first stage analog cancellation sub-modules is sequentially and serially connected in the analog domain circuit of the reception circuit;

the first stage analog cancellation sub-module includes: an analog cancellation unit, a corresponding control unit, and an adder;

the corresponding adder of each first stage analog cancellation sub-module is serially connected in the analog domain circuit of the reception circuit, and the output of the adder is connected to the input of the adder of another first stage analog cancellation sub-module or the input of the adder of the first digitally assisted analog cancellation sub-module;

the analog cancellation unit has an input connected to the analog domain circuit of the transmission circuit, an output connected to an input of the corresponding adder, and a feedback chain connected to an output of the adder through the corresponding control unit.

Optionally, the first stage analog cancellation sub-module includes a single tap of delay and gain circuit.

Optionally, the first stage analog cancellation module includes at least one first stage analog cancellation sub-module, and the second stage analog cancellation module includes at least one second stage analog cancellation sub-module;

each of the second stage analog cancellation sub-modules is serially connected in the analog domain circuit of the reception circuit, and the inputs thereof are all connected to analog domain circuits of the transmission circuit; and one second stage analog cancellation sub-module includes: at least one tunable delay unit, at least one component signal fitting unit, a down converter, an amplifier, a first adder, and a second adder;

an input of each tunable delay unit is connected to an analog domain circuit of the transmission circuit, and an output thereof is connected to an input of the corresponding component signal fitting unit;

an output of each component signal fitting unit is connected to each input of the second adder;

an output of the second adder is connected to an input of the first adder of the second stage analog cancellation sub-module through an amplifier;

another input of the first adder of the second stage analog cancellation sub-module, is connected to the output of the first adder of the preceding second stage analog cancellation sub-module, or the output of the adder of the last first stage analog cancellation sub-module; the output of the first adder of the second stage analog cancellation sub-module is connected to the other input of each component signal fitting unit through a down converter.

Optionally, the tunable delay unit includes a multi-tap delay adjustable and gain adjustable circuit;

the multi-tap delay adjustable and gain adjustable circuit includes: a certain number of first delay line circuits with a first delay amount and second delay line circuits with a second delay amount, a delay selection on-off-switch, and a tunable gain module;

each of the first delay line circuits is connected in series;

an output of each first delay line circuit is connected to an input of a corresponding second delay line circuit;

the outputs of each of the first delay line circuits and second delay line circuit are respectively connected to each input of the delay selection on-off-switch;

the output of the delay selection on-off-switch is optionally connected to one of inputs thereof, and the output is connected to the input of the tunable gain module.

Optionally, the component signal fitting unit includes: a down converter, a conjugator, an iteration step size calculator, a first multiplier, an integrator, a second multiplier, a weighting coefficient updater, a register, a vector modulator;

the input of the down converter is connected to the output of the tunable delay unit, and the output thereof is connected to the input of the conjugator and one input of the iteration step size calculator;

one output of the conjugator is connected to another input of the iteration step size calculator;

two inputs of the first multiplier are respectively connected to another output of the conjugator and the baseband error signal end, and the output thereof is connected to the first input of the second multiplier through the integrator;

the other input of the second multiplier is connected to the output of the iteration step size calculator, and the output thereof is connected to one input of the vector modulator through the weighting coefficient updater;

the weighting coefficient updater is connected to the register;

another input of the vector modulator is connected to the input of the tunable delay unit, and the output thereof is configured to be the output of the component signal fitting unit.

Optionally, the full-duplex transceiver of the embodiment of the present application further includes: a digital cancellation module.

The digital cancellation module is connected to the transmission circuit and the digital domain circuit of the reception circuit, for performing digital cancellation on the residual self-interference signal after the analog cancellation in the received signal according to the transmitting signal.

Optionally, an auxiliary radio frequency link includes: mixers connected in sequence, a low pass filter, and an analog-to-digital conversion unit;

the input of the mixer is connected to the analog domain circuit of the transmission circuit;

the output of the analog-to-digital conversion unit is connected to a digital cancellation module.

Optionally, the full-duplex transceiver of the embodiment of the present application further includes: a pre-equalization module.

The pre-equalization module is connected to the digital domain circuit of the transmission circuit and the digital cancellation module;

the pre-equalization module includes a connected I/Q imbalance estimation unit and a pre-equalization unit, for mitigating I/Q imbalance.

Optionally, the input of the I/Q imbalance estimation unit is connected to the output of the channel estimation unit in the digital cancellation module, and the output thereof is connected to one input of the pre-equalization unit;

the pre-equalization unit is serially connected in the digital domain circuit of the transmission circuit, for performing I/Q based balance compensation on the digital signal to be transmitted according to the estimated I/Q balance information.

Optionally, the full-duplex transceiver of the embodiment of the present application further includes: an on-off-switch device.

The on-off-switch device is connected to the pre-equalization module, for dynamically activating or deactivating the pre-equalization module according to the estimation of the I/Q imbalance;

optionally, the on-off-switch device is connected to the first stage analog cancellation unit in the analog cancellation module, for activating or deactivating the first stage analog cancellation unit according to the average intensity of the signal input to the analog cancellation module.

Optionally, the digital cancellation module includes: a digital beam forming unit; and where the full-duplex transceiver of the present application further includes: a digital pre-cancellation module.

The digital pre-cancellation module is connected in the digital domain circuit of the transmission circuit.

The digital pre-cancellation module includes a connected MAC (Media Access Control/Medium Access Control) layer processing unit and a transmitter baseband signal processing unit; the MAC layer processing unit includes a spreading code/scrambling code allocation subunit; and the transmitter baseband signal processing unit includes a spreading/scrambling subunit and a transmitting beam forming subunit;

one input of a channel estimation unit is connected to the transmitter baseband signal processing unit via a digital beam forming unit.

Optionally, the full-duplex transceiver of the present application further includes: a pre-distortion module.

The pre-distortion module is connected to the digital domain circuit and the analog domain circuit of the transmission circuit.

The pre-distortion module includes a connected pre-distortion estimation unit and a pre-distortion unit.

Optionally, the pre-distortion estimating unit has an input connected to an output of the power amplifier in the analog domain circuit of the transmission circuit, and an output connected to the input of the pre-distortion unit for performing offline estimation on nonlinear component of the power amplifier in the transmission circuit;

the pre-distortion unit has an output connected to the digital domain circuit of the transmission circuit, for pre-processing the transmitted signal to be transmitted according to the result of the offline estimation, such that the nonlinear component generated by the processed transmitted signal after passing through the power amplifier is reduced to a specified level.

Optionally, in the full-duplex transceiver of the present application, for any two pairs of transmission circuits and reception circuits, the analog cancellation module of one pair of transmission circuits and reception circuits is consistent or different with the analog cancellation module of another pair of transmission circuits and reception circuits.

Optionally, in the full-duplex transceiver of the present application, for any two pairs of transmission circuits and reception circuits, the digital cancellation module of one pair of transmission circuits and reception circuits is consistent or different with the digital cancellation module of another pair of transmission circuits and reception circuits.

Optionally, in the full-duplex transceiver of the present application, the analog cancellation module is connected between transmitting antenna ports of different transmission circuit and the receiving antenna port of the same reception circuit, and performs serial cancellation on self-interference signals of different transmitting antenna ports, according to the strength of the self-interference signals from different transmitting antenna ports to the receiving antenna port.

Optionally, in the full-duplex transceiver of the present application, in different transmitting antenna ports, the transmitting antenna port in the first part and the same receiving antenna port are arranged in the same antenna array element; other transmitting antenna ports except the first part are arranged in other antenna array elements;

the polarization direction of the transmitting antenna port of the first part located in the same antenna array element is different from the polarization direction of the receiving antenna port;

the analog cancellation module is configured to first cancel self-interference signals from the transmitting antenna port in the first part, and then cancel self-interference signals from other transmitting antenna ports.

Optionally, the input of the second stage analog cancellation unit in the analog cancellation module is connected to a plurality of transmitting antenna ports, for receiving superimposed signals of the self-interference signals from the plurality of transmitting antenna ports.

Optionally, the full-duplex transceiver provided by the application further includes: a passive suppression module.

The transmitting antenna port, the analog domain circuit, and the digital domain circuit in the transmission circuit are sequentially connected.

The receiving antenna port, the analog domain circuit, and the digital domain circuit in the reception circuit are sequentially connected.

For any pair of transmission circuits and reception circuits, the passive suppression module is connected to the transmitting antenna port and the receiving antenna port, for suppressing original self-interference signals in the received signals sharing the same time-and-frequency resource, according to the transmitting signal.

The analog cancellation module is connected to the analog domain circuit of the reception circuit and the transmission circuit, for performing analog cancellation on self-interference signals after suppression in the received signal according to the transmitting signal.

Optionally, the passive suppression module includes at least one of the followings: a circulator, a dual-polarized and physical isolated antenna and a multi-antenna which performs cancellation superposition based on the transmitting signal.

Optionally, in the full-duplex transceiver of the present application, for any two pairs of transmission circuits and reception circuits, the passive suppression module of one pair of transmission circuit and reception circuit is consistent or different with the passive suppression module of another pair of transmission circuit and reception circuit.

Compared with the prior art, the full-duplex transceiver of the embodiment of the present application may better suppress self-interference from the transmitting antenna port to the receiving antenna port in the same device caused by full-duplex communication, provide more flexible full-duplex transceiver implementations, which are more widely available, thereby enabling more users to choose and obtain a custom full-duplex transceiver that is suitable for their own, achieving a reasonable compromise between self-interference suppression performance and implementation complexity of the full-duplex transceiver.

Embodiment VII

Based on the same inventive concept, the embodiment of the present application provides an electronic apparatus, which includes the full-duplex transceiver provided by the foregoing embodiments of the present application. Optionally, the electronic apparatus is a terminal equipment or a base station.

The technical effects of the embodiment of the present application are consistent with the technical effects of Embodiment V to VI, and will not be described herein.

Embodiment VIII

The embodiment of the present application provides another possible implementation. On the basis of the Embodiment V or Embodiment VI, the full-duplex transceiver shown in Embodiment VIII is further included.

A full-duplex transceiver introduced in Embodiment VIII adds other interference suppression or cancellation modules, such as a pure analog domain cancellation module and/or a digital pre-equalization module, to achieve a better interference cancellation performance on the receiving end, based on the digitally assisted analog cancellation technology. The principle of digital auxiliary analog cancellation unit technology will be introduced later. The unit models and reconstructs linear and nonlinear components of self-interference signals in the digital domain, and deletes the reconstructed interference signals in the analog domain of the receiving end.

The full-duplex transceiver of Embodiment VIII of the present application is a selection of some modules and the like of the full-duplex transceiver of the foregoing embodiments of the present application, including at least one of simplification, specification, and some additional supplements.

The first implementation in Embodiment VIII of the present application is described below. In the first implementation, the analog cancellation module only utilizes the digitally assisted analog cancellation sub-module. The first implementation includes: a first example that does not include a pre-equalization module, and a second example that includes a pre-equalization module.

Figure 36:
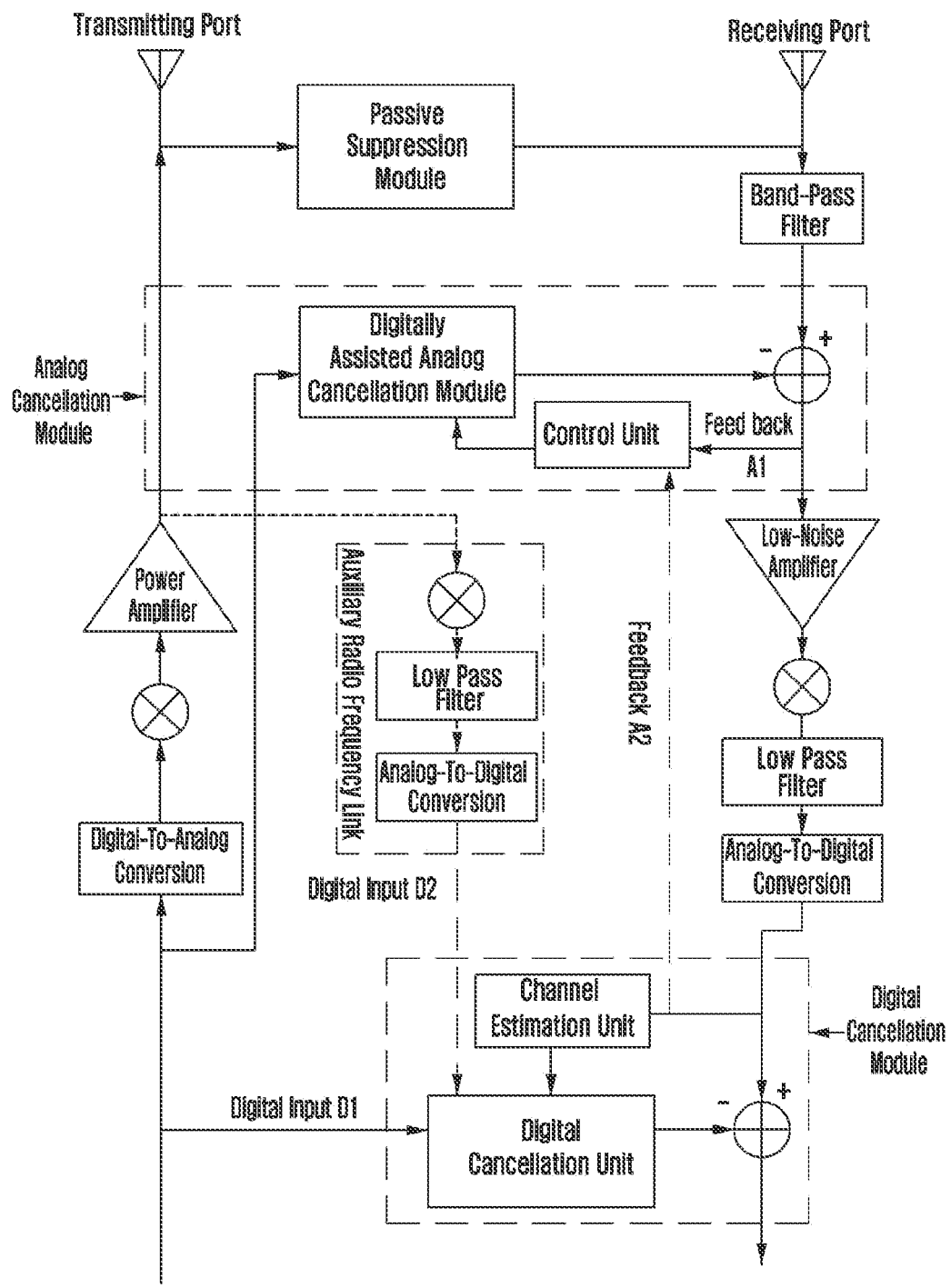
FIG. 36 is a schematic structural diagram showing a first example of a first implementation of a full-duplex transceiver according to Embodiment VIII of the present application.

FIG. 36 is a schematic structural diagram of a first example of a first implementation of a full-duplex transceiver according to Embodiment VIII of the present application;

As shown in FIG. 36, in the first example of Embodiment VIII of the present application, at least one transmission circuit and reception circuit are respectively simplified to one transmission circuit and reception circuit; the analog cancellation module is simplified to that only includes a digitally assisted analog cancellation sub-module, and at least one digitally assisted analog cancellation sub-module is simplified to one digitally assisted analog cancellation sub-module.

The transmitting antenna port in the transmission circuit is embodied as the transmitting port in FIG. 36; the analog domain circuit in the transmission circuit is embodied as a digital-to-analog conversion (unit), a mixer (i.e., the circle with multiplication sign X), and a power amplifier in series in FIG. 36, the output of the power amplifier is connected to the transmitting port; and, the input of the digital-to-analog conversion (unit) is connected to the digital domain circuit in the transmission circuit.

The receiving antenna port in the reception circuit is embodied as the receiving port in FIG. 36; the analog domain circuit in the reception circuit includes a band-pass filter, a low-noise amplifier, a mixer, a low-pass filter, and an analog-to-digital conversion (unit) in series in FIG. 36, which the input of the band-pass filter is connected the receiving port; and, the output of the analog-to-digital conversion (unit) is connected to the digital domain circuit in the reception circuit.

The full-duplex device receiver solution is shown in FIG. 36, and includes a passive suppression module, an analog cancellation module, and a digital cancellation module, wherein the analog cancellation module includes at least a digital auxiliary analog cancellation unit. The implementation circuit of this solution is relatively simple, and may achieve a better self-interference cancellation effect under premise of low receiver complexity.

Optionally, the passive suppression module of the embodiment of the present application may adopt various implementations, including at least one of the following: a circulator, a dual-polarized and physically isolated antenna, and a multi-antenna that performs cancellation superposition based on the transmitting signal.

The working principle of the passive suppression module is described below.

The passive suppression method utilizes physical isolation or dual polarization isolation of the antenna, or cancellation superposition of multi-antenna transmitting signals to reduce the intensity of self-interference signals reaching the receiving antenna, thereby suppressing self-interference. There are many ways to implement passive suppression.

Figure 37A:
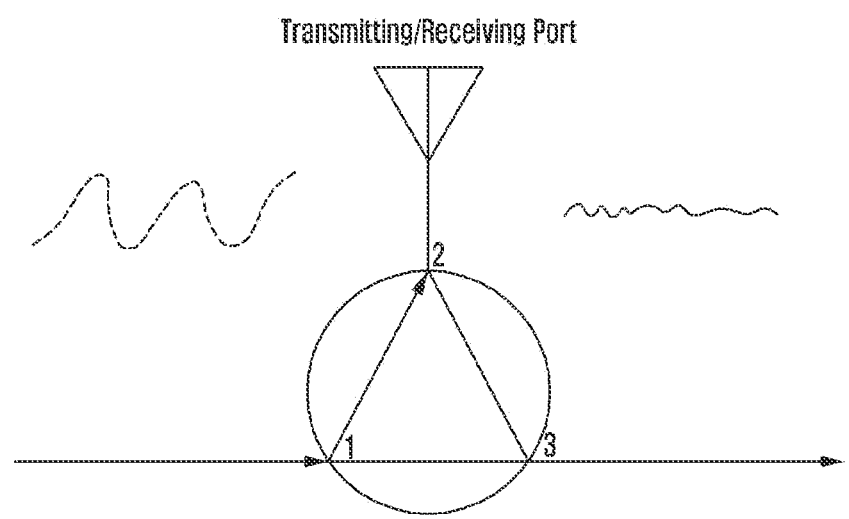
FIG. 37a is a schematic diagram showing the structure and principle of a passive suppression based on a circulator according to an embodiment of the present application.

FIG. 37a provides a method for passive suppression based on a circulator, and the circulator has three ports, wherein the transmitting signal is transmitted through port 1 to port 2, the received signal is received by port 2 to port 3, and the circulator suppresses self-interference through a signal leaked from port 1 to port 3.

Figure 37B:
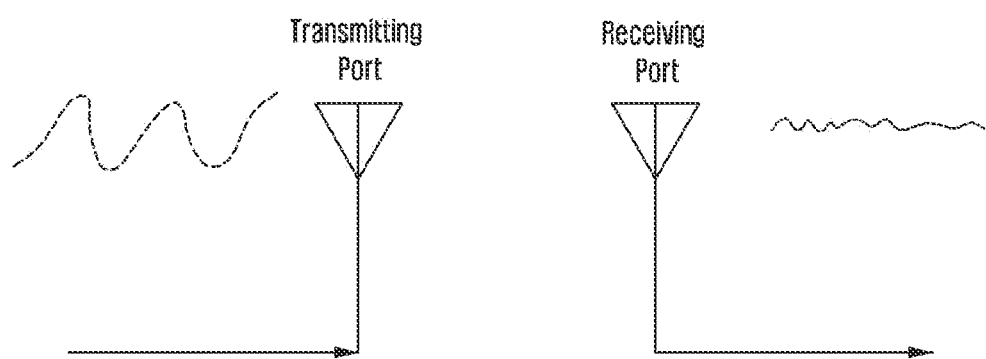
FIG. 37b is a schematic diagram showing the structure and principle of passive suppression based on antenna dual polarization and physical isolation according to an embodiment of the present application.

FIG. 37b provides a passive suppression solution based on antenna dual polarization and physical isolation. In this figure, the transmitting port and the receiving port adopt different polarization directions and are separated by a certain distance, such that the transmitting signal arriving at the receiving port is reduced due to a different polarization direction from the receiving port and path loss.

Figure 38:
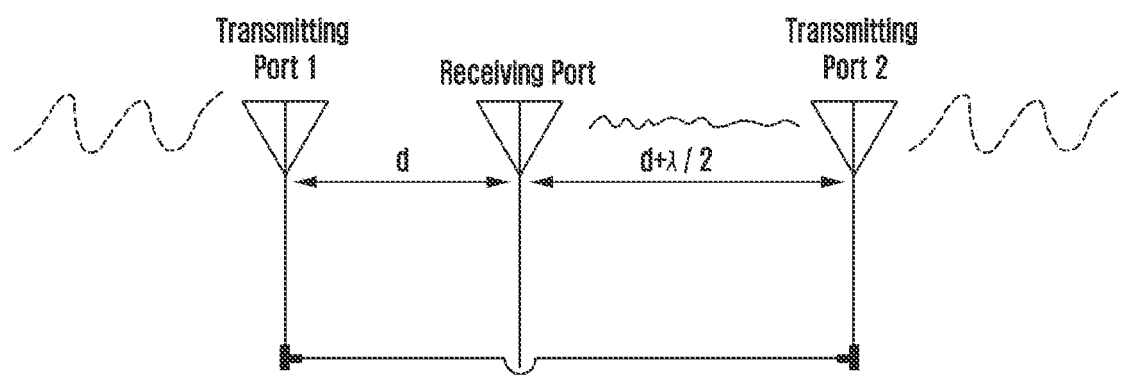
FIG. 38 is a schematic diagram showing the structure and principle of passive suppression based on cancellation superposition of multi-antenna transmitting signals according to an embodiment of the present application.

FIG. 38 provides a method for passive suppression based on cancellation superposition of multi-antenna transmitting signals, and there are two transmitting ports and one receiving port in the figure, wherein, the distance from the transmitting port 1 or the transmitting port 2 to the receiving port is d or d+λ/2 (λ is the signal wavelength), and the two transmitting signals received by the receiving port may be subjected to reversed phase cancellation by simultaneously transmitting the same signal to the two transmitting ports.

The working principle of analog cancellation module is described hereafter, that is, the principle of the method for analogously cancelling the self-interference signal.

The method for analog cancellation includes performing cancellation on self-interference signals in the analog domain (i.e., the analog domain circuit before analog-to-digital conversion) of the receiving link.

In the first implementation, analog cancellation obtains different delay copies of the transmitting signal through one or more delay circuits, and then iteratively adjusts the gain coefficients of the different delay copies through the control circuit, such that the superimposed signal approximates the self-interference signal, thereby canceling self-interference by subtracting the superimposed signal from the received signal. The analog cancellation may be divided into pure analog domain cancellation and digitally assisted analog cancellation according to whether the input of the delay circuit is an analog domain signal or a digital domain signal.

Figure 39:
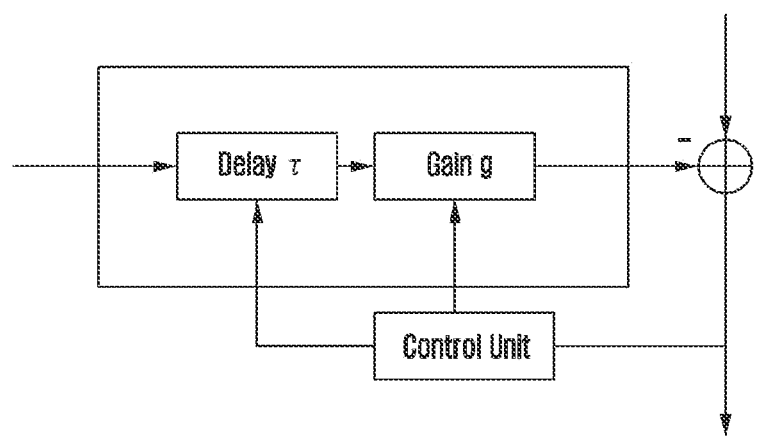
FIG. 39 is a schematic diagram showing principles of an implementing structure of pure analog domain cancellation according to an embodiment of the present application.

FIG. 39 provides an exemplary implementation method for pure analog domain cancellation, consisting of a delay and gain controllable link, and the control unit iteratively adjusts the delay and gain of the link based on the feedback signal strength, such that the signal strength is below a certain level after the unit canceling self-interference.

Figure 40:
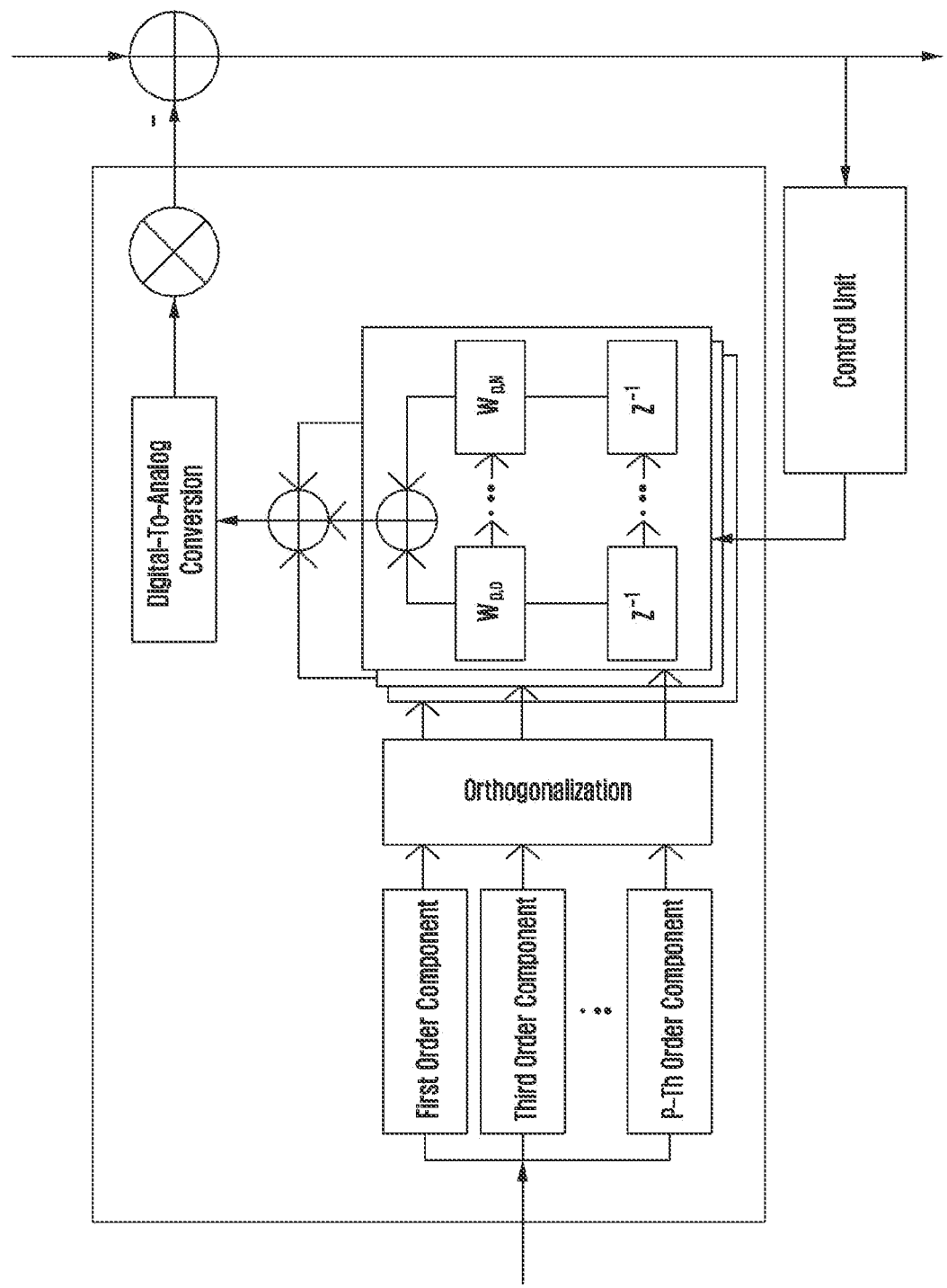
FIG. 40 is a schematic diagram showing principles of an implementing structure of digitally assisted analog cancellation according to an embodiment of the present application.

The digital assisted analog cancellation utilizes digital domain symbols of the transmitting link, reconstructs the linear and nonlinear components present in the received signal in the digital domain, and then converts the reconstructed digital domain signal to analog domain, which is converted to a radio frequency signal by up-conversion, and after phase inversion, added with the received signal to canceling self-interference. FIG. 40 provides a specific implementation circuit. First, the odd-order (1, 3, . . . , P, the highest-order P is determined according to the actual link nonlinear characteristic) components of the transmitted symbol are generated in the digital domain, then these components are orthogonalized, and each component of the orthogonalized output passes through a tap delay line circuit respectively. The output signals of all the tap delay line circuits are superimposed and converted to analog domain by digital-to-analog conversion, and after up-conversion and phase reversion, then added to the received signal. The tap order of the tap delay line circuits may be designed according to actual channels, and a higher order may be used when the actual number of channel paths and delay is large, otherwise, a lesser order being used.

Optionally, the digitally assisted analog cancellation sub-module includes: a digitally assisted analog cancellation unit, a corresponding control unit and an adder.

The adder of the digitally assisted analog cancellation sub-module is sequentially connected in series to an analog domain circuit of the reception circuit.

The digitally assisted analog cancellation unit has an input connected to a digital domain circuit of the transmission circuit (receiving digital domain data, symbols or signals) for performing analog cancellation on the self-interference signal after suppressed by the passive suppression module, according to digital transmitting signal (i.e., digital domain data, symbols or signals of the transmission circuit) and the feedback signal from the corresponding adder.

The output of the digitally assisted analog cancellation unit is connected to an input of the corresponding adder, and the feedback chain is connected to the output of the adder through a corresponding control unit. Alternatively, the feedback chain of the digitally assisted analog cancellation unit is connected to the digital domain circuit in the reception circuit through a corresponding control unit.

The digitally assisted analog cancellation unit is for performing analog cancellation on the self-interference signal after suppressed by the passive suppression module according to the digital transmitting signal (i.e., the digital domain data, symbols or signals of the transmission circuit) and the feedback signal from the digital domain circuit in the reception circuit.

Specifically, the digitally assisted analog cancellation unit in the analog cancellation module may adopt an implementation as shown in FIG. 40. The gain of each tap in the digitally assisted analog cancellation unit is adjusted by the control unit based on the feedback signal. The control unit iteratively updates parameters of each tap based on the feedback signal until that the feedback signal strength of the feedback is below a certain threshold or that the feedback signal to interference plus noise ratio is above a certain threshold.

Preferably, the feedback signal is from one of the following: feedbacking from the radio frequency end (after the adder, before the low-noise amplifier, as shown by feedback A1 in FIG. 36), or feedbacking from the digital domain (after the analog-to-digital conversion module, as shown by feedback A2 in FIG. 36).

In particular, when the feedback signal is fed back from the radio frequency end, the physical meaning of the feedback signal may be the signal strength. In particular, when the feedback signal is fed back from the digital end, the physical meaning of the feedback signal may be signal strength or signal to interference plus noise ratio. Different feedback signal sources will affect the iteration convergence speed of the tap gain in the digitally assisted analog cancellation unit and the performance of the digital analog cancellation unit on self-interference cancellation. Generally, the convergence speed based on radio frequency end feedback is faster than the convergence speed of digital end feedback, but the self-interference cancellation performance is relatively poor.

The following describes the working principle of the digital cancellation module, that is, the digital cancellation method for the self-interference signal.

The digital cancellation method performs canceling the self-interference signal in the digital domain (i.e., after analog-to-digital conversion) at the receiving end. The digital cancellation method estimates the self-interfering channel by using known transmitting symbols, then reconstructs the self-interfering signal based on the estimated channel, and subtracts the reconstructed self-interference signal from the received digital domain signal. The known transmitting symbol may be a pilot symbol or a transmitted data symbol; or may be a symbol fed back by the auxiliary link. The estimation of the digital self-interference channel includes the channel estimation of the linear component and the channel estimation of the nonlinear component. The system may choose to estimate the linear component first, and then estimate the nonlinear component after subtracting the estimated linear component from the received signal, or may jointly estimate the linear component and the nonlinear component, wherein the estimation method may be adopted as the least mean square and the like.

Alternatively, the digital cancellation module may utilize any digital cancellation technique in the prior art, for example by estimating the self-interfering channel and then reconstructing the self-interference signal. It should be noted that the symbol used for the digital domain channel estimation may be a pilot symbol, or a transmitted data symbol, as represented by the digital input D1 in FIG. 40; or may be a symbol fed back by the auxiliary link, as shown by the digital input D2 in FIG. 40. Comparing the two manners, the digital input D1-based method does not require additional circuitry, but the accuracy of the estimation is worse than that based on the digital input D2.

Figure 41:
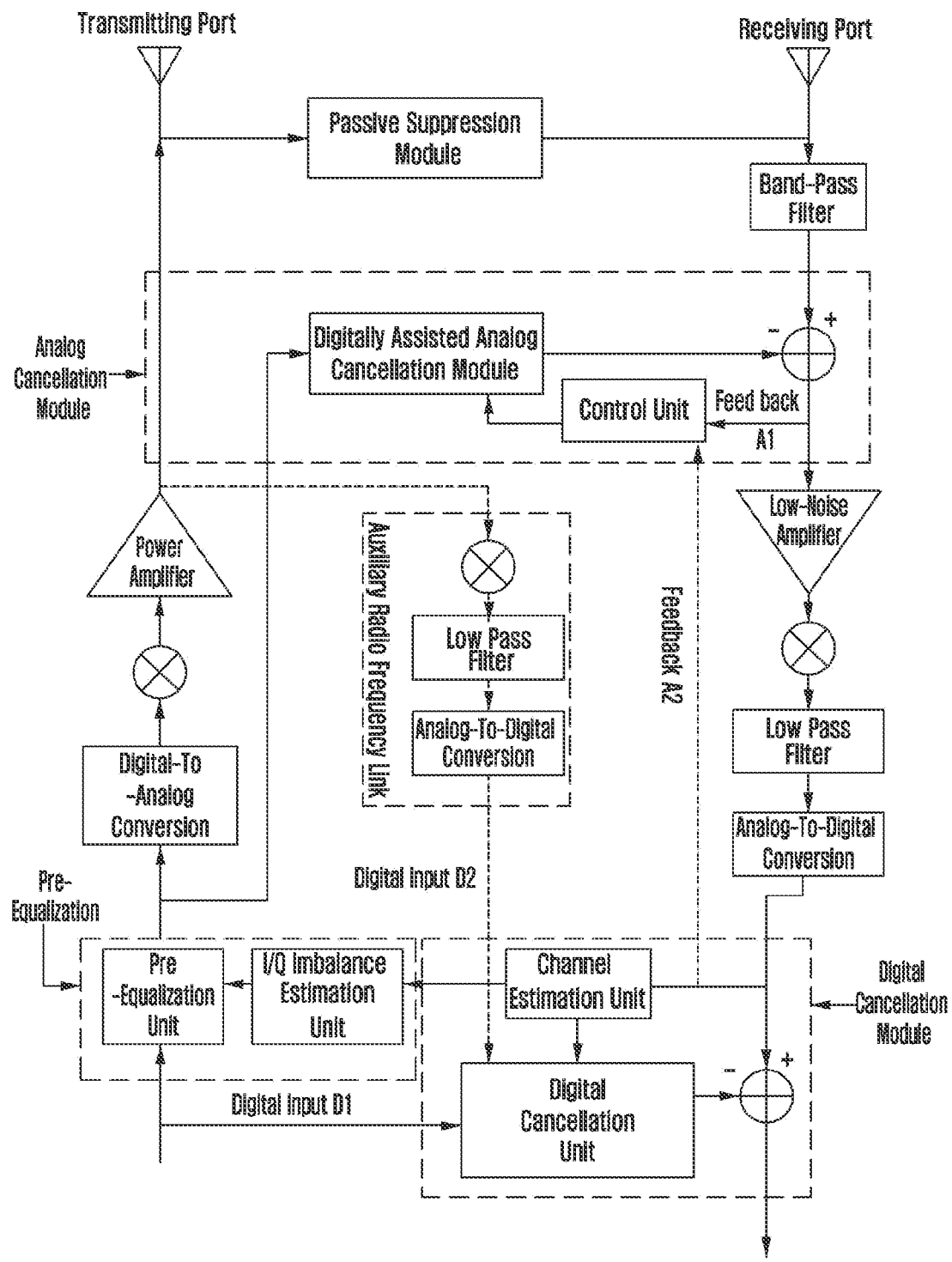
FIG. 41 is a schematic structural diagram showing a second example of a first implementation of a full-duplex transceiver according to Embodiment VIII of the present application.

FIG. 41 is a schematic structural diagram of a second example of a first implementation of a full-duplex transceiver according to Embodiment VIII of the present application;

The second example is based on the first example shown in FIG. 40, and the digital domain of the transmitting link may also be added with a pre-equalization module.

Optionally, the pre-equalization module includes an I/Q imbalance estimation unit and a pre-equalization unit.

The input of the I/Q imbalance estimation unit is connected to the output of the channel estimation unit in the digital cancellation module, and the output thereof is connected to one input of the pre-equalization unit.

The pre-equalization unit is serially connected in the digital domain circuit of the transmission circuit for performing I/Q-based balance compensation on the digital signal to be transmitted according to the estimated I/Q imbalance information.

Specifically, as shown in FIG. 41, the pre-equalization module includes an I/Q imbalance estimation unit and a pre-equalization unit, and the estimation of the I/Q imbalance and the parameter setting of the pre-equalization unit may refer methods in the prior art. By adding a pre-equalization module on the transmitting link, this solution may effectively compensate the I/Q imbalance of the transmitting link, improve the channel estimation accuracy of the digital domain cancellation module, and thereby improve the self-interference cancellation capability of the entire receiver.

Based on the first implementation, the working process of the entire full-duplex transceiver is: at the transmitting end, the digital domain symbol is converted into an analog signal by a digital-to-analog conversion module, up-converted by a mixer, performed power amplification by a power amplifier, and finally radiated out at the transmitting port; the receiving port receives the self-interference signal after the certain suppression by the passive suppression module and the useful superimposed signal, and the superimposed signal may pass through the digitally assisted analog cancellation module consisting of the digitally assisted analog cancellation unit for further canceling self-interference signals after the superimposed signal passing through the band pass filter, wherein the output signal strength is lower than a certain threshold to ensure that the signal strength maintains in a dynamic range of the digital domain after consistently cancellation of this module; then, the residual signal is amplified by a low-noise amplifier, down-converted by a mixer, filtered by a low-pass filter, and converted into a digital domain symbol by an analog-to-digital conversion module; then, the digital cancellation module may estimate the self-interference channel based on the known signal, reconstruct the residual self-interference signal based on the estimated channel, and subtract the reconstructed self-interference signal from the received digital domain signal; and, finally, the residual signal is performed by subsequent digital field processing to demodulate the useful signal. In particular, if the transmitting end has a pre-equalization module, the digital signal is pre-equalized before the digital-to-analog conversion to compensate for the I/Q imbalance of the transmitting link, and then converted into an analog signal by the analog-to-digital conversion module to perform subsequent operations.

The second implementation of the Embodiment VIII of the present application is described below. The second implementation adds at least one first stage analog cancellation sub-module on the basis of the first implementation. The second implementation includes: a first example that does not include a pre-equalization module, and a second example that includes a pre-equalization module.

Figure 42:
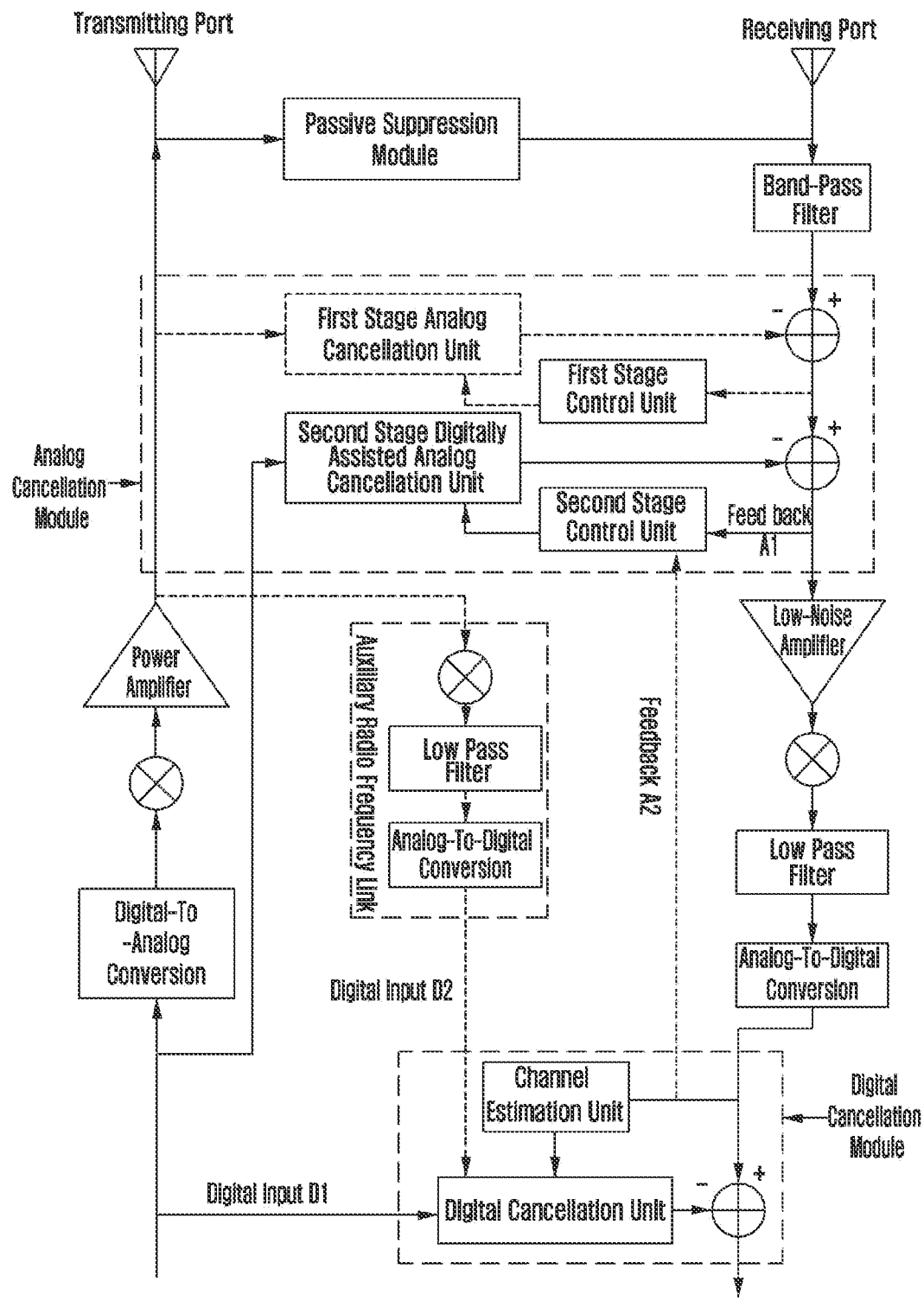
FIG. 42 is a schematic structural diagram showing a first example of a second implementation of a full-duplex transceiver according to Embodiment VIII of the present application.

FIG. 42 is a schematic structural diagram of a first example of a second implementation of a full-duplex transceiver according to Embodiment VIII of the present application; In the first example of the second implementation, at least one first stage analog cancellation sub-module is simplified to one first stage analog cancellation sub-module.

Optionally, the first stage analog cancellation sub-module is serially connected in the analog domain circuit of the reception circuit; the first stage analog cancellation sub-module is for performing analog cancellation on the main path component in the suppressed self-interference signal according to the simulated transmitting signal; where the main path is the leakage path or direct path with the strongest signal strength.

Optionally, the first-level analog cancellation sub-module comprises: an analog cancellation unit, a corresponding control unit, and an adder.

The corresponding adder of each first stage analog cancellation sub-module is serially connected in the analog domain circuit of the reception circuit, and the output of the adder is connected to the input of the adder of the next first stage analog cancellation sub-module or the input of the adder of the first digitally assisted analog cancellation sub-module.

The first stage analog cancellation unit has an input connected to the analog domain circuit of the transmission circuit, an output connected to an input of the corresponding adder, and a feedback chain connected to the output of the adder through a corresponding control unit.

Specifically, the full-duplex device transceiver solution is as shown in FIG. 42, and includes a passive suppression module, an analog cancellation module, and a digital cancellation module, wherein the analog cancellation module is consisted of the first stage analog cancellation unit and its control unit, and the second stage digitally assisted cancellation unit and its control unit, cascadingly. This solution utilizes two stages analog cancellation and has a stronger capability of analog domain self-interference cancellation.

The function and specific implementation of the passive suppression module are consistent with those of the first implementation, and are not described herein again. The first stage analog cancellation unit in the analog cancellation module is mainly configured to cancel self-interference caused by the strongest leakage path or direct path. Since the channel change of the path is relatively slow, the parameters of the first stage analog cancellation unit may be updated at a relatively low frequency. The first-order analog cancellation unit cancels the self-interference caused by the strongest leakage path or direct path. The two-level digital auxiliary analog cancellation unit may achieve faster convergence speed and achieve higher self-interference cancellation performance.

Specifically, the first stage analog cancellation sub-module includes a single tap of delay and gain circuit. Alternatively, the first stage analog cancellation unit may utilize a single tap of delay and gain circuit as shown in FIG. 39.

Figure 43:
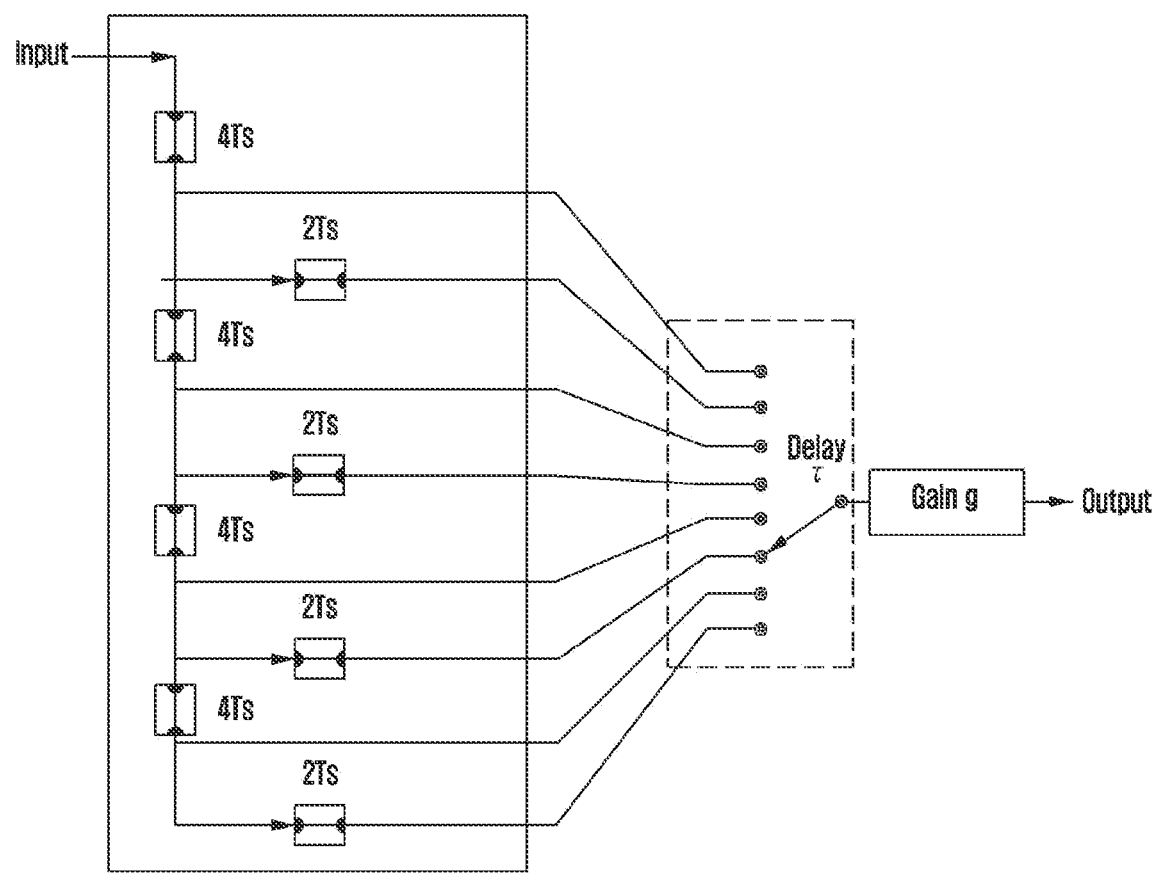
FIG. 43 is a schematic diagram showing a specific implementation of a single-path delay and gain adjustable circuit according to an embodiment of the present application.

When four 4 $T_s$ first delay line circuits and four 2 $T_s$ low delay lines are used in the single tap of delay adjustable and gain adjustable circuit, the single path delay gain adjustable circuit is specifically implemented as an implementation shown in FIG. 43. For example, the circuit shown in FIG. 43, consists of four $4T_s$ delay lines, four $2T_s$ delay lines, an 8-selected delay selection switch and a tunable gain module, which eight different delays (4 $T_s$, 6$T_s$, ..., 18$T_s$) may be realized by selection of the delay on-off-switch. Eight different delays. It should be noted that the circuit of FIG. 43 is only one implementation of FIG. 39, and other delay gain adjustable circuits may also be applied to the self-interference cancellation solution.

The digitally assisted analog cancellation unit further cancels the self-interference signal based on the first stage analog cancellation unit, which the specific implementation of the unit is consistent with that of the implementation, and details are not described herein again.

The function and the specific implementation of the digital cancellation module are consistent with those of the first implementation, and are not described herein again.

Figure 44:
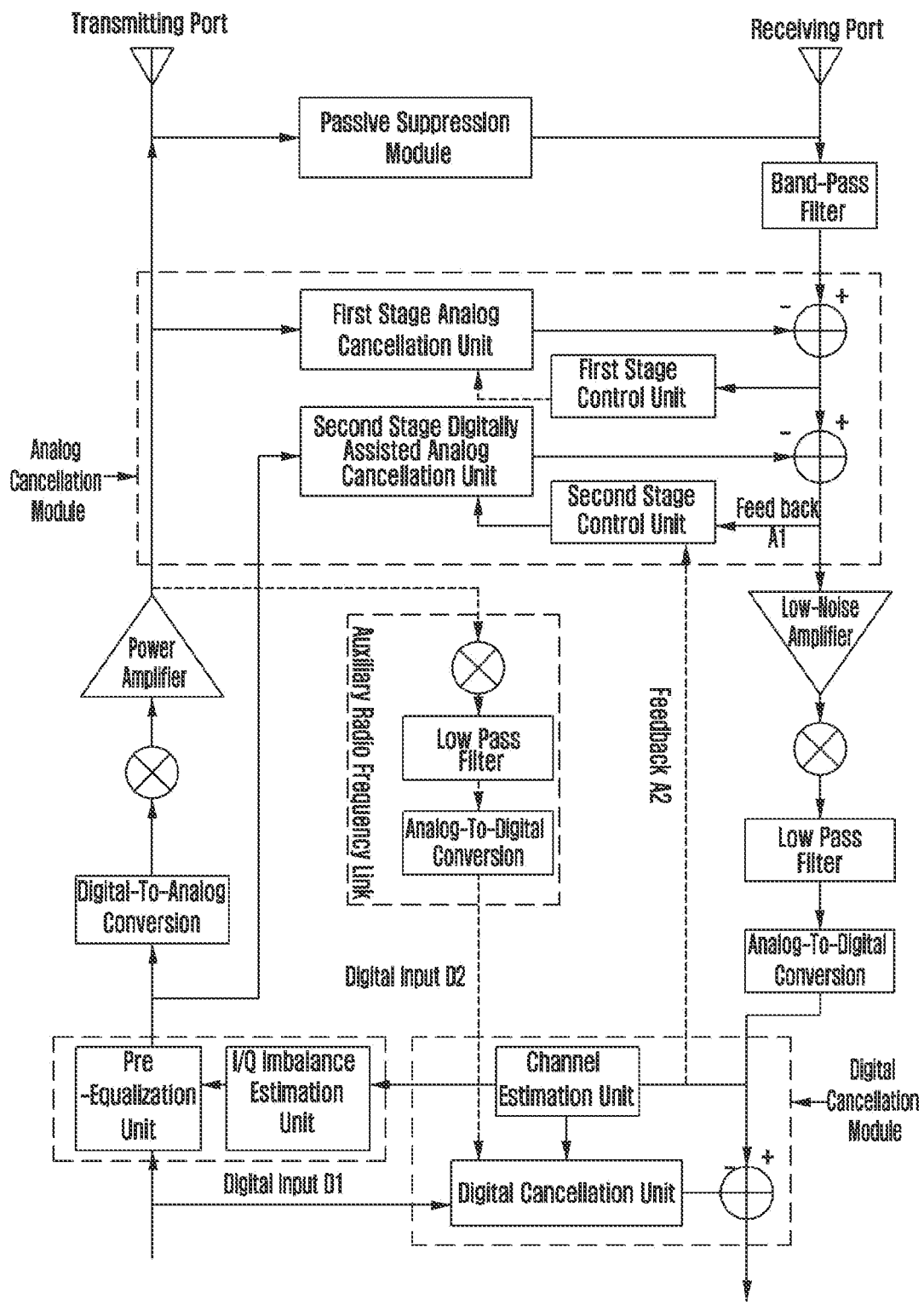
FIG. 44 is a schematic structural diagram showing a second example of a second implementation of a full-duplex transceiver according to Embodiment VIII of the present application.
Figure 56:
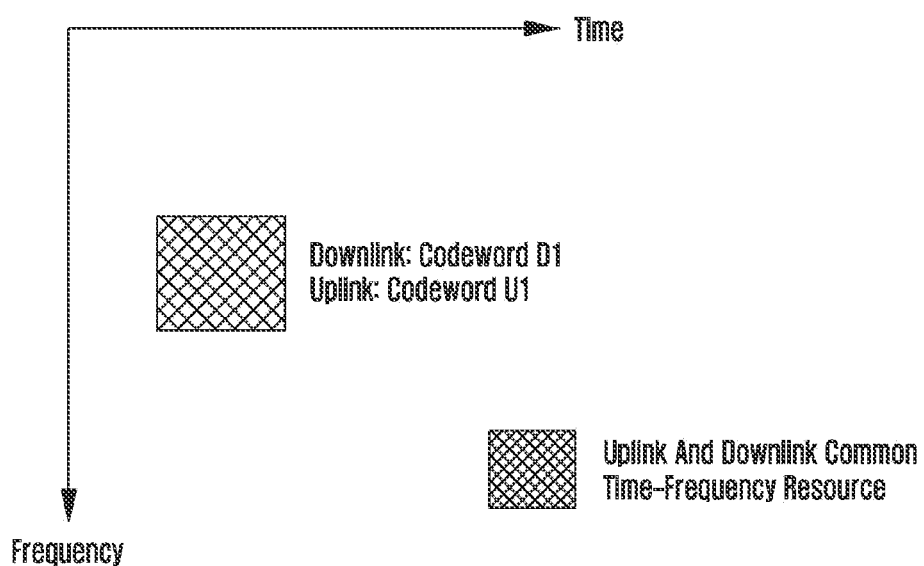
FIG. 56 is a diagram showing an example of covering uplink and downlink common time-and-frequency resource blocks by using equal-sized uplink and downlink codewords according to Embodiment XI of the present application.

FIG. 44 is a schematic structural diagram showing a second example of a second implementation of a full-duplex transceiver according to Embodiment VIII of the present application;

On the basis of the first example of the second implementation shown in FIG. 42, the digital domain of the transmitting link may be also added with a pre-equalization module, thereby forming a second example of the second implementation as shown in FIG. 56. The function and the specific implementation of the pre-equalization module are consistent with those of the first implementation, and are not described herein again.

Based on the second implementation, the working flow of the entire full-duplex transceiver is: at the transmitting end, the digital domain symbol is converted into an analog signal by a digital-to-analog conversion module, up-converted by a mixer, performed power amplification by a power amplifier, and finally radiated out at the transmitting port; the receiving port receives the self-interference signal after the certain suppression by the passive suppression module and the useful superimposed signal, and the superimposed signal may pass through the first stage analog cancellation unit for canceling self-interference signals, and then the digitally assisted analog cancellation module consisting of the digitally assisted analog cancellation unit for further canceling self-interference signals after the superimposed signal passing through the band pass filter, wherein the output signal strength is lower than a certain threshold to ensure that the signal strength maintains in a dynamic range of the digital domain; then, the residual signal is amplified by a low-noise amplifier, down-converted by a mixer, filtered by a low-pass filter, and converted into a digital domain symbol by an analog-to-digital conversion module; then, the digital cancellation module may estimate the self-interference channel based on the known signal, reconstruct the residual self-interference signal based on the estimated channel, and subtract the reconstructed self-interference signal from the received digital domain signal; and, finally, the residual signal is performed by subsequent digital field processing to demodulate the useful signal. In particular, if the transmitting end has a pre-equalization module, the digital signal is pre-equalized before the digital-to-analog conversion to compensate for the I/Q imbalance of the transmitting link, and then converted into an analog signal by the analog-to-digital conversion module to perform subsequent operations.

Optionally, the full-duplex transceiver of the embodiment of the present application further includes: an on-off-switch device;

The on-off-switch device is connected to the pre-equalization module, for dynamically activating or deactivating the pre-equalization module according to the estimation of the I/Q imbalance;

Further, the on-off-switch device is connected to the digital domain circuit of the reception circuit, for determining estimation of the I/Q imbalance according to the signal from the digital domain circuit.

Optionally, the on-off-switch device is connected to the first stage analog cancellation unit in the analog cancellation module, for activating or deactivating the first stage analog cancellation unit according to the average intensity of the signal input to the analog cancellation module.

A second example of the second implementation of the full-duplex transceiver according to the embodiment of the present application further provides a method for canceling self-interference signals:

the method provides an adaptive full-duplex device transceiver solution, and the self-interference cancellation block diagram of the solution is consistent with that of FIG. 44, and differently from the second example described in the second implementation. The pre-equalization module and the first stage analog cancellation unit in the analog cancellation module in this solution may be dynamically activated or deactivated according to the estimation of the I/Q imbalance and the signal strength input to the analog cancellation module, respectively. When the estimated transmitting link I/Q imbalance continues to be greater than a certain threshold for a period of time, the transmitting link activates the pre-equalization module; when the estimated transmitting link I/Q imbalance continues to be less than a certain threshold for a period of time, the system the pre-equalization module. Similarly, when the average signal strength input to the analog cancellation module is greater than a certain threshold for a period of time, the system activates the first stage analog cancellation unit; when the average signal strength input to the analog cancellation module is less than a certain threshold for a period of time, the system turns off the first stage analog cancellation unit. By dynamically adjusting the modules used in the link, the transceiver's power consumption may be effectively reduced while achieving optimized self-interference cancellation performance.

Specifically, it is assumed that $\alpha_1$, $\theta_1$, $\alpha_Q$, $\theta_Q$ are the estimated instantaneous amplitude, phase of the I-path of the transmitting end, estimated instantaneous amplitude and phase of the Q-path of the transmitting end, and $\alpha_{th}$, $\theta_{th}$ are thresholds of amplitude and phase imbalance, respectively, which are pre-set or configured by the system; it is assumed that β is the threshold of the signal strength input to the analog cancellation module, which is pre-set or configured by the system. When the estimated I/Q imbalance of the transmitter continues to satisfy $$\frac{\alpha_I}{\alpha_Q} > \alpha_{th}$$

and $\theta_I, \theta_Q > \theta_{th}$ for a period of time $T_1$ ($T_1$ is preset or configured by the system), I/Q imbalance The self-interference cancellation has a great influence, and at this time, the pre-equalization module is activated. Conversely, when the estimated I/Q imbalance at the $T_1$ time does not satisfy $$\frac{\alpha_I}{\alpha_Q} > \alpha_{th}$$

and $\theta_I, \theta_Q > \theta_{th}$ the I/Q imbalance has little effect on self-interference cancellation, and the pre-equalization module is turned off. Similarly, when the average signal strength input to the analog cancellation module is greater than β for a period of time $T_2$ ($T_2$ is preset or configured by the system), the first-order analog cancellation unit is activated; when the average signal strength input to the analog cancellation module is less than β in $T_2$, the first stage analog cancellation unit is turned off.

It should be noted that if there is a pre-equalization module in the link, without a first-stage analog cancellation unit, an adaptive solution based on FIG. 41 may also be designed. At this time, the dynamic adjustment of the link is limited to activation or deactivation of the pre-equalization module, and the rules adopted are consistent with the above-mentioned adaptive rules for the pre-equalization module; similarly, if there is a first stage analog cancellation unit in the link, without a pre-equalization module, the adaptive solution based on FIG. 42 may also be designed. At this time, the dynamic adjustment of the link is limited to the activation or deactivation of the first stage analog unit, and the rules adopted are consistent with the above-mentioned adaptive rules for the first stage analog cancellation unit.

Embodiment IX

The embodiment provides a method for digitally assisted analog cancellation based on a neural network. By using a neural network model in the digital domain, it is possible to better approximate non-ideal factors (non-linearity, I/Q imbalance, etc.) of the circuit; it is also convenient to simulate multipath channels in various environments by changing the number of inputs of the neural network.

Figure 45:
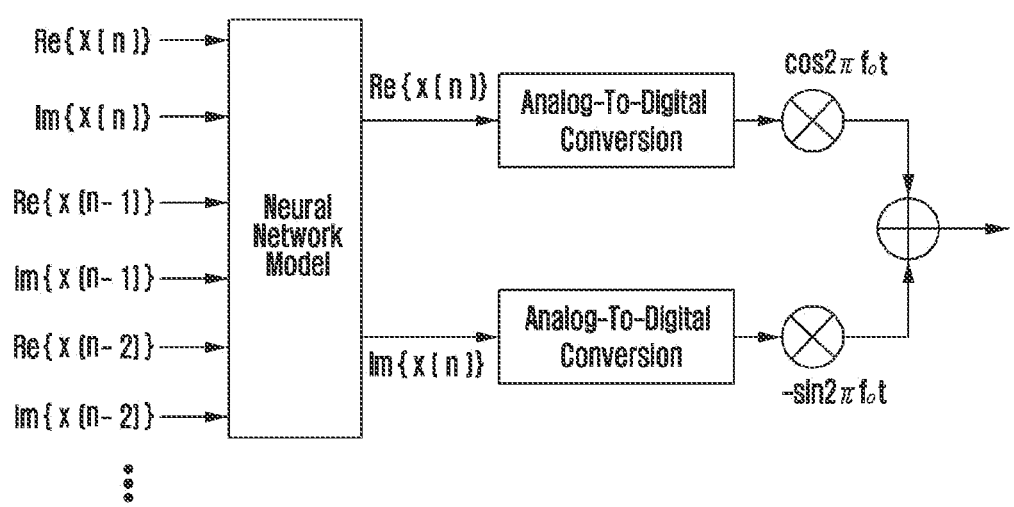
FIG. 45 is an implementing circuit of a digitally assisted analog cancellation based on a neural network according to Embodiment IX of the present application.

Specifically, a digitally assisted analog cancellation circuit based on the neural network is as shown in FIG. 45. The transmitted symbols generate output symbols in the digital domain through the neural network, which then generates an analog output signal through the digital-to-analog conversion and the up-conversion. The output signal cancels the received self-interference signal in a receiving RF domain. Wherein, the neural network model may adopt, for example, a feedforward neural network, a convolutional neural network, a recurrent neural network, etc., and the specific structure of the neural network (for example, the number of layers, the number of neurons in each layer, and an activation function of each neuron, etc.) is determined by training. The input signal of the neural network is transmitted symbols in different times, and includes at least a symbol transmitted at the current time and symbols transmitted at several previous times. Further, the inputs of the neural network may further include symbols transmitted at later times, and odd-order components of the transmitted symbols, for example, 3rd order component, 5th order component, etc. The number of input symbols is initially determined according to the time delay spread of the environment: when the time delay spread is large, the number of input symbols at different times is larger; otherwise, the number is smaller. The final number of input symbols is determined based on the results of neural network training. In addition, since the neural network only processes real signals, the real part and the imaginary part are taken as two inputs for each complex digital symbol. The output of the neural network is two real symbols, which are used as input signals of I-path and Q-path, respectively.

Figure 46:
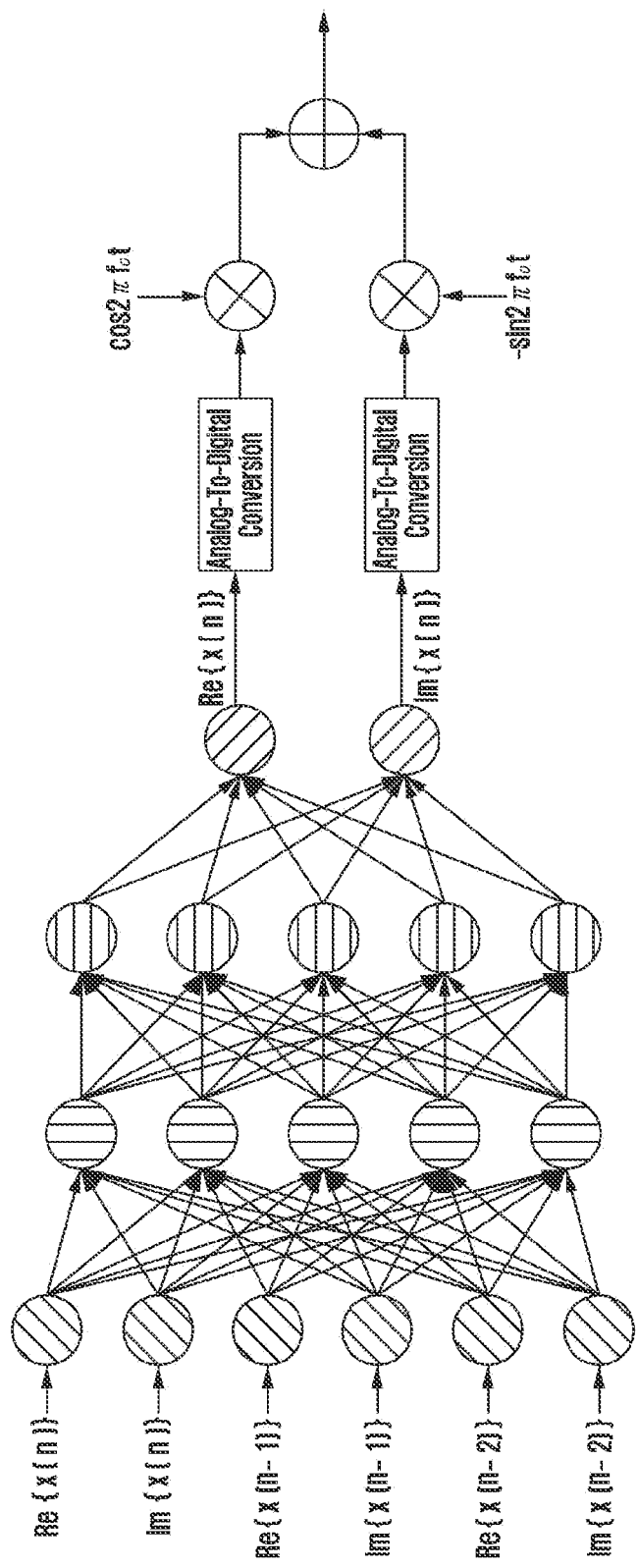
FIG. 46 is an implementing circuit of a digitally assisted analog cancellation based on a feedforward neural network according to Embodiment IX of the present application.

FIG. 46 is an example of a digitally assisted analog cancellation circuit based on a feedforward neural network. The neural network herein adopts a feedforward neural network structure, consisting of an input layer, two hidden layers, and an output layer. Wherein, the input layer has 6 inputs, which are $Re\{x(n)\}$, $Im\{x(n)\}$, $Re\{x(n-1)\}$, $Im\{x(n-1)\}$, $Re\{x(n-2)\}$, and $Im\{x(n-2)\}$, respectively, that is, the real and imaginary parts of the symbols at the current time and the two previous times, and the activation function of a neuron is an identity function, i.e., $f(x)=x$. The two hidden layers have 5 neurons respectively, and the activation function of each neuron is a rectifying linear unit ReLU, i.e., $f(x)=\max\{x, 0\}$, or an identity function $f(x)=x$, for example, the activation functions of all neurons in each layer may be set to rectifying linear units, or the activation functions of a part of the neurons in each layer are set to identity functions and the activation functions of the remaining neurons are set to rectifying linear units. The output layer has two neurons, of which the outputs are $Re\{y(n)\}$ and $Im\{y(n)\}$, respectively, and the activation function is an identity function, i.e., $f(x)=x$.

The coefficients of the neural network need to be determined by training. The labels of the training data, that is, ($Re\{y(n)\}$, $Im\{y(n)\}$) respectively take the sampling output of the I-path and Q-path of the receiving link, the labels and the symbols of the transmitting end, which serves as an input of the neural network, constitute a piece of the training data, and a plurality of the training data constitute a training set, in which the training method may adopt, for example, a random gradient descent and the like. In the specific implementation, since the received self-interference signal is strong, it may exceed the dynamic range of the analog-to-digital conversion module of the receiving link, resulting in serious distortion of the obtained label data. In order to avoid this, an attenuator may be added after the analog domain cancellation module of the receiving link and before the analog-to-digital conversion module, and attenuation is set large when obtaining the label data, to ensure that the received signal is in the dynamic range of the analog-to-digital conversion module. The label of the data for training the neural network is the sampling data at the receiving end multiplied by the reciprocal of the gain of the attenuator. During actual transmission, the gain of the attenuator is set to 1. In addition, the device may continuously update the coefficients of the neural network based on a pilot signal during transmission to better track variations of the self-interference channel.

Embodiment X

The embodiment of the present application provides another possible implementation. On the basis of Embodiment VIII or Embodiment VI, the full-duplex transceiver shown in Embodiment X is further included.

Embodiment X of the present application introduces a full-duplex transceiver. The full-duplex transceiver of Embodiment X of the present application is a preference of the above-described full-duplex transceiver of the present application, including simplification, specification and some additional supplements. The main difference between Embodiment X and Embodiment VIII is that the analog cancellation module in Embodiment X utilizes a pure analog cancellation sub-module, and no longer includes a digitally assisted analog cancellation sub-module.

Optionally, the analog cancellation module in Embodiment X includes a first stage analog cancellation sub-module and at least one second stage analog cancellation sub-module. Each of the second stage analog cancellation sub-modules is serially connected in the analog domain circuit of the reception circuit, and the inputs thereof are all connected to analog domain circuits of the transmission circuit, for performing analog cancellation on the multi-path component except the main path of the self-interfering signal after suppression according to the analog transmitting signal.

Figure 47:
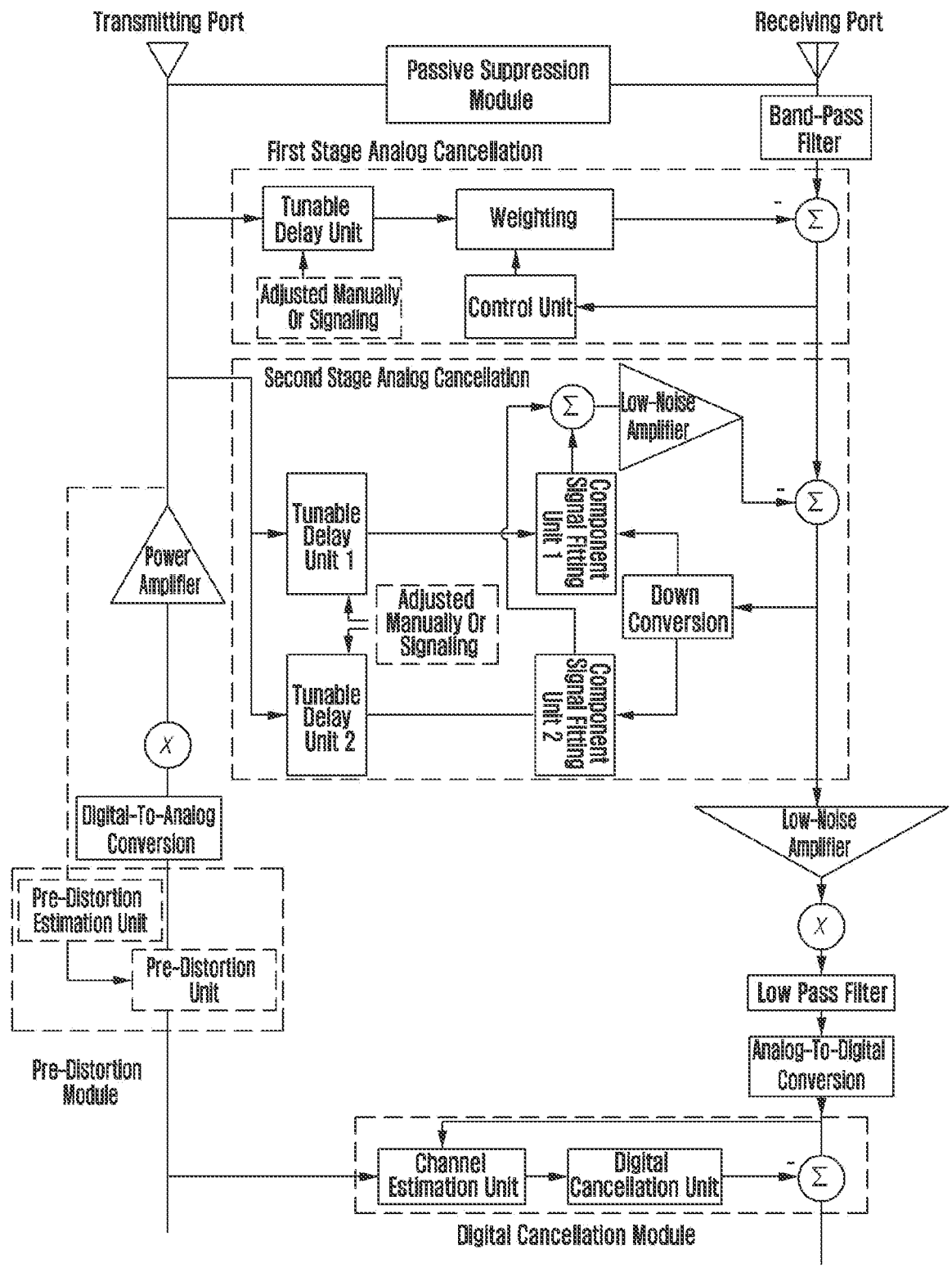
FIG. 47 is a schematic structural diagram showing an example of a first implementation of a full-duplex transceiver according to Embodiment X of the present application.

FIG. 47 is a schematic structural diagram of an example of a first implementation of a full-duplex transceiver according to Embodiment X of the present application; in an example of the first implementation of Embodiment X, the first stage analog cancellation module is the first stage analog cancellation module in FIG. 47; the at least one second stage analog cancellation sub-module is simplified to one second stage analog cancellation sub-module, and specifically to be the second stage analog cancellation module in FIG. 47; optionally, the second stage analog cancellation module in FIG. 47 is an analog-baseband assisted second stage analog cancellation module.

Optionally, a second stage analog cancellation submodule includes: at least one tunable delay unit, at least one component signal fitting unit, a down converter, an amplifier, a first adder, and a second adder;
  an input of each tunable delay unit is connected to an analog domain circuit of the transmission circuit, and an output thereof is connected to an input of the corresponding component signal fitting unit;
  an output of each component signal fitting unit is connected to each input of the second adder;
  the output of the second adder is coupled to one input of the first adder of the second stage analog cancellation sub-module through an amplifier;
  another input of the first adder of the second stage analog cancellation sub-module is connected to the output of the first adder of the preceding second stage analog cancellation sub-module or the output of the adder of the last first stage analog cancellation sub-module; the output of the first adder of the second stage analog cancellation sub-module is respectively connected to another input of each component signal fitting unit through the down converter.

Optionally, the tunable delay unit includes a multi-tap delay adjustable and gain adjustable circuit;
  the multi-tap delay adjustable and gain adjustable circuit includes: a certain number of first delay line circuits of a first delay amount and a second delay line circuits of a second delay amount, a delay selection on-off-switch, and a tunable gain module;
  each of the first delay line circuits is connected in series;
  an output of each first delay line circuits is connected to an input of a corresponding second delay line circuit;
  the outputs of each of the first delay line circuit and each second delay line circuit are respectively connected to each input of the delay selection on-off-switch;
  the output of the delay selection on-off-switch is optionally connected to one of its inputs and to the input of the tunable gain module. Specifically, this embodiment describes a full-duplex device transceiver solution that includes two-stage analog cancellation modules as shown in FIG. 47, wherein the second stage analog cancellation is analog-baseband assisted cancellation. As shown in FIG. 47, the solution may include a pre-distortion module, a passive suppression module, and a digital cancellation module in addition to the two-stage analog cancellation modules. This solution adopts two-stage analog cancellation to separate the cancellation of the main path component of the self-interference signal from the cancellation of the multi-path component, and iteratively estimates the fitting coefficient of the self-interference signal in the analog-baseband, reducing the complexity of the joint iteration and iteration time, and achieving the effect of quickly eliminating self-interference signals; that adding other modules based on two-stage analog cancellation may further improve the performance of receiver self-interference cancellation.

The function and implementation of the passive suppression module and the digital cancellation module are consistent with those of Embodiment VIII, which are not described herein again. The function of the pre-distortion module is to offline estimate the nonlinear component of the power amplifier in the transmitting link by the pre-distortion estimation unit, and pre-process the transmitting signal through the pre-distortion unit, such that the nonlinear component generated by the processed transmitting signal after passing through the power amplifier is greatly reduced.

The two-stage analog cancellation module features cascaded two-stage analog cancellation module, wherein the two-stage analog cancellation module includes a single tap of first stage analog cancellation module and a multi-tap of analog-baseband assisted second stage analog cancellation module. The specific implementation is that the first stage analog cancellation module adopts a single tap of delay line, realizes time synchronization by using a delay unit, obtains an optimal weighting coefficient through an internal control unit, and cancels the main path component of the self-interference signal; analog-baseband assisted second stage analog cancellation module adopts a two-tap delay line, realizes time synchronization of each delay line through a delay unit, iteratively obtains an optimal fitting coefficient on the delay line by its internal control unit, and cancels the multi-path component of the self-interference signal.

Specifically, the first stage analog cancellation module in the two-stage analog cancellation module is a tunable delay device, and the analog-baseband assisted second stage analog cancellation module is a tunable delay device. One implementation of the tunable delay device is to combine a plurality of fixed length delay components into a tunable delay unit having multiple gear positions. The tunable delay value may be adjusted manually or by signaling. A specific implementation may be that the delay amount of the first stage analog cancellation module may be manually adjusted offline, and the delay amount of the analog-baseband assisted second stage analog cancellation module may be selected by signaling. A specific implementation of selecting a tunable delay value by signaling is an 8-gear tunable delay unit in Embodiment VIII, consisting of four delay lines with delay line amount of $4T_s$ and four short delay lines with delay line amount of $2\ T_s$, which is totally composed of 8 gears, and the corresponding selectable delay amounts are 4 $T_s$, 6 $T_s$, 8 $T_s$, 10 $T_s$, 12 $T_s$, 14 $T_s$, 16 $T_s$, and 18 $T_s$, wherein $T_s$ being as the sampling interval; the values of TDI (Time Delay Indicator), from 0 to 7, correspond to 8 delay amounts, respectively. The base station may periodically configure subframes for a number of non-scheduling users for self-interference channel estimation, select a quantization delay amount of the power secondary strength and the secondary strong diameter as the signaling TDI to be send to the PHY (PHYsical, physical) according to the estimation, and indicate the delay of the two delay lines. Taking the m-th delay line of the $n^{th}$ data block as an example (if the synchronization mode of the first stage analog cancellation module is manual adjustment, then m=1 or 2, and if the synchronization mode of the first stage analog cancellation module is signaling selection, then m=1, 2 or 3), so that the radio frequency output signal of the transmitting link power amplifier is $x^{(n)}(t)$, assuming that the TDI obtained last time in the subframe of the non-scheduling user is $QTD_m^{(n)}$, the delay amount corresponding thereto is $\tau_m$, and the output of the tunable delay unit on the m-th delay line is $x_m^{(n)}(t-\tau_m)$, where QTD is abbreviation of Quantized Time Delay.

The analog-baseband assisted second stage analog cancellation module may utilize the component fitting technology, and the specific implementation is: the analog-baseband assisted second stage analog cancellation module performs, in the analog-baseband, multi-path signal cancellation on the self-interference signal of which the main path component having been canceled. The analog-baseband assisted second stage analog cancellation module is internally composed of a tunable delay unit, a component signal fitting unit, a down-conversion unit, an adder, and a low-noise amplifier.

The tunable delay unit realizes time synchronization of the transmitting signal and the self-interference signal, the time-synchronized transmitting signal and the received signal pass through the component signal fitting unit to obtain a fitting signal of the second strong path and the third strong path which is weaker than the second strong path of the self-interference signal, which passes through the adder and the low-noise amplifier, and subtracts from the self-interference signal of which the main path component having been canceled, and the canceled residual signal is fed back to this module for self-interference signal cancellation of next data block.

The component fitting technology features that the weighting coefficient of the delay line in the analog-baseband domain is iterated, and the fitting of the component signal of the corresponding delay amount in the self-interference signal is completed, and the fitting signal is used as the output of the unit, input to the adder and subtracted from the received signal at the receiving end to complete the multi-path component cancellation.

Figure 48:
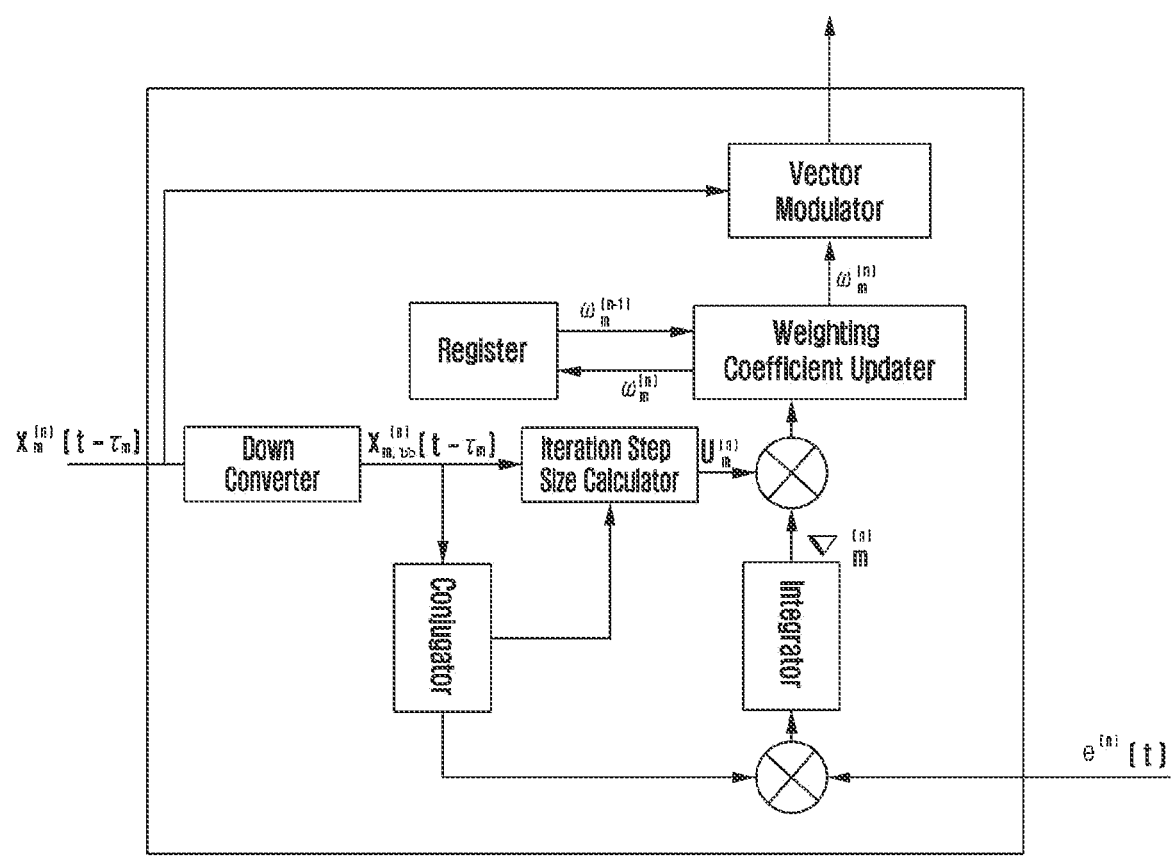
FIG. 48 is a schematic internal structural diagram showing a component signal fitting unit of an example of the first implementation of the Embodiment X of the present application.

The internal structure of the component signal fitting unit of an example of the first implementation of Embodiment X of the present application is as shown in FIG. 48, including: a down converter, a conjugator, an iteration step size calculator, a first multiplier, an integrator, a second multiplier, a weighting coefficient updater, a register, and a vector modulator;

The input of the down converter is connected to the output of the tunable delay unit, and the output thereof is connected to the input of the conjugator and one input of the iteration step size calculator;

one output of the conjugator is connected to another input of the iteration step size calculator;

two inputs of the first multiplier are respectively connected to another output of the conjugator and the baseband error signal end, and the output thereof is connected to the first input of the second multiplier through the integrator;

another input of the second multiplier is connected to the input of the iteration step size calculator, and the output thereof is connected to one input of the vector modulator through the weighting coefficient updater;

the weighting coefficient updater is connected to the register;

another input of the vector modulator is connected to the output of the tunable delay unit, and the output is used as the output of the component signal fitting unit.

As shown in FIG. 48, the working principle of the component signal fitting unit of an example of the first implementation of Embodiment X of the present application is as follows: taking the calculation flow of the n-th data block on the m-th delay line as an example, m=1 or 2. Firstly, the output signal $x_m^{(n)}(t-\tau_m)$ of the tunable delay module is down-converted to the analog-baseband, which is denoted by $x_{m,bb}^{(n)}(t-\tau_m)$; secondly, the conjugate of the baseband signal $x_{m,bb}^{(n)}(t-\tau_m)$ is multiplied by the baseband error signal $e^{(n)}(t)$ of the current data block, to obtain the gradient of the average power of the error function after the integrator, which is denoted by $\nabla_m^{(n)} = \int (x_{m,bb}^{(n)}(t-\tau_m))^* e^{(n)}(t)dt$, wherein * indicates conjugate operation; and then, $x_{m,bb}^{(n)}(t-\tau_m)$ and its conjugation are input together into the iteration step size calculator to calculate the iteration step size of the weighting coefficient. There are two methods for calculating the iteration step size, for example, the steepest descent method and the Newton' descent method. Taking the Newton's descent method as an example, the iteration step size may be obtained by integrating the product of $x_m^{(n)}(t-\tau_m)$ and its conjugate, i.e., the iteration step size $u_m^{(n)} = \int x_{m,bb}^{(n)}(t-\tau_m)(x_{m,bb}^{(n)}(t-\tau_m))^* dt$; after obtaining the step size, the weighting coefficient of the current data block is updated. The current data block has the sequence number is noted as n. The weighting coefficient $\omega_m^{(n-1)}$ of the preceding data block stored in the register is taken out from the register, and the step sizes u and the gradients $\nabla$ calculated in the third step and the second step are received, the weighting coefficient $\omega_m^{(n)} = \omega_m^{(n-1)} - u_m^{(n)} \nabla_m^{(n)}$ of the current data block is then updated, and the update result is stored in a register, which is used when the weighting coefficient of the next data block is to be updated. Finally, the weighting coefficient of the current data block is input into the vector modulator to obtain a component fitting signal of the self-interference signal as an output of the component fitting module.

The working process of the full-duplex transceiver of Embodiment X of the present application is: at the transmitting end, the digital domain symbol is processed by the pre-distortion module and converted into an analog signal by a digital-to-analog conversion module, up-converted by a mixer, performed power amplification by a power amplifier, and finally radiated out at the transmitting port; the receiving port receives the self-interference signal after the certain suppression by the passive suppression module and the useful superimposed signal, and the superimposed signal may pass through the first stage analog cancellation unit for canceling self-interference signals, and then the second stage analog cancellation unit for further canceling self-interference signals after the superimposed signal passing through the band pass filter, wherein the output signal strength is lower than a certain threshold to ensure that the signal strength maintains in a dynamic range of the digital domain; then, the residual signal is amplified by a low-noise amplifier, down-converted by a mixer, filtered by a low-pass filter, and converted into a digital domain symbol by an analog-to-digital conversion module; then, the digital cancellation module may estimate the self-interference channel based on the known signal, reconstruct the residual self-interference signal based on the estimated channel, and subtract the reconstructed self-interference signal from the received digital domain signal; and, finally, the residual signal is performed by subsequent digital field processing to demodulate the useful signal.

Embodiment XI Based on the same inventive concept, on the basis of the any embodiment of Embodiment V to Embodiment X, the present embodiment introduces a method for allocating uplink and downlink resources in a full-duplex system (e.g., a full-duplex transceiver or a full-duplex device). It should be noted that, in this embodiment, the resources of the full duplex system include at least one of a time domain resource, a frequency domain resource, and a code domain resource.

In the full-duplex system, the uplink and downlink data transmissions utilize the same time-and-frequency resource, and on the basis of the method for self-interference cancellation in Embodiment VIII and Embodiment X, different code domain resources may also be used in the uplink and downlink.

Optionally, for each successive uplink and downlink common time-and-frequency resource block, a single pair or a plurality of pairs of codewords are used for covering the uplink and downlink common time-and-frequency resource blocks, and the code operations are performed on the uplink data and the downlink data by using different or identical codewords.

Optionally, the sizes of different codeword pairs are the same or different; optionally, the time for repeated using a single pair of codewords is the same or different.

Optionally, performing code operations on the uplink data and the downlink data includes: wherein the uplink data or the downlink data is a symbol, performing at least one of the following operations on the symbol in code domain, time domain, and/or frequency domain: spreading, scrambling.

Specifically, the operation of the data in the code domain includes at least one of the following:

1. Spreading by Using Spreading Code

For a modulated symbol d, a spreading code $[s_1, s_2, \ldots, s_L]$ of length L is used to perform spreading, and the symbol after spreading is $[s_1 d, s_2 d, \ldots, s_L d]$, occupying L resource elements (RE).

2. Scrambling by Using Scrambling Code

For L modulated symbols $[d_1, d_2, \ldots, d_L]$, a scrambling code $[c_1, c_2, \ldots, c_L]$ of length L is used to perform scrambling, and the symbol after scrambling is $[c_1 d_1, c_2 d_2, \ldots, c_L d_L]$, occupying L REs.

3. Spreading by Using Spreading Code and Scrambling by Using Scrambling Code Simultaneously For one modulated symbol d, a spreading code $[s_1, s_2, \ldots, s_L]$ of length L is used first to perform spreading and a scrambling code $[c_1, c_2, \ldots, c_L]$ of length L is then used to perform scrambling, and the symbol after spreading and scrambling is $[c_1 s_1 d, c_2 s_2 d, \ldots, c_L s_L d]$, occupying L REs.

The above code operations may be performed in time domain, in frequency domain, or simultaneously in time domain and frequency domain, as follows.

1. Performing Code Operations in Frequency Domain

Figure 49:
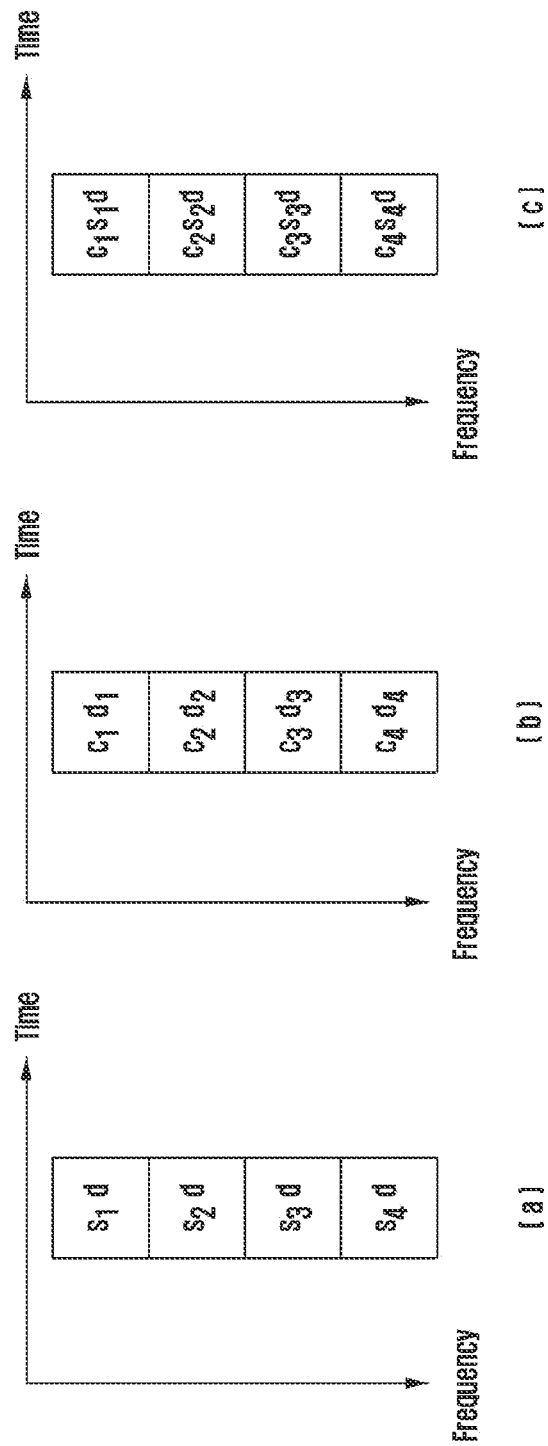
FIG. 49 is a diagram showing an example of performing code operations in frequency domain according to Embodiment XI of the present application.

If the modulated one or L symbols are d or $[d_1, d_2, \ldots, d_L]$, the spreading code of length L is $[s_1, s_2, \ldots, s_L]$, the scrambling code of length L is $[c_1, c_2, \ldots, c_L]$, in this case, FIG. 49 is an exemplary diagram performing code operations in frequency domain, and FIG. 49 shows three examples of performing code operations in the frequency domain when L=4, respectively corresponding to only spreading (a in FIG. 49), only scrambling code (b in FIG. 49) and the case of both the spreading and the scrambling code (c in FIG. 49, one of the boxes represents an RE).

2. Performing Code Operations in Time Domain

Figure 50:
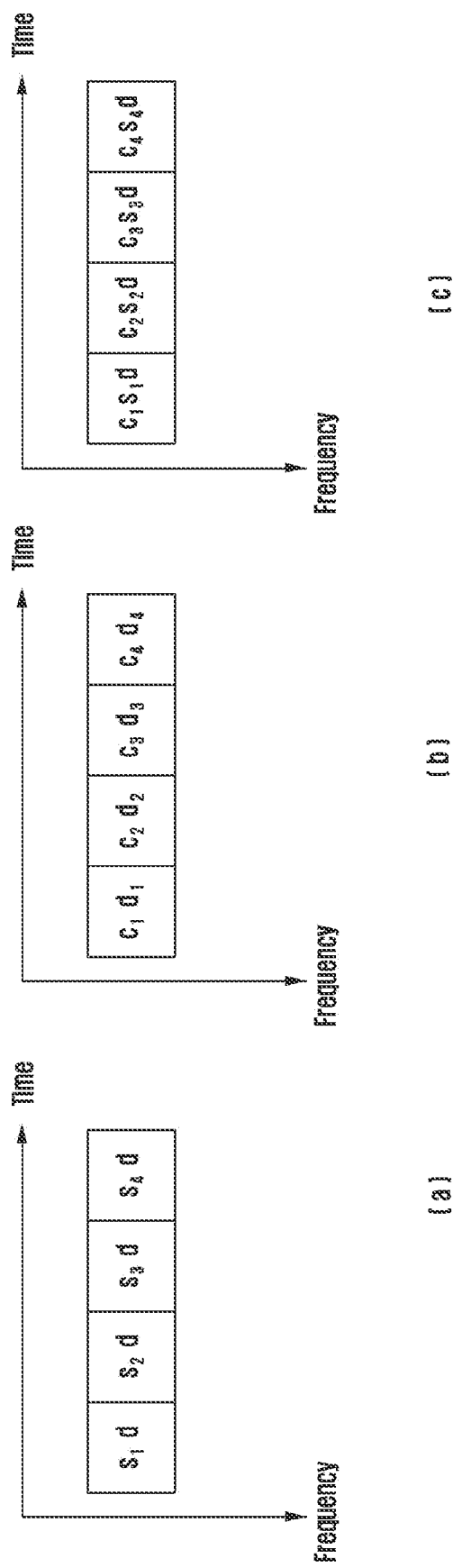
FIG. 50 is a diagram showing an example of performing code operations in time domain according to Embodiment XI of the present application.

If the modulated one or L symbols are d or $[d_1, d_2, \ldots, d_L]$, the spreading code of length L is $[s_1, s_2, \ldots, s_L]$, the scrambling code of length L is $[c_1, c_1 \ldots, c_L]$, in this case, FIG. 50 is an exemplary diagram of performing code operations in time domain, and FIG. 50 shows three examples of performing code operations in time domain when L=4, respectively corresponding to only spreading (a in FIG. 50), only scrambling code (b in FIG. 50) and the case of both the spreading and the scrambling code (c in FIG. 50, one of the boxes represents an RE).

3. Performing Code Operations in Both Time and Frequency Domains

Figure 51:
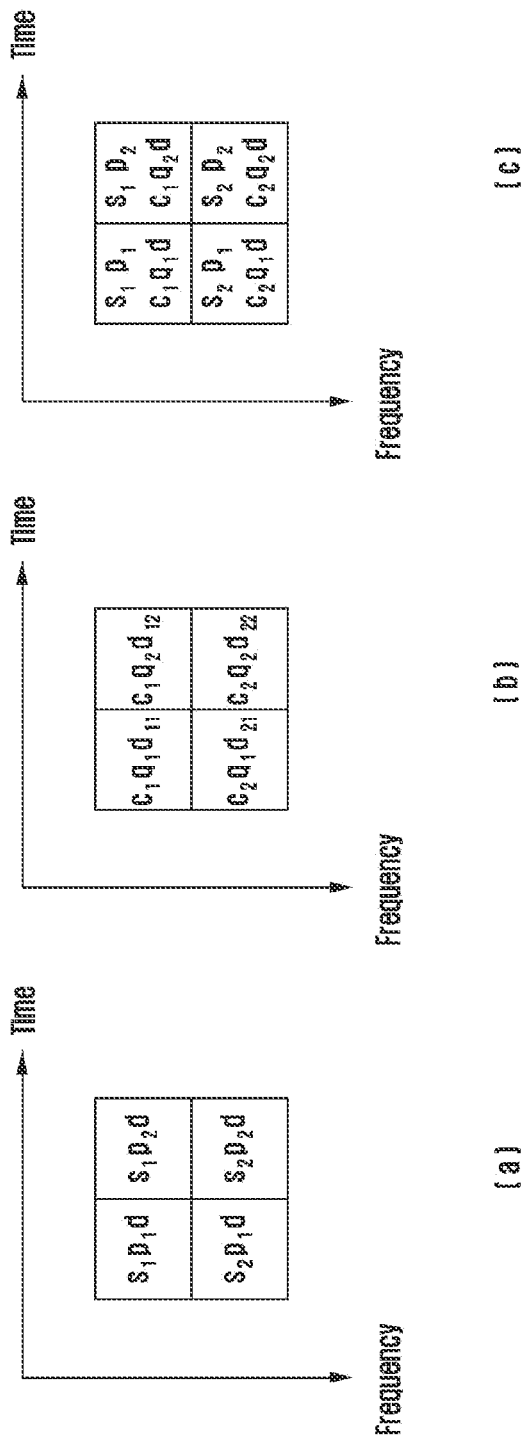
FIG. 51 is a diagram showing an example of performing code operations simultaneously in frequency domain and time domain according to Embodiment XI of the present application.

If the modulated L or LM symbols are d or $[d_{11}, d_{12}, \ldots, d_{LM}]$, the frequency domain spreading code of length L is $[s_1, s_2, \ldots, s_L]$, the time domain spreading code of length M is $[p_1, p_2, \ldots, p_M]$, the frequency domain scrambling code of length L is $[c_1, c_2, \ldots, c_L]$, and the time domain spreading code of length M is $[q_1, q_2, \ldots, q_L]$, in this case, FIG. 51 is an exemplary diagram of performing code operations in frequency domain and time domain simultaneously, and FIG. 51 shows three examples of performing code operations in frequency domain and code domain when L=M=2, respectively corresponding to only spreading (a in FIG. 51), only scrambling code (b in FIG. 51) and the case of both the spreading and the scrambling code (c in FIG. 51, one of the boxes represents an RE).

It should be noted that, in (c) of FIG. 51, the case of performing spreading and scrambling in both frequency domain and the time domain actually includes other possible cases: frequency domain spreading and scrambling with time domain spreading, frequency domain spreading and scrambling with time domain scrambling, frequency domain spreading with time domain spreading and scrambling, frequency domain spreading with time domain scrambling, frequency domain scrambling with time domain spreading and scrambling, and frequency domain scrambling with time domain spreading.

For certain one or several modulated symbols, after the above operation of the code domain, several successive time and frequency resources will be occupied. In this case, for the same time-and-frequency resources, a mutually orthogonal (or quasi-orthogonal) spreading code may be allocated for uplink and downlink, and/or different scrambling codes may be used to further cancel impact of self-interference in the full-duplex system, improving data transmitting efficiency and system throughput.

Specifically, the base station may separately define a code domain resource pool used for the downlink transmission and the uplink transmission, and configure the code domain resources in the two resource pools in pairs: regarding to several time-and-frequency resources of fixed sizes, several pairs of code domain resources are defined for a certain fixed size of the time-and-frequency, one of which is allocated to the downlink code domain resource pool, and another is allocated to the uplink code domain resource pool, and the pair of code domain resources include mutually orthogonal (or quasi-orthogonal) spreading codes, and/or, different scrambling codes.

In the subsequent example figures of this embodiment, a size of a time-and-frequency resource block occupying F subcarriers or PRBs and T symbols is defined as F×T. When the frequency is spread, and/or, the time-and-frequency resource block size occupied by the symbol after the scrambling operation is F×T, the size of this code is also defined as F×T.

Figure 52:
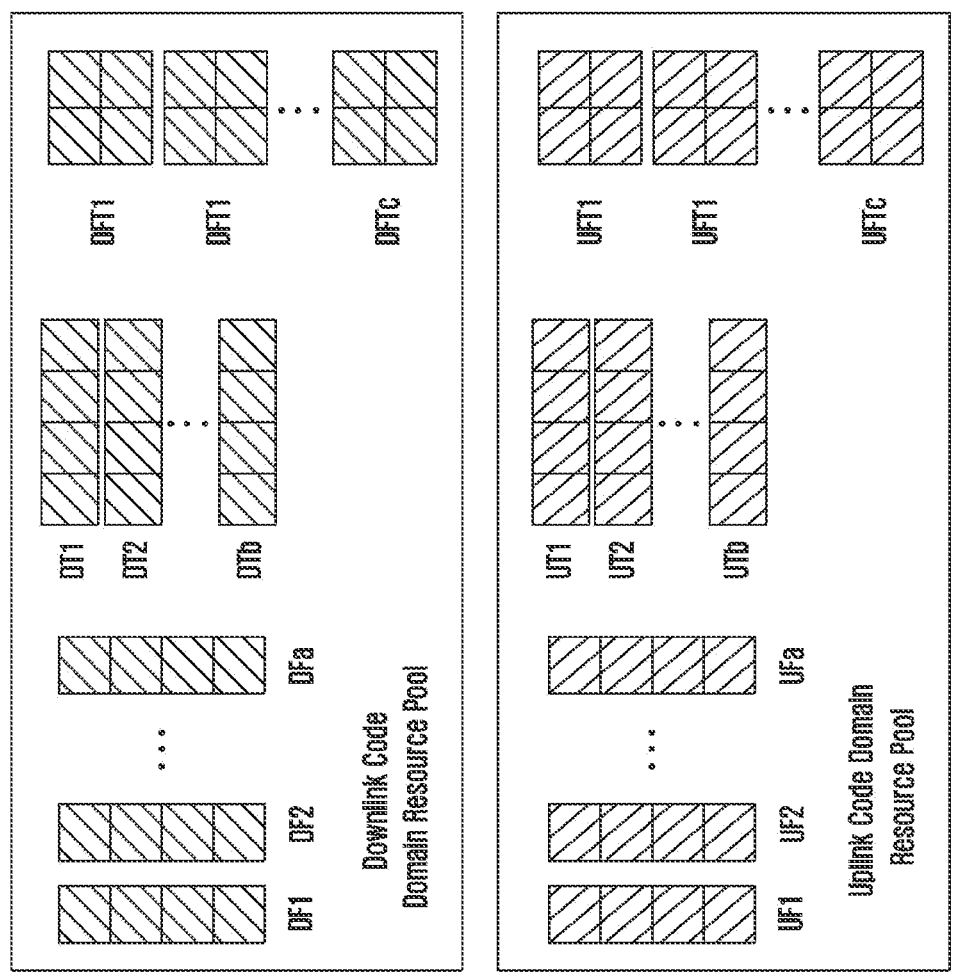
FIG. 52 is a diagram showing an example of a downlink code domain resource pool and an uplink code domain resource pool.

FIG. 52 is an exemplary diagram of a downlink code domain resource pool and an uplink code domain resource pool; FIG. 52 shows an example of a predefined downlink code domain resource pool and uplink code domain resource pool. In FIG. 52, the downlink code domain resource pool and the uplink code domain resource pool are composed of a+b+c pairs of different codes, including a pairs of codes 4×1, b pairs of codes 1×4, and c pairs of codes 2×2, wherein any pair of the codes is mutually orthogonal (or quasi-orthogonal) spreading codes, and/or different scrambling codes. The downlink code domain resource pool and the uplink code domain resource pool may be locally stored in a base station and a UE in advance.

Figure 53:
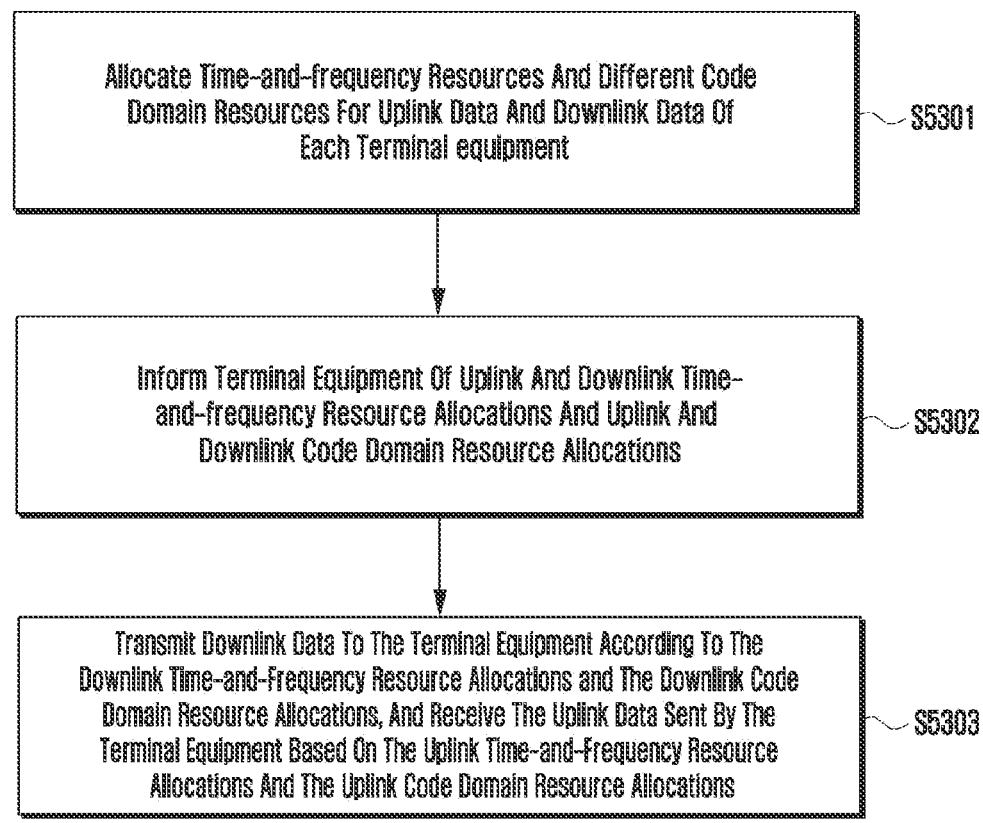
FIG. 53 is a schematic flowchart showing an interactive method based on a full-duplex transceiver according to Embodiment XI of the present application.

An interactive method of the full-duplex transceiver based on the present application and foregoing embodiments is provided in the embodiment of the present application. The schematic flowchart of the method is as shown in FIG. 53 and includes the following steps S5301 to S5303:

S5301: allocating time-and-frequency resources and different code domain resources for uplink data and downlink data of each terminal equipment.

The time-and-frequency resources that the base station may allocate for the uplink data, and the time-and-frequency resources allocated for the downlink data of each terminal equipment, may be completely covered (that is, the same time-and-frequency resource), partially covered, or not covered at all.

Optionally, the base station allocates a same time-and-frequency resource for the uplink data and the downlink data of each terminal equipment.

In this embodiment of the present application, the code domain resource may be an orthogonal resource or a non-orthogonal resource.

Optionally, the same time-and-frequency resource includes at least one successive uplink and downlink common time-and-frequency resource block. For each successive uplink and downlink common time-and-frequency resource block, the uplink-downlink common time-and-frequency resource block is configured with one or more pairs of codewords, and different or the same codewords are used to perform code operations on the uplink data and the downlink data. The code operation in this step is consistent with the foregoing code operations in Embodiment XI of the present application, and details are not described herein.

Optionally, the sizes of different codeword pairs are the same or different.

Optionally, the time for repeated using a single pair of codewords is the same or different.

The terminal equipment includes a UE (User Equipment).
1. The base station allocates downlink time-and-frequency resources and uplink time-and-frequency resources to a user equipment, and determines downlink time-and-frequency resources for transmitting other information (e.g., downlink control information transmitted in PDCCH (Physical Downlink Control Channel), synchronization signals, broadcast information in the PBCH (Physical Broadcast Channel), and the like).
2. The base station allocates code domain resources for downlink transmission and uplink transmission respectively. The allocation manner is as follows: if a block of time-and-frequency resources is simultaneously allocated to the downlink transmission and the uplink transmission (common time-and-frequency resources), then the same number of mutually corresponding codes are respectively selected in the downlink code domain resource pool and the uplink code domain resource pool, and assigned to downlink transmission and uplink transmission respectively.

S5302: informing terminal equipment of uplink and downlink time-and-frequency resource allocations and uplink and downlink code domain resource allocations.

Optionally, the base station issues the allocated uplink and downlink same time-and-frequency resources and the uplink and downlink code domain resources to the terminal equipment.

3. The base station sends the allocated uplink and downlink time-and-frequency resources and code domain resources to the UE.

S5303: transmitting downlink data to the terminal equipment according to the downlink time-and-frequency resource allocations and the downlink code domain resource allocations, and receiving the uplink data sent by the terminal equipment based on the uplink time-and-frequency resource allocations and the uplink code domain resource allocations.

Optionally, the base station sends the downlink data to the terminal equipment according to the same time-and-frequency resource and the downlink code domain resource, and receives the uplink data that is sent by the terminal equipment based on the same time-and-frequency resource and the uplink code domain resource.

4. The base station performs downlink data transmission and receives uplink data transmission of the UE. When the common time-and-frequency resource is used for downlink transmission, the code selected in the downlink code domain resource pool is used for downlink transmission; when the common time-and-frequency resource is used for receiving the uplink transmission, the code selected in the uplink code domain resource pool is used for uplink transmission detection. If a certain time-and-frequency resource is only allocated to downlink data transmission or uplink transmission (not an uplink and downlink common time-and-frequency resource), several codes may be selected in the downlink or uplink resource pool, and the selected code is used for downlink transmission or uplink detection, or directly performing downlink transmission or uplink detection without any code operation.

It should be noted that the downlink data transmission in the above step S5303 may be performed later than step S5302, or may be performed earlier than step S5302, or may be performed simultaneously with step S5302. It should be noted that the code domain resource indication sent by the base station may be displayable (for example, specifically indicating a spreading code, and/or a scrambling code), or may be implicit (for example, the index indicating the code domain resource in the downlink code domain resource pool or in the uplink code domain resource pool).

Figure 54:
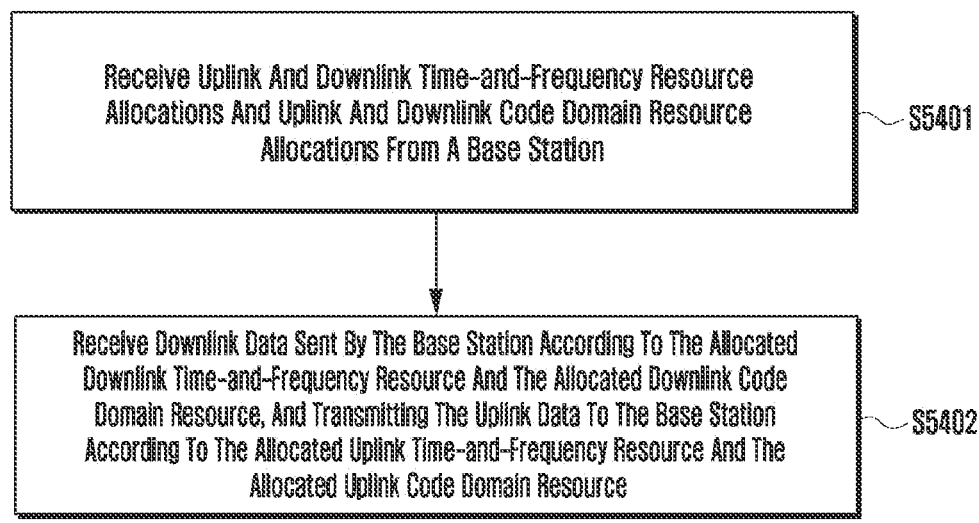
FIG. 54 is a schematic flowchart showing another interactive method based on a full-duplex transceiver according to Embodiment XI of the present application.

Another interactive method of the full-duplex transceiver based on the present application and foregoing embodiments is provided in the embodiment of the present application. The schematic flowchart of the method is as shown in FIG. 54 and includes the following steps S5401-S5402.

S5401: receiving uplink and downlink time-and-frequency resource allocations and uplink and downlink code domain resource allocations from a base station.

Optionally, the terminal equipment receives the uplink time-and-frequency resource and the downlink time-and-frequency resource allocated and issued by the base station as the same resource.

1. The terminal equipment, for example, a UE, receives the allocated uplink and downlink time-and-frequency resources and code domain resources sent by the base station.

S5402: receiving downlink data sent by the base station according to the allocated downlink time-and-frequency resource and the allocated downlink code domain resource, and transmitting the uplink data to the base station according to the allocated uplink time-and-frequency resource and the allocated uplink code domain resource.

Optionally, the terminal equipment receives the downlink data sent by the base station according to the same time-and-frequency resource and the downlink code domain resource, and sends the uplink data to the base station according to the same time-and-frequency resource and the uplink code domain resource.

2. Downlink transmission detection is performed based on the received downlink code domain resource, and uplink transmission is performed based on the received uplink code domain resource.

In addition, if based on the unscheduled transmission, the UE may also select several codewords in the uplink code domain resource pool, and use the selected codeword to transmit uplink data in the unscheduled time-and-frequency resource. In this case, the base station may perform blindly detecting the uplink transmission data of the UE on the unscheduled time-and-frequency resources based on the codewords in the uplink code domain resource pool.

Figure 55:
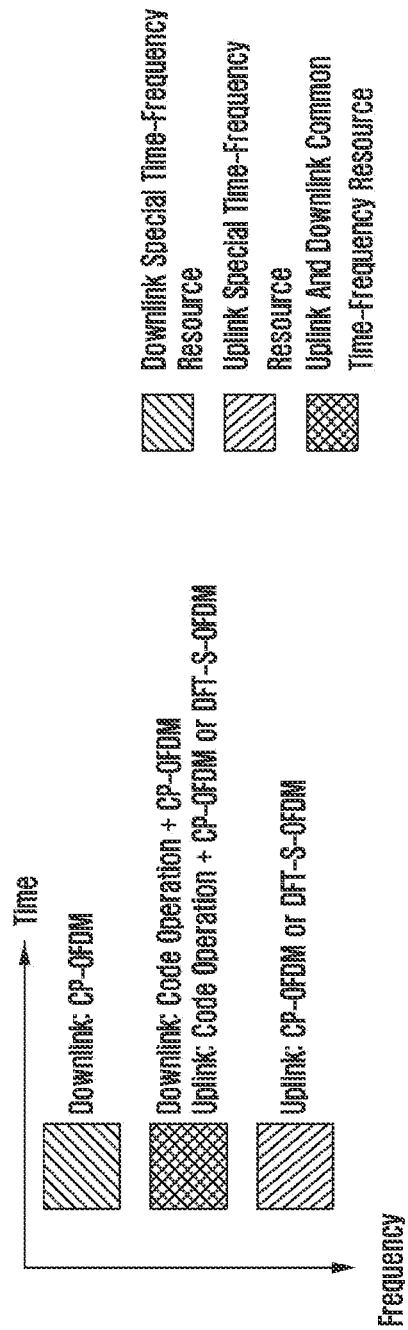
FIG. 55 is a diagram showing an example of different types of time-and-frequency resource code operations and modulation modes according to Embodiment XI of the present application.

As before, for the common time-and-frequency resources of the uplink and downlink, the code operations are respectively performed on the uplink and downlink based on the code domain resources in the code domain resource pool, and then the uplink and downlink are transmitted by conventional CP-OFDM (Cyclic Prefix Orthogonal Frequency Division Multiplexing) or DFT-S-OFDM (Discrete Fourier Transform-Spread-Orthogonal Frequency Division Multiplexing); for the unique time-and-frequency resources of uplink or downlink may be directly transmitted by using conventional CP-OFDM or DFT-S-OFDM. FIG. 55 is an exemplary diagram of different types of time-and-frequency resource code operations and modulation solutions; FIG. 55 shows an example of such a transmission solution.

Optionally, for each successive uplink and downlink common time-and-frequency resource block, a single pair or a plurality of pairs of codewords are used for covering the uplink and downlink common time-and-frequency resource blocks, and the code operations are performed on the uplink data and the downlink data by using different or identical codewords.

Specifically, in the foregoing steps, the allocation of specific time-and-frequency resources and code domain resources for one successive uplink and downlink common time-and-frequency resource block may include the following different cases.

1. A single pair of codewords is used to cover one successive uplink and downlink common time-and-frequency resource block and codewords are not reused.

For one successive uplink and downlink common time-and-frequency resource block, a pair of codewords of the same size as the current-frequency resource block are used for covering. FIG. 56 is a diagram showing an example of uplink and downlink codeword covering in this case. FIG. 56 is a diagram showing an example of covering uplink and downlink common time-and-frequency resource blocks by using equal-sized uplink and downlink codewords. In FIG. 56, for the same successive uplink and downlink common time-and-frequency resource, the downlink transmission utilizes the codeword D1 for code operation, and the uplink transmission utilizes the codeword U1 for code operation.

2. A single pair of codewords is used to cover one successive uplink and downlink common time-and-frequency resource block and codewords may be reused.

Figure 57:
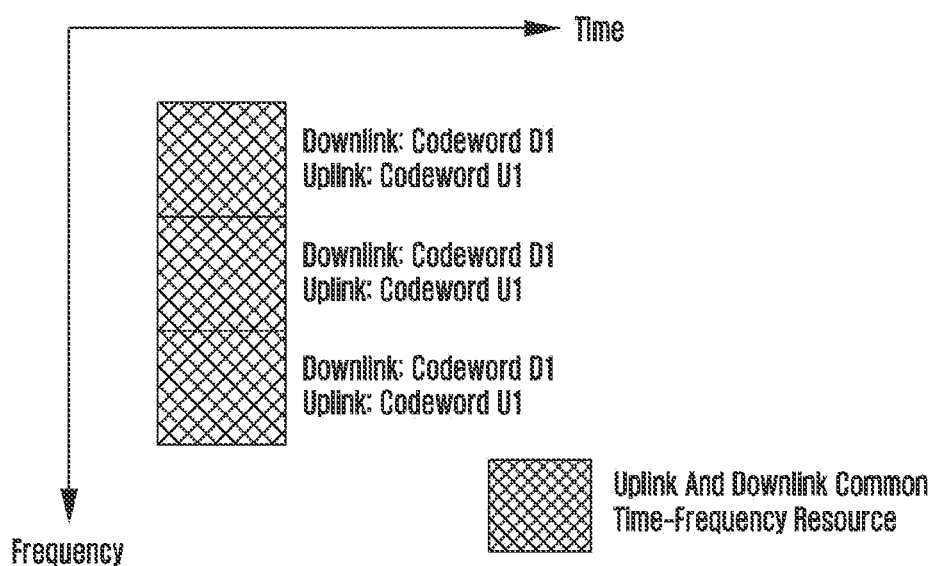
FIG. 57 is a diagram showing an example of repeatedly using the same pair of uplink and downlink codewords to cover uplink and downlink common time-and-frequency resource blocks according to Embodiment XI of the present application.

For a successive uplink and downlink common time-and-frequency resource block, when the selected codeword is smaller than the current frequency resource block, the uplink and downlink common time-and-frequency resources of the block may be covered by repeatedly using the same pair of codewords. FIG. 57 is a diagram showing an example of uplink and downlink codewords covering an uplink and downlink common time-and-frequency resource block. FIG. 57 is a diagram showing an example of uplink and downlink codeword coverage in this case. In FIG. 57, one successive uplink and downlink common time-and-frequency resource is divided into three parts. For each part, the downlink transmission utilizes the codeword D1 for code operation, and the uplink transmission utilizes the codeword U1 for code operation.

3. Multiple pairs of codewords is used to cover one successive uplink and downlink common time-and-frequency resource block and codewords are not reused.

Figure 58:
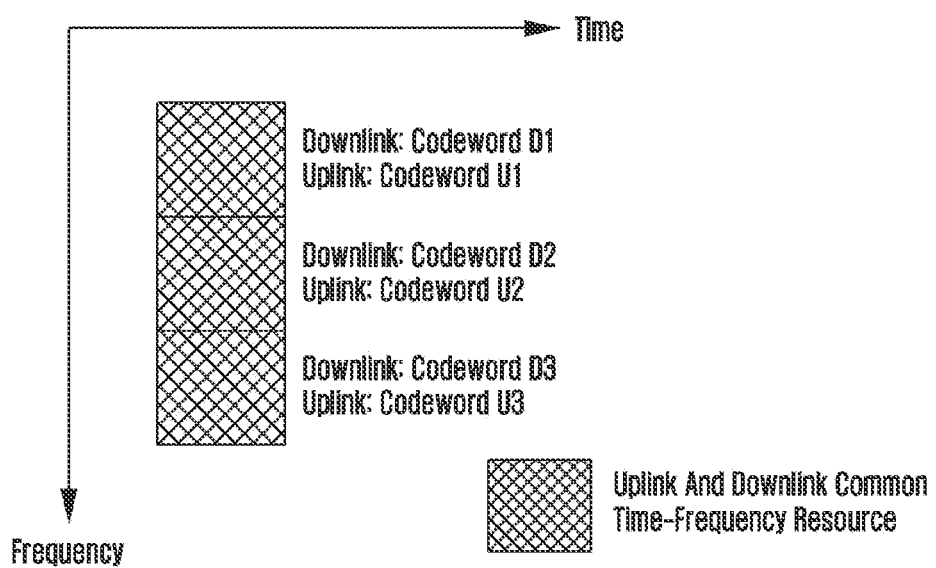
FIG. 58 is a diagram showing an example of using multiple pairs of uplink and downlink codewords to cover uplink and downlink common time-and-frequency resource blocks according to Embodiment XI of the present application.

For a successive uplink and downlink common time-and-frequency resource block, when the selected codeword is smaller than the current frequency resource block, the uplink and downlink common time-and-frequency resources of the block may be covered by repeatedly using multiple pairs of codewords. FIG. 58 is a diagram showing an example of uplink and downlink codeword coverage in this case. FIG. 58 is a diagram showing an example of uplink and downlink codewords covering an uplink and downlink common time-and-frequency resource block. In FIG. 58, one successive uplink and downlink common time-and-frequency resource is divided into three parts: for the first part of the time-and-frequency resource block, the downlink transmission utilizes the codeword D1 for code operation, and the uplink transmission utilizes the codeword U1 for code operation; for the second part of the time-and-frequency resource block, the downlink transmission utilizes the codeword D2 for code operation, and the uplink transmission utilizes the codeword U2 for code operation; and for the third part of the time-and-frequency resource block, the downlink transmission utilizes the codeword D3 for code operation, and the uplink transmission utilizes the codeword U3 for code operations.

It should be noted that the sizes of the different codeword pairs may be the same or different.

4. Multiple pairs of codewords is used to cover one successive uplink and downlink common time-and-frequency resource block and codewords may be reused.

Figure 59:
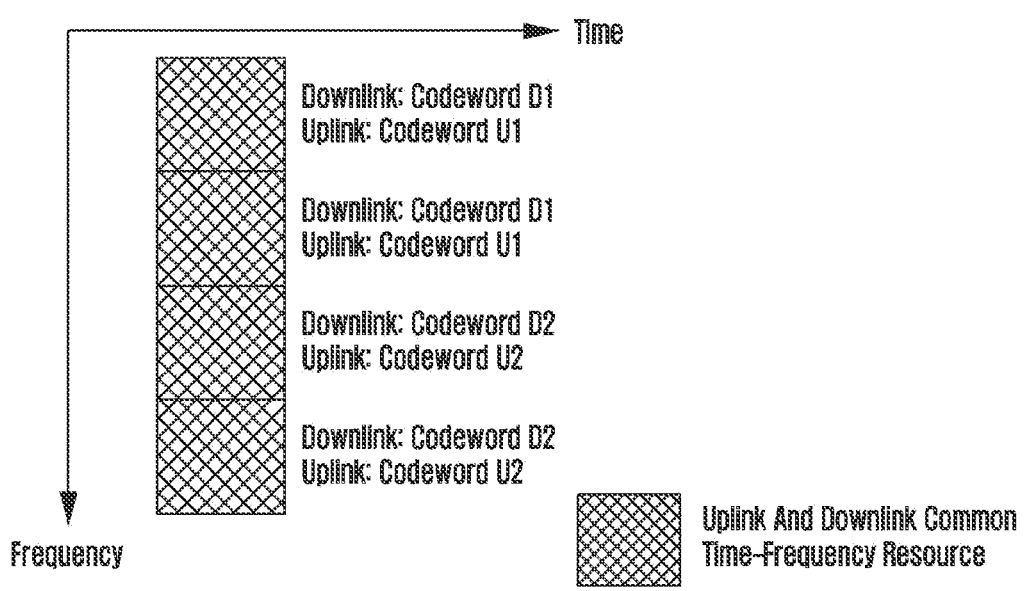
FIG. 59 is a diagram showing an example of repeatedly using multiple pairs of uplink and downlink codewords to cover uplink and downlink common time-and-frequency resource blocks according to Embodiment XI of the present application.

For a successive uplink and downlink common time-and-frequency resource block, when the selected codeword is smaller than the current frequency resource block, the uplink and downlink common time-and-frequency resources of the block may be configured with multiple pairs of codewords and repeatedly using a single codeword. FIG. 25 is a diagram showing an example of uplink and downlink codeword coverage in this case. FIG. 59 is a diagram showing an example of uplink and downlink codewords covering an uplink and downlink common time-and-frequency resource block. In FIG. 59, one successive uplink and downlink common time-and-frequency resource is divided into four parts: for the first part and the second part of the time-and-frequency resource block, the downlink transmission all utilizes the codeword D1 for code operation, and the uplink transmission all utilizes the codeword U1 for code operation; for the third part and the fourth part of the time-and-frequency resource block, the downlink transmission all utilizes the codeword D2 for code operation, and the uplink transmission all utilizes the codeword U2 for code operation.

It should be noted that the sizes of the different codeword pairs may be the same or different; the number of times for repeatedly using the single pair of codewords may be the same or different.

It should also be noted that the foregoing methods for allocating time-and-frequency resources and code domain resources may be used singly or in combination. For each single successive time-and-frequency resource block, any one of the above-mentioned time-and-frequency resources and methods for allocating code domain resources may be used.

The method for allocating uplink and downlink time-and-frequency resources and code domain resources described in this embodiment may also be combined with NoMA (Non-orthogonal Multiple Access) technology to further improve system throughput and transmission efficiency.

Optionally, in the interactive method based on the full-duplex transceiver in the embodiment of the present application, when an uplink resource or a downlink resource is allocated to the non-orthogonal multiple access user, at least one of the following is also performed:

scheduling multiple users with non-orthogonal multiple access on the same time-and-frequency resource, with different uplink codewords and without allocating multiple access signatures;

scheduling multiple users with non-orthogonal multiple access on the same time-and-frequency resource, with different uplink codewords and different multiple access signatures;

scheduling multiple users with non-orthogonal multiple access on the same time-and-frequency resource, with same uplink codeword and different multiple access signatures.

Specifically, when an uplink resource is allocated to a user (the user is short for the user equipment, referred as same in other parts), multiple users may be allocated to a same time-and-frequency resource, and on the basis of the code domain resource allocation, MA Signature (Multiple Access Signature) may be further allocated to different users to achieve the purpose of distinguishing different users. Broadly, multiple access signatures for different NoMA users may include at least one of different bit-level scrambling codes, different symbol-level scrambling codes, different symbol-level spreading codes, different constellation maps, different resource maps, different bit-level interleaving, and different symbol-level interleaving. It should be noted that if different uplink codewords are allocated to different users, different uplinks, and/or downlink codewords may be used as different multiple access signatures to distinguish users, or other multiple access signatures may be allocated on the basis of assigned codewords to distinguish users. For convenience of description, in subsequent description of this embodiment, the multiple access signature does not include a codeword.

For a successive uplink and downlink common time-and-frequency resource block, or a part of a successive uplink and downlink common time-and-frequency resource block, allocation of specific time-and-frequency resources, code domain resources, and multiple-access signatures may include the following different situations.

1. Scheduling NoMA users in the same time-and-frequency resource to use different uplink codewords and not allocating multiple access signatures.

Figure 60:
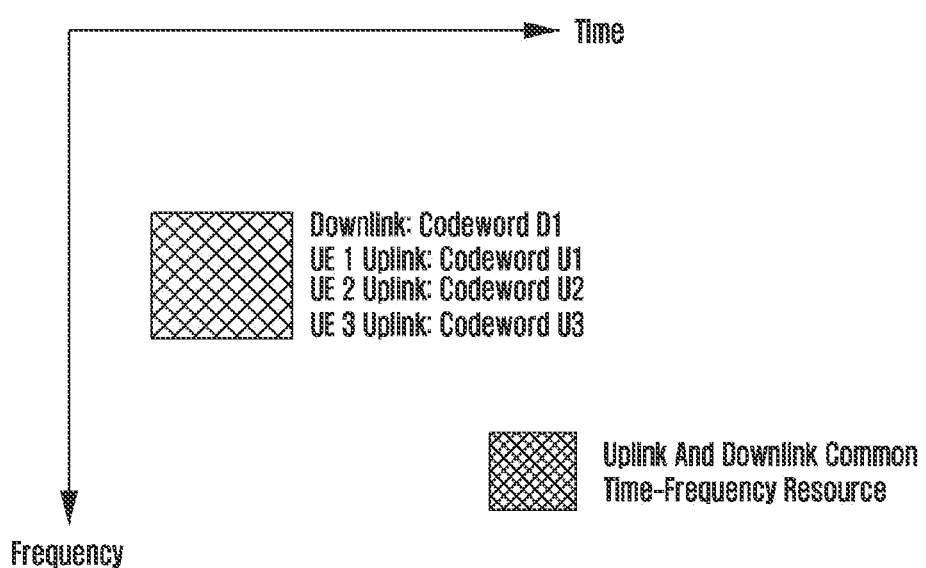
FIG. 60 is a diagram showing an example of uplink and downlink codewords covering uplink and downlink common time-and-frequency resource blocks according to Embodiment XI of the present application.

For one successive uplink and downlink common time-and-frequency resource block, if uplink resources of multiple users are simultaneously allocated on the block resource, then different uplink codewords may be allocated to these users. FIG. 60 is a diagram showing an example of uplink and downlink codeword coverage in this case. FIG. 60 shows an example of uplink and downlink codewords covering an uplink and downlink common time-and-frequency resource block. In FIG. 60, 3 UEs are allocated the same common time-and-frequency resource for uplink transmission, the downlink transmission utilizes codeword D1 for code operation, and the uplink transmissions of UE1, UE2, and UE3 respectively utilize codeword U1, codeword U2, and codeword U3 to perform operation.

2. Scheduling NoMA users in the same time-and-frequency resource to use different uplink codewords and allocating different multiple access signatures.

Figure 61:
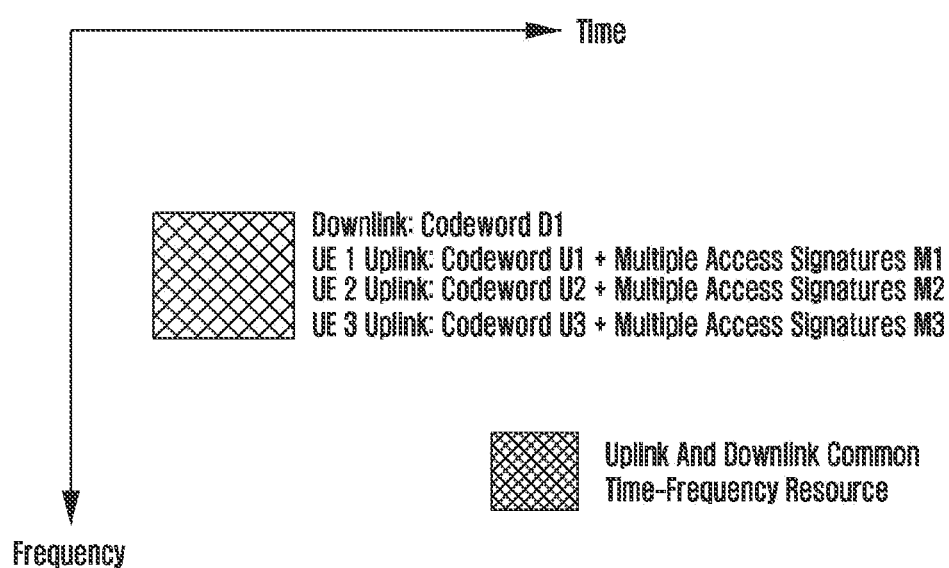
FIG. 61 is a diagram showing another example of uplink and downlink codewords covering uplink and downlink common time-and-frequency resource blocks according to Embodiment XI of the present application.

For one successive uplink and downlink common time-and-frequency resource block, if uplink resources of multiple users are simultaneously allocated on the block resource, then different uplink codewords and different multiple access signatures may be allocated to these users. FIG. 61 is a diagram showing an example of uplink and downlink codeword coverage in this case. FIG. 61 is another diagram showing an example of uplink and downlink codewords covering an uplink and downlink common time-and-frequency resource block. In FIG. 61, 3 UEs are allocated the same common time-and-frequency resource for uplink transmission, the downlink transmission utilizes codeword D1 for code operation, and the uplink transmissions of UE1, UE2, and UE3 respectively utilize codeword U1 and multiple access signature M1, codeword U2 and multiple access signature M2, and codeword U3 and multiple access signature M3 to perform operation.

3. Scheduling NoMA users in the same time-and-frequency resource to use same uplink codeword and allocating different multiple access signatures.

Figure 62:
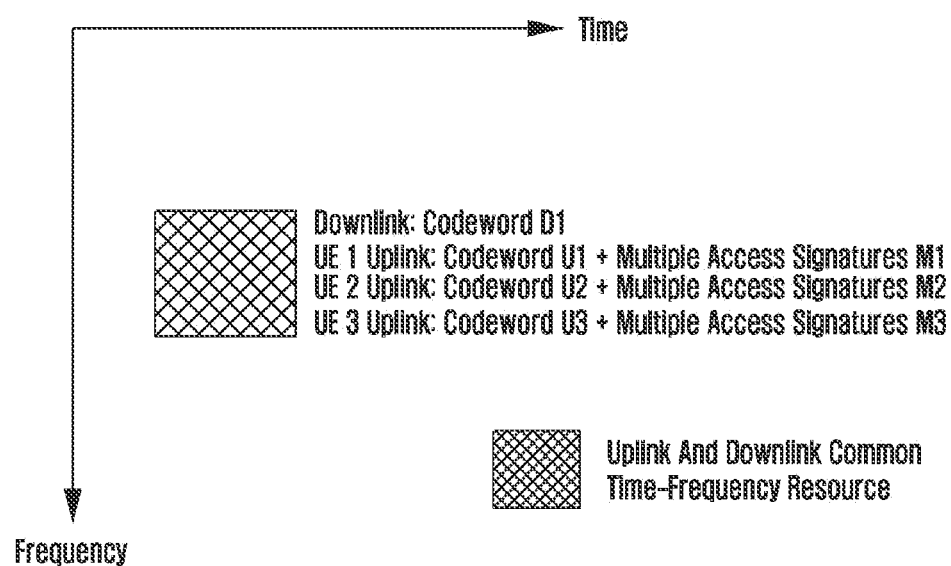
FIG. 62 is a diagram showing another example of uplink and downlink codewords covering uplink and downlink common time-and-frequency resource blocks according to Embodiment XI of the present application.

For one successive uplink and downlink common time-and-frequency resource block, if uplink resources of multiple users are simultaneously allocated on the block resource, then same uplink codewords and different multiple access signatures may be allocated to these users. FIG. 62 is a diagram showing an example of uplink and downlink codeword coverage in this case. FIG. 62 is another diagram showing an example of an uplink and downlink codeword covering an uplink and downlink common time-and-frequency resource block. In FIG. 62, 3 UEs are allocated the same common time-and-frequency resource for uplink transmission, the downlink transmission utilizes codeword D1 for code operation, and the uplink transmissions of UE1, UE2, and UE3 respectively utilize codeword U1 and multiple access signature M1, codeword U2 and multiple access signature M2, and codeword U3 and multiple access signature M3 to perform operation.

Similarly, when a downlink resource is allocated to a user, then multiple users may be allocated with the same time-and-frequency resource, and on the basis of the code domain resource allocation, multiple access signatures may be further allocated to different users to achieve the purpose of distinguishing different users. For a successive uplink and downlink common time-and-frequency resource block, or a part of a successive uplink and downlink common time-and-frequency resource block, allocation of specific time-and-frequency resources, code domain resources, and multiple-access signatures may include the following different situations:

1. scheduling NoMA users in the same time-and-frequency resource to use different downlink codewords and not allocating multiple access signatures;
2. scheduling NoMA users in the same time-and-frequency resource to use different downlink codewords and allocating different multiple access signatures;
3. scheduling NoMA users in the same time-and-frequency resource to use same downlink codeword and allocating different multiple access signatures.

It should also be noted that the base station may simultaneously allocate multiple users to the same block of uplink and downlink common time-and-frequency resources. For a successive uplink and downlink common time-and-frequency resource block, or a part of a successive uplink and downlink common time-and-frequency resource block, allocation of specific time-and-frequency resources, code domain resources, and multiple-access signatures may include the following different situations:
1. scheduling NoMA users in the same time-and-frequency resource to use different uplink codewords and different downlink codewords, and not allocating multiple access signatures;
2. scheduling NoMA users in the same time-and-frequency resource to use different uplink codewords and different downlink codewords, and allocating different multiple access signatures;
3. scheduling NoMA users in the same time-and-frequency resource to use different uplink codewords and same downlink codeword, and allocating different multiple access signatures;
4. scheduling NoMA users in the same time-and-frequency resource to use same uplink codeword and different downlink codewords, and allocating different multiple access signatures;
5. scheduling NoMA users in the same time-and-frequency resource to use same uplink codeword and same downlink codeword, and allocating different multiple access signatures;

On the basis of the method for canceling self-interference provided in Embodiment VIII and Embodiment X, the resource allocation method in Embodiment XI may be added in the digital domain to allocate code domain resources for different time-and-frequency resources, and perform corresponding code operations on digital signals at the transmitting end, to further cancel impact of self-interference, and improve system throughput and transmission efficiency.

Embodiment XII

The embodiment of the present application provides another possible implementation, and on the basis of any one of Embodiment V to Embodiment X, a full-duplex transceiver shown in Embodiment XII is further included.

A multi-antenna full-duplex transceiver is provided in Embodiment XII of the present application. The multi-antenna full-duplex transceiver includes at least one transmission circuit and at least two reception circuits, or at least two transmission circuits and at least one reception circuit. Each transmission circuit corresponds to one antenna, and each reception circuit corresponds to one antenna.

Optionally, for any two pairs of transmission circuits and reception circuits, passive suppression modules, analog cancellation modules or digital cancellation modules of one pair of transmission circuit and reception circuit, are consistent or different with passive suppression modules, analog cancellation modules or digital cancellation modules of another pair of transmission circuit and reception circuit.

Based on the same inventive concept, the embodiment of the present application provides an electronic apparatus, including: the full-duplex transceiver of each embodiment in the present application.

Optionally, the electronic apparatus of the embodiment in the present application is a terminal equipment or a base station. The terminal equipment includes a user equipment.

Optionally, the digital cancellation module of the full duplex transceiver of the embodiment in the present application further includes: a digital beam forming unit The full-duplex transceiver further includes: a digital pre-cancellation module; the digital pre-cancellation module includes a connected MAC layer processing unit and a transmitter baseband signal processing unit; the MAC layer processing unit includes a spreading code/scrambling code allocation sub-unit; and the transmitter baseband signal processing unit includes a spreading/scrambling subunit and a transmitting beam forming subunit.

An input of a channel estimation unit is connected to the transmitter baseband signal processing unit via a digital beam forming unit.

Specifically, for the purpose of the present application, a joint design solution (hereinafter referred as a transceiver solution) of a receiver and a transmitter of a multi-antenna full-duplex device will be described below. The solution may be applied to a base station or terminal of multi-antennas and full-duplex.

Figure 63:
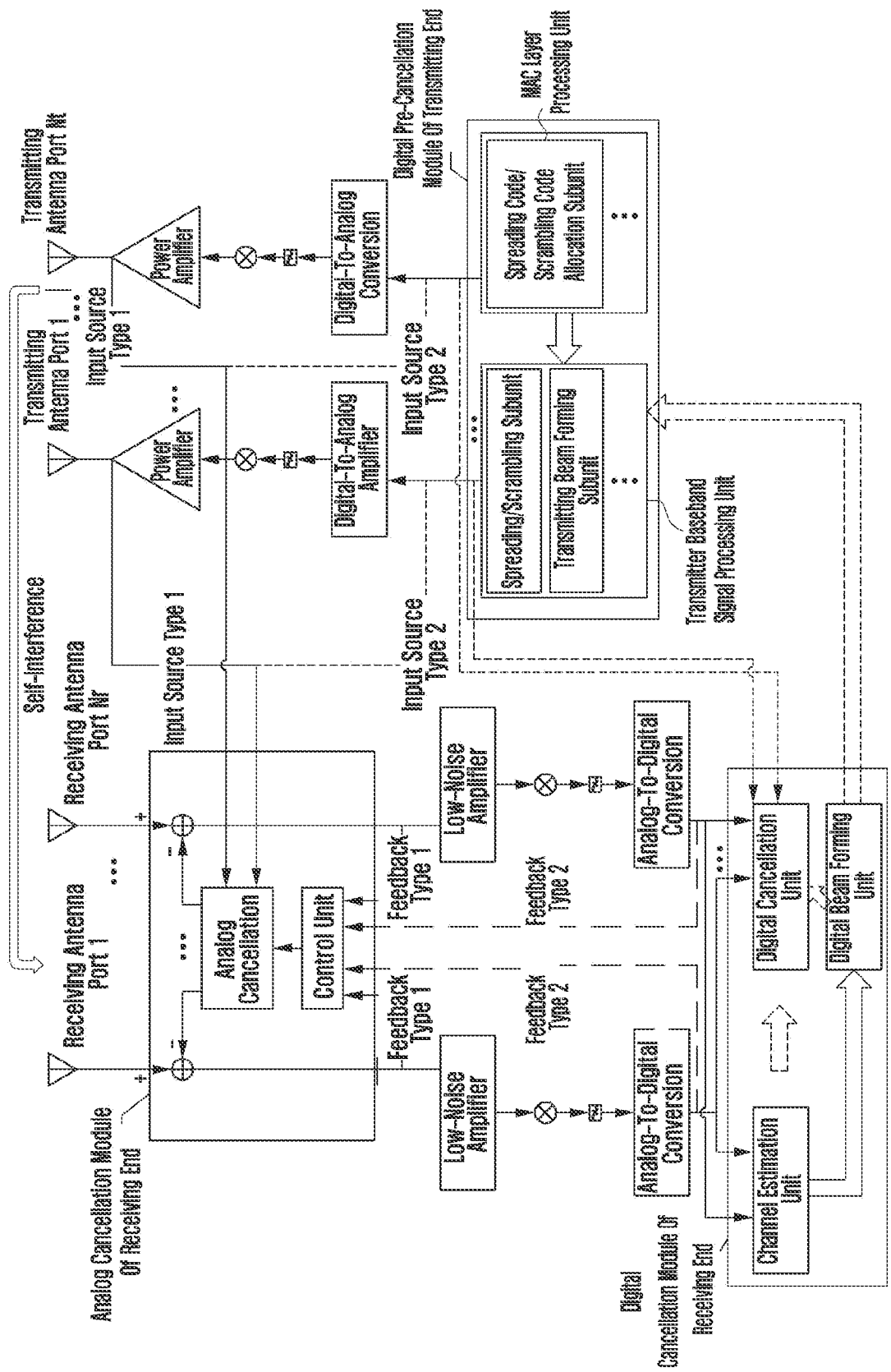
FIG. 63 is a schematic structural diagram showing an example of a multi-antenna full-duplex transceiver according to Embodiment XII of the present application.

Taking a base station configured with Nr receiving antenna ports and Nt transmitting antenna ports as an example, wherein Nr and Nt are both natural numbers greater than zero. FIG. 63 is a schematic structural diagram of an example of a multi-antenna full-duplex transceiver. FIG. 63 shows a schematic diagram of the structure of the antenna full duplex transceiver. Similar to the solutions in Embodiments II to VI, a receiver-side analog cancellation module, a receiver-side digital cancellation module, and a transmitter-side digital pre-cancellation module are mainly included. The passive suppression technology, the pre-distortion technology, and the pre-distortion technology in Embodiment VI to Embodiment X are also applicable to the combination of any pair of transmitting antenna ports and receiving antenna ports of the multi-antenna system in the embodiment, and implementation thereof is consistent with that of Embodiment VI to Embodiment IX and will not be described herein.

Analog Cancellation Module of Receiving End

The analog domain circuit of the reception circuit is an analog domain, and the analog domain circuit of the transmission circuit is an analog domain.

The function of the module is consistent with that of Embodiment VI to Embodiment X, which are all in analog domain, that is, the self-interference signals from the transmitting antenna port to the receiving antenna port in the same device are deleted before low-noise amplifier of the receiving end. The function of the analog cancellation unit in the receiving end analog cancellation module of the multi-antenna system is similar to that of Embodiment VI to Embodiment X, and for reconstructing the analog domain interference signal received, the domain interference signal is removed from the signal of each receiving antenna port by each receiving antenna port in the analog domain. The function of the control unit in the receiving end analog cancellation module of the multi-antenna system is similar to that of Embodiment VI to Embodiment X, for controlling the analog cancellation unit reconstruct the generation process of filter coefficient of the analog domain interference signal received by each analog antenna port according to the feedback signal, for example, analog cancellation parameter iteration process in Embodiment VI to Embodiment X. The input signals of the analog cancellation unit in the analog cancellation module of the multi-antenna system are analog signals or digital signals of different transmit antenna ports, which are respectively input source type 1 or input source type 2 in FIG. 63; the feedback signals of the control unit in the analog cancellation module of the multi-antenna system are analog signals or digital signals of different transmit antenna ports, which are respectively feedback type 1 or feedback type 2 in FIG. 63.

Specifically, the implementation of the analog cancellation module of the receiving end in the multi-antenna full-duplex transceiver solution may be a combination of any single-receiving antenna port and a single-transmitting antenna port in the multi-antenna device, and the analog cancellation solutions in Embodiment VI to Embodiment X may be used independently. A specific implementation may be that different analog antenna ports and transmit antenna port may jointly use different analog cancellation solutions, for example, according to different self-interference sizes of transmitting antenna ports to receiving antenna ports in different combinations of transmitting antenna port and receiving antenna port, different analog cancellation solutions may be selected. An example is that for a full-duplex device configured with a dual-polarized uniform planar array antenna, i.e., the uniform planar array is composed of dual-polarized antenna elements, if the two polarization antenna elements have different polarization directions, which can be used separately, then the transmitting port and the receiving port are used to reduce the interference from the transmitting antenna port to the receiving antenna port. At this time, for one receiving antenna port, it will be interfered by another polarization direction from the same array element, as well as interference from other antenna elements. Compared with the interference energy of other antenna elements, the interference energy of another polarization direction in the same array element is larger, such that the combination of the transmission antenna port and the reception antenna port belonging to the same antenna element may utilize a better performed but more complicated solution of self-interference cancellation, such as the solution in Embodiment VIII; and a combination of a transmitting antenna port and a receiving antenna port belonging to different antenna elements may utilize a less performed but less complicated solution of self-interference cancellation, such as the solution in Embodiment X.

In addition, in the embodiment of the present application, the analog cancellation module is connected between different transmitting antenna ports and the same receiving antenna port, and used for receiving the strength of the self-interference signal of different transmitting antenna ports according to the receiving antenna port, and performing serial cancellation on self-interfering signals from different transmitting antenna ports.

Further, among the different transmitting antenna ports, the transmitting antenna port in the first part is disposed in the same antenna array element as the same receiving antenna port; another transmitting antenna ports except the first part are disposed in other antenna array elements; the first part of the transmitting antenna port is different from the receiving antenna port in the polarization direction; the analog cancellation module is used to first cancel the self-interference signal from the transmitting antenna port in the first part, and then cancel the self-interference signal from other transmitting antenna ports.

Optionally, an input of the second stage analog cancellation unit in the analog cancellation module is connected to a plurality of transmitting antenna ports, for receiving a superimposed signal of the self-interference signals from the plurality of transmitting antenna ports.

Specifically, the implementation of the analog cancellation module of receiving end in the multi-antenna full-duplex transceiver solution may also be a serial cancellation manner, that is, according to different interference sizes of different transmitting antenna ports to the same receiving antenna port, the larger interference is canceled first, and then the less interference is canceled. Since the interference signals in the receiving antenna port are aliased signals from different transmitting antenna ports, the interference signals from different transmitting antenna ports to the same receiving antenna port are sequentially canceled according to interference sizes, thereby avoiding unideal performance of a less interference signal due to presence of a larger interference signals. Specifically, the serial cancellation method may first remove the linear component of the interference signals from the strong interference transmitting antenna port to the target receiving antenna port, then cancel the linear component of the interference signals from the weak interference transmitting antenna port to the target receiving antenna port, subsequently cancel the nonlinear component of the interference signals from the strong interference transmitting antenna port to the target receiving antenna port, and finally cancel the nonlinear component of the interference signals from the weak interference transmitting antenna port to the target receiving antenna port; or, first remove the linear component of the interference signals from the strong interference transmitting antenna port to the target receiving antenna port, then cancel the nonlinear component of the interference signals from the strong interference transmitting antenna port to the target receiving antenna port, subsequently cancel the linear component of the interference signals from the weak interference transmitting antenna port to the target receiving antenna port, and finally cancel the nonlinear component of the interference signals from the weak interference transmitting antenna port to the target receiving antenna port. In particular, when strength of interference signals from some transmitting antenna ports to target antenna port in the device is very weak, the analog cancellation module of receiving end may not cancel these interference signals, such as a transmitting antenna physically being isolated from the receiving antenna. In particular, in some steps of the specific serial cancellation method, some steps may be omitted to form a serial cancellation method. For example, a serial cancellation method may be that first canceling the linear component of the interference signals from the strong interference transmitting antenna port to the target receiving antenna port and finally canceling the linear component of the interference signals from the weak interference transmitting antenna port to the target receiving antenna port, without canceling nonlinear component from strong interference and weak interference transmitting antenna port to the target receiving antenna port in the analog cancellation module. Another serial cancellation method may be that first canceling the linear component of the interference signals from the strong interference transmitting antenna port to the target receiving antenna port and finally canceling the nonlinear component of the interference signals from the strong interference transmitting antenna port to the target receiving antenna port, without canceling the interference signals from strong interference transmitting antenna port to the target receiving antenna port in the analog cancellation module. In particular, the size of the interference signal from the transmitting antenna port to the receiving antenna port may be determined according to the position of the antenna array to which the transmitting antenna port and the receiving antenna port belong, for example, for a full-duplex device configured with a dual-polarized uniform planar array antenna, when the two polarization directions of the same antenna array element are respectively used as the transmitting antenna port and the receiving antenna port, the transmitting antenna port belonging to the same antenna array element as the receiving antenna port is a strong interference transmitting antenna port, otherwise, it is a weak interference transmitting antenna port.

Figure 64A:
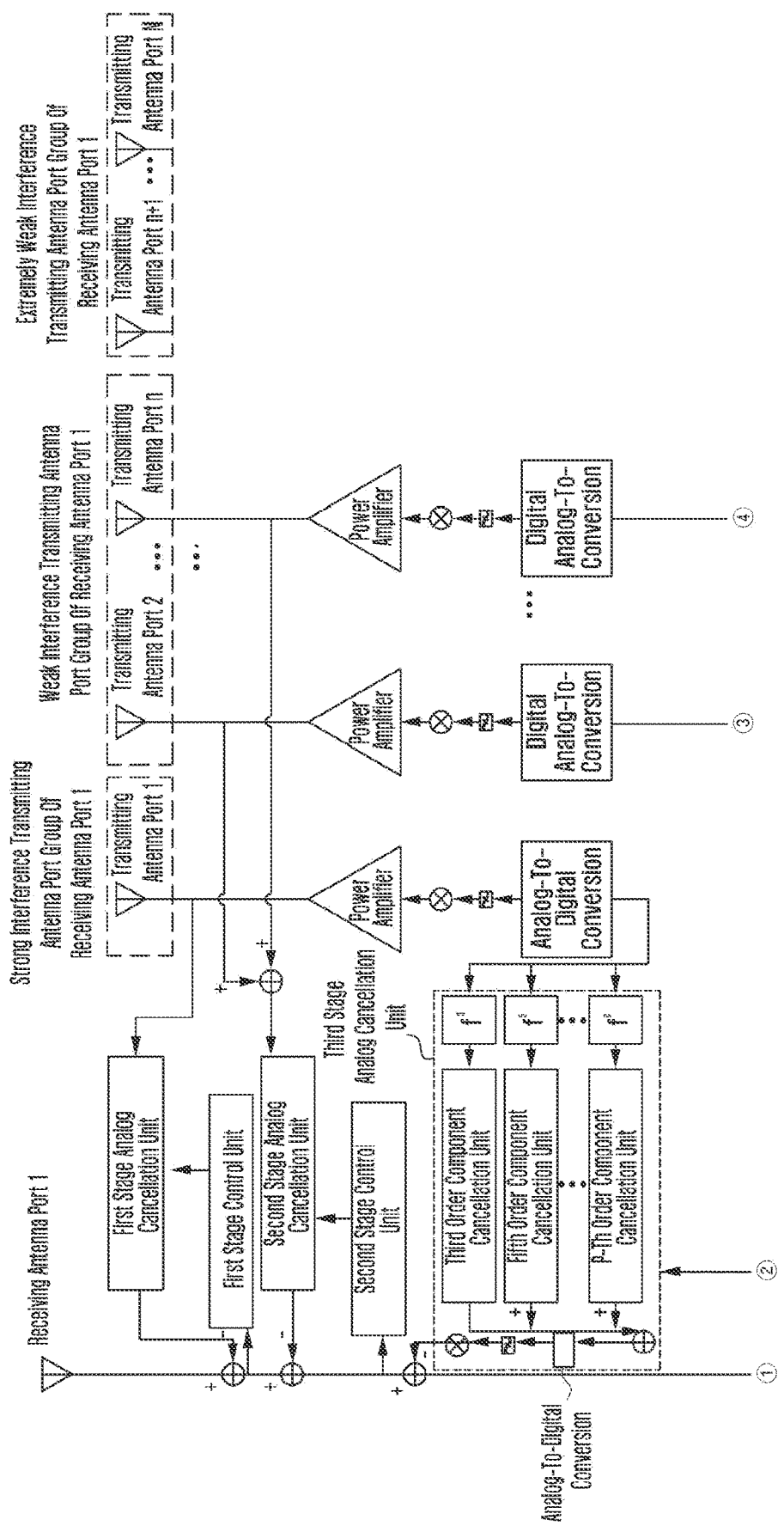
FIGS. 64a and 64b are diagrams showing an example of a method for deleting a serial sequence by a receiving end analog cancellation module according to Embodiment XII of the present application.
Figure 64B:
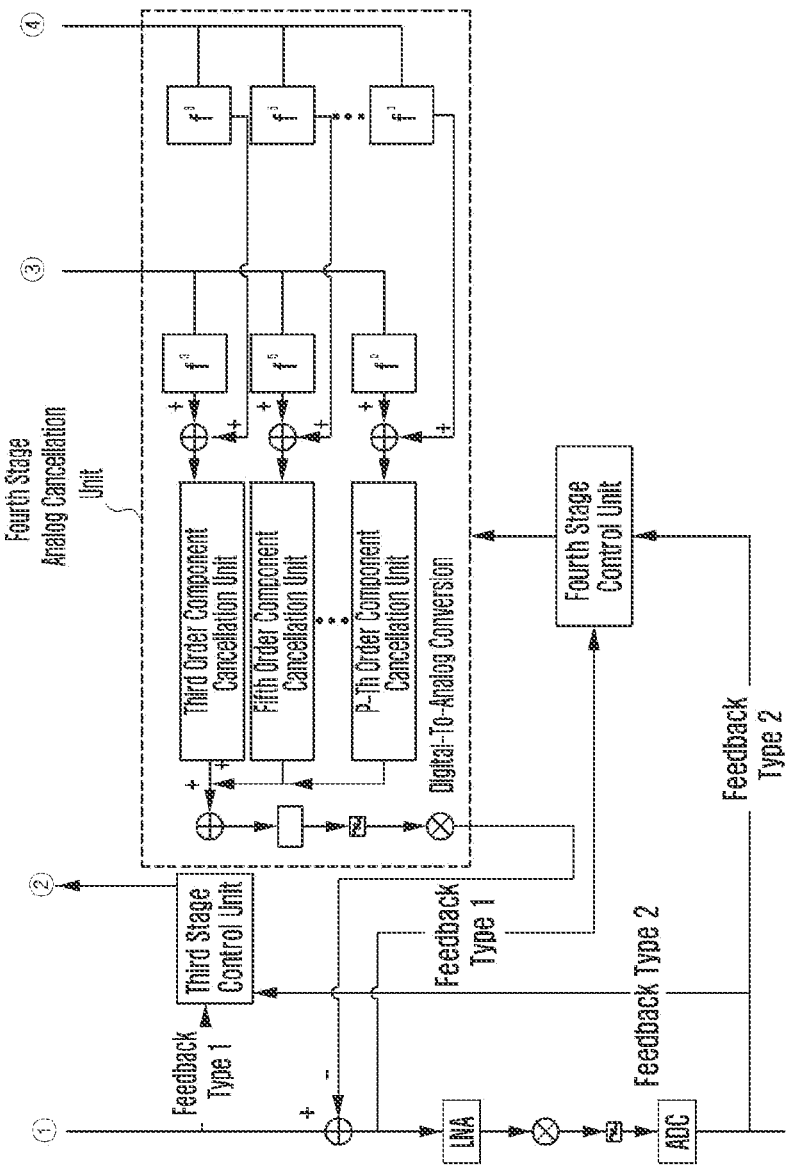

FIG. 64*a* and FIG. 64*b* are diagrams showing an example of a serial cancellation method for the analog cancellation module of the receiving end. FIG. 64*a* and FIG. 64*b* show an example of a serial cancellation method for the analog cancellation module of the receiving end. It is assumed that the target receiving antenna port is the receiving antenna port 1, the strong interference transmitting antenna port of the receiving antenna port 1 is the transmitting antenna port 1, and the weak interference transmitting antenna port of the receiving antenna port 1 is the transmitting antenna port 2 to the transmitting antenna port n (n≥2), and the rest of the transmitting antenna ports are extremely weak antenna port of receiving antenna port 1. In this example, the analog cancellation module of the receiving end will not cancel the interference signal generated by the extremely weak transmitting antenna port. In FIG. 64*a* and FIG. 64*b*, the first stage analog cancellation unit and the first-level control unit are used to cancel the linear component of the interference signal from the strong interference transmitting antenna to the target receiving antenna port, wherein the implementation method of the first stage analog cancellation unit and the first stage control unit may be consistent with relevant modules in Embodiment VI to Embodiment X, as analog cancellation shown in FIG. 39, or the first stage and/or the second stage analog cancellation module in FIG. 47. After completing first stage analog cancellation operation, the received signal after the interference cancellation is further canceled by the second stage analog cancellation unit, and the second stage analog cancellation unit and the second stage control unit function to cancel the linear component of the interference signal from the weak interference transmitting antenna port to the receiving antenna port, wherein the implementation method of the second stage analog cancellation unit and the second stage control unit may be consistent with relevant modules in Embodiment VI to Embodiment X, as analog cancellation shown in FIG. 39, or the first stage and/or the second stage analog cancellation module in FIG. 47. The input signal of the second stage analog cancellation unit may be a superposed signal of a plurality of transmitting antenna port transmit signals. After completing second stage analog cancellation operation, the received signal after the interference cancellation is further canceled by the third stage analog cancellation unit, and the third stage analog cancellation unit and the third stage control unit function to cancel the nonlinear component of the interference signal from the strong interference transmitting antenna port to the receiving antenna port, and the implementation method of the third-order to P-order component cancellation unit in the third stage analog cancellation unit and the third stage control unit may be consistent with the method described in Embodiment VIII, wherein the feedback type of the third stage control unit may be the analog signal or digital signal of the receiving end, respectively corresponding to the feedback type 1 and the feedback type 2 in FIG. 64*a* and FIG. 64*b*. After completing third stage analog cancellation operation, the received signal after the interference cancellation is finally canceled by the fourth stage analog cancellation unit, and the fourth stage analog cancellation unit and the fourth stage control unit function to cancel the nonlinear component of the interference signal from the weak interference transmitting antenna port to the receiving antenna port, and the implementation method of the third-order to P-order component cancellation unit in the fourth stage analog cancellation unit and the fourth stage control unit may be consistent with the method described in Embodiment VIII, wherein the feedback type of the fourth stage control unit may be the analog signal or digital signal of the receiving end, respectively corresponding to the feedback type 1 and the feedback type 2 in FIG. 64*a* and FIG. 64*b*. The input signal of the fourth stage analog cancellation unit may be a superposed signal of a plurality of transmitting antenna port transmit signals.

Digital Cancellation Module of Receiving End

The digital domain circuit of the reception circuit is a digital domain, and the digital domain circuit of the transmission circuit is a digital domain.

The function of the digital cancellation module of the receiving end is consistent with those described in Embodiment VI to Embodiment X, which are all in digital domain, that is, after an analog-to-digital conversion module of the receiving end, the self-interference signals from the transmitting antenna port to the receiving antenna port in the same device are canceled, and the same device means same base station or same terminal.

FIG. 63 is a structural block diagram of a digital cancellation module of a receiving end by taking a base station as an example. Part functions of the channel estimation unit in the digital cancellation module of the multi-antenna system are consistent with those in Embodiment VIII to Embodiment X, first functioning to estimate a self-interference channel from each transmitting antenna port to each receiving antenna port in same multi-antenna full-duplex device, wherein the multi-antenna full-duplex device may be a full-duplex base station or a full-duplex terminal. Differently from Embodiment VIII to Embodiment X, when the multi-antenna full-duplex device is a full-duplex base station, the channel estimation unit for digital cancellation in the digital cancellation module may further include uplink channel estimation of terminal transmitting antenna port to base station receiving antenna port; when the multi-antenna full-duplex device is a full-duplex terminal, the channel estimation unit for digital cancellation in the digital cancellation module may further include downlink channel estimation of base station transmitting antenna port to terminal receiving antenna port. In particular, uplink channel estimation or downlink channel estimation included in the channel estimation unit for digital cancellation may be used for digital beam forming unit.

The function of digital beam forming in the digital cancellation module of the receiving end of the multi-antenna system is consistent with that in the prior art, which means calculating transmitting beam forming vector of transmitting end, and/or calculating beam forming vector of receiving end. A complex modulation signal is noted as s, and a transmitting beam forming signal via the transmitting end is noted as $t=G_{tx} \cdot s$, wherein, $G_{tx}$ means the transmitting beam forming vector, t means the transmitting signal vector, and dimensions are the number of transmitting antennas multiplied by one. The received signal vector is noted as r, dimensions are the number of transmitting antennas multiplied by one, and the estimated transmitting signal obtained after the received signal vector being beam formed may be noted as $\hat{s}=G_{rx}^{H} \cdot r$ wherein, $G_{rx}$ means the receiving beam forming vector (or referred as equalization vector), dimensions are the number of transmitting antennas multiplied by one, and $\hat{s}$ means the estimated transmitting signal which is a complex number like s. The calculation methods of transmitting beam forming and receiving beam forming may be found in many references. In addition to the conventional calculation of the beam forming vector based on the propagation channel between the terminal and the base station, as in references, self-interference signal energy may be effectively reduced by reasonable designing transmitting and receiving beam forming vectors for the multi-antenna full-duplex system, which these beam forming vectors may be generated by minimizing the self-interference signal, minimizing the mean square error of the residual self-interference signal and noise, or the like.

The digital cancellation unit of the digital cancellation module in the receiving end of the multi-antenna system functions to calculate the self-interference signal at the receiving end and subtract the self-interference signal from the received signal. Specifically, calculating the self-interference signal of the receiving end may be implemented according to the estimated self-interference channel, or the estimated self-interference channel and the digital beam forming vector. For example, an estimated self-interference channel matrix of multi-transmitting antennas to multi-receiving antennas in the same device is noted as H, and dimensions are the number of transmitting antennas multiplied by one. The transmitting signal vector of the transmitting end at the same time is noted as t, and dimensions are the number of transmitting antennas multiplied by one. Then, the process, of calculating the self-interference signal of the receiving end according to the estimated self-interference channel and subtracting the self-interference signal from the received signal, may be noted as r−H·t, wherein r is the received single vector, and dimensions are the number of transmitting antennas multiplied by one.

When there is digital beam forming in the transmitting end, regardless of whether the digital beam forming in the transmitting end is used for self-interference signal cancellation, the transmitting signal vector of the transmitting end at the same time is noted as $r=G_{tx} \cdot s$, and then the digital canceling unit calculates the self-interference signal according to the self-interference channel to be estimated and the digital beam forming vector, and subtracts the self-interference signal from the received signal. This process is further written as $r-H \cdot G_{tx} \cdot s$, wherein, $G_{tx}$ means the digital beam forming vector in the transmitting end, dimensions are the number of transmitting antennas multiplied by one, and s means the transmitted complex signal which is a complex number.

Digital Pre-Cancellation Module of Transmitting End

The digital pre-cancellation module of the transmitting end functions to achieve the purpose of reducing or canceling self-interference by processing the transmitting signal. The process of the transmitting signal includes at least one of the following: the spreading or scrambling technology in Embodiment XI, and the beam forming technology in the transmitting end.

When the multi-antenna full-duplex device is a base station, as shown in FIG. 63, the allocated spreading code/scrambling code obtained from the MAC layer of the base station is used for spreading/scrambling the transmitting signal. When the multi-antenna full-duplex device is a terminal, the allocated spreading code/scrambling code obtained according to the base station signaling is used for spreading/scrambling the transmitting signal. Specific implementations of spreading and scrambling is referred in Embodiment XI.

Corresponding to spreading/scrambling subunit, after the receiving end signal processed by the digital cancellation module, de-spreading and de-scrambling subunits should be added before operations of demodulation, decoding, and the like, which may be referred in Embodiment XI and will not be described here.

Figure 65:
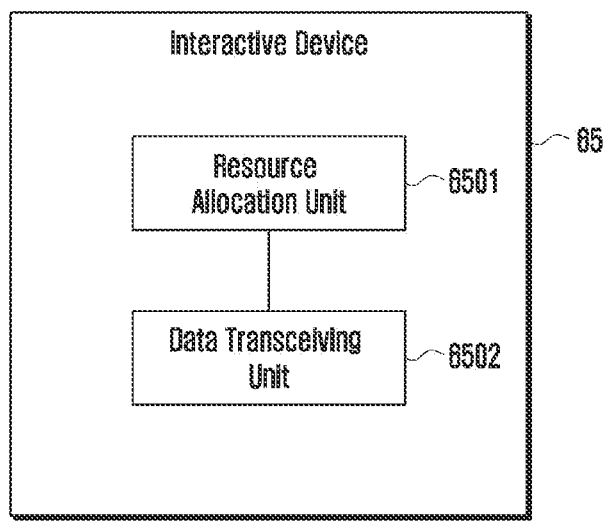
FIG. 65 is a schematic structural diagram showing an interactive apparatus based on a full-duplex transceiver according to Embodiment XIII of the present application.

Embodiment XIII Based on the same inventive concept, the embodiment of the present application provides an interactive device 65, and the schematic structural diagram of the interactive device is shown in FIG. 65, including: a resource allocation unit 6501 and a data transceiving unit 6502.

The resource allocation unit 6501 is used for allocating time-and-frequency resources and different code domain resources for uplink data and downlink data of each terminal equipment, wherein the code domain resources are orthogonal resources or non-orthogonal resources.

The data transceiving unit 6502 is used for informing terminal equipment of uplink and downlink time-and-frequency resource allocations and uplink and downlink code domain resource allocations; and for transmitting downlink data to the terminal equipment according to the downlink time-and-frequency resource allocations and the downlink code domain resource allocations, and receiving the uplink data sent by the terminal equipment based on the uplink time-and-frequency resource allocations and the uplink code domain resource allocations.

Optionally, the resource allocation unit 6501 is specifically used for allocating same time-and-frequency resource for the uplink data and the downlink data; the same time-and-frequency resource includes at least one successive uplink and downlink common time-and-frequency resource block, and for each successive uplink and downlink common time-and-frequency resource block, a single pair or a plurality of pairs of codewords are used for covering the uplink and downlink common time-and-frequency resource blocks, and performing code operation on the uplink data and the downlink data by using different or identical codewords; and/or, the sizes of different codeword pairs are the same or different; and/or, the times for repeated using a single pair of codewords is the same or different.

Optionally, the resource allocation unit 6501 is specifically used for performing, when the uplink data or the downlink data is a symbol, at least one of the following operations on the symbol in code domain, time domain, and/or frequency domain: spreading, scrambling.

Optionally, the resource allocation unit 6501 is further used for performing, when allocating uplink resources or downlink resources for a non-orthogonal multiple access user, at least one of the following:

scheduling multiple users with non-orthogonal multiple access on the same time-and-frequency resource, with different uplink codewords and without allocating multiple access signatures;

scheduling multiple users with non-orthogonal multiple access in the same time-and-frequency resource, with different uplink codewords and different multiple access signatures;

scheduling multiple users with non-orthogonal multiple access in the same time-and-frequency resource, with same uplink codeword and different multiple access signatures.

Figure 66:
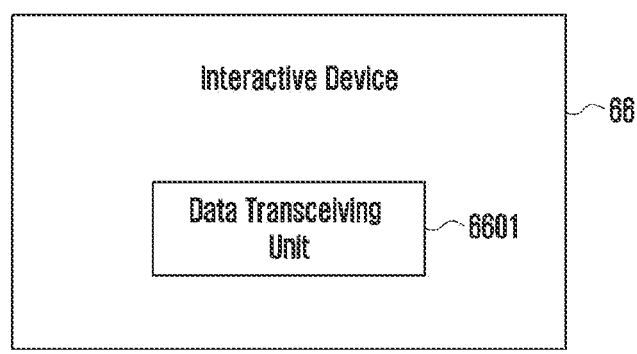
FIG. 66 is a schematic structural diagram showing another interactive apparatus based on a full-duplex transceiver according to Embodiment XIII of the present application.

Based on the same inventive concept, the embodiment of the present application provides another interactive device 66 based on the full-duplex transceiver of the present application, and schematic structural diagram of the interactive device is as shown in FIG. 66, including: a data transceiving unit 6601.

The data transceiving unit 6601 is used for receiving uplink and downlink time-and-frequency resource allocations and uplink and downlink code domain resource allocations from a base station; and for receiving downlink data sent by the base station according to the allocated downlink time-and-frequency resource and the allocated downlink code domain resource, and transmitting the uplink data to the base station according to the allocated uplink time-and-frequency resource and the allocated uplink code domain resource.

The interactive device 65 and the interactive device 66 of the present embodiment based on the full-duplex transceiver of the present application may perform the interactive method based on the full-duplex transceiver of the present application shown in Embodiment XI of the present application, which implementing principles thereof are similar and will not be described again.

Embodiment XIV

Based on the same inventive concept, the embodiment of the present application provides a computer readable storage medium, wherein the computer readable storage medium stores a computer program, and the program implements the method shown in Embodiment XI when the program is executed by the processor.

In particular, those skilled in the art will appreciate that the present application includes apparatus related to performing one or more of the operations described herein, including a full-duplex transceiver and an electronic apparatus. These devices may be specially designed and manufactured for required purposes, or may also include known devices in a general-purpose computer. These devices have computer programs stored therein that are selectively activated or reconfigured. Such computer programs may be stored in a device (e.g., a computer) readable medium or in any type of medium suitable for storing electronic instructions and respectively coupled to a bus, including but not limited to, any types of disks (including floppy disks, hard disks, optical disks, CD-ROMs, and magneto-optical disks), ROMs (Read-Only Memory), RAMs (Random Access Memory), EPROMs (Erasable Programmable Read-Only Memory), EEPROMs (Electrically Erasable Programmable Read-Only Memory), flash memories, magnetic cards or light cards. That is, the readable medium includes any medium that is stored or transmitted by a device (e.g., a computer) in a readable form.

The technical effects of Embodiment XV of the present application are consistent with the technical effects of Embodiment XII, and are not described again.

The embodiment of the present application provides a computer readable storage medium suitable for the foregoing method embodiments. Details will not be described again.

It should be noted that the above solutions can be combined arbitrarily without any conflict therebetween. For example, the solutions of FIGS. 13-22, the solutions of FIGS. 23-34, and the solutions of FIGS. 35-66 can be regarded as particular implementations, or supplements, of solutions depicted in FIGS. 1 and/or 2. As an example, the receiving/obtaining step in FIGS. 13 and 24 may be a particular implementation of the receiving step in FIG. 1, the transmitting step in FIGS. 13 and 24 may be a particular implementation of the transmitting step in FIG. 1, and the like. It should also be noted that other combinations may also be known to those skilled in the art, and thus fall into the scope of the invention. The above combination is only an example to which the invention should not be limited. For example, the solutions of FIGS. 1-12 may also be used as particular implementations, or supplements, of the solutions of FIGS. 13-22 and/or the solutions of FIGS. 23-34 and/or the solutions of FIGS. 35-66.

Figure 67:
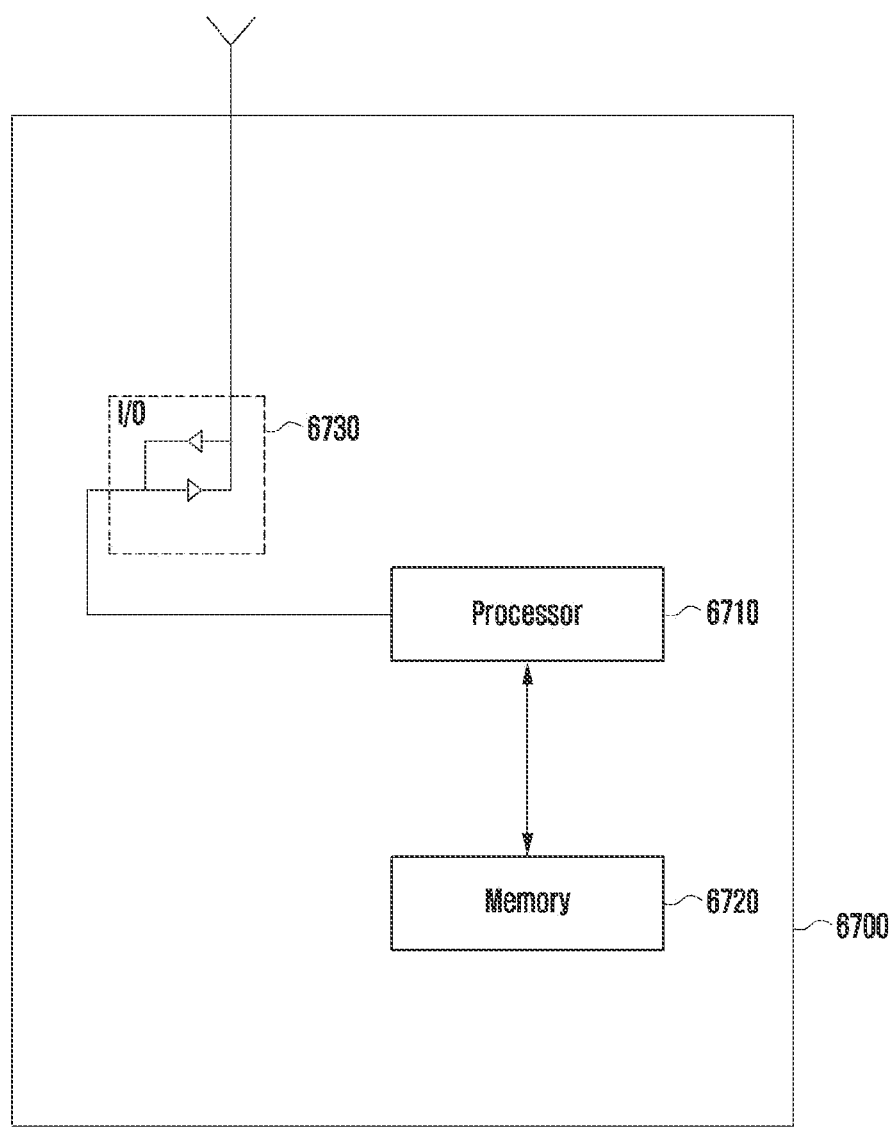
FIG. 67 schematically illustrates a block diagram of a device according to an embodiment of the present disclosure.

FIG. 67 schematically illustrates a block diagram of a device 6700 according to an embodiment of the present disclosure. The device 6700 comprises a processor 6710, for example, a Digital Signal Processor (DSP). The processor 6710 may be a single apparatus or multiple apparatuses for performing different actions according to the embodiments of the present disclosure. The device 6700 may further comprise an Input/Output (I/O) apparatus 6730 configured to receive signals from other entities or transmit signals to other entities.

In addition, the device 6700 comprises a memory 6720 which may be in a form of non-volatile or volatile memory, for example, an Electrically Erasable Programmable Read Only Memory (EEPROM), a flash memory, etc. The memory 6720 has computer readable instructions stored thereon, which when executed by the processor 6710, cause the processor to perform the method according to the embodiments of the present disclosure.

It can be understood by those skilled in the art that the methods described above are merely exemplary. The method according to the present disclosure is not limited to the steps and sequences described above. The device described above may comprise more modules, for example, may further comprise modules which have been developed or will be developed in the future for base stations or UEs, etc. Various identifications described above are merely exemplary and not restrictive, and the present disclosure is not limited to specific cells as examples of such identifications. Many variations and modifications can be made by those skilled in the art in light of the teachings of the illustrated embodiments.

It should be understood that the embodiments of the present disclosure described above may be implemented by software, hardware, or a combination thereof. For example, various components within the device in the embodiments described above may be implemented by various devices including, but not limited to, analog circuit devices, digital circuit devices, Digital Signal Processing (DSP) circuits, programmable processors, Application-Specific Integrated Circuits (ASICs), Field Programmable Gate Arrays (FPGAs), Programmable Logic Devices (CPLDs), etc.

In the present application, "base station" refers to a mobile communication data and control switching center having a large transmission power and a relatively large coverage area, which has functions such as resource allocation scheduling, data reception and transmission, etc. "Terminal" refers to a user equipment, for example, a terminal device which may comprise a mobile phone, a notebook, etc., and may communicate wirelessly with a base station or a micro-base station.

Further, the embodiments of the present disclosure disclosed here may be implemented on a computer program product. More specifically, the computer program product is a product having a computer readable medium encoded with a computer program logic which, when executed on a computing device, provides related operations to implement the technical solutions of the present disclosure. When executed on at least one processor of a computing system, the computer program logic causes the processor to perform the operations (methods) described in the embodiments of the present disclosure. Such an arrangement according to the present disclosure is typically provided as software, codes and/or other data structures, disposed or encoded on a computer readable medium such as an optical medium (for example, CD-ROM), a floppy disk, or a hard disk etc., firmware or other media for micro-codes on one or more ROM or RAM or PROM chips, or downloadable software images, shared databases, etc. in one or more modules. The software or firmware or such a configuration may be installed on the computing device, so that one or more processors in the computing device perform the technical solutions described in the embodiments of the present disclosure.

Although the present disclosure has been described above in combination with the preferred embodiments of the present disclosure, it will be understood that various modifications, alterations and changes may be made to the present disclosure without departing from the spirit and scope of the present disclosure. Therefore, the present disclosure should not be limited by the embodiments described above, but should be defined by the appended claims and equivalents thereof.

What is claimed is:

1. A method performed by a terminal supporting a full duplex mode in a wireless communication system, the method comprising:
   obtaining first information associated with a waveform, wherein the first information indicates whether transform precoding for orthogonal frequency division multiplexing (OFDM) is enabled or disabled;
   identifying second information on resource mapping for a downlink based on the first information;
   identifying third information on resource mapping for an uplink based on the first information;
   identifying fourth information on a resource allocation type for the uplink and fifth information on a resource allocation type for the downlink based on the first information, wherein the fourth information and the fifth information indicate whether a resource allocation in a frequency domain is continuous or not continuous;
   receiving, from a base station, a downlink signal based on the second information and the fifth information; and
   transmitting, to the base station, an uplink signal based on the third information and the fourth information.

2. The method of claim 1,
   wherein the obtaining of the first information comprises receiving, from the base station, information indicating a combination of a uplink waveform and a downlink waveform.

3. The method of claim 1,
   wherein in case that at least one of an uplink waveform or a downlink waveform is associated with OFDM for which transform precoding is enabled, the resource mapping for the uplink and the resource mapping for the downlink are associated with a frequency hopping with a same frequency hopping pattern, and
   wherein in case that the uplink waveform and the downlink waveform are associated with OFDM for which transform precoding is disabled, the resource mapping for the uplink and the resource mapping for the downlink are associated with a distributed mapping.

4. The method of claim 1, wherein in case that at least one of an uplink waveform or a downlink waveform is associated with OFDM for which transform precoding is enabled, the resource allocation type for the uplink and the resource allocation type for the downlink indicate the resource allocation that is continuous in the frequency domain.

5. The method of claim 1, further comprising:
   receiving, from the base station, information on a resource that is invalid for a downlink reception or an uplink transmission.

6. The method of claim 5,
   wherein the resource that is invalid for the downlink reception or the uplink transmission includes a physical uplink shared channel (PUSCH) resource that overlaps with a physical downlink control channel (PDCCH) resource or a physical downlink shared channel (PDSCH) resource that overlaps with a physical uplink control channel (PUCCH) resource.

7. A method performed by a base station supporting a full duplex mode in a wireless communication system, the method comprising:
   transmitting, to a terminal, first information associated with a waveform, wherein the first information indicates whether transform precoding for orthogonal frequency division multiplexing (OFDM) is enabled or disabled;
   determining second information on resource mapping for a downlink based on the first information;
   determining third information on resource mapping for an uplink based on the first information;
   determining fourth information on a resource allocation type for the uplink and fifth information on a resource allocation type for the downlink based on the first information, wherein the fourth information and the fifth information indicate whether a resource allocation in a frequency domain is continuous or not continuous;
   transmitting, to the terminal, a downlink signal based on the second information and the fifth information; and
   receiving, from the terminal, an uplink signal based on the third information and the fourth information.

8. The method of claim 7,
   wherein the first information includes information indicating a combination of a uplink waveform and a downlink waveform.

9. The method of claim 7,
   wherein in case that at least one of an uplink waveform or a downlink waveform is associated with OFDM for which transform precoding is enabled, the resource mapping for the uplink and the resource mapping for the downlink are associated with a frequency hopping with a same frequency hopping pattern, and
   wherein in case that the uplink waveform and the downlink waveform are associated with OFDM for which transform precoding is disabled, the resource mapping for the uplink and the resource mapping for the downlink are associated with a distributed mapping.

10. The method of claim 7, wherein in case that at least one of an uplink waveform or a downlink waveform is associated with OFDM for which transform precoding is enabled, the resource allocation type for the uplink and the resource allocation type for the downlink indicate the resource allocation that is continuous in the frequency domain.

11. The method of claim 7, further comprising:
    transmitting, to the terminal, information on a resource that is invalid for a downlink reception or an uplink transmission,
    wherein the resource that is invalid for the downlink reception or the uplink transmission includes a physical uplink shared channel (PUSCH) resource that overlaps with a physical downlink control channel (PDCCH) resource or a physical downlink shared channel (PDSCH) resource that overlaps with a physical uplink control channel (PUCCH) resource.

12. A terminal supporting a full duplex mode in a wireless communication system, the terminal comprising:
    a transceiver; and
    a controller coupled with the transceiver and configured to:
       obtain first information associated with a waveform, wherein the first information indicates whether transform precoding for orthogonal frequency division multiplexing (OFDM) is enabled or disabled, identify second information on resource mapping for a downlink based on the first information, identify third information on resource mapping for an uplink based on the first information, identify fourth information on a resource allocation type for the uplink and fifth information on a resource allocation type for the downlink based on the first information, wherein the fourth information and the fifth information indicate whether a resource allocation in a frequency domain is continuous or not continuous, receive, from a base station, a downlink signal based on the second information and the fifth information, and transmit, to the base station, an uplink signal based on the third information and the fourth information.

13. The terminal of claim 12,
wherein the controller is configured to receive, from the base station, information indicating a combination of an uplink waveform and a downlink waveform for obtaining the first information.

14. The terminal of claim 12,
wherein in case that at least one of an uplink waveform or a downlink waveform is associated with OFDM for which transform precoding is enabled, the resource mapping for the uplink and the resource mapping for the downlink are associated with a frequency hopping with a same frequency hopping pattern, and
wherein in case that the uplink waveform and the downlink waveform are associated with OFDM for which transform precoding is disabled, the resource mapping for the uplink and the resource mapping for the downlink are associated with a distributed mapping.

15. The terminal of claim 12, wherein in case that at least one of an uplink waveform or a downlink waveform is associated with OFDM for which transform precoding is enabled, the resource allocation type for the uplink and the resource allocation type for the downlink indicate the resource allocation that is continuous in the frequency domain.

16. The terminal of claim 12,
wherein the controller is further configured to receive, from the base station, information on a resource that is invalid for a downlink reception or an uplink transmission, and
wherein the resource that is invalid for the downlink reception or the uplink transmission includes a physical uplink shared channel (PUSCH) resource that overlaps with a physical downlink control channel (PDCCH) resource or a physical downlink shared channel (PDSCH) resource that overlaps with a physical uplink control channel (PUCCH) resource.

17. A base station supporting a full duplex mode in a wireless communication system, the base station comprising:
a transceiver; and
a controller coupled with the transceiver and configured to:
transmit, to a terminal, first information associated with a waveform, wherein the first information indicates whether transform precoding for orthogonal frequency division multiplexing (OFDM) is enabled or disabled,
determine second information on resource mapping for a downlink based on the first information,
determine third information on resource mapping for an uplink based on the first information,
determine fourth information on a resource allocation type for the uplink and fifth information on a resource allocation type for the downlink based on the first information, wherein the fourth information and the fifth information indicate whether a resource allocation in a frequency domain is continuous or not continuous,
transmit, to the terminal, a downlink signal based on the second information and the fifth information, and
receive, from the terminal, a uplink signal based on the third information and the fourth information.

18. The base station of claim 17,
wherein the first information includes information indicating a combination of a uplink waveform and a downlink waveform.

19. The base station of claim 17,
wherein in case that at least one of an uplink waveform or a downlink waveform is associated with OFDM for which transform precoding is enabled, the resource mapping for the uplink and the resource mapping for the downlink are associated with a frequency hopping with a same frequency hopping pattern, and
wherein in case that the uplink waveform and the downlink waveform are associated with OFDM for which transform precoding is disabled, the resource mapping for the uplink and the resource mapping for the downlink are associated with a distributed mapping.

20. The base station of claim 17, wherein in case that at least one of an uplink waveform or a downlink waveform is associated with OFDM for which transform precoding is enabled, the resource allocation type for the uplink and the resource allocation type for the downlink indicate the resource allocation that is continuous in the frequency domain.

* * * * *